US010674857B2

(12) United States Patent
Lyons et al.

(10) Patent No.: US 10,674,857 B2
(45) Date of Patent: Jun. 9, 2020

(54) PORTABLE SYSTEM FOR DISPENSING CONTROLLED QUANTITIES OF ADDITIVES INTO A BEVERAGE

(71) Applicant: LifeFuels, Inc., Reston, VA (US)

(72) Inventors: Mark Lyons, Ashburn, VA (US); Jonathon Perrelli, Leesburg, VA (US); Robert Lawson-Shanks, Reston, VA (US); Abraham Maclean, Reston, VA (US); Connor Bacon, Reston, VA (US); James Christopher Small, Stratford-upon-Avon (GB); Jesse John Horne, Stratford-upon-Avon (GB); Simon Lewis Bilton, Leamington Spa (GB); Matthew James Edwards, Leamington Spa (GB); Andrew Gordon Wallace, Long Itchington (GB); Maxim D. Wheatley, Reston, VA (US); David J. Wheatley, Reston, VA (US); Todd Metlen, Ojai, CA (US)

(73) Assignee: LifeFuels, Inc., Reston, VA (US)

( * ) Notice: Subject to any disclaimer, the term of this patent is extended or adjusted under 35 U.S.C. 154(b) by 0 days.

(21) Appl. No.: 15/862,206

(22) Filed: Jan. 4, 2018

(65) Prior Publication Data

US 2018/0177325 A1 Jun. 28, 2018

Related U.S. Application Data

(63) Continuation-in-part of application No. 14/960,109, filed on Dec. 4, 2015, now Pat. No. 9,932,217.
(Continued)

(51) Int. Cl.
*A47J 31/00* (2006.01)
*A47J 31/46* (2006.01)
*A47J 31/40* (2006.01)

(52) U.S. Cl.
CPC ........... *A47J 31/005* (2013.01); *A47J 31/002* (2013.01); *A47J 31/40* (2013.01); *A47J 31/401* (2013.01); *A47J 31/46* (2013.01); *Y02T 10/56* (2013.01)

(58) Field of Classification Search
CPC ........ A47J 31/005; A47J 31/40; A47J 31/002; A47J 30/401; A47J 31/46; A47J 31/401; Y02T 10/56
(Continued)

(56) References Cited

U.S. PATENT DOCUMENTS

| D95,559 S | 5/1935 | Vogel |
| D97,347 S | 10/1935 | Gambell |

(Continued)

FOREIGN PATENT DOCUMENTS

| CN | 1942392 | 4/2007 |
| DE | 3428178 | 2/1986 |

(Continued)

*Primary Examiner* — Michael Collins
(74) *Attorney, Agent, or Firm* — Kenealy Vaidya LLP

(57) ABSTRACT

A portable, self-contained beverage apparatus includes a container assembly having a known storage capacity for storing a consumable liquid, and a dispensing assembly disposed within the container assembly that dispenses variable, non-zero quantities of additives into the consumable liquid. The dispensing assembly includes multiple apertures structured and arranged to retain vessels containing the additives to be dispensed into the consumable liquid. The beverage apparatus also includes a level sensor disposed within the container assembly that determines a consumable liquid level of the consumable liquid stored in the container assembly. In certain embodiments, one or more positive displacement pumping mechanisms are configured to pump additive liquid from additive containers into a beverage chamber.

15 Claims, 70 Drawing Sheets

Related U.S. Application Data

(60) Provisional application No. 62/442,039, filed on Jan. 4, 2017, provisional application No. 62/174,415, filed on Jun. 11, 2015, provisional application No. 62/174,466, filed on Jun. 11, 2015, provisional application No. 62/174,935, filed on Jun. 12, 2015, provisional application No. 62/088,189, filed on Dec. 5, 2014.

(58) Field of Classification Search
USPC .................................................. 700/231–244
See application file for complete search history.

(56) References Cited

U.S. PATENT DOCUMENTS

| | | |
|---|---|---|
| 2,071,399 A | 2/1937 | Gambell |
| D157,486 S | 2/1950 | Glowacki |
| 2,682,355 A | 6/1954 | Robbins |
| D192,814 S | 5/1962 | Edwin |
| 3,319,637 A | 5/1967 | Gore |
| 3,548,657 A | 12/1970 | Panerai |
| D225,364 S | 12/1972 | Antoni |
| 3,727,803 A | 4/1973 | Cobb |
| D242,132 S | 11/1976 | Hasegawa |
| 4,051,726 A | 10/1977 | Hastbacka |
| 4,087,024 A | 5/1978 | Martin |
| 4,125,187 A | 11/1978 | Vecchiotti |
| 4,133,457 A | 1/1979 | Klassen |
| 4,450,722 A | 5/1984 | Keyes, IV |
| D279,621 S | 7/1985 | Richer |
| 4,688,701 A | 8/1987 | Sedam |
| 4,728,006 A | 3/1988 | Drobish |
| D295,954 S | 5/1988 | Kirchhoff |
| D296,302 S | 6/1988 | Weber |
| 4,898,306 A | 2/1990 | Pardes |
| 4,938,387 A | 7/1990 | Kervefors |
| 4,964,541 A | 10/1990 | Gueret |
| 5,080,260 A | 1/1992 | Doring |
| 5,119,279 A | 6/1992 | Makowsky |
| 5,139,169 A | 8/1992 | Boyer |
| 5,174,458 A | 12/1992 | Segati |
| 5,182,084 A | 1/1993 | Plester |
| D336,216 S | 6/1993 | Rohrbeck |
| 5,325,765 A | 7/1994 | Sylvan |
| D352,204 S | 11/1994 | Hayes |
| 5,377,877 A | 1/1995 | Brown et al. |
| 5,379,916 A | 1/1995 | Martindale |
| 5,398,853 A | 3/1995 | Latham |
| 5,474,211 A | 12/1995 | Hellenberg |
| D372,867 S | 8/1996 | Lambelet |
| D382,808 S | 8/1997 | Fenton |
| D383,383 S | 9/1997 | Prestia |
| D387,992 S | 12/1997 | Kotoucek |
| 5,725,125 A | 3/1998 | Bessette |
| 5,747,824 A | 5/1998 | Jung |
| D396,603 S | 8/1998 | Gasser |
| D399,098 S | 10/1998 | Yang |
| D400,050 S | 10/1998 | Littmann |
| D404,253 S | 1/1999 | Littmann |
| 5,938,080 A | 8/1999 | Haaser |
| 6,077,579 A | 6/2000 | De Laforcade |
| 6,142,063 A | 11/2000 | Beaulieu |
| 6,170,712 B1 | 1/2001 | Kasboske |
| 6,230,884 B1 | 5/2001 | Coory |
| 6,422,422 B1 | 7/2002 | Forbes |
| 6,504,481 B2 | 1/2003 | Teller |
| D477,791 S | 7/2003 | Wells |
| D478,073 S | 8/2003 | Topinka |
| 6,615,881 B2 | 9/2003 | Bartholomew |
| 6,644,471 B1 | 11/2003 | Anderson |
| 6,722,530 B1 | 4/2004 | King |
| 6,761,318 B2 | 7/2004 | Dudek |
| D499,603 S | 12/2004 | Nikkhah |
| D500,936 S | 1/2005 | Nikkhah |
| 6,889,872 B2 | 5/2005 | Herman |
| 6,921,911 B2 | 7/2005 | Siepmann |
| 6,925,871 B2 | 8/2005 | Frank |
| 6,935,493 B2 | 8/2005 | Cho |
| D514,385 S | 2/2006 | Smith |
| 7,004,213 B2 | 2/2006 | Hansen |
| D517,852 S | 3/2006 | Jalet |
| D522,860 S | 6/2006 | LaFortune |
| D523,332 S | 6/2006 | McEldowney |
| D525,135 S | 7/2006 | Bakic |
| 7,104,184 B2 | 9/2006 | Biderman |
| 7,107,838 B2 | 9/2006 | Chai |
| D529,340 S | 10/2006 | Laib |
| D530,968 S | 10/2006 | Bodum |
| D533,018 S | 12/2006 | Berg |
| 7,172,095 B2 | 2/2007 | Marshall |
| 7,196,624 B2 | 3/2007 | Teller |
| D541,106 S | 4/2007 | Spiegel |
| D541,596 S | 5/2007 | Hicks |
| 7,228,879 B2 | 6/2007 | Miller |
| 7,319,523 B2 | 1/2008 | Chiarello |
| D565,350 S | 4/2008 | Gauger |
| D572,588 S | 7/2008 | Osborn |
| D573,464 S | 7/2008 | Kogure |
| 7,439,859 B2 | 10/2008 | Humphrey |
| D582,767 S | 12/2008 | Batton |
| 7,464,811 B2 | 12/2008 | Patterson |
| 7,501,933 B2 | 3/2009 | Rousso |
| D591,599 S | 5/2009 | Okin |
| D593,411 S | 6/2009 | Bizzell |
| D596,487 S | 7/2009 | Batton |
| 7,614,496 B2 | 11/2009 | Dvorak |
| D608,637 S | 1/2010 | Getsy |
| D611,298 S | 3/2010 | Freeman |
| D613,183 S | 4/2010 | Overgaard |
| 7,710,567 B1 | 5/2010 | Mentzer |
| D618,963 S | 7/2010 | Freeman |
| 7,762,181 B2 | 7/2010 | Boland |
| D621,283 S | 8/2010 | Overgaard |
| 7,798,373 B1 | 9/2010 | Wroblewski et al. |
| D634,157 S | 3/2011 | Hoff |
| D635,823 S | 4/2011 | Mauffette |
| D635,864 S | 4/2011 | Lee |
| D639,607 S | 6/2011 | Bracq |
| 8,083,055 B2 | 12/2011 | Simonian |
| D651,474 S | 1/2012 | Gut |
| 8,091,735 B2 | 1/2012 | Girard |
| 8,141,700 B2 | 3/2012 | Simonian |
| D658,982 S | 5/2012 | Pauser |
| D659,472 S | 5/2012 | D'Amato |
| 8,196,776 B2 | 6/2012 | Doglioni Majer |
| 8,210,396 B2 | 7/2012 | Girard |
| 8,240,508 B2 | 8/2012 | Wegelin |
| 8,302,795 B2 | 11/2012 | Van den Broek |
| 8,361,527 B2 | 1/2013 | Winkler |
| 8,378,830 B2 | 2/2013 | Moran |
| 8,397,519 B2 | 3/2013 | Loibl |
| 8,417,377 B2 | 4/2013 | Rothschild |
| 8,464,633 B2 | 6/2013 | Anson |
| 8,485,359 B2 | 7/2013 | Anderson |
| D688,531 S | 8/2013 | Ceder |
| 8,515,574 B2 | 8/2013 | Studor et al. |
| 8,522,968 B2 | 9/2013 | Middleman |
| 8,523,837 B2 | 9/2013 | Wiggins |
| D690,990 S | 10/2013 | Boggs |
| D690,991 S | 10/2013 | Boggs |
| 8,556,127 B2 | 10/2013 | Olson |
| 8,584,691 B2 | 11/2013 | Hammonds |
| 8,584,840 B2 | 11/2013 | Kim |
| 8,590,753 B2 | 11/2013 | Marina |
| D699,106 S | 2/2014 | Glaser |
| D699,996 S | 2/2014 | De Leo |
| D700,008 S | 2/2014 | Ehrenhaus |
| 8,678,183 B2 | 3/2014 | Jones |
| D702,474 S | 4/2014 | Scherer et al. |
| 8,684,231 B2 | 4/2014 | Lane |
| 8,695,420 B1 | 4/2014 | Korman |
| 8,701,906 B1 | 4/2014 | Anderson |
| 8,717,182 B1 | 5/2014 | Brashears |
| 8,718,819 B2 | 5/2014 | Hyde |

(56) References Cited

U.S. PATENT DOCUMENTS

| | | | |
|---|---|---|---|
| 8,754,769 B2 | 6/2014 | Stein | |
| 8,757,227 B2 | 6/2014 | Girard | |
| D709,387 S | 7/2014 | Marina et al. | |
| 8,794,485 B2 | 8/2014 | Lunn | |
| 8,801,688 B2 | 8/2014 | Wiggins | |
| 8,851,740 B1 | 10/2014 | Mills | |
| 8,919,613 B2* | 12/2014 | Mileti | G01F 11/08 222/105 |
| 8,940,163 B2 | 1/2015 | Bassett | |
| 8,945,374 B2 | 2/2015 | Chase | |
| 8,977,389 B2 | 3/2015 | Witchell | |
| 8,979,539 B1 | 3/2015 | Snyder | |
| 8,985,395 B2 | 3/2015 | Tansey | |
| 8,989,673 B2 | 3/2015 | Sandy | |
| 8,991,648 B2* | 3/2015 | Smith | A47K 5/1208 222/1 |
| D727,171 S | 4/2015 | Marina | |
| 9,014,846 B2 | 4/2015 | Newman | |
| 9,020,635 B2 | 4/2015 | Hortin | |
| D729,571 S | 5/2015 | Wilson | |
| 9,035,222 B2 | 5/2015 | Alexander | |
| 9,035,765 B2 | 5/2015 | Engelhard | |
| D731,242 S | 6/2015 | Machovina | |
| D731,243 S | 6/2015 | Machovina | |
| 9,102,441 B1 | 8/2015 | Orvik | |
| 9,111,324 B2 | 8/2015 | Hyde | |
| 9,126,738 B2 | 9/2015 | Boggs | |
| 9,134,020 B1 | 9/2015 | Wells | |
| 9,138,091 B2 | 9/2015 | Zhao | |
| 9,151,605 B1 | 10/2015 | Sweeney | |
| 9,161,654 B2 | 10/2015 | Belmont | |
| 9,169,112 B2 | 10/2015 | Chase | |
| D742,691 S | 11/2015 | Zhang | |
| D746,046 S | 12/2015 | Lee | |
| D748,955 S | 2/2016 | Oliver | |
| 9,254,250 B1 | 2/2016 | Orofino | |
| D751,865 S | 3/2016 | Harris | |
| D752,391 S | 3/2016 | Hatherell | |
| D752,396 S | 3/2016 | Tu | |
| 9,290,309 B1 | 3/2016 | Pabon | |
| D758,868 S | 6/2016 | Bretschneider | |
| D760,537 S | 7/2016 | Hertaus | |
| D768,507 S | 10/2016 | Hotell | |
| 9,506,798 B2 | 11/2016 | Saltzgiver | |
| D779,881 S | 2/2017 | Lee et al. | |
| D813,049 S | 3/2018 | Richmond | |
| 9,932,217 B2 | 4/2018 | Perrelli et al. | |
| D826,052 S | 8/2018 | Harris et al. | |
| D836,385 S | 12/2018 | Arzunyan | |
| D837,594 S | 1/2019 | Palese | |
| 10,231,567 B2* | 3/2019 | Perrelli | B67D 1/0016 |
| 2002/0070861 A1 | 6/2002 | Teller | |
| 2002/0090426 A1 | 7/2002 | Denny | |
| 2002/0129663 A1 | 9/2002 | Hoyt | |
| 2005/0284302 A1 | 12/2005 | Levin | |
| 2007/0214055 A1 | 9/2007 | Temko | |
| 2008/0023488 A1 | 1/2008 | Guerrero et al. | |
| 2008/0190958 A1 | 8/2008 | Wyner et al. | |
| 2009/0069930 A1 | 3/2009 | Peters et al. | |
| 2009/0120815 A1 | 5/2009 | Mitchell | |
| 2009/0205506 A1 | 8/2009 | Lin | |
| 2009/0206084 A1 | 8/2009 | Woolf | |
| 2009/0228367 A1 | 9/2009 | Hughes | |
| 2009/0272274 A1 | 11/2009 | De Graaff | |
| 2010/0055252 A1* | 3/2010 | Marina | A47J 31/407 426/77 |
| 2010/0163567 A1 | 7/2010 | Chiang | |
| 2010/0183776 A1 | 7/2010 | Gruenwald | |
| 2010/0219151 A1 | 9/2010 | Risheq | |
| 2011/0006071 A1 | 1/2011 | Koumans | |
| 2011/0024537 A1 | 2/2011 | Gonzalez | |
| 2011/0049161 A1 | 3/2011 | Savinskyi | |
| 2011/0050431 A1 | 3/2011 | Hood | |
| 2011/0052764 A1 | 3/2011 | Bulgin | |
| 2011/0166910 A1* | 7/2011 | Marina | B65D 51/2807 705/7.29 |
| 2011/0180563 A1 | 7/2011 | Fitchett | |
| 2012/0017766 A1 | 1/2012 | Anson | |
| 2012/0035761 A1 | 2/2012 | Tilton et al. | |
| 2012/0094261 A1 | 4/2012 | Hayn | |
| 2012/0097567 A1 | 4/2012 | Zhao | |
| 2012/0104023 A1 | 5/2012 | Anselmino | |
| 2012/0173164 A1 | 7/2012 | Steuerwald | |
| 2012/0234183 A1 | 9/2012 | Edwards | |
| 2012/0267320 A1 | 10/2012 | Baccigalopi | |
| 2013/0037506 A1 | 2/2013 | Wahlstrom et al. | |
| 2013/0043304 A1 | 2/2013 | Agan | |
| 2013/0092567 A1 | 4/2013 | Lok | |
| 2013/0127748 A1 | 5/2013 | Vertegaal | |
| 2013/0139703 A1 | 6/2013 | Hogarth | |
| 2013/0156904 A1 | 6/2013 | Nosler | |
| 2013/0186779 A1 | 7/2013 | Kambouris | |
| 2013/0240079 A1 | 9/2013 | Petrini | |
| 2013/0247770 A1* | 9/2013 | Wilder | B67D 1/0021 99/281 |
| 2013/0319915 A1* | 12/2013 | Gellibolian | C02F 1/002 210/87 |
| 2014/0044837 A1 | 2/2014 | Weisman et al. | |
| 2014/0079856 A1 | 3/2014 | Hatherell | |
| 2014/0110476 A1 | 4/2014 | Sheehan | |
| 2014/0114469 A1* | 4/2014 | Givens | B67D 1/0041 700/232 |
| 2014/0272019 A1 | 9/2014 | Schuh et al. | |
| 2014/0273925 A1 | 9/2014 | Burgett | |
| 2014/0277707 A1 | 9/2014 | Akdogan | |
| 2014/0303790 A1 | 10/2014 | Huang | |
| 2014/0305952 A1 | 10/2014 | Harris | |
| 2014/0312247 A1 | 10/2014 | McKee | |
| 2014/0324585 A1 | 10/2014 | Mederos | |
| 2014/0335490 A1 | 11/2014 | Baarman | |
| 2014/0352843 A1 | 12/2014 | Solera et al. | |
| 2014/0354438 A1 | 12/2014 | Hazen | |
| 2014/0372045 A1 | 12/2014 | Keski-Pukkila | |
| 2014/0374438 A1 | 12/2014 | Carpenter et al. | |
| 2015/0014369 A1 | 1/2015 | Hatton | |
| 2015/0024349 A1 | 1/2015 | Bischoff | |
| 2015/0088304 A1* | 3/2015 | Ameye | A47J 31/404 700/233 |
| 2015/0115158 A1 | 4/2015 | Fu | |
| 2015/0060482 A1 | 5/2015 | Murray | |
| 2015/0122688 A1 | 5/2015 | Dias | |
| 2015/0173488 A1 | 6/2015 | Witchell | |
| 2015/0175400 A1 | 6/2015 | Newman | |
| 2015/0182797 A1 | 7/2015 | Wernow | |
| 2015/0183627 A1 | 7/2015 | Tansey, Jr. | |
| 2015/0223623 A1 | 8/2015 | Davis | |
| 2015/0272394 A1 | 10/2015 | Lin | |
| 2015/0284163 A1 | 10/2015 | Manwani | |
| 2016/0159632 A1 | 6/2016 | Wheatley | |
| 2016/0174470 A1 | 6/2016 | Shaffer | |
| 2016/0251234 A1 | 9/2016 | Hayslett | |
| 2016/0317985 A1 | 11/2016 | Mutschler et al. | |
| 2016/0376140 A1* | 12/2016 | Tansey, Jr. | A47J 31/44 700/236 |
| 2017/0156540 A1 | 6/2017 | Wheatley | |
| 2017/0361984 A1 | 12/2017 | Fouad | |
| 2018/0072553 A1 | 3/2018 | Lyons | |
| 2018/0099850 A1 | 4/2018 | Lyons | |
| 2018/0208447 A1 | 7/2018 | Perrelli | |
| 2018/0344070 A1 | 12/2018 | Perrelli | |
| 2019/0208948 A1 | 7/2019 | Perrelli | |

FOREIGN PATENT DOCUMENTS

| | | |
|---|---|---|
| GB | 860987 | 2/1961 |
| WO | WO2008/111072 A2 | 9/2008 |

* cited by examiner

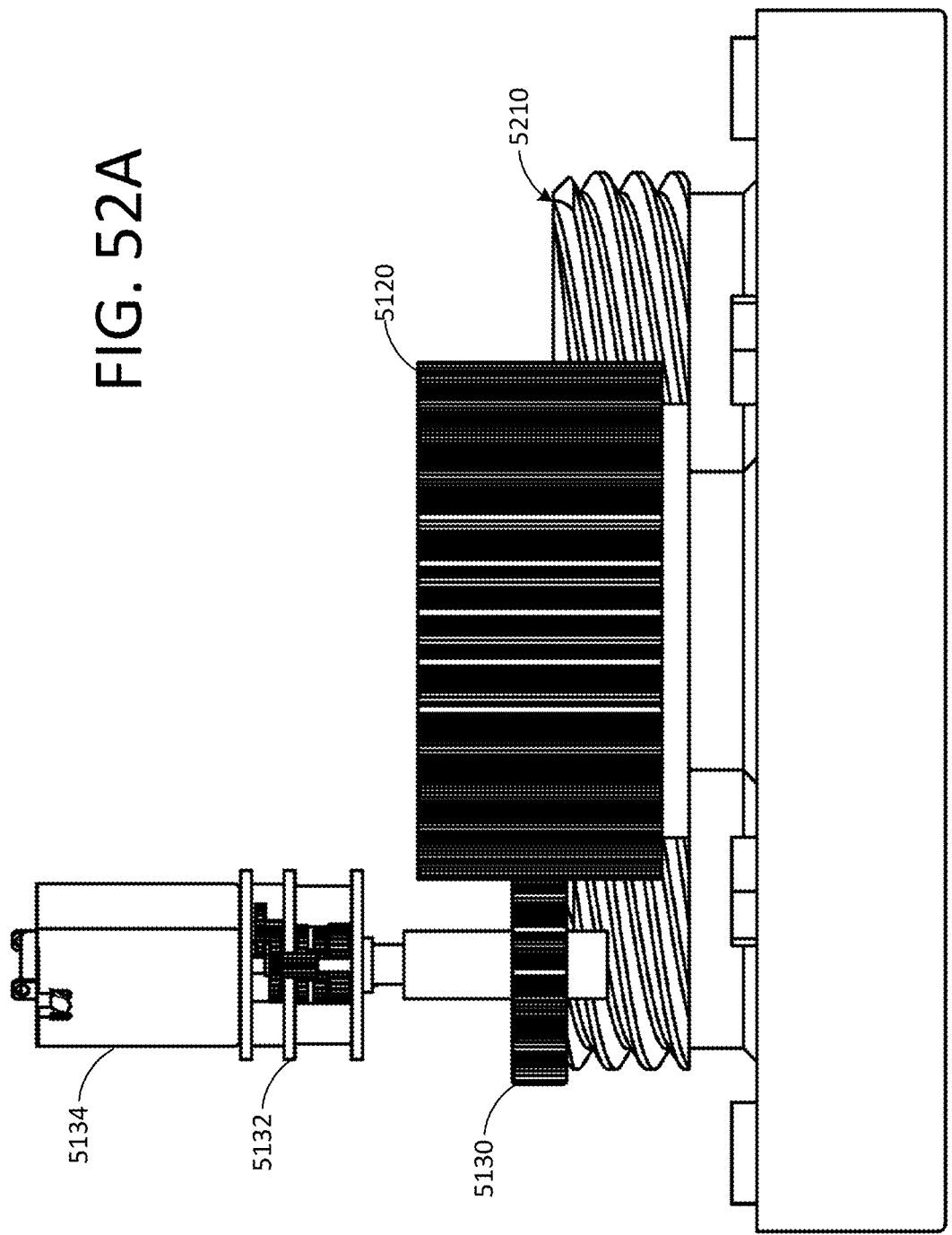

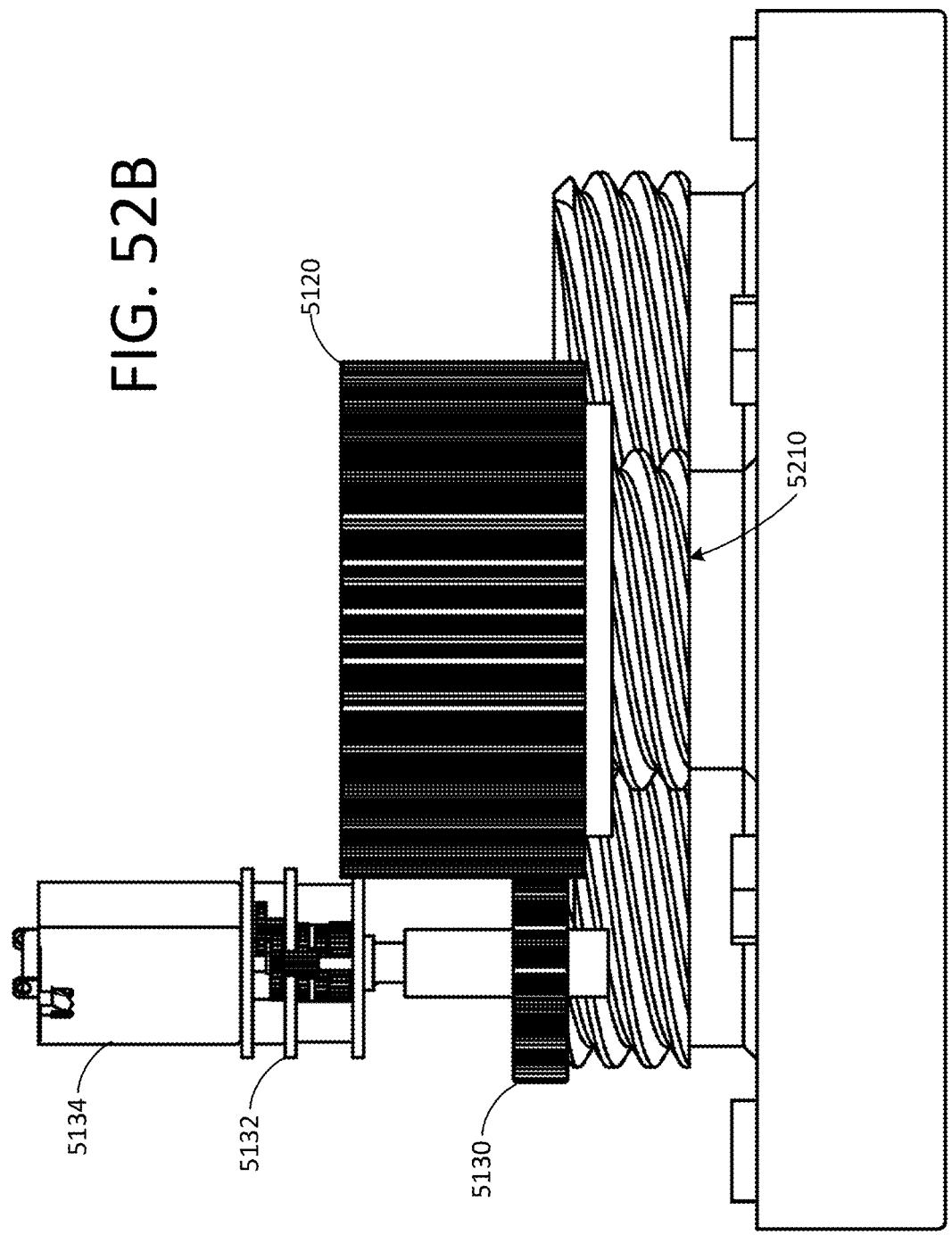

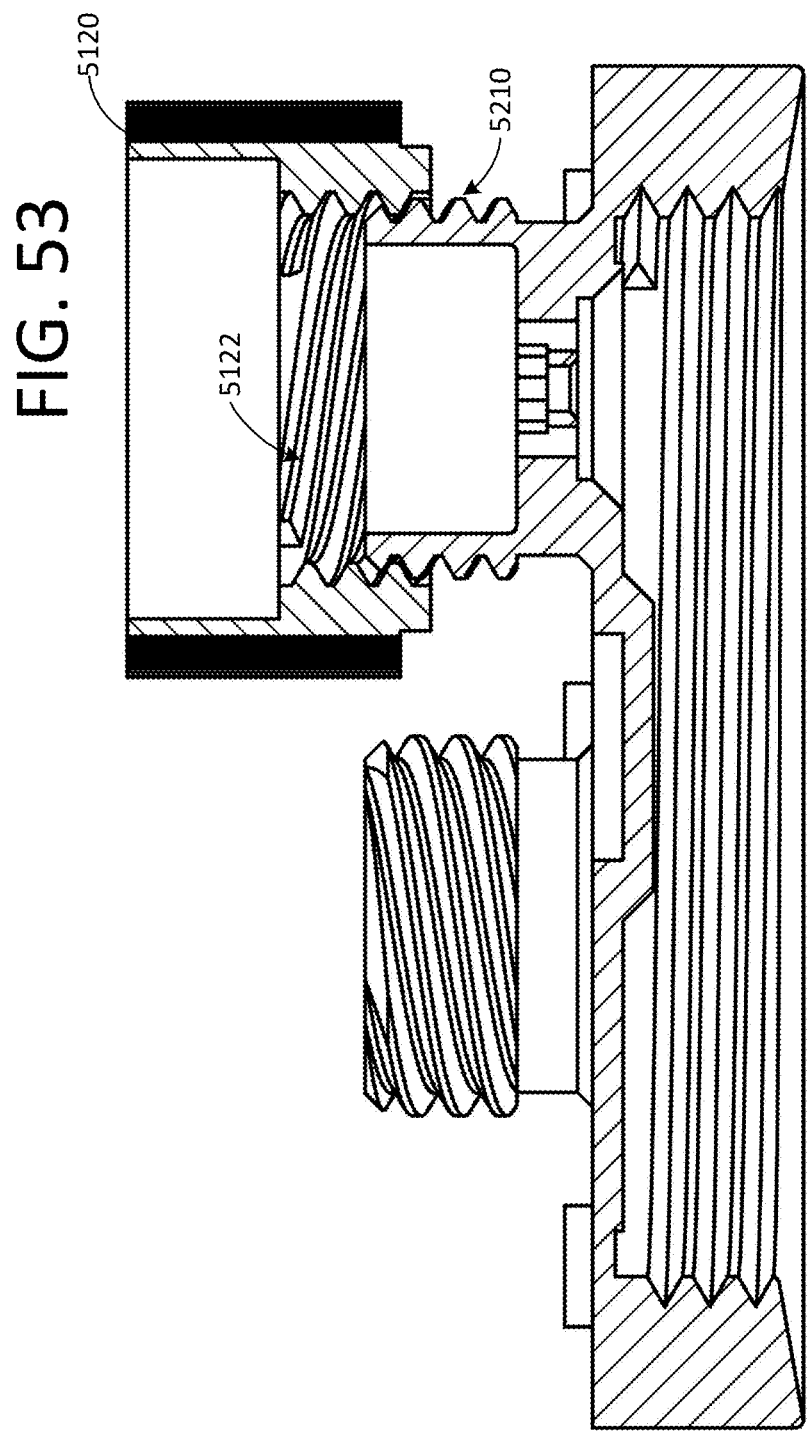

PORTABLE SYSTEM FOR DISPENSING CONTROLLED QUANTITIES OF ADDITIVES INTO A BEVERAGE

RELATED APPLICATIONS AND PRIORITY

This application is a continuation-in-part (CIP) of, and claims priority to, U.S. application Ser. No. 14/960,109 filed Dec. 4, 2015, the entire disclosure of which is hereby incorporated by reference.

This application claims priority to U.S. Provisional Patent Application Ser. No. 62/442,039, filed Jan. 4, 2017, the entire disclosure of which is hereby incorporated by reference.

The subject matter of this application is related to U.S. application Ser. No. 14/960,109, filed Dec. 4, 2015 and published Jun. 9, 2016, which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,415, filed Jun. 11, 2015; and U.S. Provisional Patent Application Ser. No. 62/088,189, filed Dec. 5, 2014, the entire disclosures of which are hereby incorporated by reference.

The subject matter of this application is also related to International Application Ser. No. PCT/US2015/063974, filed Dec. 4, 2015 and published Jun. 9, 2016, which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,415, filed Jun. 11, 2015; and U.S. Provisional Patent Application Ser. No. 62/088,189, filed Dec. 5, 2014, the entire disclosures of which are hereby incorporated by reference.

The subject matter of this application is also related to U.S. application Ser. No. 15/179,709, filed Jun. 10, 2016, which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,459, filed Jun. 11, 2015; U.S. Provisional Patent Application Ser. No. 62/174,453, filed Jun. 11, 2015; U.S. Provisional Patent Application Ser. No. 62/174,447, filed Jun. 11, 2015; U.S. Provisional Patent Application Ser. No. 62/174,427, filed Jun. 11, 2015; U.S. Provisional Patent Application Ser. No. 62/174,415, filed Jun. 11, 2015; U.S. Provisional Patent Application Ser. No. 62/174,343, filed Jun. 11, 2015; U.S. Provisional Patent Application Ser. No. 62/174,336, filed Jun. 11, 2015; U.S. Provisional Patent Application Ser. No. 62/174,254, filed Jun. 11, 2015; and U.S. Provisional Patent Application Ser. No. 62/174,440, filed Jun. 11, 2015, the entire disclosures of which are hereby incorporated by reference.

The subject matter of this application is also related to International Application Ser. No. PCT/US2016/036992, filed Jun. 10, 2016 and published Dec. 15, 2016, which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,459, filed Jun. 11, 2015; U.S. Provisional Patent Application Ser. No. 62/174,453, filed Jun. 11, 2015; U.S. Provisional Patent Application Ser. No. 62/174,447, filed Jun. 11, 2015; U.S. Provisional Patent Application Ser. No. 62/174,427, filed Jun. 11, 2015; U.S. Provisional Patent Application Ser. No. 62/174,415, filed Jun. 11, 2015; U.S. Provisional Patent Application Ser. No. 62/174,343, filed Jun. 11, 2015; U.S. Provisional Patent Application Ser. No. 62/174,336, filed Jun. 11, 2015; U.S. Provisional Patent Application Ser. No. 62/174,254, filed Jun. 11, 2015; and U.S. Provisional Patent Application Ser. No. 62/174,440, filed Jun. 11, 2015, the entire disclosures of which are hereby incorporated by reference.

BACKGROUND

Portable refillable bottles and other containers used for water and other beverages are widely used and are important for health and hydration. Such bottles and containers are also used with increasing frequency to consume functional ingredients, such as, for example, energy, protein, and sleep supplements. However, one limitation of such bottles and hydration containers is that the consumable contents remain constant and unchanged except for changes in quantity as the contents (frequently, but not exclusively water) are consumed and subsequently replenished.

Furthermore, vitamins, health, and dietary supplements in the form of liquids, powders, gels, and solid tablets are becoming increasingly popular and widely consumed. Such supplements and additives are frequently being bought in bulk by consumers since they are using and consuming such supplements and additives on a frequent and long term basis. In addition, such nutritional supplements are frequently dissolved in water for consumption, with different supplements consumed at intervals, several times throughout the day.

SUMMARY

A portable, self-contained beverage apparatus includes a container assembly having a known storage capacity for storing a consumable liquid; a level sensor disposed within, or attached to, the container assembly that determines a consumable liquid level of the liquid stored within the container, and a dispensing assembly disposed within, or attached to the upper or lower end of, said container assembly. The dispensing assembly includes a plurality of apertures structured and arranged to retain additive vessels, which contain additives that may be dispensed into the consumable liquid in variable, non-zero quantities. These additive vessels can be easily inserted or removed by users, and a portion of the contents (e.g., additives) contained therein can be dispensed reliably and repeatedly through a valve, or series of valves, when mechanical force is applied to the vessel, or when mechanical force is applied to the aperture in which the vessel is contained, either via electromechanical means or through "manual" means (e.g., where the force is provided controllably by the user via a mechanical interface).

The dispensing assembly can be easily attached to the container assembly by means of threading, clips, or an otherwise secure attachment mechanism while also being easily separable from one another by a user. In at least one embodiment, the dispensing assembly contains water/temperature sensitive systems, and is separable by the user, allowing the container assembly to be washed, placed in a refrigerator, or be heated in a microwave oven, and the like.

The portable, self-contained beverage apparatus can periodically partially or fully dispense additives into a consumable liquid contained within the container assembly in continuously variable volumes or concentrations, with contextual variables informing type, volume, timing, and the like of the dispensing action. The contextual variables can include or be capable and/or configured to perform one or more of the following: measure the level of liquid in the container and adjust the amount of additive dispensed in order to achieve a targeted level of concentration of the additive in the liquid contained in the container; block or postpone a dispensing event if the container is empty or insufficiently filled; block or postpone dispensing an additive if the container has not been refilled since a previous dispensing of the same additive; trigger dispensing if the container is partially emptied and then refilled so as to maintain a targeted level of additive concentration; block, postpone, or otherwise modify dispensing based upon measured or inferred temperature of the solute, specifically as such data might relate to the solubility of an additive; adjust the amount of additive dispensed based on user preferences and/or user activity, location, environment or context of use; and/or block, postpone, or otherwise modify dispensing based upon prior consumption data, either specific to the device, or as collected from a complementary and/or supporting data source based upon some hourly, daily, or weekly limit or goal, such as food-logging data systems and the like.

As described above, one of the main limitations of existing portable bottles and other containers is that the consumable contents contained in such bottles and containers remain essentially unchanged other than in their quantity. The utility of such bottles and containers can be greatly enhanced if the flavor, consistency, and/or the nutritional, chemical or other make-up of the consumable liquid is altered over some period of time (e.g., hourly, daily, etc.) and/or according to some other cycle based on, for example, the needs or desires of the user, in order to optimize the health and well-being of the user. For example, the consumable liquid can be enhanced with an energy boosting supplement in the morning to facilitate alertness and focus, with vitamin supplements throughout the day, and with a calming nutritional supplement at the end of the day to facilitate quality sleep. Such a daily cycle can be supplemented by an additional longer term cycle of additives dispensed on a weekly, bi-weekly, etc., basis or some other customized time-cycle. As well as nutritional supplements, it may additionally be desirable to dispense other types of substances or additives such as, for example, vitamins, flavorings, pharmaceuticals, and the like, into the contents of portable containers in order to further optimize the health, hydration, recovery, and other benefits to a user, athlete, or patient.

Another feature of the methods, systems, and apparatuses described herein relates to additive vessels retained within apertures in the dispensing assembly, from which the additives are dispensed into the consumable liquid stored in the container assembly. The additive vessels can be easily removed by a user from the dispensing assembly at any time (e.g., when the additive vessel is not yet empty), stored and/or replaced in the dispensing module for continued use, or transferred to the dispensing assembly of a second container. In at least one embodiment, the additive vessel is recyclable, and configured in such a way as to prevent or otherwise discourage end-user refilling/reusing. In another example, the additive vessel can be recyclable following the removal of the dispensing nozzle.

Aspects of the present disclosure also relate to the functional form and configuration of the materials, shape, form, and valve mechanism of the aforementioned additive vessels inserted or received within the dispensing assembly, enabling one or more additives contained within said vessels to be controllably dispensed into the consumable contents of the container. In accordance with at least one embodiment, data associated with the vessel informs a dispensing system of the vessel's capacity status and/or other important information relevant to the user, the system, and/or the apparatus.

In accordance with at least one embodiment, a portable, self-contained beverage apparatus includes a dispensing assembly that is attachable to a lower end of the container assembly. The dispensing assembly holds a plurality of additive vessels or containers which can be removed, and further includes a controller that controls the dispensing by the dispensing assembly of the variable, non-zero quantities of the additives into the consumable liquid stored in the container assembly. In this and other embodiments such dispensing mechanisms can operate by having a repeatable force act upon the additive vessel, or the aperture in which the additive vessel is contained, track dispensing actions, and obtain data regarding the contents and dispensing protocol of the additive vessels. In this and other embodiments the dispensing can be variable based on the consumable liquid level of the container assembly determined by the level sensor and the known storage capacity of said assembly. One having ordinary skill in the art will understand that such operating methods do not necessitate wholly electromechanical approaches, and in some cases may in fact benefit from a less automated, simple, or low-cost implementation. The methods, systems, and apparatus of the present disclosure also improve upon existing approaches for creating consumable beverages by enabling full or partial dispensing of the additive from an additive vessel. This is in contrast to many existing approaches that are based upon puncturing a seal or membrane and releasing all of the contents of the vessel or container, which can be used only once and which also cannot be transferred to a second container and in many cases are also not suitable for recycling.

In one embodiment, the dispensing assembly of the portable, self-contained beverage apparatus includes a nest having a plurality of nest apertures structured and arranged to receive and support additive vessels retained in the apertures.

In accordance with one embodiment, a precise and continuously variable dispensing of an additive liquid is provided by a pump mechanism which, in at least one embodiment of this system, draws additive from a container or vessel and dispenses the additive into a consumable liquid contained within the container assembly. A method enables a user's input, such as a finger press, to translate into a dispensing event that is precise and repeatable. Electronics can be configured to log or measure which additive container or vessel is used, what dispensing quantity is dispense, and a number of dispensing events that occur to log a user's consumption activity and behaviors.

In one embodiment of the system, a method for determining the level and/or volume of the consumable liquid contained within the container assembly may be included. A user may be drinking a consumable liquid from the container as needed and refilling it periodically, therefore the level in the container will vary over time. Thus, to achieve the correct concentration when an additive is dispensed, the amount of liquid in the container at the time of dispensing needs to be known and the amount of additive dispensed adjusted so that the resulting concentration is correct. Methods for determining the level and/or volume may include a level sensing device such as an infrared receiver diode array, non-contact capacitive sensing arrays, ultrasonic sensor devices, sensors that include a pressure transducer and/or accelerometer, etc., in order to adjust the dispensing of additives and to control the resulting concentration of the additives in the consumable liquid. Further details on methods for achieving this are disclosed.

In this and other embodiments of the portable, self-contained beverage apparatus, a means for managing information associated with the apparatus is provided. This includes a means for reading identification information on the additive vessels retained in the apertures; a memory device storing the tracked consumable liquid level in the container assembly and the quantity of at least one additive, the level sensor sensing the consumable liquid level at different times, the controller tracking the consumable liquid level in the container assembly and the quantity of additives dispensed into the consumable liquid, and the memory device storing the identification information of each of the vessels retained in the apparatus in data association with the tracked consumable liquid level and quantity of additives. This information can be relayed from the beverage apparatus to a network, and in accordance with at least one embodiment, Bluetooth low energy may be used as the primary transmission method of such information.

In this and other embodiments, the method of controlling a portable, self-contained beverage apparatus further includes: reading identification information on vessels retained in the apertures; storing the tracked consumable liquid level in the container assembly and the quantity of the at least one additive; sensing, using the sensor device disposed within the container assembly, the consumable liquid level at different times; tracking the consumable liquid level in the container assembly and the quantity of additives dispensed into the consumable liquid; and storing the identification information of each of the vessels retained in the apparatus in data association with the tracked consumable liquid level and quantity of additives.

In accordance with one or more embodiments, the beverage apparatus includes a means, such as RFID, NFC, optical, etc., to identify information on the additive vessels retained in the apertures. This information may detail, for example, contents of the additives, lot numbers, nutritional information, etc. In addition, another feature described herein is the ability to write information to a readable/writeable tag located on an additive vessel, in order to transfer the information with the additive vessel to additional, separate containers or systems. This information can be relayed to a network from the beverage apparatus, wherein Bluetooth low energy can be used as the primary transmission method of such information.

In one embodiment, a means to use activity, location information, user data, etc. from a third party application can relay information to the beverage apparatus, wherein Bluetooth low energy can be used as the primary transmission method of such information, in order to inform context for dispensing of certain types and amounts of additives.

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to hydration systems, methods, and apparatuses. More specifically, aspects of the present disclosure relate to a portable and non-portable hydration container that periodically fully or partially dispenses additives into a liquid consumable or other solute within the container in continuously variable volumes or concentrations, with contextual variables informing type, volume, timing, and the like of the dispensing action.

One embodiment of the present disclosure relates to a portable, self-contained beverage apparatus comprising: a container assembly having a known storage capacity for storing a consumable liquid; a dispensing assembly disposed within the container assembly that dispenses variable, non-zero quantities of additives into the consumable liquid stored in the container assembly, where the dispensing assembly includes a plurality of apertures structured and arranged to retain vessels containing the additives to be dispensed into the consumable liquid; and a level sensor disposed within the container assembly that determines a consumable liquid level of the consumable liquid stored in the container assembly.

In another embodiment, the portable, self-contained beverage apparatus further includes a controller that controls the dispensing by the dispensing assembly of the variable, non-zero quantities of the additives into the consumable liquid stored in the container assembly.

In another embodiment, the controller of the portable, self-contained beverage apparatus controls the dispensing by the dispensing assembly of the variable, non-zero quantities of the additives based on the consumable liquid level of the consumable liquid determined by the level sensor and the known storage capacity of the container assembly.

In another embodiment, the portable, self-contained beverage apparatus further includes reading means for reading identification information on vessels retained in the apertures, said controller controlling the dispensing by the dispensing assembly based on the identification information.

In another embodiment, the portable, self-contained beverage apparatus further includes reading means for reading identification information on vessels retained in the apertures; and a memory device storing the tracked consumable liquid level in the container assembly and the quantity of the at least one additive, the level sensor sensing the consumable liquid level at different times, the controller tracking the consumable liquid level in the container assembly and the quantity of additives dispensed into the consumable liquid, and the memory device storing the identification information of each of the vessels retained in the apparatus in data association with the tracked consumable liquid level and quantity of additives.

In another embodiment, the controller of the portable, self-contained beverage apparatus controls the dispensing by the dispensing assembly to achieve a targeted concentration of at least one of the additives in the consumable liquid stored in the container assembly, wherein the controlling is based on the consumable liquid level of the consumable liquid determined by the level sensor and the known storage capacity of the container assembly.

In another embodiment, the level sensor of the portable, self-contained beverage apparatus senses the consumable liquid level at different times, and the controller tracks the consumable liquid level in the container assembly and the quantity of at least one additive dispensed into the consumable liquid.

In yet another embodiment, the portable, self-contained beverage apparatus further includes a memory device storing the tracked consumable liquid level in the container assembly and the quantity of the at least one additive.

In another embodiment, the controller of the portable, self-contained beverage apparatus controls the dispensing by the dispensing assembly to maintain the targeted concentration of at least one of the additives in the consumable liquid stored in the container assembly, wherein the controlling is based on tracked consumable liquid level and the quantity of the at least one additive.

In another embodiment, the dispensing assembly of the portable, self-contained beverage apparatus includes a nest having a plurality of nest apertures structured and arranged to receive and support vessels retained in the apertures, and a pressure applicator provided proximate to at least one of the apertures, said pressure applicator applying pressure to the vessel when it is retained in one of the apertures to create a dispensing event from the vessel.

In yet another embodiment, the portable, self-contained beverage apparatus further includes the vessels retained in the plurality of apertures that contain the additives to be dispensed into the consumable liquid stored in the container assembly.

In another embodiment, the container assembly of the portable, self-contained beverage apparatus includes an outer sleeve, and an inner chamber slidably and removably fitted into said outer sleeve, said inner chamber being structured and arranged to receive the dispensing assembly at a top end thereof, said inner chamber storing the consumable liquid.

Another embodiment of the present disclosure relates to a method of controlling a portable, self-contained beverage apparatus including an internally disposed dispensing assembly having a plurality of apertures structured and arranged to receive and retain vessels containing the additives to be dispensed into the consumable liquid, the method comprising: storing capacity information indicating a storage capacity of the container assembly for storing a consumable liquid; determining a consumable liquid level of a consumable liquid stored in the container assembly using a sensor device disposed within the container assembly; and controlling the dispensing assembly to dispense variable, non-zero quantities of additives from the vessels into the consumable liquid based on the determined consumable liquid level of the consumable liquid and the storage capacity of the container.

In another embodiment, the method of controlling a portable, self-contained beverage apparatus further comprises: reading identification information on vessels retained in the apertures; and controlling the dispensing by the dispensing assembly based on the identification information.

In another embodiment, the method of controlling a portable, self-contained beverage apparatus further comprises: reading identification information on vessels retained in the apertures; storing the tracked consumable liquid level in the container assembly and the quantity of the at least one additive; sensing, using the sensor device disposed within the container assembly, the consumable liquid level at different times; tracking the consumable liquid level in the container assembly and the quantity of additives dispensed into the consumable liquid; and storing the identification information of each of the vessels retained in the apparatus in data association with the tracked consumable liquid level and quantity of additives.

In another embodiment, the method of controlling a portable, self-contained beverage apparatus further comprises: controlling the dispensing by the dispensing assembly to achieve a targeted concentration of at least one of the additives in the consumable liquid stored in the container assembly based on the consumable liquid level of the consumable liquid determined by the sensor device and the stored storage capacity of the container assembly.

In another embodiment, the method of controlling a portable, self-contained beverage apparatus further comprises: sensing using the sensor device disposed within the container assembly, the consumable liquid level at different times; tracking the consumable liquid level in the container assembly and the quantity of at least one additive dispensed into the consumable liquid; and storing the tracked consumable liquid level in the container assembly and the quantity of the at least one additive.

In another embodiment, the method of controlling a portable, self-contained beverage apparatus further comprises: controlling the dispensing by the dispensing assembly to maintain the targeted concentration of at least one of the additives in the consumable liquid stored in the container assembly based on tracked consumable liquid level and the quantity of the at least one additive.

In one or more other embodiments of the present disclosure, the methods, systems, and apparatus described herein may optionally include one or more of the following additional features: the plurality of apertures are positioned radially about the dispensing assembly; the plurality of apertures is five apertures, each of the vessels includes a one-way valve through which the additive contained in the vessel is dispensed into the consumable liquid stored in the container assembly; and/or each of the vessels has a plurality of bellows formed in at least one side wall of the vessel.

In accordance with at least one embodiment, provided is a portable hydration container having one or more electronic and/or electro-mechanical modules (e.g., components, subsystems, etc.) that may measure and/or monitor the contents of the container, and/or act upon additive vessels inserted or received in the container to dispense the contents thereof. The modules are physically separable from the container and from each other so as to allow for the container and other modules and/or components to be washed without damage to the sensitive electronic components, or to replace or otherwise upgrade components without necessitating complete replacement or upgrade.

Aspects of the present disclosure also relate to the functional form and configuration of the materials, shape, form, and valve mechanism of the aforementioned additive vessel inserted or received within the container (e.g., inserted or received in at least one aperture or chamber that forms a part or portion of the container), enabling one or more additives contained in the additive vessel to be controllably dispensed into the consumable contents of the container.

One or more other embodiments relate to a method for determining the level and/or volume of liquid or other substance within the portable liquid container using a level sensing device such as, for example, an infrared receiver diode array, non-contact capacitive sensing arrays, ultrasonic sensor devices, sensors that include a pressure transducer and/or accelerometer, etc., in order to adjust the dispensing of additives and to control the resulting concentration of the additives in the consumable liquid.

Also provided herein are methods for obtaining data about the contents of the additive vessels inserted or received in the portable container. Aspects of the present disclosure also relate to methods, systems, and apparatuses for the accurate control of the selection of an additive vessel and accurate control of the amount of additive dispensed therefrom, for example, when there are a number of separate additive vessels available and accessible within the container. Further aspects of the disclosure relate to a system enabling a monitoring person, such as, for example, a sports coach or medical professional, to dynamically adjust a dispensing schedule based on feedback data received from a group of the containers (e.g., used in a context or setting where multiple individuals are involved in a common activity or share similar circumstances).

As described above, one of the main limitations of existing portable bottles and other containers is that the consumable contents contained in such bottles and containers remain essentially unchanged other than in their quantity. The utility of such bottles and containers may be greatly enhanced if the flavor, consistency, and/or the nutritional, chemical or other make-up of the consumable liquid could be altered over some period of time (e.g., hourly, daily, etc.) and/or according to some other cycle based on, for example, the needs or desires of the user, in order to optimize the health and well-being of the user. For example, the consumable liquid may be enhanced with an energy boosting supplement in the morning to facilitate alertness and focus, with vitamin supplements throughout the day, and with a calming nutritional supplement at the end of the day to facilitate quality sleep. Such a daily cycle may be supplemented by an additional longer term cycle of additives dispensed on a weekly, bi-weekly, etc., basis or some other customized time-cycle. As well as nutritional supplements, it may additionally be desirable to dispense other types of substances or additives such as, for example, vitamins, flavorings, pharmaceuticals, and the like, into the contents of portable containers in order to further optimize the health, hydration, recovery, and other benefits to a user, athlete, or patient.

Furthermore, mobile and wearable activity and fitness monitoring devices, as well as remote applications, may communicate with and/or receive data provided from portable bottles and other containers to control and monitor liquid and/or additive consumption and to perform other functions such as, for example, communicating a timely signal to portable and other containers to release all or a pre-defined amount of an additive substance from one of the additive vessels into the consumable contents of the container. Furthermore, such data might modify the dispensing protocol of the aforementioned additive vessels, in similar fashion, such data might function to recommend or otherwise incentivize the discovery, purchase, and and/or consumption of the aforementioned additive vessels.

Since portable hydration containers may typically be filled in the morning and topped-off throughout the day as the liquid is consumed, it is neither practical nor desirable to require that a user fill multiple compartments of a container with multiple different consumable liquids or mixtures for consumption throughout the course of the day. Therefore, a more practical and desirable solution is to sequentially dispense a selection, sequence or combination of different additives from one or more additive vessels into a consumable liquid at the appropriate time in response to a signal from a mobile or wearable device, processor or application. Neither is it desirable that a user have to carry around separate additive vessels and insert them into the hydration container when needed at various times throughout the day, as inferior, all-or-none dispensing approaches in the prior art dictate. An illustrative example of such an additive delivery ecosystem is shown in FIG. 1.

A hydration system such as that illustrated in FIG. 1 and describes above requires electrical, electromechanical, and electronic components to enable a number of functions. For example, measuring, monitoring or identifying the amount of liquid in the container at any point in time, determining when the container has been refilled and/or measuring the rate of consumption of the liquid consumable are desirable functions of such a system and require sensing, processing, communication technology and electronic components which generally have to be in close proximity to the liquid or other substance within the container in order to monitor the quantity or level. The proximity and/or placement of the aforementioned systems and/or devices is sensitive, in many cases, regardless of whether or not the system directly, indirectly, or inferentially obtains such information. Similarly, electro-mechanical components and/or actuators may be required to dispense an additive into the contents of the container.

In accordance with at least one embodiment of the present disclosure, such dispensing mechanisms may operate by having a repeatable force act upon the additive vessel, track dispensing actions, and obtain data regarding the contents and dispensing protocol of the additive vessels. One having ordinary skill in the art will understand that such operating methods do not necessarily necessitate wholly electromechanical approaches, and in some cases may in fact benefit from a less automated, simple, or low-cost implementation. As will be described in greater detail herein, the methods, systems, and apparatus of the present disclosure utilize separate removable additive vessels, which can be acted upon to dispense all or a portion of (e.g., variable quantities of) the additive content into a consumable liquid contained (e.g., stored) in the container, in a non-zero, continuously variable fashion. The methods, systems, and apparatus of the present disclosure also improve upon existing approaches for creating consumable beverages by enabling full or partial dispensing of the additive from an additive vessel. This is in contrast to many existing approaches that are based upon puncturing a seal or membrane and releasing all of the contents of the vessel or container, which can be used only once and which also cannot be transferred to a second container and in many cases are also not suitable for recycling.

To maintain appropriate levels of user health and hygiene, it is also necessary for such bottles and containers to be periodically washed, including washing in dishwashers at water temperatures typically between 120 and 150 degrees Fahrenheit. Though some commercial electronics may have an operational range up to, for example, 185 degrees Fahrenheit, repeated and sustained exposure to water at such temperatures would be harmful to the electronic components. Furthermore, to achieve desired consumption temperatures, or to maintain a desired consumption temperature, it may be desirable to refrigerate the liquid container, in which case repeated and sustained exposure to low temperatures and humidity would be harmful to the electronic components. Though it is desirable that these electronics components and sensors be in close proximity to the liquid container for functional reasons, it is also desirable that they be fully separable to enable thorough washing or cooling of the liquid container.

A user will be drinking a consumable liquid from the container as needed and refilling it periodically, therefore the level in the container will vary over time. Thus, to achieve the correct concentration when an additive is dispensed, the amount of liquid in the container at the time of dispensing needs to be known and the amount of additive dispensed adjusted so that the resulting concentration is correct. A method for achieving this is disclosed.

The systems, methods, and apparatuses of the present disclosure are designed to include, enable, or otherwise account for the desirous and advantageous features and functionalities described above. For example, one or more embodiments of the present disclosure relate to a liquid container having a chamber for consumables which fits within an outer sleeve. The chamber may be tapered in form and the sleeve may contain, among other things, sensors, electronic circuitry, mechanical and/or other water and/or temperature sensitive components. In accordance with at least one embodiment, the chamber and the sleeve may be clipped, attached, or otherwise held together in a secure manner, while also being easily separable from one another by a user.

In accordance with one or more embodiments, the liquid container may also include a removable lid containing water sensitive and/or temperature sensitive electronic or mechanical components. The water and/or temperature sensitive components may also be easily separable from the liquid container and from the removable lid.

As will be described in greater detail below, the apparatuses and systems of the present disclosure are designed to facilitate the separation of the water/temperature sensitive modules from the non-water/temperature sensitive modules in order that the latter can be washed or autoclaved, be placed in a refrigerator, or be heated in a microwave oven, and the like.

One embodiment of the apparatuses and systems described herein relates to the accurate positioning of the sensing or other measuring components relative to the liquid chamber in order to maintain accurate and consistent sensing and/or to enable the accurate positioning of mechanical components or actuators which may act upon an additive vessel or the liquid chamber or the contents thereof.

In another embodiment, the apparatus described herein facilitates the independent replacement of one or a plurality of modules without the need to replace all modules, in a scenario where one or more of said modules were to need replacement to continue functioning as designed.

As will also be described in greater detail below, one or more embodiments of the present disclosure relates to a liquid container assembly comprising integrated or separable modules containing one or more infrared (IR) emitting sources and also integrated or separable modules consisting of one or a plurality of infrared receiving sources (e.g., emitting and/or receiving diodes). The IR source(s) may periodically or continuously emit an IR signal that is detected by the IR receiving diodes. Since the fluid in the container attenuates the IR radiation, the level of fluid within the container can then be inferred by measuring the different signal strengths detected at each of the IR receiver diodes. In at least one embodiment, a less nuanced measurement detects the peak difference between any two adjacent sensors to measure or otherwise infer the water-line, and therefore, the volume. As such, the methods, systems, and apparatuses of the present disclosure are designed to enable the determination of the level or volume of fluid within the container.

In accordance with one or more embodiments, the methods, systems, and apparatus described herein may optionally include or be capable/configured to perform one or more of the following: determine a rate of consumption of the fluid or liquid within the container; communicate data to a processor with regard to the level and/or rate of consumption of the fluid or liquid within the container; determine when the container is empty and/or when it is re-filled; infer the level of concentration of additives in the liquid within the container; determine received signal levels when the container is full and when it is empty in order to calibrate the system and compensate for varying levels of environmental or user-generated interference.

In accordance with one or more embodiments, the methods, systems, and apparatus of the present disclosure are designed to operate with or include a vessel or container, from which all or a portion of the contents (e.g., additives) contained therein can be dispensed through a valve when mechanical pressure is applied to the vessel, either via electromechanical means or through "manual" means (e.g., where the force is provided controllably by the user via a mechanical interface). The shape and form of the vessel may be recoverable to the shape and form possessed prior to the dispensing event caused by the application of mechanical pressure, for the purpose of equilibration as it relates to reliability and/or repeatability of the desired dispensing function. As will be described in greater detail below, a valve mechanism permits vessel contents to pass outward and prevents liquid contents of the container to pass inwards. Such a feature provides for the controlled, unidirectional ingress and/or egress of the contents of the additive vessel.

In at least one embodiment, the valve mechanism is designed to permit air to pass inwards to equalize pressure when mechanical pressure is released following a dispensing event. In contrast to the valve's role in the controllably unidirectional dispensing of an additive, in accordance with at least one embodiment, the valve also functions to controllably allow for air to bidirectionally flow from either side of the valve to equilibrate the vessel.

As will be described in greater detail below, the additive vessel can be removed from the consumable container and stored, the vessel may be re-inserted into the same container, into a different aperture, or may be inserted in a second container irrespective of how full or empty the additive vessel is. In accordance with at least one embodiment, data associated with the vessel informs the dispensing system(s) of the vessel's capacity status and/or other important information relevant to the user, the system, and/or the apparatus.

The additive vessel may be refillable and reusable. For example, in at least one embodiment, the additive vessel is recyclable, and configured in such a way as to prevent or otherwise discourage end-user refilling/reusing. In another example, the additive vessel may be recyclable following the removal of the dispensing nozzle.

One or more embodiments of the present disclosure relates to a consumable container having a dispensing module assembly with a number of apertures into which the above described additive vessels can be inserted by a user. Each of these additive vessels has a passive RFID tag attached to the vessel, oriented toward the central axis of the consumable container. An RFID antenna is mounted on the surface of a rotatable dispensing module located on the central axis of the consumable container and, when aligned to an additive vessel, accesses data about the contents of the additive vessel from the RFID tag. Therefore, the methods, systems, and apparatuses of the present disclosure are also designed to access data about the contents of an individual additive vessel within a consumable container. In accordance with at least one embodiment, the antenna and/or other read and/or write capable data modality is oriented in such a way so as to necessitate only one system, as opposed to a static modality that might require a unique instance of the modality on each unique aperture. One having ordinary skill in the art will recognize that although a passive data system such as RFID is ideal due to its passive nature, read/write capability, and low-cost, that functionally, other methods could accomplish similar results, including but not limited to physical key-based methods, or optical methods.

In accordance with one or more embodiments, the methods, systems, and apparatus described herein may optionally include or be capable/configured to perform one or more of the following: sequentially access data about the contents of several additive vessels within a consumable container; ensure that the data accessed relates to only one of several proximally positioned vessels within the consumable container; and/or communicate that data to a processor or application within or external to the consumable container (such as a user's mobile device, etc.)

One or more embodiments of the present disclosure additionally relate to a system for the automatic and/or on-demand dispensing of a full or partial amount of one or a plurality of additive substances into the consumable contents of a portable container.

Another feature of the methods, systems, and apparatuses described herein is to enable additive vessels to be removable from the dispensing module at any time (e.g., when the additive vessel is not yet empty), stored and/or replaced in the dispensing module for continued use, or transferred to the dispensing module of a second container.

Another feature of the methods, systems, and apparatuses described herein is a means to identify the additive vessel and its contents via a read/writeable tag and to communicate, or make available this information to a processor.

Another feature of the methods, systems, and apparatuses described herein is to write information to a read/writeable tag on an additive vessel in order that the information may be transferable with the additive vessel to additional, separate containers or systems.

Another feature of the methods, systems, and apparatuses described herein is to receive data associated with the user of a container and to use this preference or other data as a parameter in the controlled release of additives into the consumable.

Another feature of the methods, systems, and apparatuses described herein is to determine when the number or configuration of additive vessels has been changed and to identify and communicate data about the changed configuration to a processor or application.

One or more embodiments of the present disclosure relates to an apparatus comprising two small DC motors operating via planetary-gear drivetrains to rotate and position a dispensing module and, via a rack-and-pinion mechanism, provide linear motion to a pressure applicator acting on an additive vessel to controllably apply pressure and dispense all or a portion of the contents of the additive vessel (e.g., into a container containing a liquid consumable).

As will be described in greater detail below, the methods, systems, and apparatuses of the present disclosure are designed to accurately control the rotational position of a pressure applicator. In accordance with at least one embodiment, a rotation sensor/rotary potentiometer encodes position. Those of ordinary skill in the art will understand that similar results could be accomplished with more passive, inferential mechanisms, such as, for example, a hall effect/reed-switch interface.

In accordance with one or more embodiments described herein, the methods, systems, and apparatuses of the present disclosure are also designed to accurately control the linear motion of a pressure applicator and thereby the amount of pressure applied to an additive vessel.

In accordance with one or more embodiments, the methods, systems, and apparatus described herein may optionally include or be capable/configured to perform one or more of the following: measure rotational and linear motions, and to provide confirmatory feedback that the correct amount of motion and/or pressure has been applied by the apparatus; rotate the dispensing module to scan all vessels in response to a sensor detecting that the lid or top has been opened and/or closed; and/or read data from an RFID or similar tag on the additive vessel to confirm alignment of the pressure applicator with the correct additive vessel.

An application controlling the additive dispensing may beneficially have API-based connectivity to other applications on the users' mobile device and/or access to web services to access contextual data which may be used to further control or influence dispensing and/or to generate future purchase recommendations based on user context, consumption, and/or activities. As such, in accordance with one or more embodiments, the methods, systems, and apparatuses of the present disclosure are designed to access data about a user's location, activity, and environmental context, and to influence or adjust the dispensing of additives in accordance with the needs of that context.

Another feature is to determine the geo-location of the user and determine whether the dispensing of additives should be adjusted based on some aspect or aspects of this location (e.g., home, gym, office, etc.). One learned in the art will understand that such data, working to inform or otherwise guide a dispensing system, could be directly extrapolated or indirectly inferred.

Another feature is to determine the speed of motion of the user and determine whether the dispensing of additives should be adjusted based on this activity (e.g. walking, cycling, running). This data might further operate to corroborate supporting data feeds, such as those provided by wearable activity trackers and the like.

Another feature is to combine the user's location and the user's speed of motion to predict whether a user is indoors or outdoors and, if outdoors, to access weather, temperature and humidity data and adjust the dispensing of additives according to the needs of those environmental conditions. Such contextual data associated with ambient conditions relevant to dispensing events and/or additive recommendations or purchase does not necessarily need to relate to the user's physical movements however.

In accordance with one or more embodiments, the methods, systems, and apparatus described herein may optionally include or be capable/configured to perform one or more of the following: measure the level of liquid in the container and adjust the amount of additive dispensed in order to achieve a targeted level of concentration of the additive in the liquid contained in the container; block or postpone a dispensing event if the container is empty or insufficiently filled; block or postpone dispensing an additive if the container has not been refilled since a previous dispensing of the same additive; trigger dispensing if the container is partially emptied and then refilled so as to maintain a targeted level of additive concentration; block, postpone, or otherwise modify dispensing based upon measured or inferred temperature of the solute, specifically as such data might relate to the solubility of an additive; adjust the amount of additive dispensed based on user preferences and/or user activity, location, environment or context of use; and/or block, postpone, or otherwise modify dispensing based upon prior consumption data, either specific to the device, or as collected from a complementary and/or supporting data source based upon some hourly, daily, or weekly limit or goal, such as food-logging data systems and the like.

In one or more embodiments of the present disclosure, the consumable liquid container may include an array of independently controllable (e.g., by a processor of the container), addressable LEDs, whereby the state (e.g., on/off) of the LEDs can be controlled, and the brightness, color output, flash frequency, and other parameters can be varied in order to communicate information to the user. For example, the LEDs may be controlled to display a pattern and/or temporal sequence of colors which communicates information to a viewer. In another example, the LEDs may be controlled to flash the illuminants with a range of frequencies to communicate information to a viewer. Such an implementation may function primarily as a symbolic user interface. In one example, it might initiate an LED behavior to remind the user to hydrate. In another example, it might initiate another LED behavior to confirm an action.

As will be described in greater detail below, the methods, systems, and apparatus of the present disclosure are also designed to present information to a user regarding the additives consumed and/or remaining in the vessels inserted in the hydration container. For example, in accordance with one or more embodiments, the portable container may display (e.g., on a user interface screen of the container) information or generate an alert to the user when one or more of the additive vessels inserted in the hydration container is, or will soon become empty. In another example, the container may be configured to predict a future date when one or more of the additive vessels inserted in the hydration container will become empty. Such a feature serves to recommend and/or automate future purchases. Such a system might also function to adjust or otherwise modify dispensing protocol to ensure that the additive does not become depleted on or before a targeted time.

In accordance with one or more embodiments, the methods, systems, and apparatus described herein may optionally include or be capable/configured to perform one or more of the following: correlate depletion information of additive vessels with purchase history and previous rate of consumption to ascertain when a user will run out of supplies of the additive vessel irrespective of whether they are currently inserted in the container; enable the user to order replacement additive vessels by adding to their shopping cart on an eCommerce site through some type of user action (e.g., pressing a button on the container, interacting with an associated application, etc.).

In accordance with at least one embodiment, the methods, systems, and apparatuses may be designed to provide for direct or indirect communication of an instruction from a central control application to a consumable container. Such a direct or indirect communication may be, for example, an instruction to dispense an additive, may include a dispensing schedule and/or protocol, or may indicate that an additive (e.g., medication, pharmaceutical, or the like) has, or has not, been dispensed by the dispensing apparatus within the container. Data associated with the dispensing event (or lack thereof) might also be collected and communicated directly or indirectly between the dispensing device and the aforementioned central control application. In accordance with at least one embodiment, Bluetooth low energy may be used as the primary transmission method of such data.

In accordance with one or more embodiments, data may be communicated from a container that an additive (e.g., medication, pharmaceutical, or other additive) has, or has not, been added to the consumable contents of the container; data may be communicated from a container that the consumable contents of the container have been fully consumed, partially consumed, or not consumed. Direct or indirect mechanisms might further corroborate or invalidate such information directly or inferentially (e.g. the user has dumped the contents, as opposed to properly consuming them).

Also provided are a method and apparatus for the precise and continuously variable dispensing of a removable additive vessel through the use of a discretely adjustable piston or actuator, the key adjustment variable being stroke length (and therefore displacement volume) by the user, which then by the user's input (in the preferred disclosure's use case, the user's finger) translates into a dispensing event that is precise and repeatable. Passive electronics measuring which additive vessel, and what dispensing quantity, and how many dispensing events are initiated could log the user's consumption activity and behaviors.

Embodiments of some or all of the systems and apparatuses disclosed herein may also be configured to perform some or all of the methods described above and in greater detail below. Embodiments of some or all of the methods disclosed herein may also be represented as instructions embodied on transitory or non-transitory processor-readable storage media such as optical or magnetic memory or represented as a propagated signal provided to a processor or data processing device via a communication network such as, for example, an Internet or telephone connection.

Further scope of applicability of the systems, apparatuses, and methods of the present disclosure will become apparent from the Detailed Description given below. However, it should be understood that the Detailed Description and specific examples, while indicating embodiments of the systems, apparatuses, and methods, are given by way of illustration only, since various changes and modifications within the spirit and scope of the concepts disclosed herein will become apparent to those skilled in the art from this Detailed Description.

BRIEF DESCRIPTION OF THE DRAWINGS

These and other objects, features, advantages, and characteristics of the present disclosure will become more apparent to those skilled in the art upon consideration of the following Detailed Description, taken in conjunction with the accompanying claims and drawings, all of which form a part of the present disclosure. In the drawings:

FIGS. 52A and 52B illustrate an elevation view of the drive mechanism with the receptacle in a starting position and in a withdrawn position.

FIG. 53 illustrates a cross section of an internally threaded toothed ring engaged with a threaded extension of a pump housing.

Figure 1:
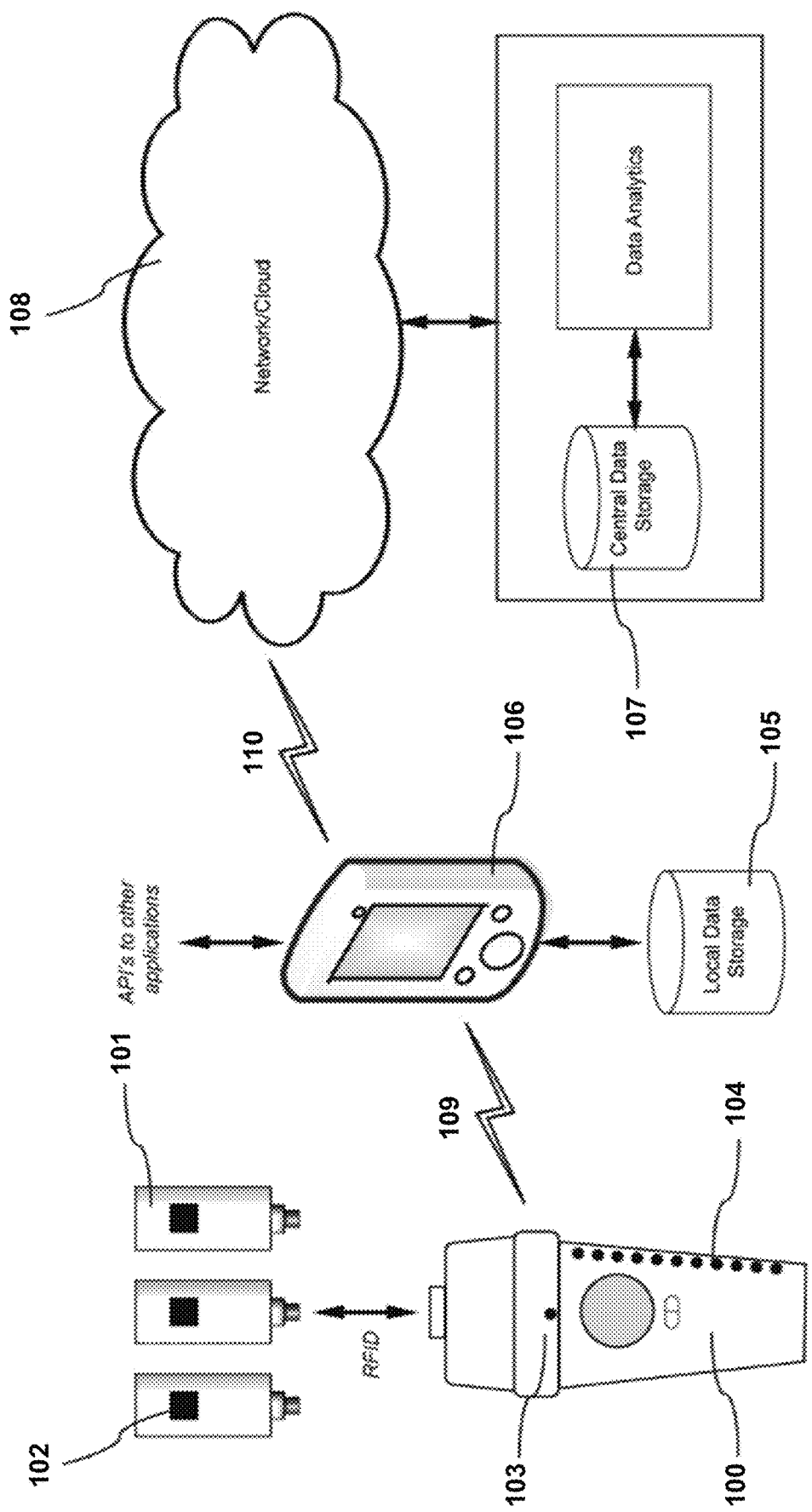
FIG. 1 is a block diagram illustrating an example high-level hydration ecosystem according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. References are also made to the accompanying drawings in which the same reference numbers are used throughout to refer to the same or like components.

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

In view of the above, it is therefore desirable for a portable hydration container or bottle to have included within it, a number of separate vessels containing various additives such as, for example, vitamins or pharmaceuticals, and the like, which may be chosen and inserted within the hydration container by the user in various different combinations, such that some of the beverages, functional beverages, vitamins, pharmaceuticals, etc., could be periodically dispensed into the liquid contents of the container when required or desired, and consumed by the user.

Such a hydration apparatus or system may communicate with an application (e.g., mobile telephone application, computer program, etc.) that controls and monitors the additive dispensing from the vessels, and adjusts or otherwise modifies the dispensing of those additives according to real-time environmental and contextual variables. Hydration systems and containers such as those described herein also need to be periodically washed or sterilized in order to maintain hygiene levels and to avoid or eliminate cross-contamination between different additives. Furthermore, when a container assembly includes sensitive electronics, it is also beneficial to design the apparatus in such a way that washing, cleaning, or sterilization can be carried out without undue risk of damage to the electronic components.

As will be described in greater detail below, the methods, systems, and apparatus of the present disclosure may utilize and/or include an additive vessel designed to be easily compressible under mechanical pressure, in order to dispense the additive contents, and which readily recovers its original shape and form in order to facilitate a subsequent dispensing event and/or multiple dispensing events. The additive vessel is designed for repeatable, controllable, consistent, and predictable ejection of its contents, thereby enabling the dispensing of variable, non-zero quantities of an additive (e.g., into a liquid consumable contained in a container).

Furthermore, the amount of consumable within such a portable hydration container will vary over time as it is consumed. As such, the methods, systems, and apparatus of the present disclosure are capable of varying and/or adjusting the amount of additive to be dispensed into the consumable in order to achieve or maintain a targeted (e.g., optimal) or desired level of concentration of the additive (or additives) in the consumable. In addition, the consumption behaviors of the user related to hydration and the consumption of additives and the like would benefit from tracking and level measurement to provide apparatus-level context for non-zero dispensing, but also for the overall tracking and recommendation of additives and/or additive vessels, present and future.

Furthermore, since such hydration containers are portable and may be carried around to many different places, it would also be beneficial to a user if they could periodically re-order products from an online (e.g., eCommerce, and/or Mobile Application) website, and replenish their supplies of additives, vitamins, etc., directly from the container in which they are used, or from an associated mobile device, at any time and irrespective of the user's location. In addition, while hydration containers such as those described herein are of considerable value to an individual user, a collection of such containers may also be used by a group of users with common interests, such as, for example, a sports team, patients in a medical facility or assisted-living home, participants in clinical trials of a drug, and the like. In such instances it may be of considerable additional value to control, monitor, or otherwise coordinate the dispensing of additives both individually and/or collectively, and/or to monitor the consumption of consumables and additives individually and/or collectively. The following description of examples and embodiments of the methods, systems, and apparatus of the present disclosure provides additional details about many of the above features and functions.

FIG. 1 shows an illustrative block diagram of an overall ecosystem within which one or more embodiments of the present disclosure has application and/or may be implemented. FIG. 1 includes a container 100, generally but not necessarily portable, that may contain a consumable (e.g., a liquid) into which liquid, powder, and/or other forms of consumable additives may be dispensed from one or more separate removable additive vessels 101. Data about the additives within each vessel 101 may be encoded within an RFID or similar active or passive type tag 102 mounted on or otherwise attached to the additive vessel 101. Such data about the additives contained within the vessels 101 can be read from the RFID or similar type tag 102 by, for example, an RFID or similar-type antenna that is a component of the container 100. For example, in accordance with at least one embodiment, the container 100 may include an RFID antenna (not shown) that rotates around a central axis of the container 100 to individually and/or sequentially read data from additive vessels 101 inserted in a circular arrangement around the central axis of the hydration container. In this manner, data about the additives contained in the additive vessels 101 may be collected, analyzed, and/or communicated by the container 100 (e.g., by a processor and/or other components of the container 100), and made available to one or more user devices 106, local storage 105, remote network storage 107 and the like. Such information may also be presented to the user by means of a display 111 mounted on the container and/or by means of a display on the user's mobile device 106.

Furthermore, in accordance with one or more embodiments, an infrared LED emitter/receiver implementation 103 and an array of infrared LED receivers 104 may be mounted within or adjacent to the chamber within which a consumable liquid may be stored (e.g., contained). The emitter/receiver 103 and the infrared receivers 104 may be configured to determine the level, volume, or quantity (e.g., the amount) of liquid consumable in the container 100 at any given time. As such, data about the consumable liquid in the chamber of the container 100 may be collected, analyzed, and/or communicated by the container 100 (e.g., by a processor and/or other components of the container 100), and made available to one or more user devices 106, local storage 105, remote network storage 107 and the like. Such information may also be explicitly or implicitly presented to the user by means of a display 111 mounted on the container and/or by means of a display on the user's mobile device 106. Volumetric implications of a non-linear container are accounted for with firmware/software level calculations and/or transformations (e.g. sensor point #3 corresponds to a volume of 16 oz. etc.)

Data about a user of the container 100 may be accessible to and/or obtainable by the container (e.g., by a processor or other component of the container 100). For example, the container 100 may receive (e.g., retrieve, access, request, or otherwise obtain) data about the user that is stored, for example, in one or more databases or storage devices 105 local to the user, within an application residing on a device of the user 106 (e.g., a portable user device, such as a cellular telephone, smartphone, personal data assistant, laptop or tablet computer, etc.), and/or in network/cloud data storage 107, 108. In accordance with at least one embodiment of the present disclosure, the data about the user may include, for example, user demographic information (e.g., age, gender, weight, body mass index (BMI), address, occupation etc.), additive purchase history information, additive usage history information, charge/payment information for purchases, medical and/or prescription history and various other data associated with the user or actions or behaviors of the user. User data may also include sports and fitness activities, fitness schedule/regime, dietary preferences/requirements, allergies, sensitivities, workout schedule and/or preferred locations for fitness training etc. In this manner, such data about the user of the container 100 may be collected, analyzed, and/or communicated by the container 100 (e.g., by a processor and/or other components of the container 100), and made available to the device of the user 106, to one or more other devices of the user, to the one or more databases or storage devices 105 local to the user, to the network/cloud data storage 107, 108, and the like. Such data may be communicated to, and received from, a user device by means of local wireless network 109 and further communicated to or from the cloud from the user device by means of wide area wireless network 110. It may also be communicated by means of Wi-Fi and/or other wired or wireless communications methods known in the art. Such information may also be presented to the user (graphically or symbolically) by means of a display 111 mounted on the container and/or by means of a display on the user's mobile device 106.

Furthermore, one or more APIs (Application Programming Interfaces), or other data sharing mechanisms, from a mobile device application associated with, and controlling the container 100 may interface with and access contextual/context data from other applications running on a device of the user (e.g., user device 106), where such context data may include, but is not limited to, geo-location, time, date, weather conditions, temperature, personal schedule (e.g., from a calendar application), travel schedule of the user etc. APIs or other data sharing mechanisms to third party applications may also be used by the container 100 to access user data about the current or past physical activity of the user. For example, data may be obtained from a variety of existing or future personal physical activity tracking/monitoring devices or applications (e.g., Fitbit, Apple Health-Kit, MyFitnessPal, etc.), any of which may furnish various data related to the physical activity of the user. Some non-limiting examples of the type of data that may be obtained from such physical activity tracking/monitoring devices include data about the type of physical activity undertaken by the user, the number of steps taken by the user during a period of time, speed of motion, estimated energy expenditure (e.g., calories burned), heart rate and the like. Accordingly, data about the user's physical activity levels and activity history may be collected, analyzed, and/or communicated by the container 100 (e.g., by a processor and/or other components of the container 100).

All or a portion of the data described above may be communicated to or otherwise retrieved by one or more processors which may be located within the consumable container 100 or external to the consumable container (e.g., in the user's mobile device 106, in the cloud network 108, etc.), where various combinations, instances, and/or transformations of that data may be analyzed and used to derive more specific and focused patterns and trends about a user's behavior patterns, activity patterns, additive and consumable purchase and consumption patterns, personal preferences, health and fitness regime and the like.

In accordance with one or more embodiments, the container (e.g., container 100 in the example system shown in FIG. 1) of the present disclosure may consist of multiple modules. It should be understood that although various examples and features are described in the context of a container comprising an assembly of a single liquid chamber and three separate electronic and/or mechanical modules, the scope of the present disclosure is in no way limited to such a configuration. Instead, in accordance with one or more embodiments, the container may include one or a plurality of chambers for containing a liquid consumable, and/or one or a plurality of electronic and/or mechanical modules containing one or more components which are water-sensitive and/or temperature-sensitive. For example, one separable electronic module may have wholly housed within it, a component which is not necessarily water or temperature sensitive and requires separation for sufficient washing/sterilization.

In accordance with at least one embodiment of the present disclosure, a container assembly (e.g., container 100 in the example system shown in FIG. 1) may consist of multiple modules, including a consumable container, a separable outer sleeve, a separable lid or cover and an inner dispensing module.

Figure 2:
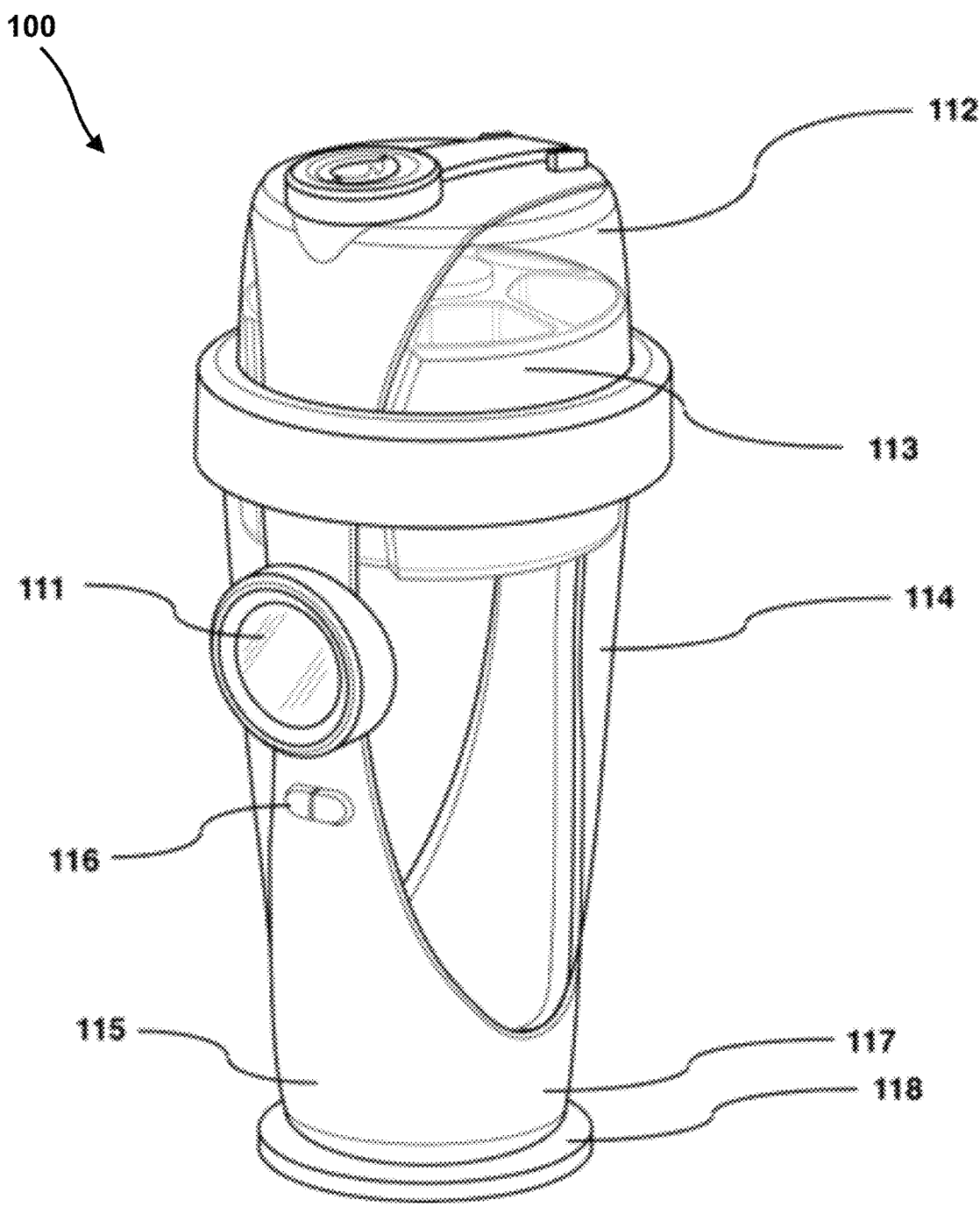
FIG. 2 illustrates an example container assembly according to one or more embodiments described herein.

FIG. 2 shows a container for consumables 100 comprising a removable top portion or lid 112. A dispensing assembly 113 comprising sensitive electronic components fits within the top portion of the consumable container thereby using gravity to aid in the dispensing and/or general static-equilibration of additives from the additive vessels (not shown) into the consumable in the container and providing easy user access to add, change or configure additive vessels by removal of the lid 112. The dispensing assembly 113 comprises a series of apertures into which additive vessels can be inserted by a user. In the current embodiment, five apertures are arranged in a circle, however this is not a limitation, as it should be obvious that a wide range of configurations and aperture quantities are possible. The container 100 is also equipped with a display 111 which may, in some embodiments, display information about the user of the container, the contents of the additive vessels, the contents of the container, and/or the amount, volume or rates of consumption of the additive vessel contents and/or the container contents. The container 100 also has one or a plurality of buttons 116 for user input of dispensing instructions and other functions, in the current embodiment two buttons are configured for navigation and selection, however this is not a limitation, as it should be obvious that a wide range of interfaces and implementations thereof are possible. The container is equipped with an internal sensor (not visible in FIG. 2) appropriately positioned and configured to detect when the lid or top portion 112 is removed and/or replaced, in the preferred embodiment this may be a Hall Effect sensor however this is not a limitation and many other methods known in the art may be used to detect when the top portion is removed or replaced or when additive vessels are changed, a further example might specify a reed-switch, or a contact switch, to accomplish the same result. The container also comprises a consumable chamber 114 removably fitted within an outer sleeve 115, which may contain electronic or other components for determining the level or amount of consumable in the chamber 114. The electronic components may be powered by a battery 117 in the base of the sleeve, the battery in the present embodiment being inductively charged when placed on a charging coaster 118.

Figure 3:
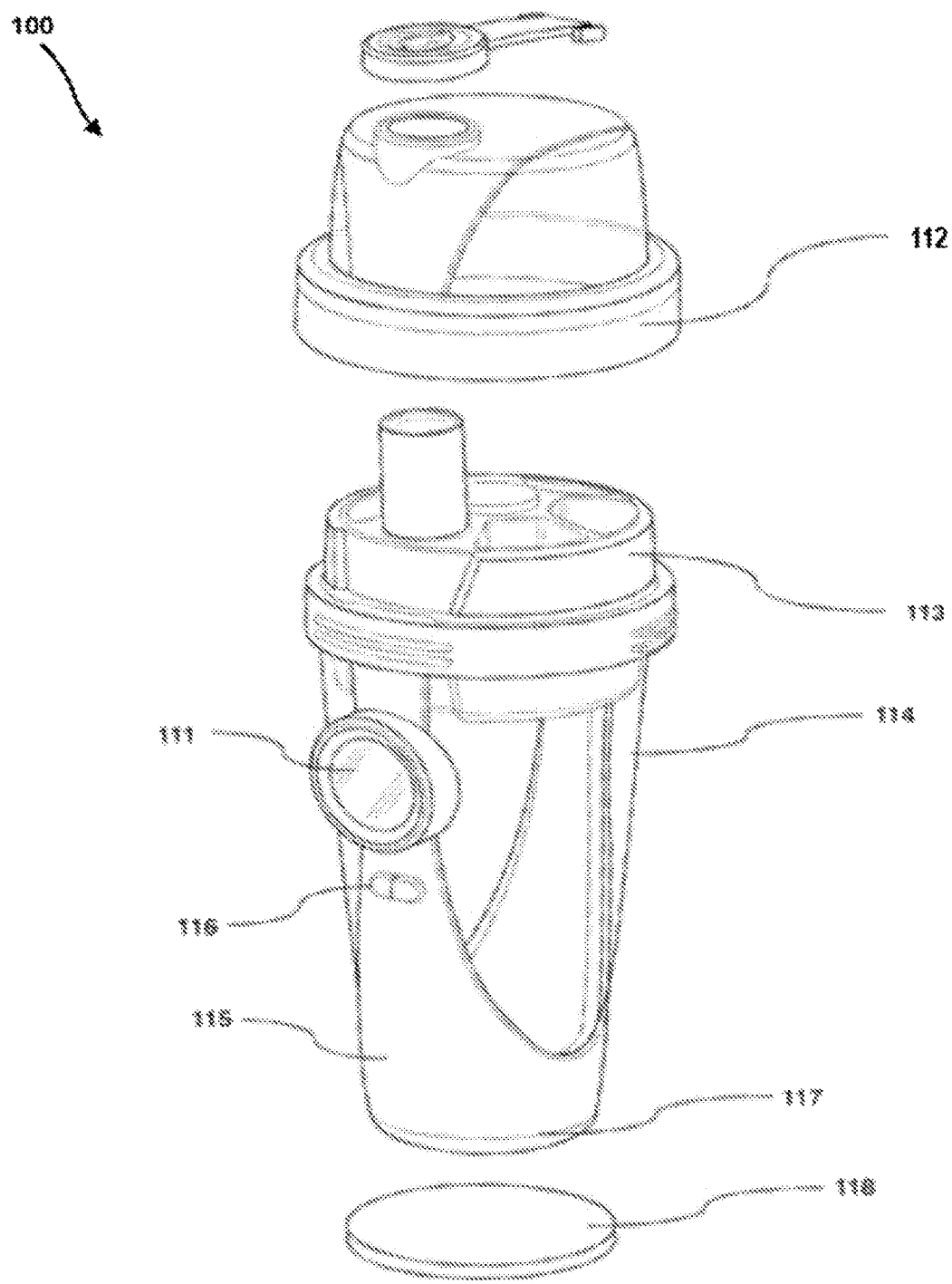
FIG. 3 illustrates an example of a container assembly with top cover removed according to one or more embodiments described herein.

FIG. 3 shows an example of the container assembly 100 with the top cover removed, the dispensing module partially visible and the charging coaster separated. The assembly consists of a chamber 114 containing a consumable liquid (e.g. water) which slide-ably fits within an outer sleeve 115, the outer sleeve containing an IR sensor array or other sensor technology (such as a non-contact capacitive sensing PCB strip) used to measure the level of consumable in the adjacent chamber 114. In order to accurately and reliably measure the liquid level, the removable outer sleeve has to be accurately positioned relative to the consumable container. The outer sleeve may also comprise user interface components including a display 111 and pushbuttons 116. The outer sleeve 115 therefore contains sensitive electronic components and is separable from the consumable container 114 in order that the consumable container can be washed or otherwise sanitized. Temperature and/or water sensitive components may be located or moulded within the sleeve and/or may be within the sides and/or the bottom of the sleeve.

A dispensing module assembly 113 may also comprise of temperature and/or water sensitive electronic or mechanical components and may be separably located within the container 100 and secured in place and sealed further against leakage by a separable lid or cover 112 which fits over the dispensing module assembly 113. The removable lid 112 (which does not contain sensitive electronics) covers and secures (but is not attached to) the electro-mechanical dispensing module 113 which does comprise of sensitive electronic and electro-mechanical components. The dispensing module 113 consists of both electronic and moving mechanical components and may therefore be damaged by temperature extremes, water, humidity, and mechanical shock, it may be totally separable from the lid so that the lid 112 can be washed. The dispensing module also comprises mechanical actuators which move to apply mechanical pressure to the additive vessels contained therein and dispense the contents of the additive vessels. Accurate positioning of the mechanical actuator is necessary, and it is important that the moulding which retains and positions the additive vessels does not get damaged or warped by hot water.

Figure 4:
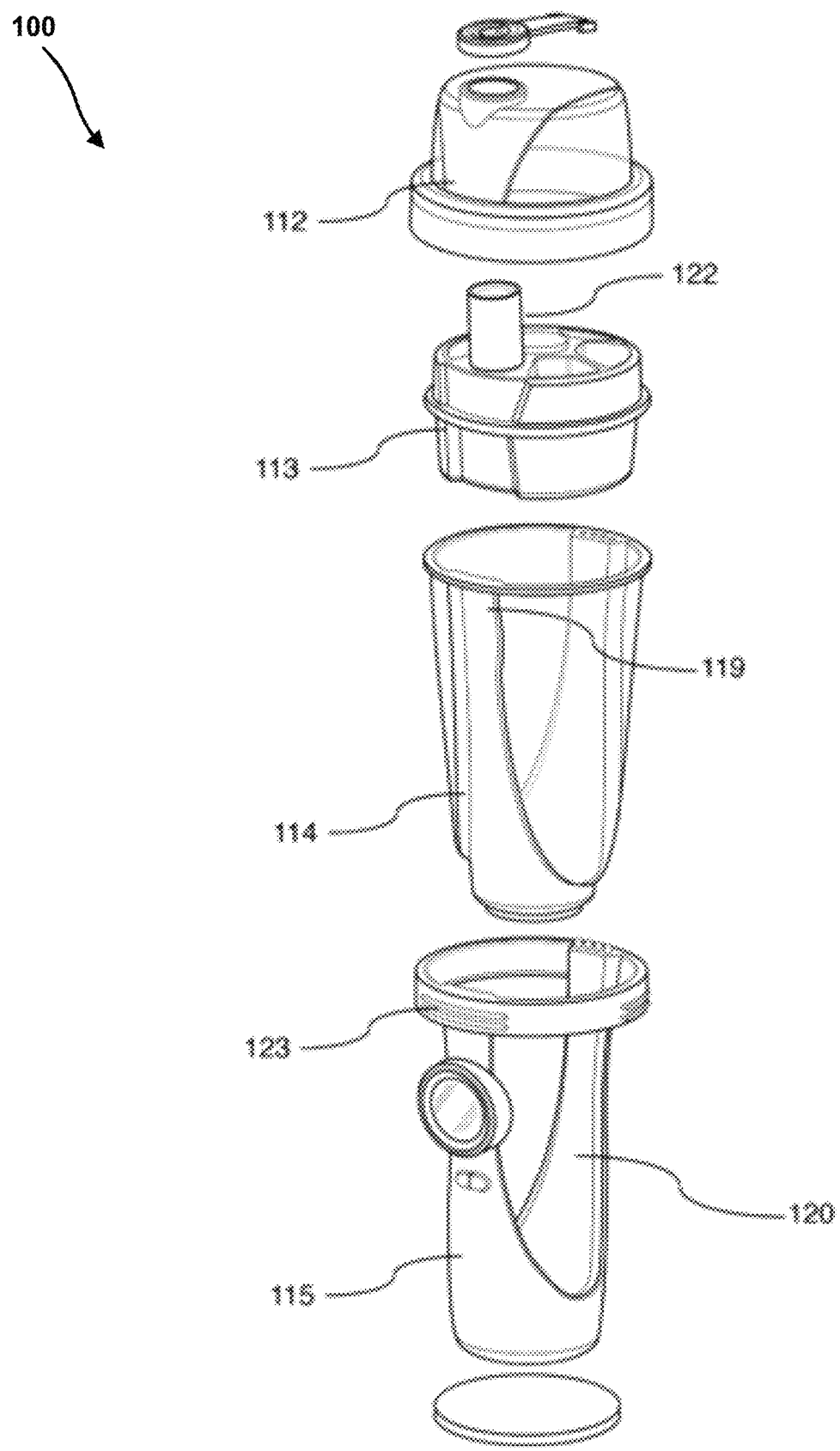
FIG. 4 illustrates an exploded view of the example container assembly shown in FIG. 2 according to one or more embodiments described herein.

FIG. 4 shows an exploded diagram of a number of modules forming a container assembly, in accordance with one or more embodiments described herein. An outer sleeve 115 which contains sensitive electronic components, is separable from an inner chamber 114 enabling the latter to be washed in a dishwasher or the like. Tapering the outer sleeve 115 enables the tapered inner chamber 114 to be positioned within the outer sleeve and to clip securely within it at 119. Secure clipping of the chamber 114 within the sleeve 115 enables sensing components located in an enclosed cavity 120 to be accurately positioned in relation to the chamber 114 and the chamber contents, this being required for accurate and reliable sensing or measurement of the level of, or amount of chamber contents. Such sensing components include, but are not limited to LEDs, infrared emitters and/or sensors, magnetic sensors, capacitive sensing arrays, visual sensors etc. Such sensors may also be positioned on an inner surface of the sleeve.

In accordance with at least one embodiment, the cover or lid module 112 may additionally have passing through it, a drinking channel 122 which may additionally be separable from the lid and/or cover 112 to enable washing. The drinking channel 122 may be part of the dispensing module assembly 113, may be part of another component or module of the container, or may be a separate component of the container altogether. The dispensing module 113 is wholly contained, secured and sealed within the cover module 112 when the cover module is affixed to the outer sleeve 115 by means of the screw cap mechanism at 123. It contains sensitive electronic and electro-mechanical components and is separable from the cover 112 in order that the latter can be thoroughly washed. In the current embodiment an electrical interface connecting the lower components to the upper, separable, components dictates an orientation specific connection further facilitated by an independently rotatable "lock-ring," forcing a uniform-pressure seal without further requiring the dispensing module and/or its housing to rotate, and thereby creating complications for an electrical interface.

One of the numerous advantages of the embodiments described herein is to additionally facilitate the easy replacement and/or upgrading of one or more of the modules of the container assembly. For example, a consumable container (e.g., chamber 114, or drinking channel 122) may become degraded or stained by the contents over a period of time and may therefore be easily replaced or upgraded without the need to replace or upgrade other, more complex and costly modules which may contain integrated electronics or sensors.

A portable hydration container such as is disclosed, also requires a means to determine the level of water or other liquid in the container. Infrared light emitting diodes (LEDs) are widely used in TV remote controls, in cameras and in many other consumer products and water absorbs the infrared radiation emitted from such emitters. Infrared LEDs are small, inexpensive, have low power requirements and low power consumption, they are therefore well suited to a method for detecting the level of water or other liquid in a portable hydration container. In another embodiment, a similarly "mapped" capacitive sensing PCB or equivalent might be oriented in such a way so as to detect the same contrast at which the waterline contained in the vessel makes itself apparent via variation of dielectric constant as measured by a capacitive sensing implementation (contact (probe), and non-contact.)

Figure 10:
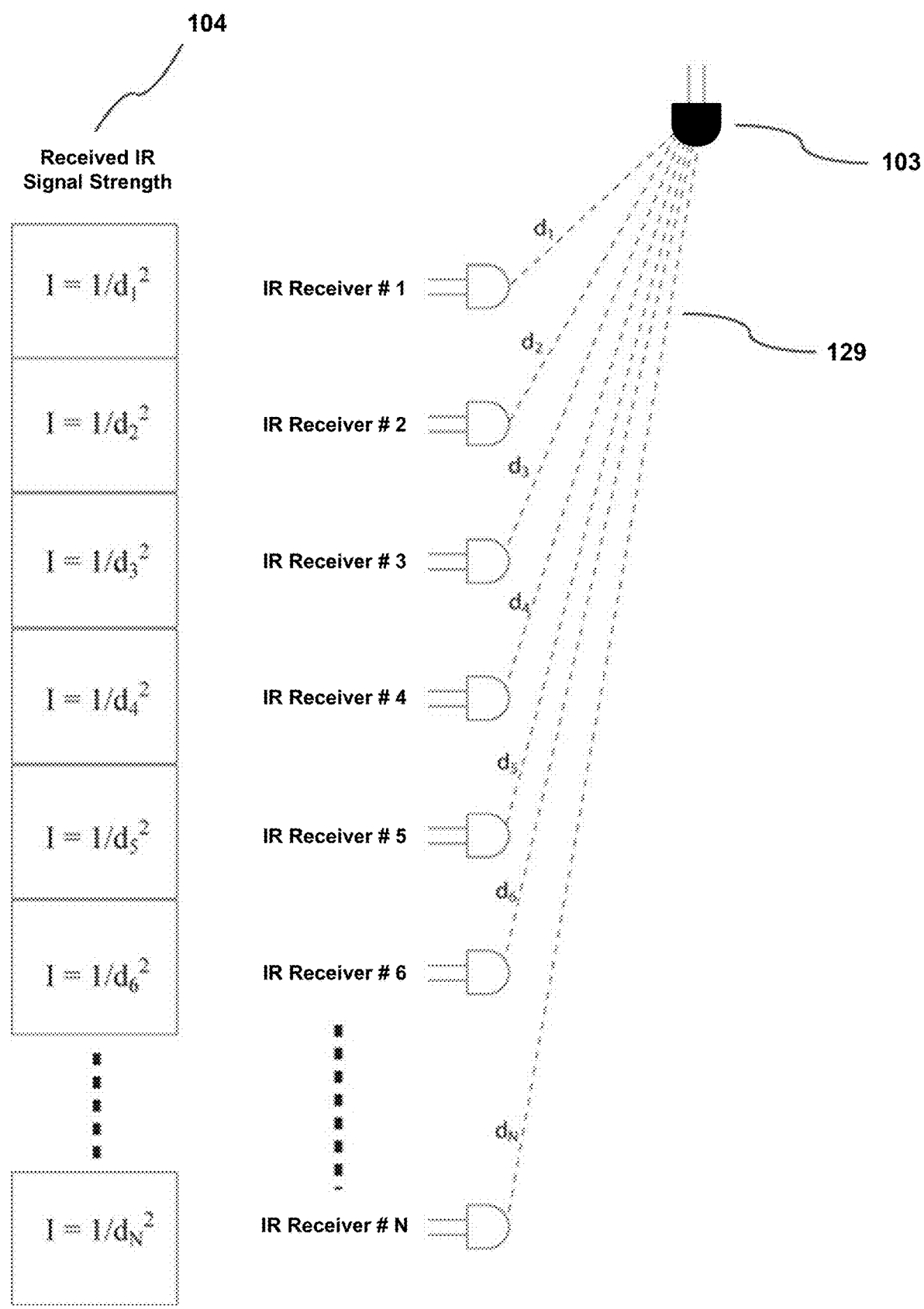
FIG. 10 is a schematic diagram illustrating an example fluid level detection system according to one or more embodiments described herein.

The presence of water or other liquid between an IR emitter and an IR receiver will attenuate the IR signal, and the signal level detected at a receiver diode which is beneath the surface level of the liquid will be substantially less than would be expected based solely on its distance from the emitter. For example, the absorption characteristics of electromagnetic radiation by water are shown in FIG. 10, indicating that maximum absorption occurs at a wavelength of approximately 3 um. Similarly, the dielectric signal measured by a capacitive sensing array positioned and configured in similar fashion would detect a significant value difference between a 'submerged' versus 'exposed' sensor and/or portion/region of the capacitive sensor implementation.

Figure 5:
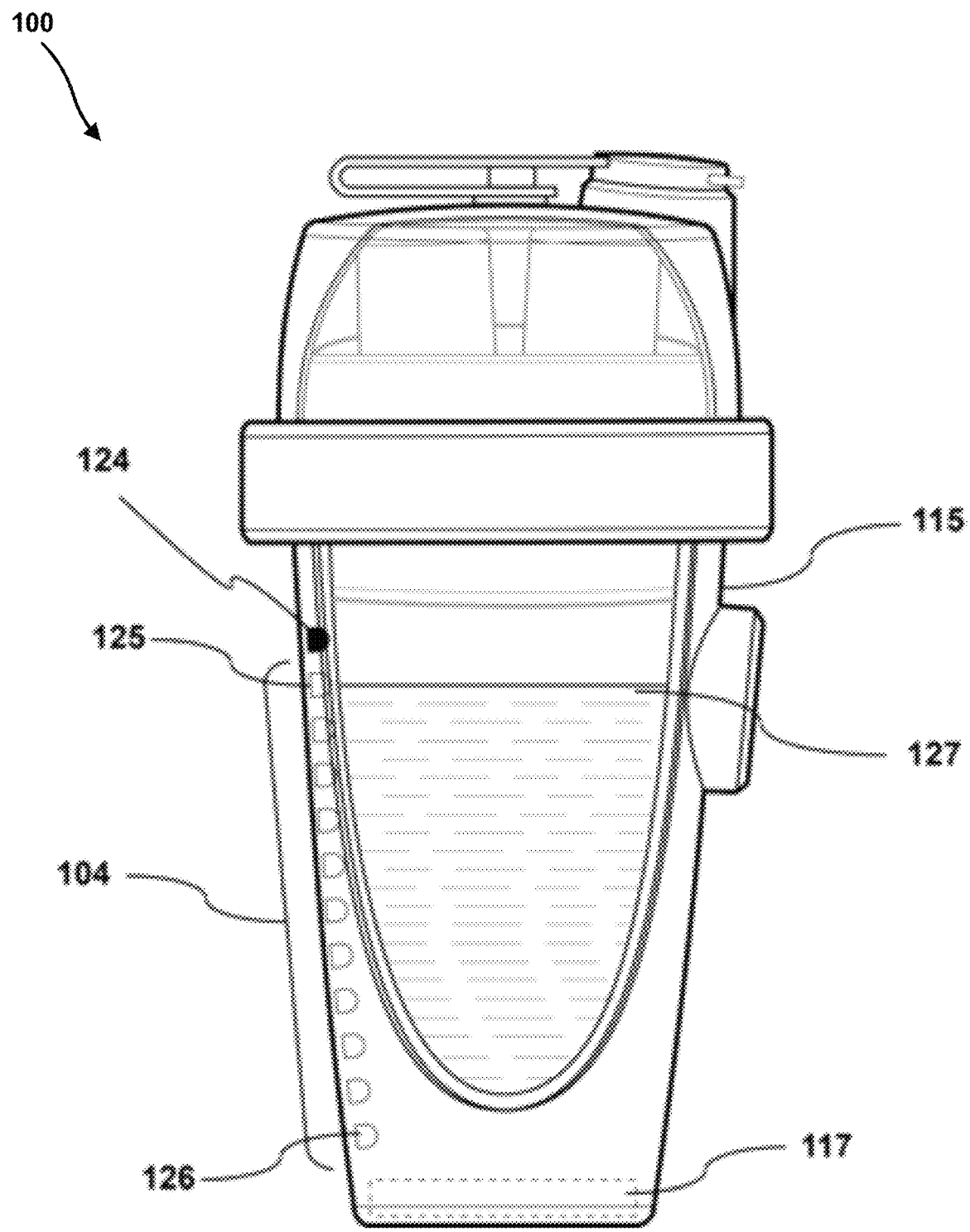
FIG. 5 illustrates an example arrangement of an infrared emitter and infrared receivers according to one or more embodiments described herein.

A first embodiment of the liquid level sensing method is now described with reference to FIG. 5. For convenience this will be referred to as the single side emitter embodiment, though more than one emitter may be used. One or more IR LEDs 124 emitting electromagnetic radiation are mounted within a side of the liquid container 115. The IR emission may be at any appropriate wavelength but in a preferred embodiment may be at least 1050 nm in order to be undetectable by the human eye. In this example, the topmost LED 124 in the array is the single side emitter. In addition, one or a plurality of infrared (IR) receivers are oriented vertically 104 at different liquid levels, with the topmost receiving diode 125 positioned to be approximately aligned with the highest liquid level and the lowest receiving diode 126 aligned with the lowest liquid level possible within the container. The emitting diode 103 may be part of the vertical receiver array in the side of the container as shown in FIG. 5, or may be separated from it, it requires only that its emission is sufficient to radiate significantly towards the general direction of the receivers. IR radiation from the emitter will be scattered within the liquid and reflected off the container walls such that it will be detectable, to varying degrees, by each one of the IR receivers. The emitting and receiving LEDs receive power from a battery unit 117 contained within the base of the liquid container 100 or within any other module of the container assembly. In the current, and preferred, embodiment, a power system is located in the lowermost portion so as to be amenable to coaster-based inductive charging.

When the container is filled completely with liquid, all of the receiving diodes 104 will be submerged, the signal level detected by each of these receiving diodes will be low and there will be minimal differences between the signal strengths detected by each of the plurality of IR receivers. Because the signal level is low, and substantially equal at all receivers, the system determines that the container is full. Similarly when the container is empty, all of the receiver diodes 104 will be exposed and the signal level detected by each receiver diode will be high and there will similarly be minimal differences between the signal strengths detected by each of the plurality of receivers. Because the signal strength is high, and substantially equal across all receivers, the system determines that the container is substantially empty. The difference between a full and an empty container can be further inferred and corroborated by the direction/vector of level-change, as measured by the sensor implementation (e.g., full to empty, leading to empty, necessitates that the uppermost sensors record empty prior to the lower sensors, and vice versa for empty to full, leading to empty, whereby for example, the user might be replenishing the vessel.)

As the liquid level 127 in the container decreases, several diodes will become exposed and no longer submerged, as a consequence they will detect a higher level of IR radiation. Information on the physical location of each receiving diode and the signal level detected at each one can then be used to determine a liquid level, and thus volume. In a further embodiment, with data on the shape, size and form of the container, it is additionally possible to infer the volume of liquid in the container. In a further enhancement, measurement of the time elapsed or the number of IR pulses emitted in a period of time by the emitter 124, can be used to determine a rate of depletion (consumption) of the liquid. For example at a first point in time, the liquid level is determined to be level with receiving LED 125, as shown in FIG. 5. At a second point in time, 5 minutes later, the liquid level is determined to be level with receiving LED 126. It is therefore possible to estimate the rate of consumption of the liquid to be the calculated volume of liquid between these two LED positions divided by the elapsed time. If the volume of liquid is assumed (for example) to be 15 oz, then the rate of consumption would have been 3 oz. per min. Time measurement may be by means of an onboard clock or timer within the onboard processor or, in an embodiment where the emitting LED is emitting periodic pulses, by counting the number of periodic pulses. For example, to reduce power consumption, the emitting LED may emit an IR pulse at 30 second intervals enabling the liquid level to be determined at 30 second intervals and the rate of consumption more accurately estimated. A shorter measurement interval or higher pulse frequency will result in a more accurate rate of consumption estimate. Similarly, the same method can be used to determine when the container has been re-filled since determination of the rate of consumption of the liquid would, in this case be a high negative rate. In all embodiments of a level sensing technique in this implementation, an inertial sensor (not labelled or drawn) such as, for example, a four-axis accelerometer might provide usage context to activate and/or inactivate the level sensing system, such that it is recording and measuring only when in use. Alternately, such an inertial sensor might trigger a higher sampling-rate of a level sensing system, so as to continuously measure and seek water-level changes, while triggering the more precise high-frequency evaluation of water-level changes when the probability of the user consuming or filling the vessel is significantly higher (as measured by movement.)

The emitting diode 124 may or may not be submerged beneath the liquid surface. Since the IR emission will be scattered by the liquid and reflected off the container walls, and will be substantially the same for all receiving LED's, this will not affect the level measurement.

Figure 6:
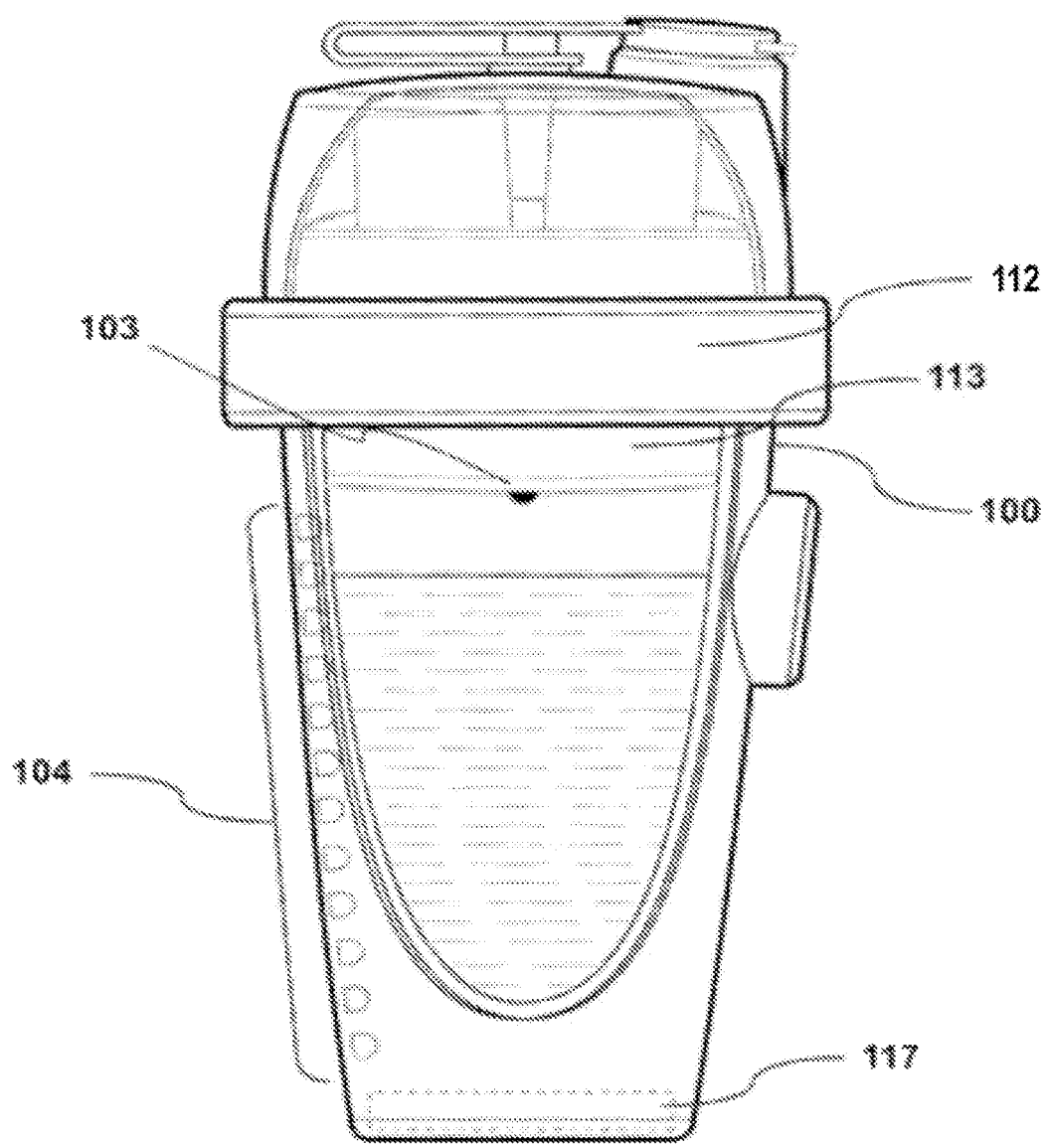
FIG. 6 illustrates another example arrangement of an infrared emitter and infrared receivers according to one or more embodiments described herein.

The LED emitter may be in one of multiple locations within the enclosure. FIG. 6 shows a further embodiment which, for convenience will be referred to as the single top emitter, in which a single emitting LED 103 is mounted at the top of the container preferably within a lid component 112 which may be separable from the container 100. Alternatively it may be in the base of a dispensing module assembly 113 but in a broadly similar location relative to the liquid. Power to the emitter is provided by means of a connector between the removable lid and the base which supplies power from the battery 117 contained in the base of the liquid container 100. Multiple emitting LEDs may also be used subject to power and space limitations. The array of LED receivers 104 may be positioned vertically within the side of the container similar to FIG. 5. While this configuration is specified, and is representative of the current and preferred embodiment, it should be obvious to one learned in the art that such a configuration is not limiting, and that a wide range of configurations are possible.

Figure 7A:
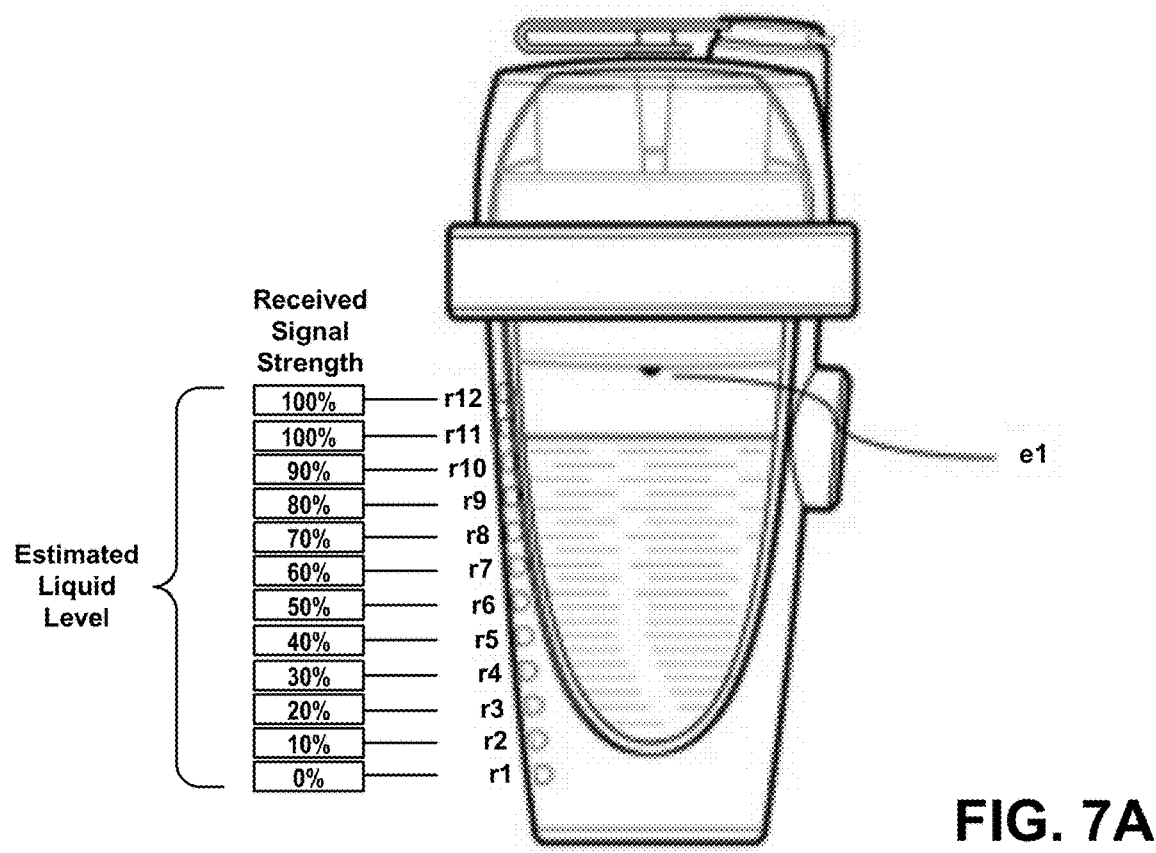
FIGS. 7A and 7B are schematic diagrams illustrating an example process of determining a fluid level in a container assembly having the arrangement of an infrared emitter and infrared receivers shown in FIG. 6 according to one or more embodiments described herein.
Figure 7B:
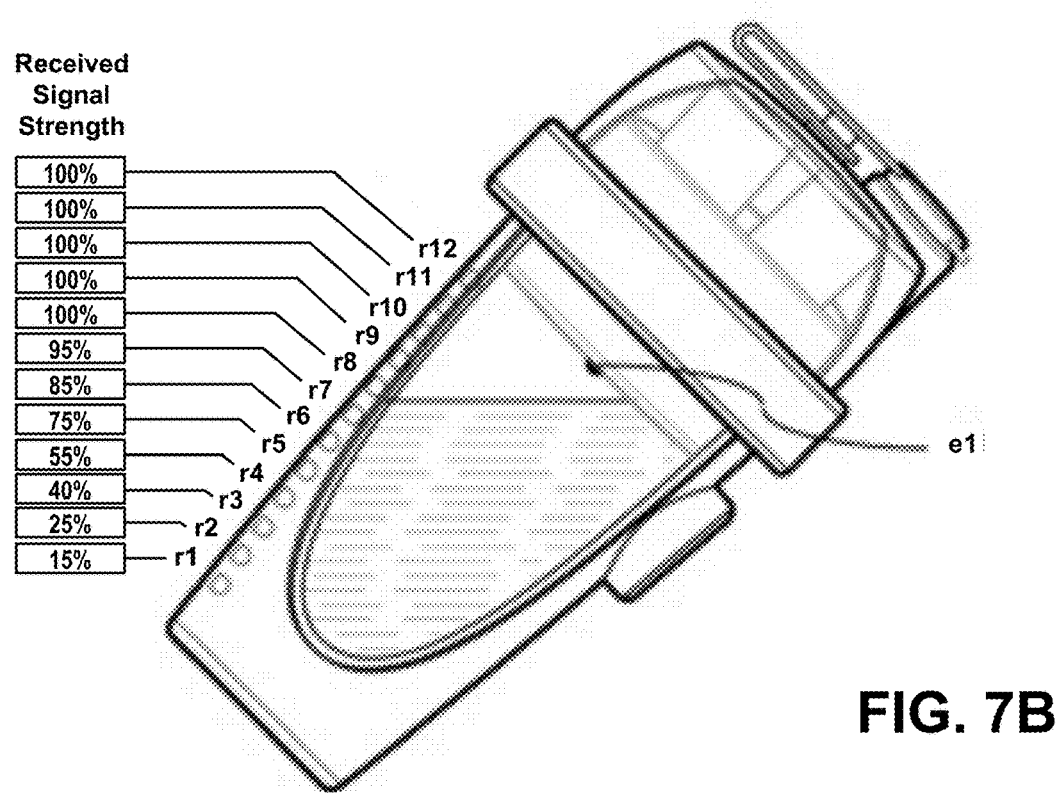

FIGS. 7A and 7B show the single top emitter embodiment in an upright (FIG. 7A) and tilted (FIG. 7B) position. IR radiation is detected at each of 12 receiving LEDs r1 to r12 from an emitting LED e1 mounted in an upper part of the container. In FIG. 7A it will be apparent that the signal strength detected at receivers r12 and r11 will be relatively high, since the IR radiation has not passed through the liquid and been attenuated, while the signal strength detected at receivers r1 to r10 will be considerably lower since it has been attenuated by passing through the liquid. Furthermore, after compensating for the distance between the emitter and the receivers (the inverse square law, explained in more detail in FIG. 7), the signal strengths detected at each of r1 to r10 will be substantially similar. Therefore the method concludes that the liquid level is between r10 and r11.

When the container is tilted as shown in FIG. 7B, the signal strength detected at receivers r8 to r12 will be high and substantially similar, while the signal strength detected at receivers r1 to r7 will be low and substantially similar (compensating for distance). The method would therefore conclude that the liquid level is between r7 and r8, which is the case, but only because the container is tilted, this would be an erroneous conclusion and would lead to an incorrect estimate of liquid level or volume when the container is upright. Consequently this embodiment would additionally require inertial or other sensors to detect when the container is upright and the direction and degree of tilting of the container when it is not upright. Alternatively, inertial sensors may instruct the processor to measure the liquid level only when the container is upright.

Figure 8:
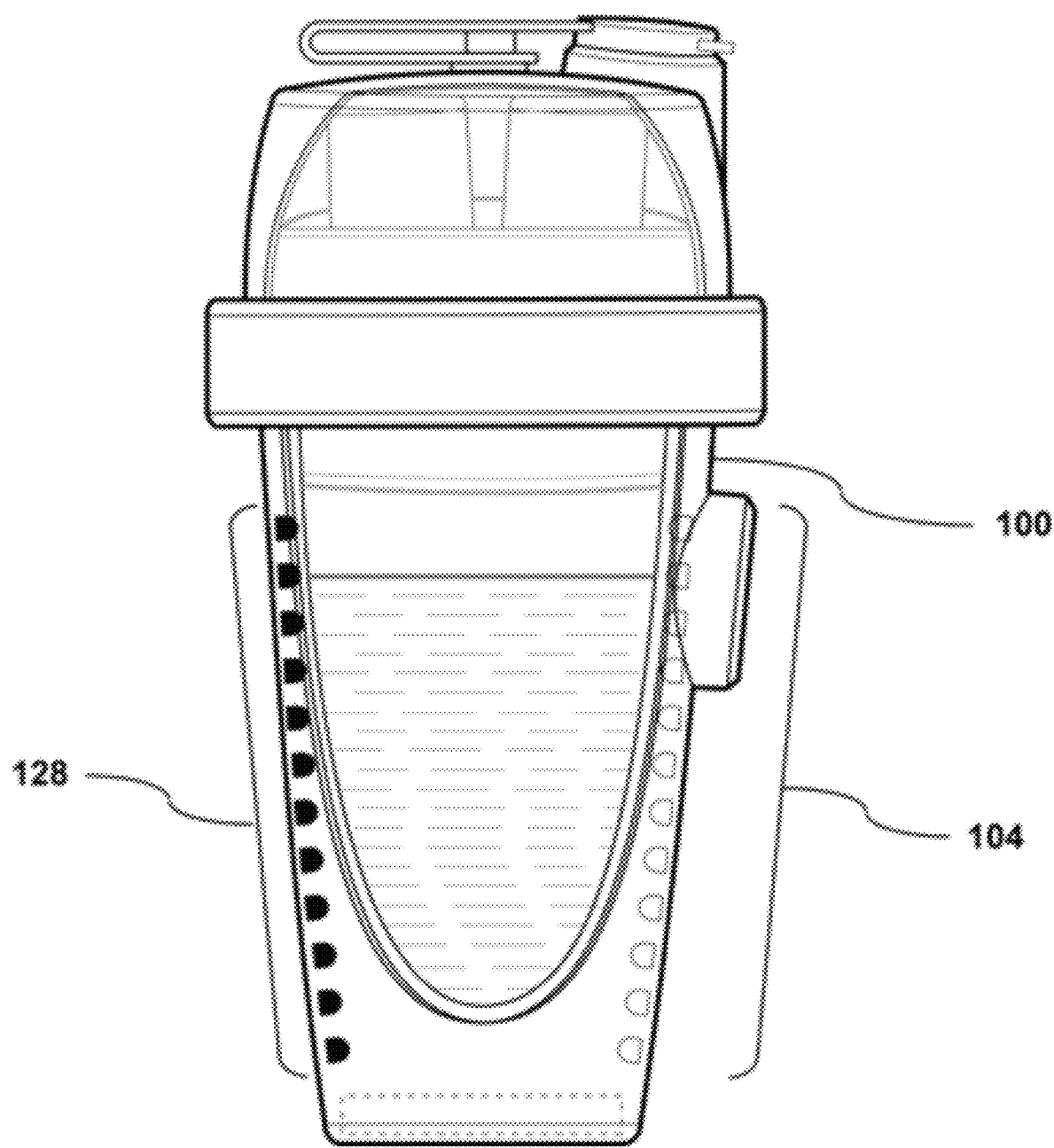
FIG. 8 illustrates another example arrangement of an infrared emitter and infrared receivers according to one or more embodiments described herein.

FIG. 8 shows a further embodiment, which for convenience will be referred to as multiple side emitters, which does not require inertial sensors, in which a first vertical array of multiple IR emitters 128 may be mounted on one side of the container 100 and a second vertical array of multiple IR receivers 104 mounted on the opposite side of the container such that each emitter is in substantial alignment with a corresponding receiver on the opposite side. This provides the additional capability of determining the volume of liquid in the container when the container is tilted. Though two vertical arrays of sensors are disclosed and illustrated, this is not a limitation and any other number of arrays may be deployed within a container. Similarly, the sensor arrays are not required to be vertical or linear in placement and many other arrangements are possible.

Figure 9A:
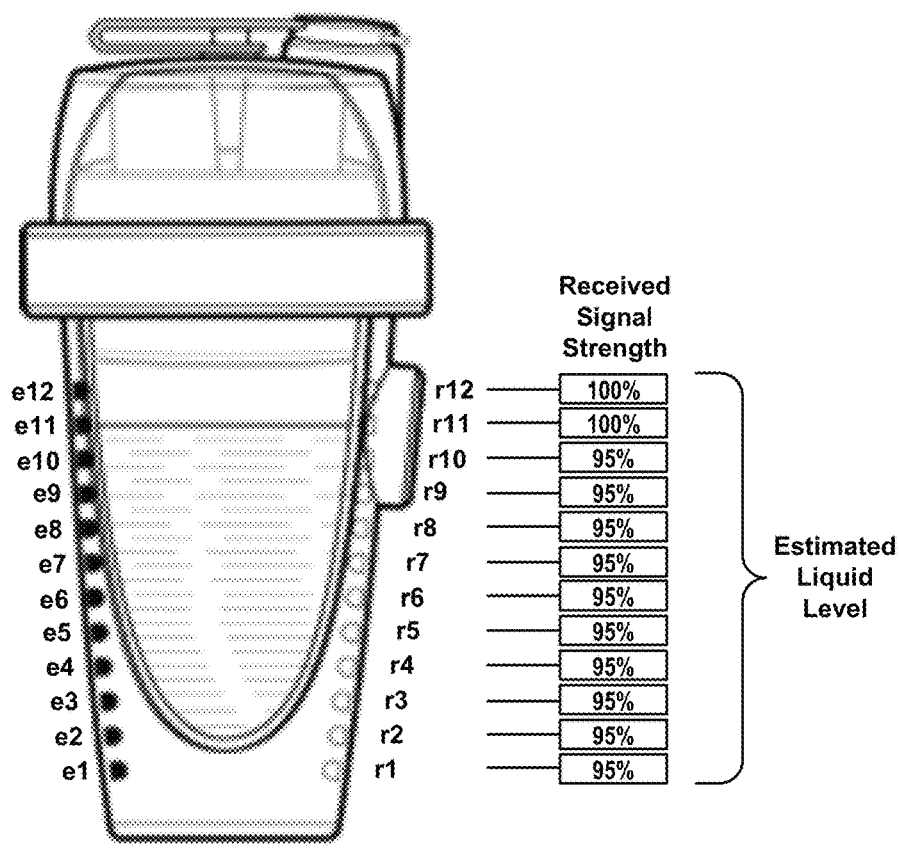
FIGS. 9A and 9B are schematic diagrams illustrating an example process of determining a fluid level in a container assembly having the arrangement of an infrared emitter and infrared receivers shown in FIG. 8 according to one or more embodiments described herein.
Figure 9B:
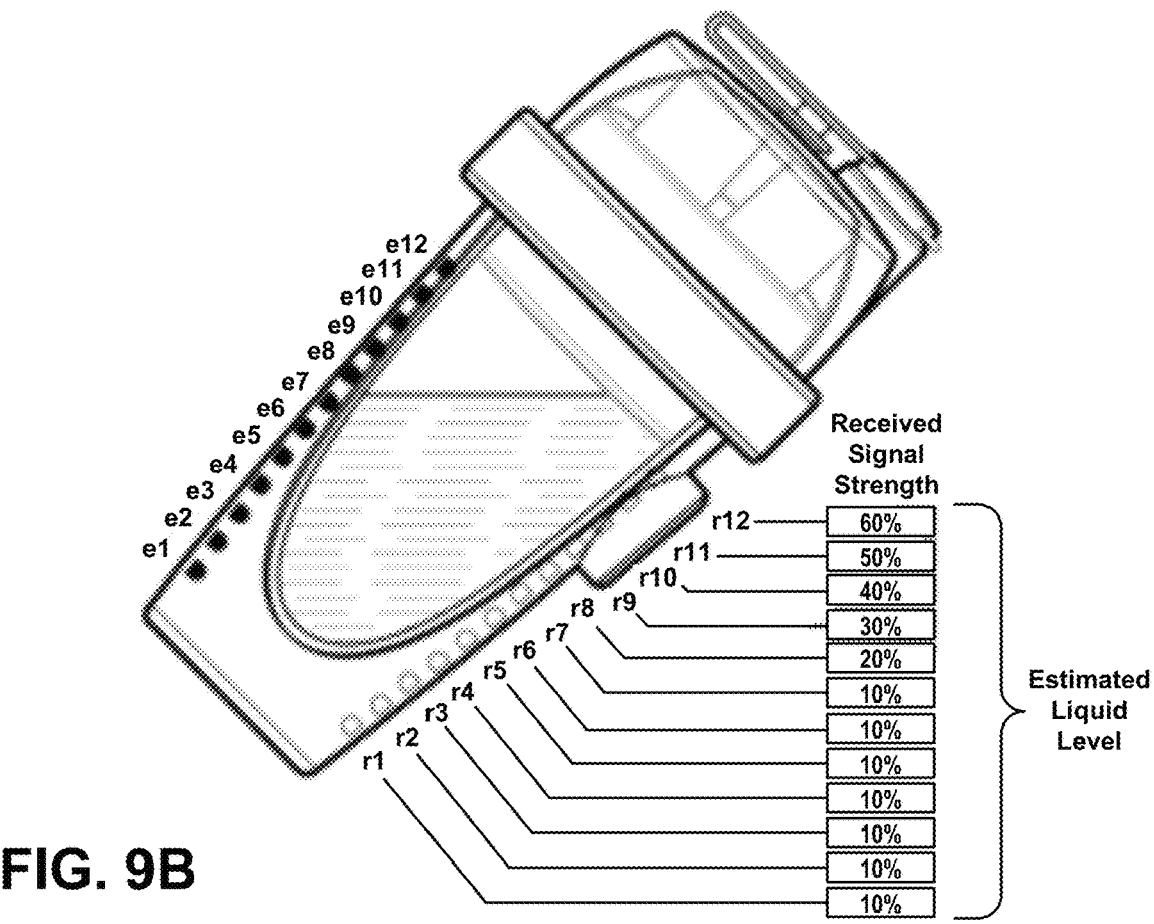

In FIGS. 9A and 9B the multiple side emitters embodiment shown in FIG. 8 is shown in an upright and in a tilted position. Continuous or intermittent IR pulses are emitted by emitters e1 to e12 in a substantially constrained angle such that the signal emitted by e12 will be detected primarily by receiver r12, the signal emitted by e11 will be detected primarily by receiver r11 and so on. In the following descriptions the received signal strength is represented as a percentage of the emitted signal strength, the percentages are for illustration only and do not necessarily represent actual signal strength.

In FIG. 9A, it will be seen that the received signal strength at r11 and r12 are high, at approximately 100% and at receivers r1 to r10 are relatively low at 15%, and approximately equal. This transition from high to low between r10 and r1 indicates that the liquid is at that level (between r10 and r11) in the container.

In FIG. 9B, it will be seen that the IR signal strength detected at receiver r12 is 60% (neither high nor low), having been slightly attenuated by passing through the liquid, the signal detected at receiver r11 will be attenuated to a slightly greater extent (e.g. 55%) since there is a greater volume of liquid between e11 and r11. The signal strength will step down further at receivers r10 to r8 as the amount of liquid between emitter and receiver gradually increases. The signal strengths received at r7 to r1 may be substantially similar (e.g. 15%). The gradually changing signal level indicates that the container is tilted, while the transition between r7 and r8 indicates that the lowest liquid level is approximately at the level of r7/r8. The fact that the signal strengths at r8 to r12 are not close to 100% indicates that liquid is present above r7 and that the equivalent liquid level, if the container were upright would be midway between r7 and a point where the received signal would be 100%. In this case determining that the liquid level would be at approximately r10. In a further embodiment, the container may also contain a tilt sensing device and/or accelerometer to substantially determine the orientation of the container and increase the accuracy of measurement. Note that the percentage signal strengths referred to above are for the purposes of illustration and example only and do not necessarily represent actual received signal strengths.

The use of inertial sensors and/or IR sensors as previously described to determine that the consumable container is tilted may also be used to determine that a user is actually drinking from the container at that time, this information may be used to initiate or prevent a liquid level measurement and/or initiate or prevent a scheduled dispensing event and/or to perform other functions which should preferably take place coincident with the drinking process.

Since infrared is an electromagnetic radiation and subject to the inverse square law, the signal level detected at a receiving diode is dependent on the distance between the emitter and the receiver, as well as any attenuating fluid between. Thus the signal detected at a more distant receiver will be less than that detected at a proximal receiver independently of whether liquid is between them to attenuate the signal. This can be compensated for in the method since the relative locations of all emitters and receivers are fixed and known.

FIG. 10 shows the detailed method of compensating for the attenuation of infra-red signal due to distance from the emitter (commonly known as the inverse square law), to more accurately determine the level of liquid in a portable container. This is described in the context of the single top emitter embodiment shown in FIG. 6 but applies to all embodiments. An array of IR receivers 104 detects IR radiation from IR LED emitter 103. The distance 129 between the IR emitter and IR receiver 1, is $d_1$, the distance between the IR emitter and IR receiver 2, is $d_2$, the distance between the IR emitter and IR receiver 3, is $d_3$, and so on to IR receiver N 705, at a distance of $d_N$. If there is no attenuation by liquid in the container then the signal strength detected at each of the IR receivers will be subject to the inverse square law and for IR receiver 1, will be $1/d_1^2$, for receiver 2, will be $1/d_2^2$ and so on up to $1/d_N^2$ 704. This is compensated for in the method used to process the received signal strengths to determine a level of liquid in the container.

Figure 11:
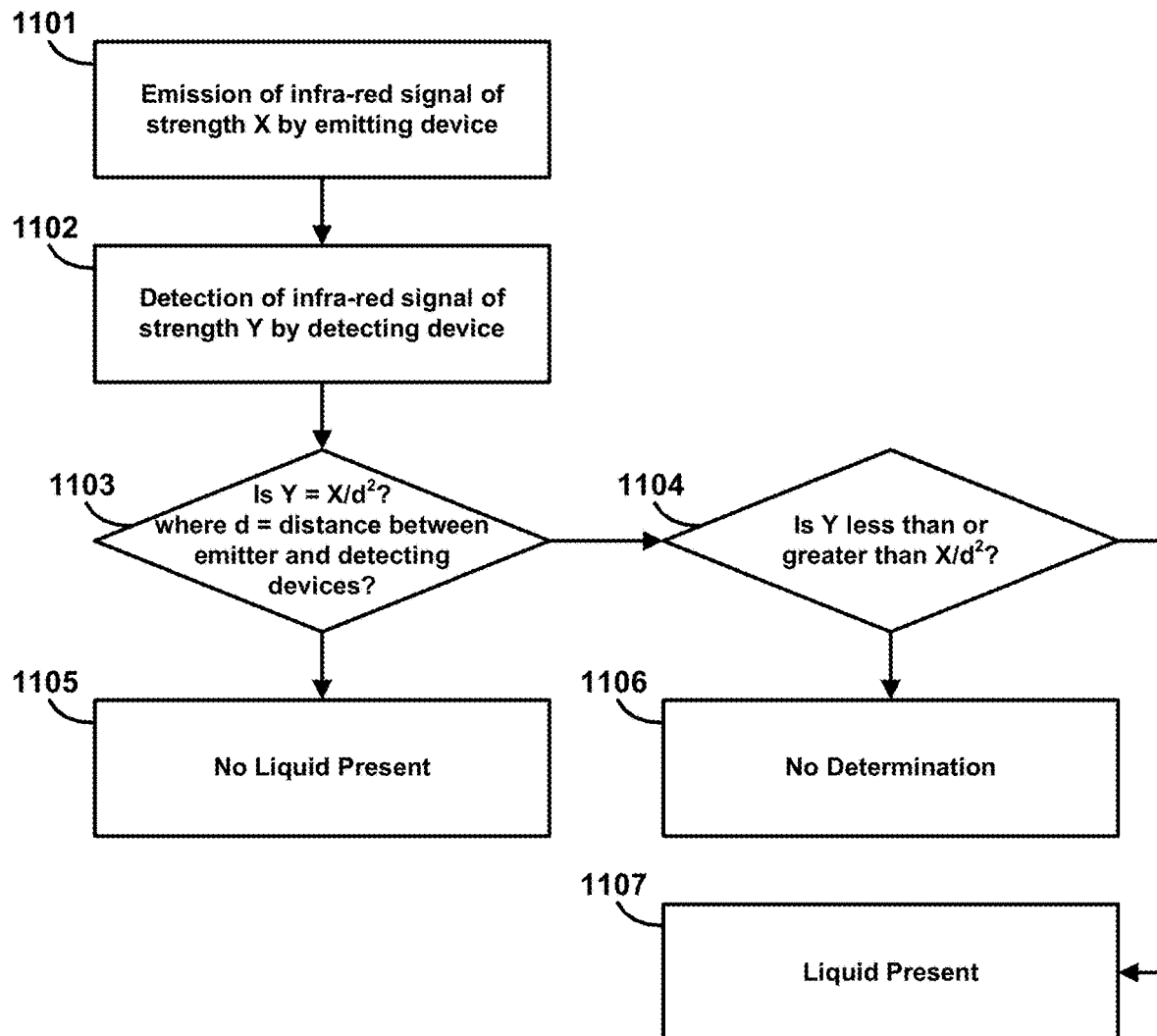
FIG. 11 is a flowchart illustrating an example process for determining a level of liquid within a container according to one or more embodiments described herein.

FIG. 11 shows an illustrative process for the determination of liquid level within a portable container. Infrared radiation of signal strength X is emitted by an IR emitting device at 1101 and a signal of strength Y is detected by an IR receiving device at 1102. Processing circuitry receives the data from a plurality of receiving devices and determines whether the detected signal Y is approximately equal to the emitted signal X, divided by the square of the linear distance between the emitter and the detector 1103. If the signal strength is substantially equal, then the processor determines that there is no liquid in the space between that emitter and that receiver. At 1104 the processor determines whether the detected signal Y is less than or greater than the emitted signal X, 1104. If the signal strength is less than the emitted signal X, then the processor determines that there is liquid present in the space between that emitter and that receiver. If the signal strength is greater than the emitted signal X, then the processor determines that there may be an error and no determination of the presence or absence of liquid is made.

Since a portable container will be subject to motion, the liquid level will not remain constant, but will be variable depending on the motion. Therefore much of the time, a determination of liquid level could be erroneous. To address this issue, in a further enhancement, the processing circuitry may use a plurality of signal strength measurements taken at various time intervals, for example 10 seconds and combine them together to generate a mean value as the estimate of fluid level in the container during that time period. In this embodiment, the infra-red emission may be continuous, with periodic detection of the received signal or the infra-red emission may be periodic, with continuous detection of a received signal.

Figure 12:
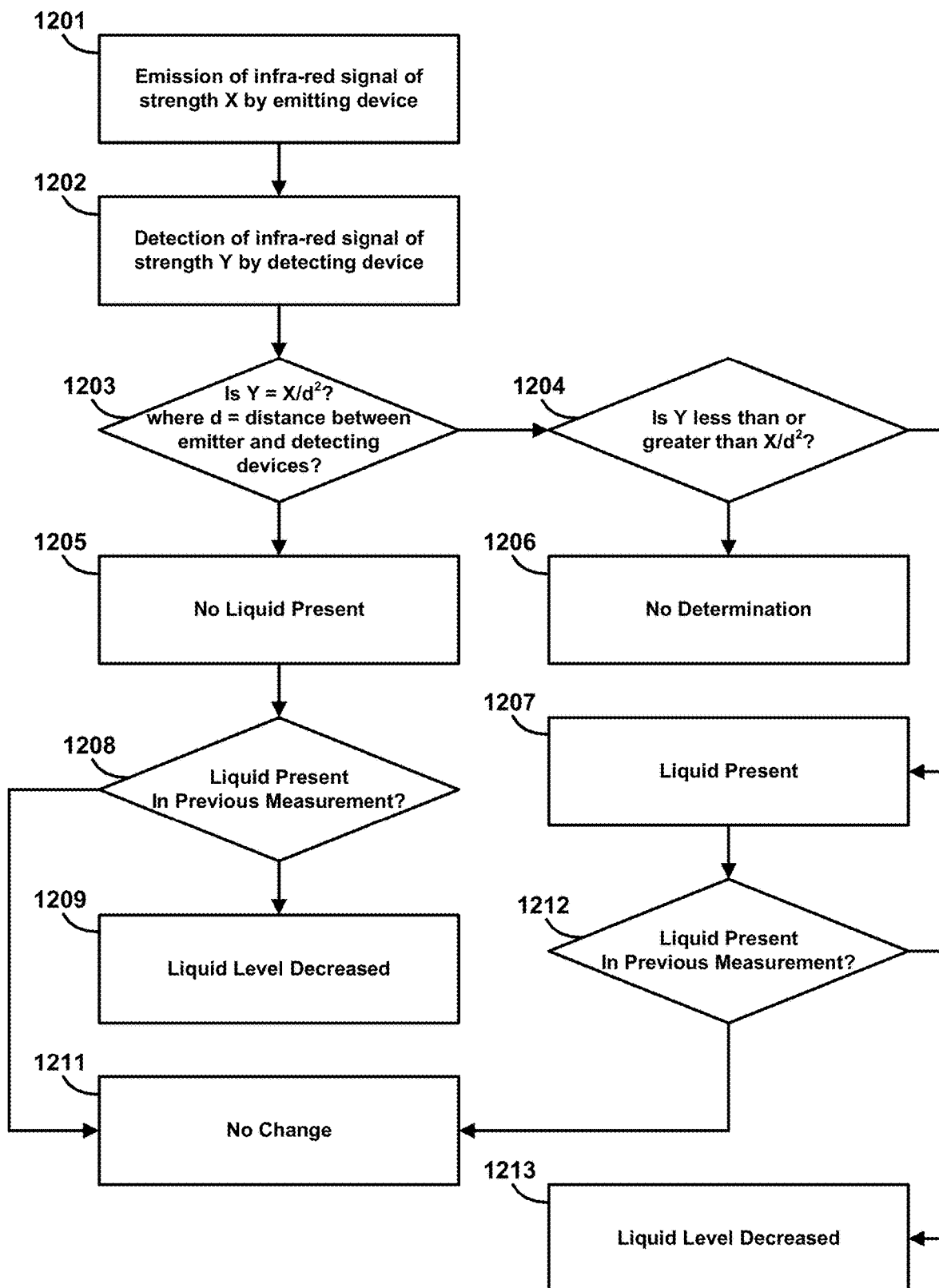
FIG. 12 is a flowchart illustrating an example process for determining a rate of consumption of liquid within a container according to one or more embodiments described herein.

FIG. 12 shows an illustrative process for the determination of the rate of consumption of a liquid within a portable container. The process of steps 1101 to 1104 is as previously described with reference to FIG. 11 in addition, at step 1205, comparison is made between a first and a second signal strength detected at that detection device to ascertain whether the signal strength has changed from that previously detected. If liquid was previously determined to be not present and in the subsequent detection event found to be present, then the system determines that the liquid level has increased 1206. If liquid was previously determined to be present and in the subsequent detection event found to be not present, then the system determines that the liquid level has decreased 1207. By taking account of the time period between the first received signal strength and second received signal strength and/or a plurality of measurement events between, the system determines a rate of consumption of liquid to be the difference between the two measured levels divide by the time between measurements. Such a technique in this instance is nearly identical in a fundamental manner for an alternate embodiment involving a capacitive sensing implementation.

Data on the level or volume of liquid in a portable or non-portable container may be used for a variety of purposes, including but not limited to determining a rate of consumption of the liquid in the container, determining when the container is empty, determining when the container needs to be refilled, and determining when the container has been refilled. Determining the level of liquid may also be used to determine whether a scheduled dispensing event has taken place. For example, if a signal is communicated from a processor to dispense 0.2 oz. of a consumable additive, the level detection system can immediately afterwards carry out a level check to confirm whether the fluid level has increased by an amount substantially in accordance with the introduction of 0.2 oz. of the additive. The aforementioned example assuming that the two or more substances have strictly additive volumes (e.g. 1 oz. plus 1 oz equals 2 oz total, etc.), whereby in cases where the respective volumes are non-additive (e.g. 1 oz plus 1 oz equals 1.9 oz total, etc.), a defined adjustment factor would be considered.

Figure 13:
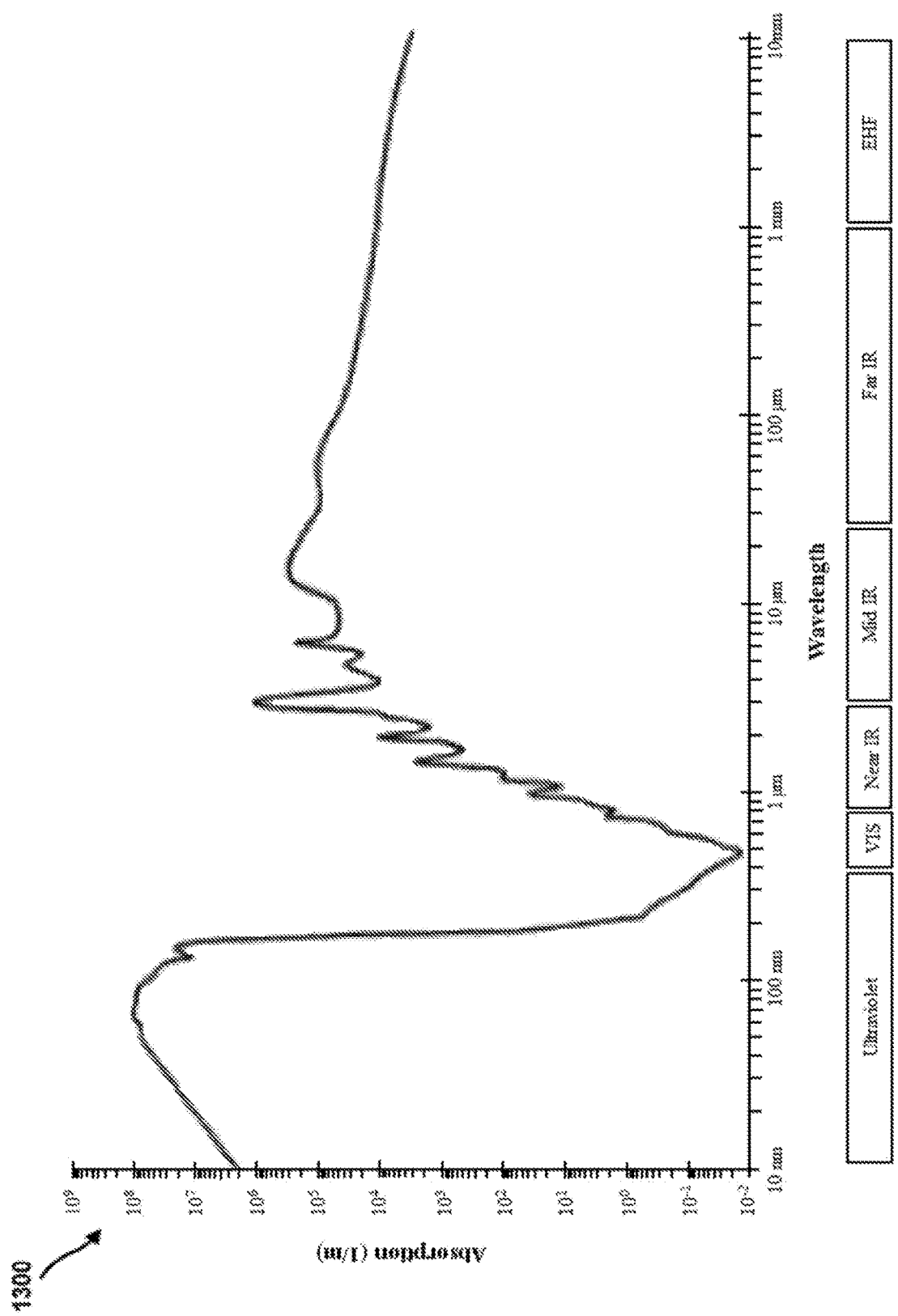
FIG. 13 is a graphic representation of the electromagnetic spectrum absorption characteristics of water.

In a further embodiment of the invention, the system may be used to establish and periodically re-establish baseline IR emission and/or detection thresholds corresponding to when the container is full and empty. The current embodiment of the container additionally comprises of a sensor to determine when the lid is removed for the container to be refilled and subsequently replaced. On detection of the lid removal, the processor may signal an IR emission and detection event to establish threshold signal levels corresponding to an empty container and on subsequent replacement of the lid, the processor may signal an IR emission and detection event to establish threshold signal levels corresponding to a full container. This may be particularly useful to increase the accuracy of level detection within the container and decrease threshold shifts caused by a varying infra-red level in the environment external to the container, or variable absorption/refraction or other forms of disruption of the fluid (e.g. water.) FIG. 13 shows a graph of the electromagnetic spectrum absorption characteristics of water.

Figure 14:
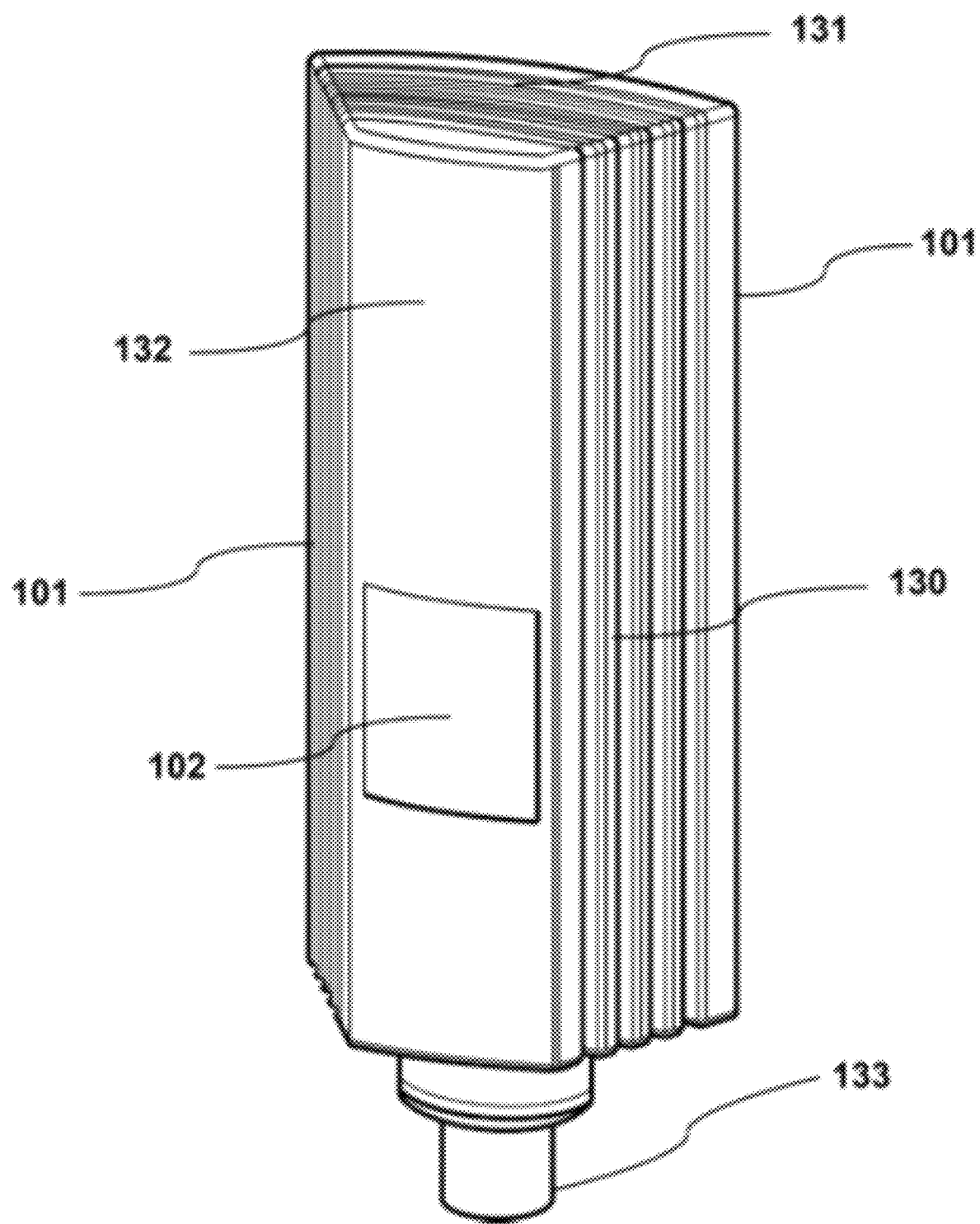
FIG. 14 is a perspective view of an example additive vessel with ridged sidewalls according to one or more embodiments described herein.

A portable hydration container such as is disclosed herein requires a number of separate vessels to be inserted containing the additives to be dispensed into the consumable. FIG. 14 shows a general view of an additive vessel according to one or more embodiments described herein. The example additive vessel may include a substantially airtight vessel 101 manufactured from a compressible, flexible or semi-flexible and recoverable material such as BPA-free LDPE (Low Density Polyethylene). It may be manufactured in such a way that the side walls 130 and top surface 131 of the vessel comprise of corrugated, accordion-like ridges enabling the vessel to be readily compressed laterally, while providing the necessary geometry to facilitate a 'rebound' behavior sufficiently strong and/or reliable to return the vessel to its standard form, shape, and/or pressure. The vessel is configured in the container in such a way so as to reliably constrain it across all but one axis of motion, consistent with the requirement of a correspondingly oriented actuator or other pressurization mechanism. The aforementioned configuration dictates that all input force from a dispensing mechanism necessarily translates into a force directed towards the ultimate and controlled ejection of the vessels' contents. The vessel may be removably mounted within a dispensing module assembly of a portable hydration container of substantially circular cross-section with the surface 132 facing inward as illustrated more clearly in FIG. 17 and FIG. 18. The additive vessel may also have affixed to its surface an RFID or similar tag 102, encoded with information about the vessel contents and the like, and comprises a separable nozzle assembly 133 through which the additive contents are dispensed. The dispensing assembly is preferably removable from the consumable container.

Figure 15:
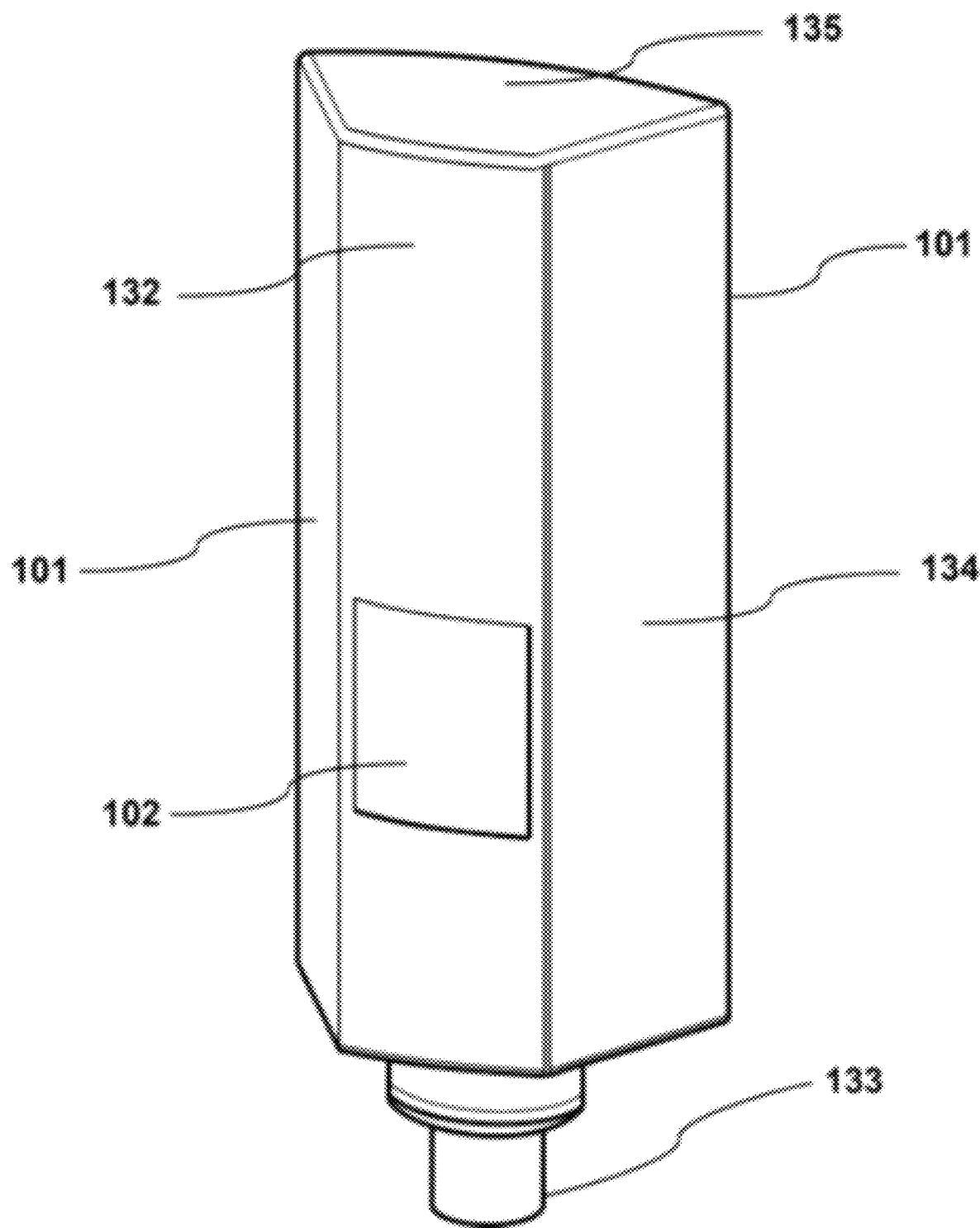
FIG. 15 is a perspective view of an example additive vessel with non-ridged sidewalls according to one or more embodiments described herein.

FIG. 15 shows an alternative embodiment of an additive vessel with flexible, compressible and non-ridged (non-accordion) side-walls 134 and flexible, non-ridged (non-accordion) top surface 135. This is essentially the same as the embodiment shown in FIG. 14, with the exception being the absence of bellows, accordion features, corrugations, ridges or other features of the side-walls and top surface. In the preferred embodiment, the 'smooth' surface specifically on the uppermost surface provides for a more rigid, planar surface that in turn dictates a more forceful 'rebound' behavior in the vessel, perpendicular to the compressive dispensing force, thus allowing for a more reliable re-equilibration/re-aspiration cycle.

Figure 16A:
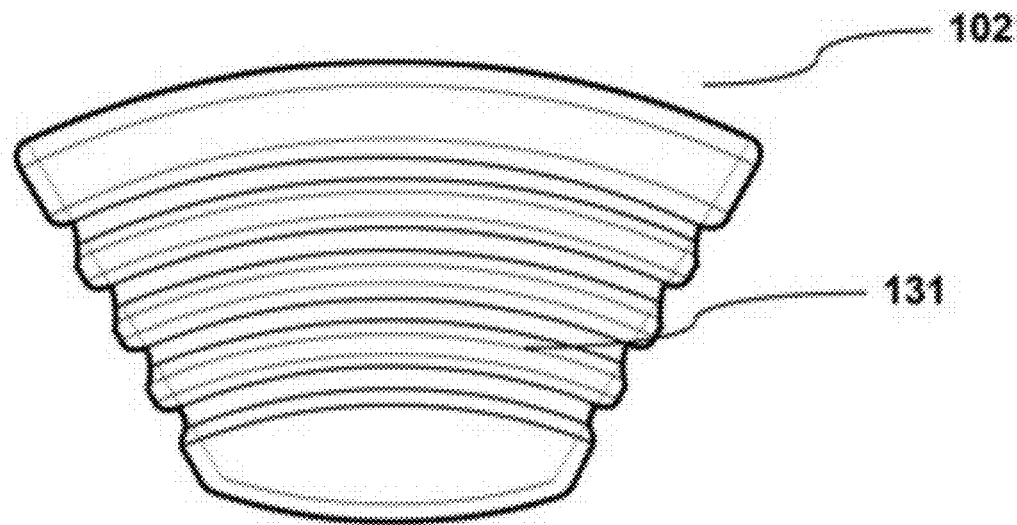
FIGS. 16A and 16B are top and bottom views of an example additive vessel with ridged sidewalls according to one or more embodiments described herein.
Figure 16B:
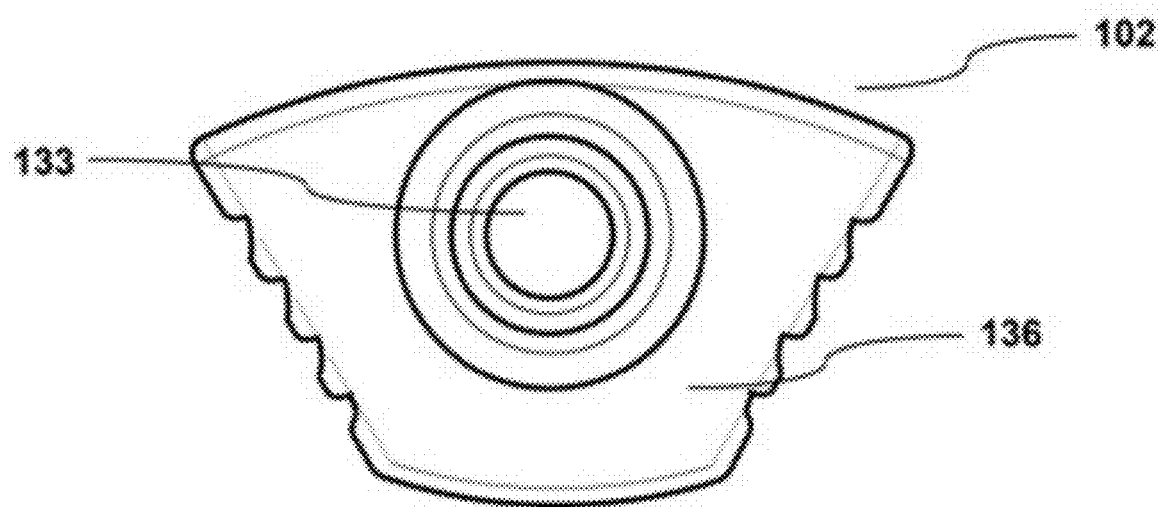

FIGS. 16A and 16B show a top and a bottom view of an additive vessel 102 in which it can be seen that the top surface of the vessel comprises of a corrugated or ridged compressible form 131, while the bottom comprises a smooth surface 136 to facilitate effective sealing of the dispensing nozzle 133 to the additive vessel surface and sealing of the additive vessel against a retaining surface within the dispensing module assembly.

Figure 17:
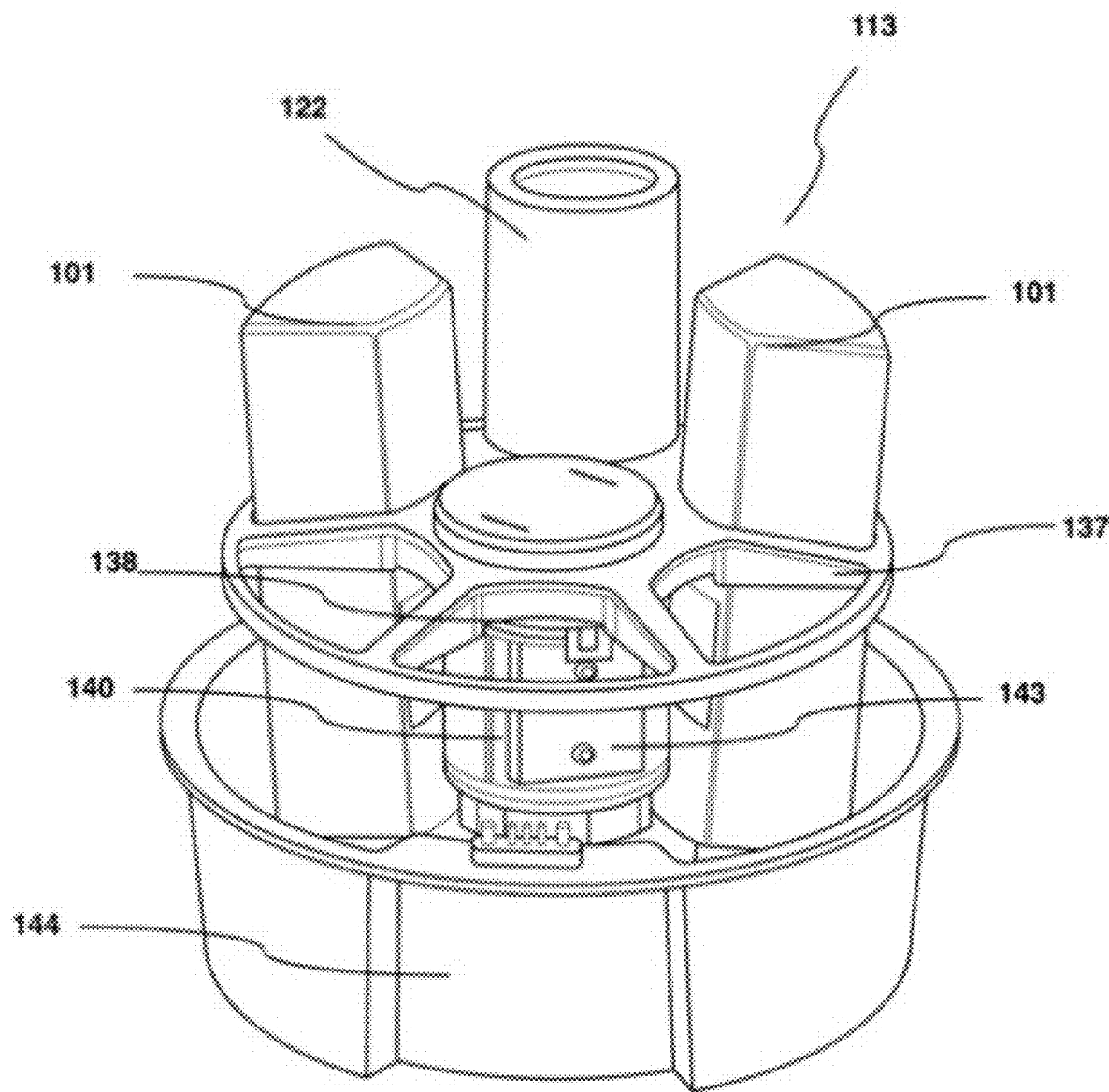
FIG. 17 is a perspective view of an example dispensing module assembly with several additive vessels having non-ridged sidewalls removably mounted therein according to one or more embodiments described herein.

FIG. 17 shows a dispensing module assembly 113 with a plurality of apertures for locating additive vessels 101 within a nest 137. A rotatable dispensing module 140 has one or a plurality of pressure applicators in the approximate location 138 and close to the innermost surface wall of the additive vessels. Mechanical motion of the pressure applicator 141, operating via a rack-and-pinion mechanism when it is adjacent to the inner-oriented wall of the additive vessel, applies pressure to and compresses the additive vessel in order to dispense the additive contents through the dispensing nozzle. Compression of the additive vessel occurs in a substantially linear manner. Dispensing behaviors, in a general sense in the current embodiment, are modulated primarily by volume (length) and frequency (number of actions) of the compression.

Figure 18:
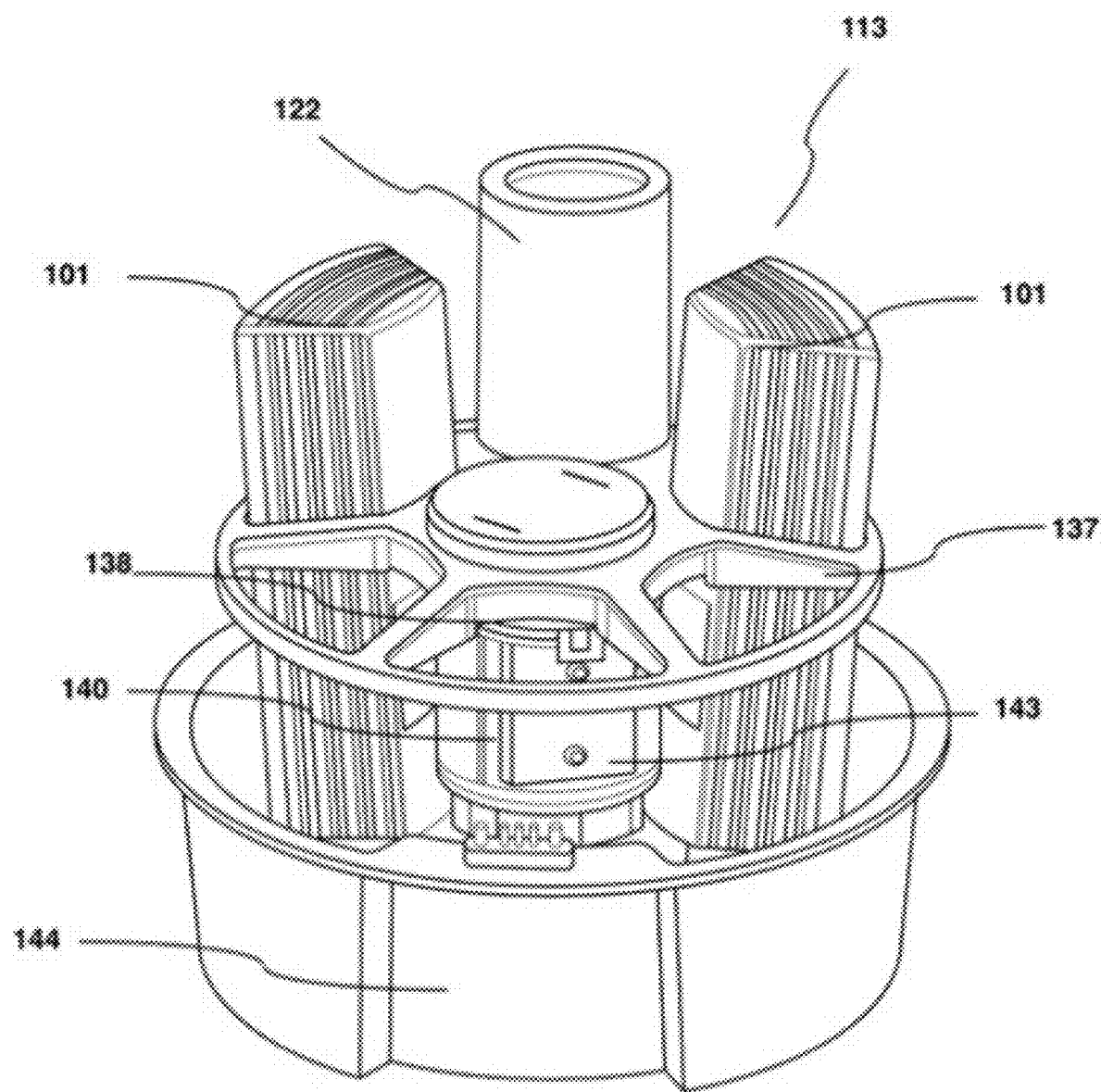
FIG. 18 is a perspective view of an example dispensing module assembly with several additive vessels having ridged sidewalls removably mounted therein according to one or more embodiments described herein.

FIG. 18 shows a substantially similar dispensing module assembly 113 but with additive vessels of the form shown in FIG. 14, each having a compressible bellows-like or ridged feature on the side-walls 130 and top surface 131 to facilitate compression of the additive vessel and the dispensing of vessel contents. The module 113 may have one or multiple (e.g., 5) apertures into which a user may insert additive vessels 101. It should be understood that the module 113 may include more or fewer than five apertures. For purposes of clarity only, and not in any way intended to be limiting, the example dispensing module 113 is shown with two additive vessels 101 inserted into separate apertures.

Figure 19:
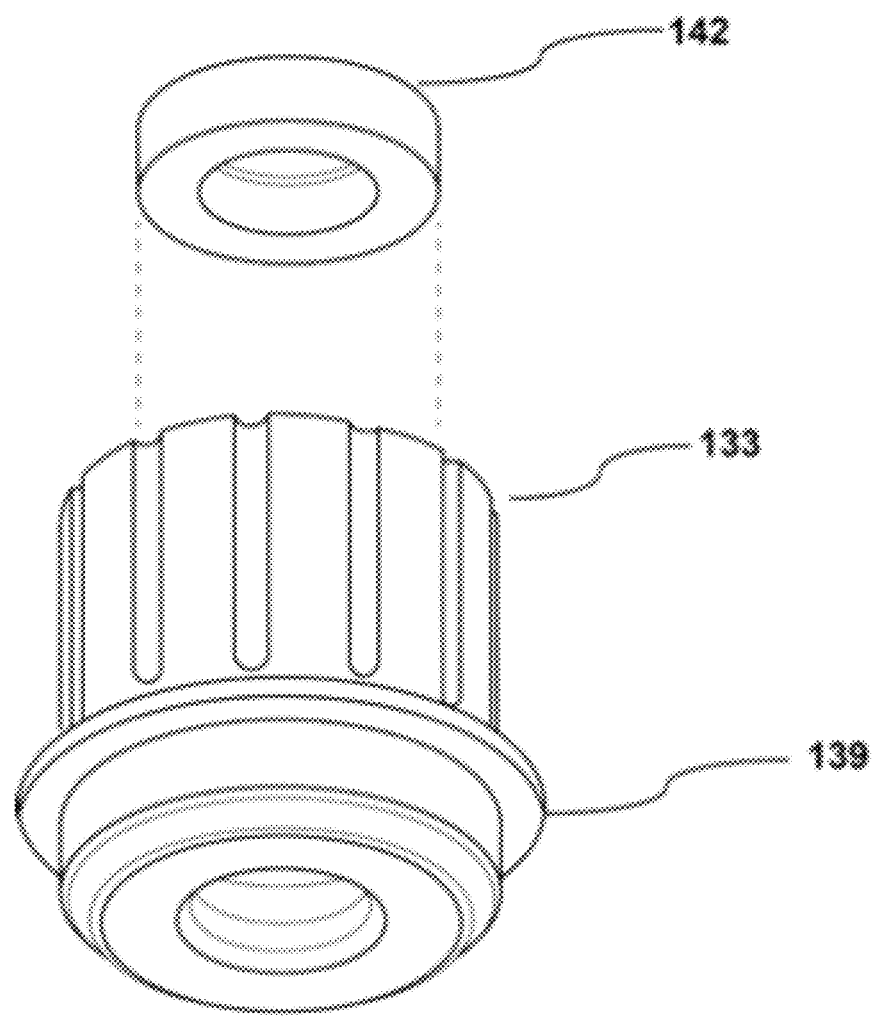
FIG. 19 illustrates an example nozzle assembly that interfaces an additive vessel to a dispensing assembly according to one or more embodiments described herein.

FIG. 19 shows an example detail view of a nozzle assembly in accordance with one or more embodiments described herein. A nozzle 133 is removably attached to the base of an additive vessel 101. This enables the additive vessel itself to be manufactured from a recyclable compressible material and the nozzle to be manufactured from a more rigid material such as Polypropylene. Furthermore, the valve described in the embodiment of the present disclosure requires the use of silicone, a non-recyclable material that thus requires separation from the primary, recyclable, body of the vessel. The nozzle 133 has a flange 139 which seals against a perimeter of the aperture in the dispensing module assembly 113 and prevents downward motion of the additive vessel when mechanical pressure is applied to the walls to dispense additives. The nozzle also comprises a domed and circular silicon valve 142 having a narrow cross-shaped slit which permits the additive to flow in an outward direction when pressure is applied to the vessel, and permits air to flow back in when the pressure is released. This silicon valve interfaces to a flange on the inside of the dispensing nozzle 133.

The time duration of the dispensing event is variable, depending on the amount of additive to be dispensed, but at the completion of a dispensing event, the pressure applicator in the dispensing module retracts and pressure ceases to be applied, at which point the circular silicon valve 142 allows air to be drawn back into the additive vessel without substantial leakage of the additive substance in an outward direction, thereby enabling the vessel to recover and return to the exact shape, form and position that it possessed prior to the dispensing event, and preparing it for a subsequent dispensing event. In this way a plurality of variable dispensing events can take place by means of pressure applied to the additive vessel, with each dispensing event being independent and unaffected by previous events. The silicon valve 142 also prevents the ingress of liquid consumable from the main chamber of the container which would contaminate the additive stored in the vessel, for example when the container is tilted in order for the user to consume the contents, or during regular transit and/or transport of the container by the user.

The additive vessel may be removable from the dispensing module in the consumable container at any time prior to and subsequent to a dispensing event without substantial loss of additive. Furthermore, in contrast to existing approaches in which a seal or membrane is punctured to release an additive, the removable nozzle assembly of the apparatus disclosed herein, is not damaged when the vessel is removed, thereby enabling the additive vessel to be potentially refillable and reusable. In a further embodiment, the mechanical interface between the additive vessel and the dispensing module assembly may additionally comprise a duckbill or similar type valve as is known in the art and which may provide an additional barrier between the additive and the consumable liquid.

Figure 20A:
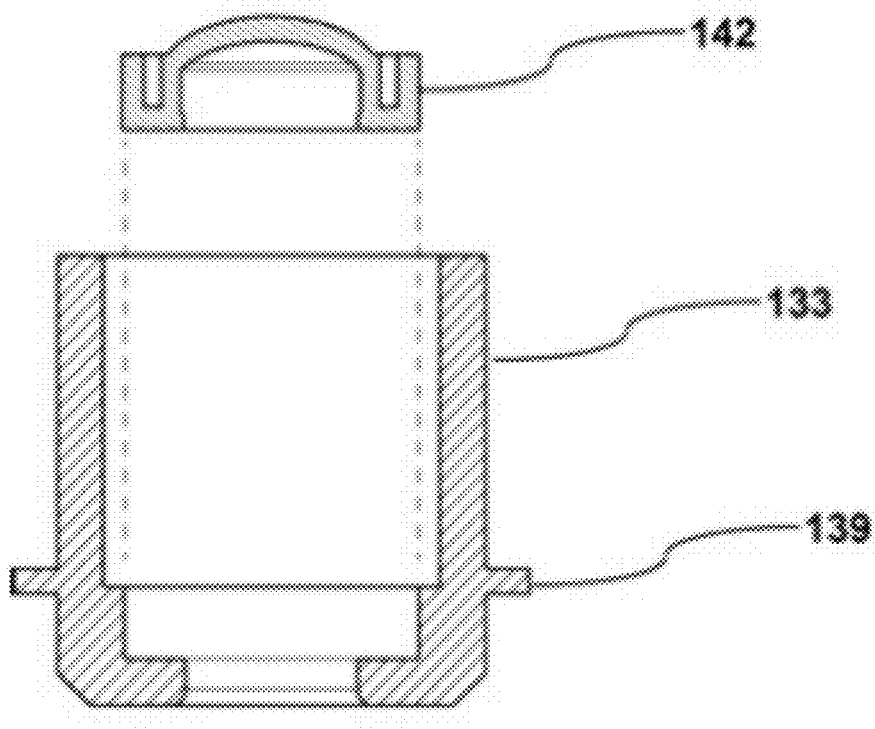
FIGS. 20A and 20B are cross-sectional views of an example nozzle assembly that may be used with or included as part of an additive vessel according to one or more embodiments described herein.
Figure 20B:
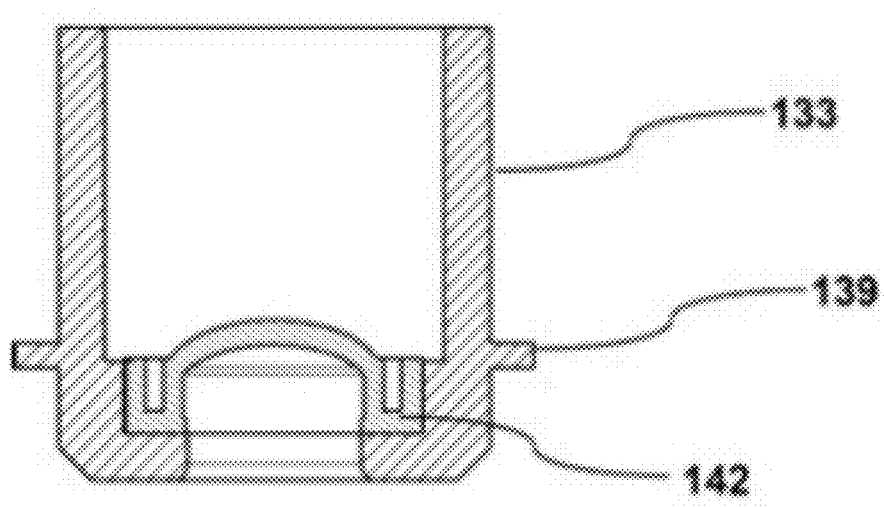

FIGS. 20A and 20B show a detailed cross section of a nozzle assembly that may be used with or included as part of an additive vessel in accordance with one or more embodiments described herein. FIG. 20A shows the nozzle 133 and the silicon valve 142 separated, illustrating that the silicon valve is removably inserted within the nozzle 133. The nozzle 133 seals against the perimeter of an aperture in the dispensing module at flange 139. FIG. 20B shows the nozzle 133 and the silicon valve 142 in their assembled position with the silicon valve 142 positioned within the nozzle 133.

In an alternate embodiment, the valve 142 and nozzle 133 assemblies may be a single, more efficient, component. The multi-piece assembly allows for interchangeability of the valves, whereby different slit geometries, thicknesses, pliability, and the like further refine and/or dictate the dispensing behavior of the attached vessel in the presently disclosed system and apparatus, thus making the valve/nozzle assembly more readily adjustable to accommodate different characteristics of additives.

Figure 21B:
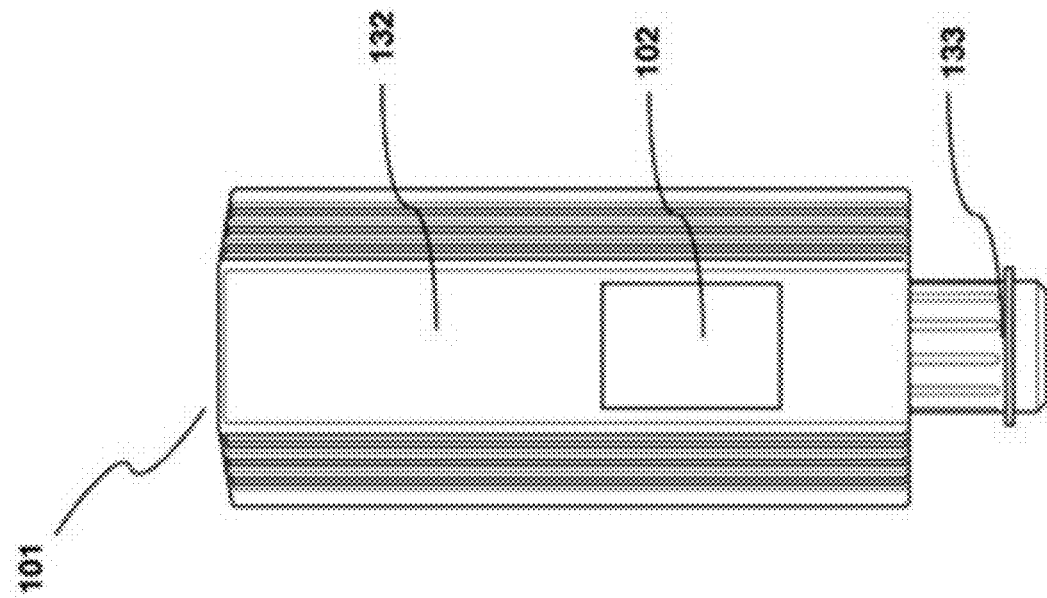
FIGS. 21A and 21B are side and rear elevational views of an additive vessel with an identification tag mounted thereon according to one or more embodiments described herein.
Figure 21A:
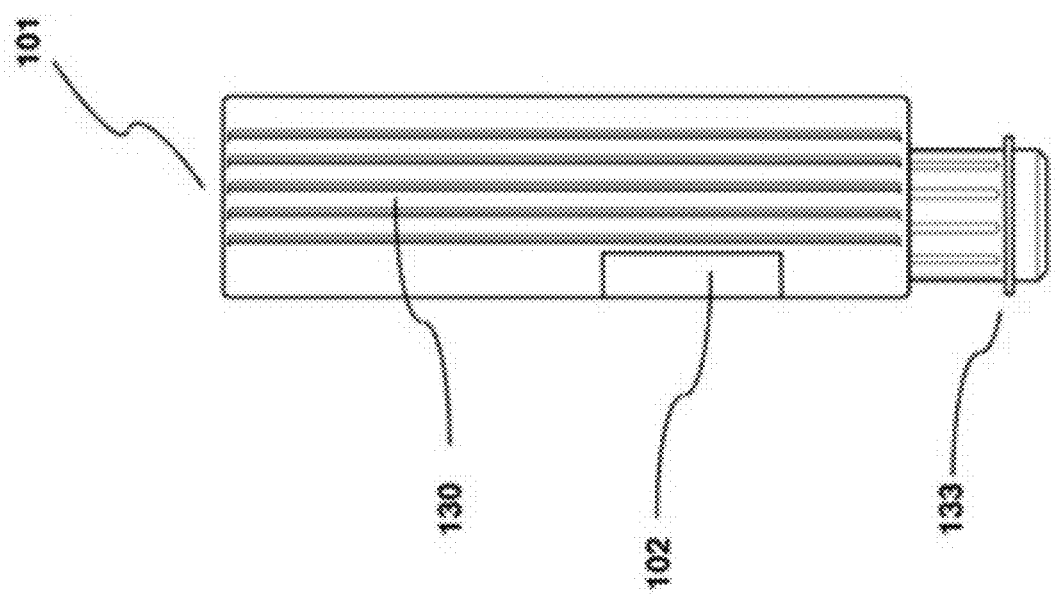

FIG. 21 shows an illustrative example of the side and rear views of an additive vessel 101 in accordance with one or more embodiments described herein. The additive vessel 101 has at least one side portion 130, an innermost (rear) surface 132, and a dispensing nozzle 133 at the lower end of the vessel. The vessel 101 may also have a RFID tag 102 mounted on the inward facing (rear) surface of the vessel. This is positioned distant from a pressure applicator which applies mechanical pressure to the upper portion of the inner (rear) surface of the vessel 101 to fully or partially dispense the additive contents, in order to ensure that the pressure applicator does not apply pressure directly to the RFID tag 102. The tag 102 may typically be manufactured from aluminum or other appropriate material and is securely affixed to the external surface of the vessel. It should be understood that the RFID tag 102 may also be positioned on any other surface or portion of the additive vessel 101 where the tag 102 can be accessed by an RFID antenna, in addition to, or instead of the example positions of the RFID tag 102 described above.

In accordance with one or more embodiments of the present disclosure, the RFID tag 102 may contain information about the contents of the additive vessel 101 to which the tag 102 is attached, including, for example, a name or type of additive in the vessel (e.g., vitamin B, cherry flavor, etc.), a category of the additive (e.g., nutritional supplement, pharmaceutical, energy supplement, etc.), a capacity of the vessel (e.g., 75 drops, 1.5 oz., etc.), a standard serving amount for the particular additive (e.g., 3 drops, 2.5 mL, etc.), dosage or consumption limitations for the additive (e.g., 12 drops per day, 4 drops per hour, 7.5 mL per day, etc.), as well as various other information that may be pertinent to the contents of the vessel 101 and/or the dispensing of the contents.

In accordance with at least one embodiment, data regarding the dispensing of additives may be encoded in any form suitable or appropriate to the dispensing process. (e.g. number of actuations, voltage, frequency, length of actuation, etc.).

Figure 22:
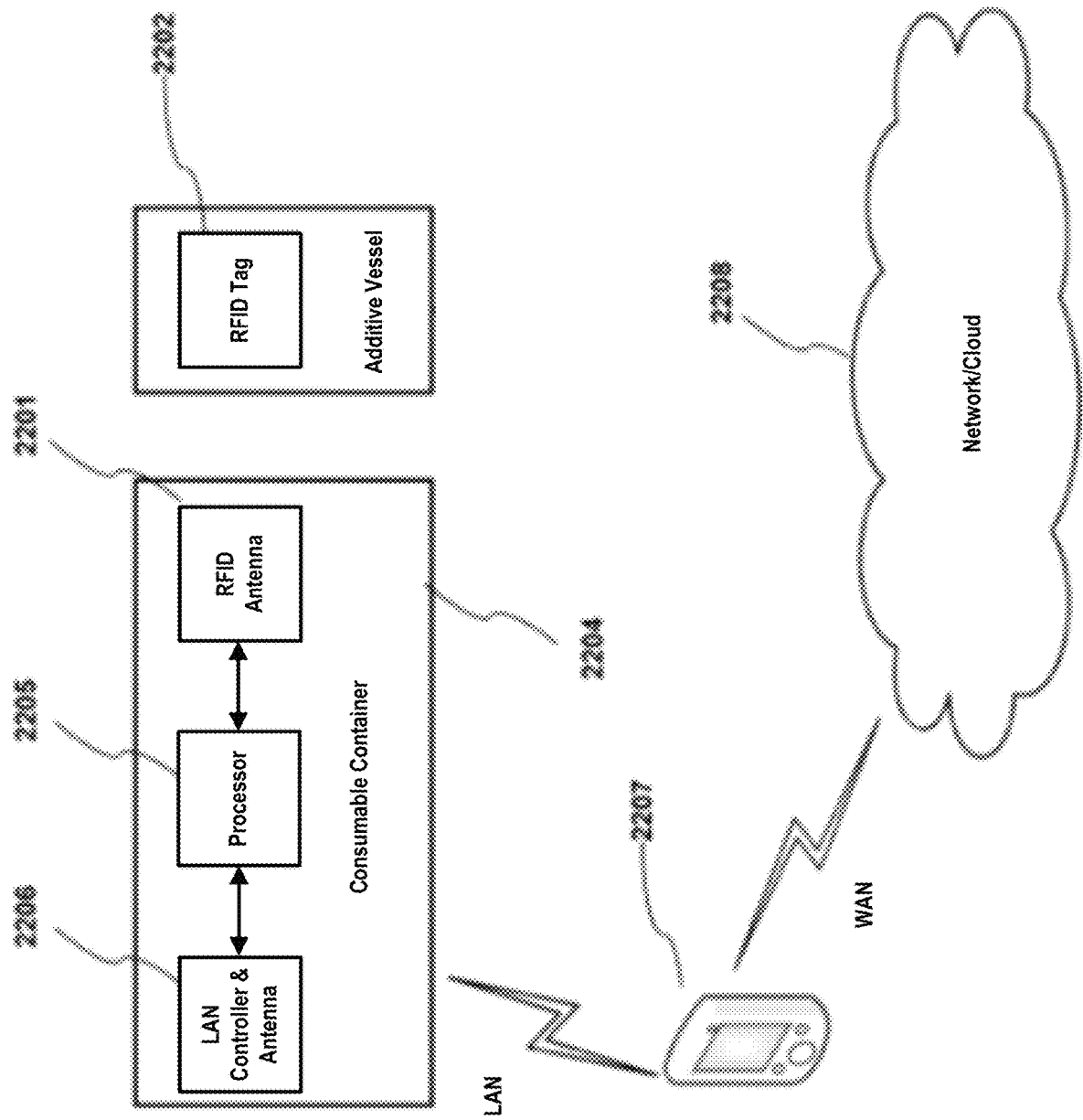
FIG. 22 is a block diagram illustrating example data communications within a data access system according to one or more embodiments described herein.

FIG. 22 is a block diagram illustrating example data communications between various components of the system, in accordance with one or more embodiments of the present disclosure. An RFID antenna 2201 mounted on a rotatable dispensing module within a consumable container 2204 reads data encoded on an RFID tag 2202 mounted on or within an additive vessel. Data received at the antenna 2201 is communicated to a processor 2205 which uses that data to determine that the correct additive vessel is to be dispensed and to access other data about the additive vessel contents and/or data about the preferences of the user of the container that may be influencing factors in the subsequent dispensing event. The data is also wirelessly communicated 2206 to an associated user mobile device 2207 via a Local Area Network, such as Bluetooth Low Energy, though it is understood that other wireless or wired technologies may be utilized for this. The mobile device 2207 further communicates wirelessly with the cloud 2208 via Wi-Fi, and/or a Wide Area Network (WAN) such as cellular, etc., and is able to communicate the data accessed from the additive vessel to a storage location in the cloud and is also able to access from the cloud additional information or data about the additive vessel or the user of the consumable container (such as user preferences, consumption or usage history, etc.).

Figure 23:
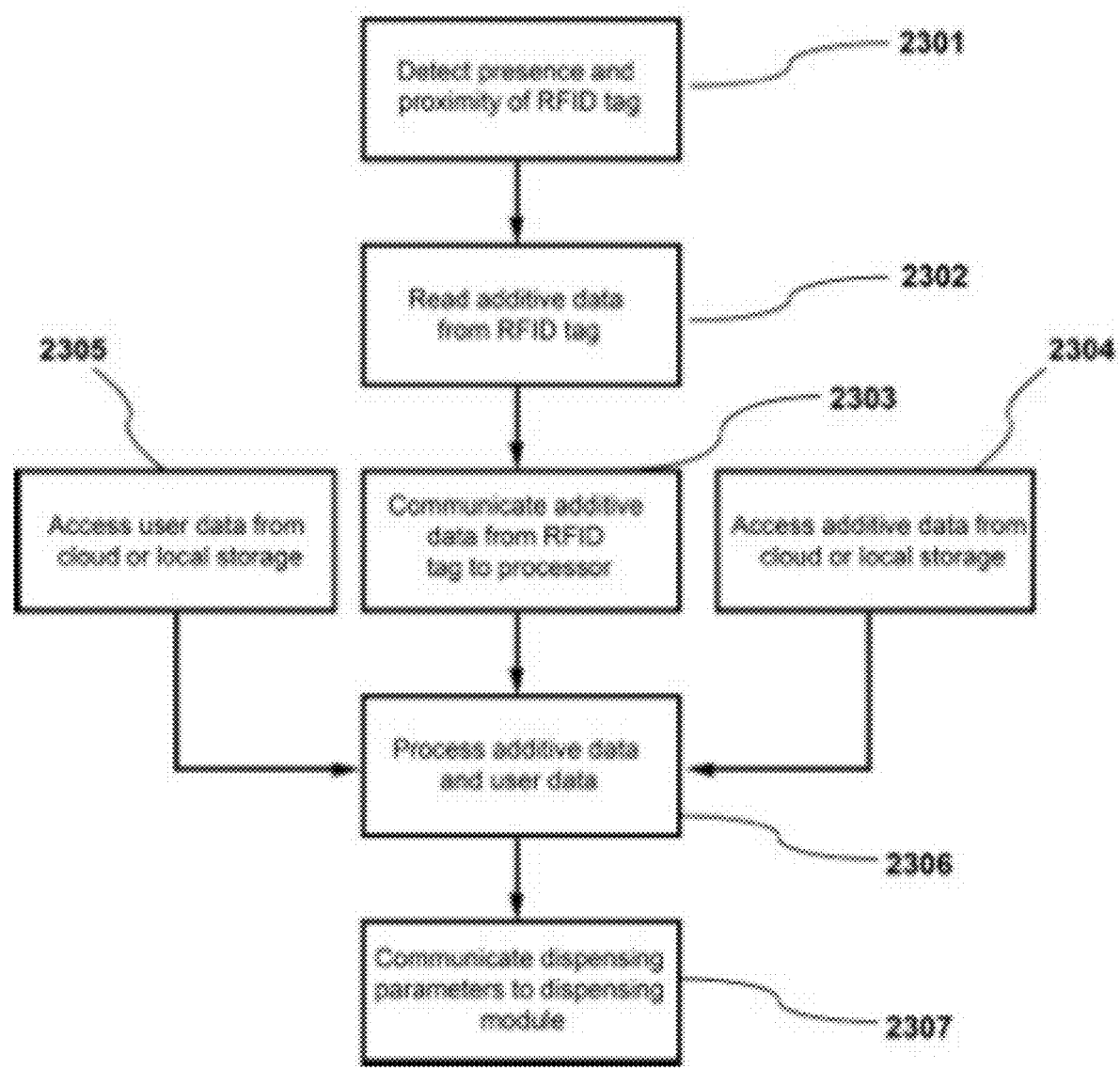
FIG. 23 is a flowchart illustrating an example process for identifying a container and accessing data about the contents of the container and about a user of the container according to one or more embodiments described herein.

FIG. 23 is a flowchart illustrating an example process for identifying a container and accessing data about the additive contents within the container, and about a user of the container. At block 2301 the system may detect that an additive vessel has an RFID tag and that the RFID antenna is sufficiently close to the tag to read the data encoded thereon. At block 2302, the data may be read by the antenna and communicated to an onboard or external processor at block 2303. Data about the user of the container may be further accessed at block 2305 from a local storage location or from, for example, an associated network cloud, and communicated to the processor. Similarly, supplemental data about the additive in the container may additionally be accessed at block 2304 from a local storage location or from the cloud and also communicated to the processor. Data from these three sources may then be used by the processor at block 2306 to determine the parameters of a subsequent dispensing event, which may include, for example, the distance through which the rack mechanism needs to move to provide the correct amount of pressure to the pressure applicator and the duration of the application of pressure to the additive vessel, such an action would also correspond to number of rotations of the interfacing pinion gear, which subsequently would correspond to length of activation for the driving motor. In the preferred embodiment, the action of the rack-and-pinion actuator is measured with a linear position sensor, for which the primary purpose is to confirm a complete actuation, and a corresponding complete return to a home position, such that the dispensing module is free to rotate on its axis without interference with other components and/or housings. These parameters are then communicated to the dispensing module at block 2307.

Figure 24:
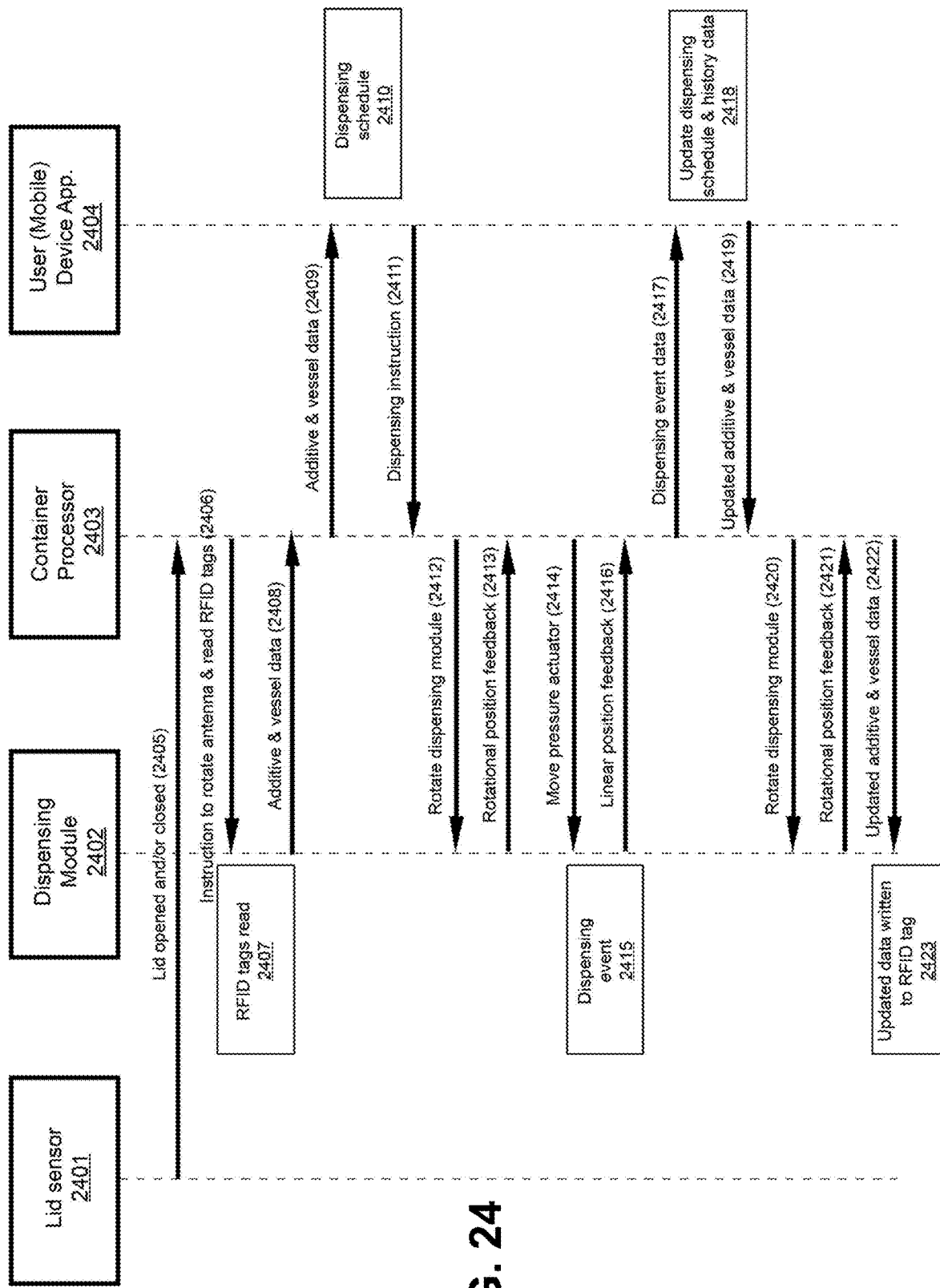
FIG. 24 is a data flow diagram illustrating example data flows between components of a hydration system and a user device in accordance with one or more embodiments described herein.

FIG. 24 illustrates example data flows between components of a hydration system. Example data flows are shown between an application on the user's mobile device 2404, a processor within the portable hydration container assembly 2403, the dispensing module 2402, and a lid open/close sensor 2401.

A lid sensor 2401 (e.g., a Hall-Effect switch) communicates to the container processor 2403 that the lid has been opened or closed (2405), the open and close event indicating a likelihood that the user has placed or replaced additive vessels in the container and/or emptied or refilled it with water or other consumable liquid. Irrespective of what change has occurred, the container processor 2403 instructs the dispensing module 2402 to rotate through 360 degrees (2406) enabling the RFID antenna to pass by and/or pause at each of the RFID tags and read the encoded data (2407) about the additives in the additive vessels. This additive data is then communicated (2408) to the container processor 2403 and may be further communicated to an application 2404 on the user's mobile device (2409). The mobile device 2404 stores and/or creates a dispensing schedule (2410) for that user based on the additive vessels loaded into the container and, at the appropriate time, communicates (2411) a dispensing instruction to the container processor. The dispensing schedule may be periodically updated or modified according to user preferences, information, context data, environmental information, and the like which may be communicated from remote storage in the cloud to the user's mobile device application 2404 or from an API to third-party applications on the user's mobile device 2404. A dispensing schedule may also be periodically adjusted based upon updated data read from an RFID tag.

In one or more embodiments of the present disclosure, in response to a dispensing instruction (2411) from the container processor 2403, a first motor rotates the dispensing module (2412) to align with the target additive vessel, and positional information determined by a rotary potentiometer is communicated (2413) back to the container processor 2403 to confirm alignment with the correct additive vessel. Concurrently or subsequently, the container processor 2403 instructs a second motor to rotate and subsequently drive a pressurizing actuator (2414) to apply compressive force to the target additive vessel thereby dispensing the vessel contents (2415) in a controlled fashion. A linear potentiometer confirms the position of the pressure actuator (2416) to the container processor 2403, enabling the processor to determine whether the actuator has moved the correct distance and maintained that position for the correct length of time in order to dispense the correct amount of additive from the vessel.

The aggregated dispensing event data may then be communicated (2417) to the application on the user's mobile device 2404, and the dispensing schedule and/or dispensing history updated accordingly (2618). Updated information may then be written to the RFID tag on the vessel that was just used for dispensing. This may include information on the quantity just dispensed, the quantity of additive remaining in the additive vessel, the time/date of dispensing, the amount of consumable in the container at the time of dispensing and the like. This data may then be communicated (2419) from the user's mobile device 2404 to the container processor 2403. If this occurs immediately after a dispensing event, then it is likely that the RFID antenna is still aligned with the appropriate RFID tag and the data can be written to the tag. However, there may be dispensing events which require additives to be dispensed from more than one additive vessel, in which case the RFID antenna may not be aligned with the appropriate RFID tag and the dispensing module may need to be rotated back into the correct position (2420), that position being confirmed by the rotary potentiometer (2421), and the updated information then communicated (2422) from the container processor 2403 to the RFID antenna in the dispensing module 2402 and written to the RFID tag (2423). The system is then ready for the next dispensing instruction and/or the next lid open/close event detection.

Figure 25:
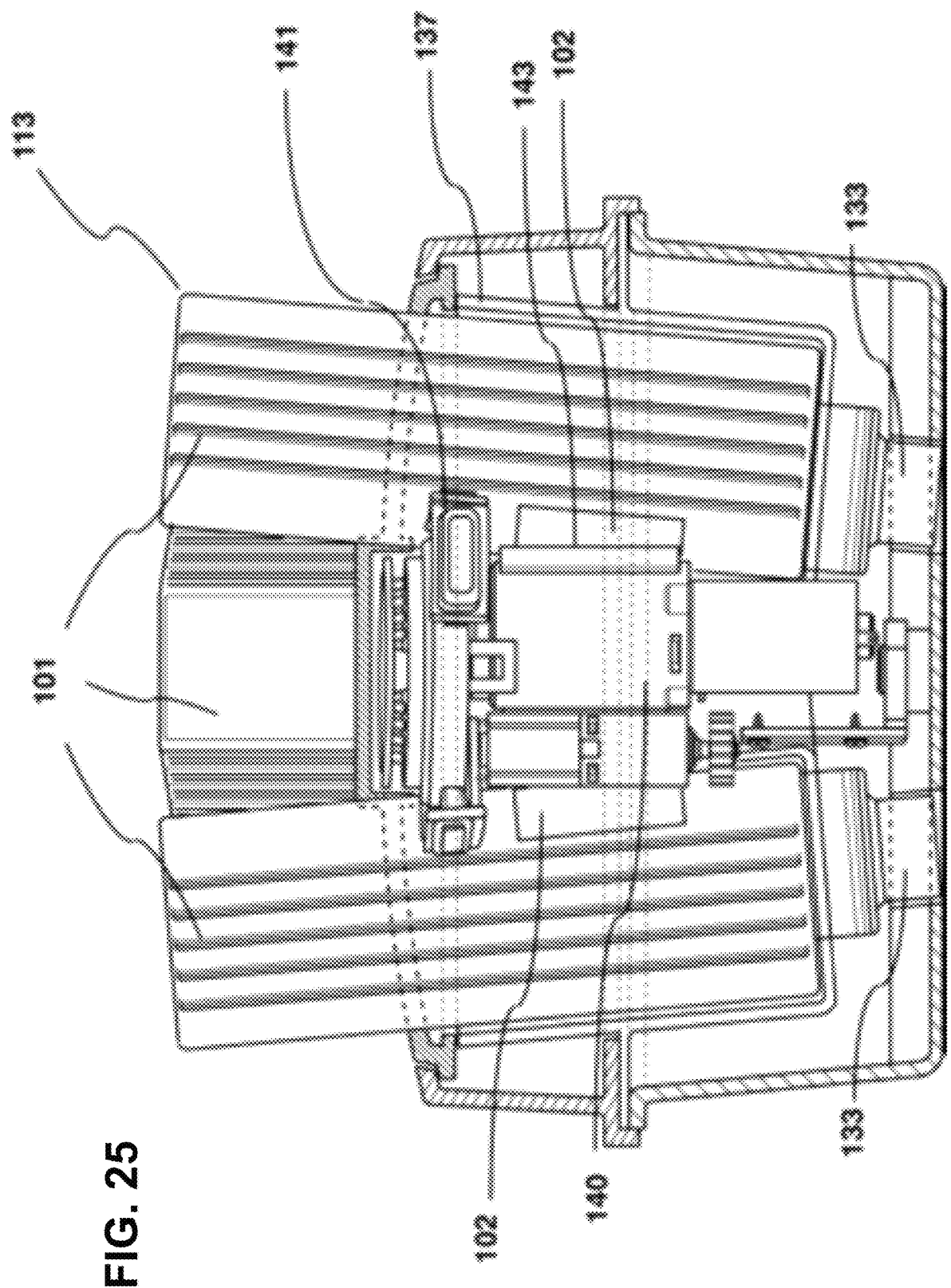
FIG. 25 is a cross-sectional view of a dispensing module assembly with additive vessels removably retained therein according to one or more embodiments described herein.

FIG. 25 shows example components that make up the apparatus of the dispensing module nest 137. The dispensing module nest 137 comprises one or a plurality of additive vessels 101 (three shown for reasons of clarity), a vessel nest or ring structure 137, providing apertures into which the multiple additive vessels can be inserted in positions chosen by the user, and a lower nest support structure. The aforementioned apertures 303 serve an ancillary purpose of constraining the additive vessel in all but one axis, thereby dictating that any input force operating on the additive vessel is (primarily) working to dispense the contents of the vessel. Furthermore, the apertures 303 dictate an orientation-specific configuration of the additive vessels, ensuring accurate placement of the vessel from both a dispensing and a data-read/write standpoint. One portion of the ring structure 303 is occupied by a drinking channel 305 which allows the consumable liquid to pass from the container through the dispensing assembly to the user. Centrally positioned within the dispensing assembly is a dispensing module 306, equipped with one or more pressure applicators 141. In response to a signal from an onboard or external application or processor, the dispensing module moves the pressure applicator into a position proximal to a selected additive vessel and applies pressure to the inner surface of that additive vessel 101, to cause all or a portion of the additive therein to be controllably released through the bottom of the additive vessel 101 through the dispensing nozzle and into the consumable within the container. This will be more readily understood with reference to FIG. 25. The aforementioned embodiments, as disclosed earlier in the present disclosure, do not necessitate a partially or completely electromechanical implementation, one learned in the art will recognize that the dispensing actuation described, for the purpose of controllably variable, non-zero dispensing, could be accomplished with direct user-force acting upon a non-electrical, mechanical mechanism.

A detailed cross sectional view of the top portion of the container assembly and the dispensing assembly 113 are shown in FIG. 25. Here it can be seen that the additive vessels 101 are inserted and retained at an angle within the nest or ring structure 137, with the dispensing valve at the bottom and facing downwards (three are shown for reasons of clarity). Thus enabling the additive release to be assisted by gravity in addition to the pressure applied to the additive vessel 101 by the pressure applicator 141, which is moved axially into position by the dispensing module motors, and linear pressure applied to the wall of the additive vessel by the pressure applicator 141.

Information about the contents of an additive vessel may be encoded within an RFID tag 102 or similar proximity based read/write memory system mounted on a surface, preferably the inner surface of the additive vessel 101 and in close proximity to a self-indexing RFID or other appropriate receiving antenna or sensor 143. The data tag 102 may be active but is preferably passive, requiring no power source. By identifying the additive vessel 101 within the limited readable range of the antenna 143, additionally provides locational precision and ensures that the information from only one additive vessel 101 is readable in each possible discrete antenna position, and that the antenna alignment additionally coincides with the pressure applicator 141 alignment. Therefore, the pressure applicator 141 may act only on the additive vessel 101 about which data is currently communicated via the RFID or similar type identification system. Therefore this acts to ensure that the pressure applicator 141 applies pressure to the correct additive vessel 101 to dispense the correct additive.

Removal and/or replacement of the lid or top portion of the container may be detected by a sensor. A number of alternative technologies are possible, the preferred embodiment being a Hall Effect sensor located in the uppermost part of the consumable container and the lower part of the lid. In response to determining that the lid or top portion has been removed and/or replaced, the system initiates a scan of the RFID tags 102 on all additive vessels 101 within the top portion of the container by means of the RFID antenna 143, which is rotated through 360 degrees by the dispensing module 140, thereby reading data from the RFID tags 102 mounted on the inner surface of the additive vessels 101 and communicating this data to an onboard or external application or processor.

The RFID or similar type passive tag 102 communicates information about the additives within the vessels 101 including, but not limited to, the name and/or type volume and/or amount of additive, the dosage, dosage frequency, the maximum, minimum and/or recommended volume or amount to be dispensed, usage guidelines, "use by" dates and/or other information specific to that additive vessel. It may additionally comprise information about the dispensing characteristics of the vessel contents, for example whether it is a liquid or powder, it's mass or viscosity etc. the optimum amount or range of pressure which should be applied by the pressure applicator to dispense the additive and/or the length of time or number of times that pressure should be applied to optimize dispensing of the additive. This information is communicated via the RFID or other antenna to an onboard or remote application or processor. This information is used in conjunction with additional information such as end-user taste preferences, volume of consumable in the container, previous volume/amounts and additives dispensed into the consumable liquid, when the consumable liquid container was last refilled and other information relating to the user and/or the hydration container which is not specific to an individual additive vessel.

In a further embodiment, the RFID antenna may additionally write or encode information to an RFID or similar tag mounted on an additive vessel including, as a non-limiting example, a device ID may be encoded or otherwise programmed to the additive vessel in a dynamic fashion, related to the container within which it is inserted. The device ID may be used to ensure that an additive vessel may only be used in one or a specific type of container, or by a specific user, which may be appropriate for example if the additive in the vessel consisted of, for example, pharmaceuticals and/or other controlled substances. The RFID antenna may write information on user preferences to an RFID tag on an additive vessel, for example to fine-tune the amount of an additive dispensed to the specific personal preferences of a user. It is possible for an additive vessel to be removed from the dispensing assembly and be replaced therein at a later time, this is possible even after one or more dispensing actions have been performed on the vessel, unlike many other approaches known in the art which, after initial puncturing and use, cannot be re-used in a second container or device. This also enables an additive vessel to be transferred to a second dispensing module assembly in a different container, in which case this information can then be transferred along with the additive vessel, for example information about the amount previously dispensed during the period of time that the additive vessel was inserted in a first container or an ID code representing the user of the first container, user preferences and the like.

A dispensing assembly 140 may be centrally positioned and configured to rotate around a central axis (where the central axis of the dispensing assembly 140 may correspond to a central axis of a container assembly (e.g., consumable container 100 in the example system shown in FIG. 1, in which the dispensing module 301 operates)) to apply mechanical pressure to the correct additive vessel 101. As the dispensing assembly 140 rotates to position the pressure applicator 141, an RFID antenna 143 also rotates so that it is positioned proximal to the RFID tag 102 on the correct additive vessel 101. In accordance with at least one embodiment, the RFID antenna 143 may be designed to have a very limited angle and/or range of read visibility such that it is able to read an RFID tag 102 only if the tag is within a close range to the antenna 143. In this way the method ensures that the pressure applicator 141 is acting on the correct additive vessel 101 since the antenna 143 is unable to detect or read neighboring or adjacent tags that may be located on either side of the correct tag.

Additionally, in accordance with one or more embodiments, when one or more additive vessels are initially inserted into a consumable container, this insertion is detected by a sensor system and the dispensing assembly 140 may rotate through, for example, 360 degrees to scan and read the RFID tags of each vessel newly inserted (as well as previously inserted) to identify what additive vessels and therefore what additives, are in what aperture. The data read from the RFID tags may be stored (e.g., in a memory of the dispensing module or some other component of the container) for future reference. The dispensing assembly fits into a base 144 which retains and positions the additive vessels such that the RFID tags are reliably in alignment with the RFID antenna in accordance with the aforementioned.

Figure 26:
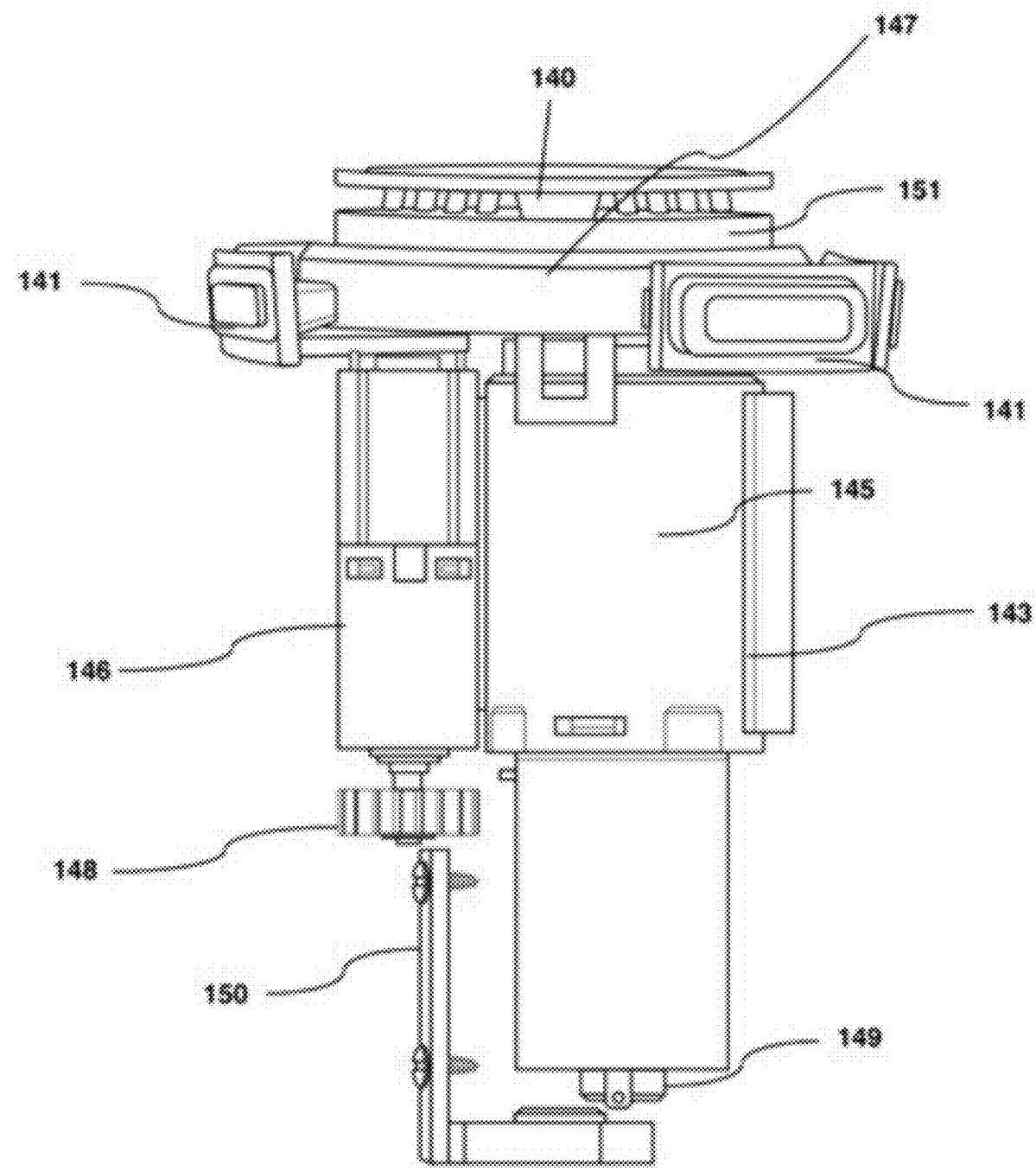
FIG. 26 is an elevational view of a dispensing module according to one or more embodiments described herein.

FIG. 26 shows an illustrative example of a dispensing module 140, the functions of which include rotating the RFID antenna 143 to align with and read the RFID tags on the additive vessels, rotating the pressure applicator(s) 141 to align with the appropriate additive vessel, and providing the physical movement and force required for the pressure applicator 141 to dispense the appropriate amount of additive from the target additive vessel.

In accordance with at least one embodiment, the dispensing module 140 comprises of two DC electric motors 145 and 146. A first dispensing motor 145 operates via a planetary-gear drivetrain mated to a rack-and-pinion mechanism 147 to provide controllably linear motion to the pressure applicator(s) 141, the linear motion of which applies pressure to a surface, preferably the inner surface of an additive vessel (e.g., additive vessel 101 as shown in FIG. 1) to release controllably variable amounts of the additive. A second indexing motor 146 operates using a spur-gear mated to a ring-gear 153 to enable axial rotation of the dispensing module 140 to achieve alignment of the pressure applicator 141 with an additive vessel. The indexing motor 146 also makes use of a planetary-gear drivetrain 148, thus facilitating much greater passive holding-force to maintain axial position even in a non-powered state, and furthermore, providing for reliable speed reduction facilitating more precise axial positioning. Note that the inner gear 153 operates within a fixed outer circumferential ring-gear (not shown) such that the outer gear remains stationary relative to the container and the dispensing module rotates within it. In other words, the additive vessels remain stationary and the dispensing module 140 rotates to align itself with the correct vessel. One having ordinary skill in the art will understand that the aforementioned relationship of a stationary retaining body with a dynamic dispensing module could be readily modified to accommodate an inverse relationship between the two general components, whereby the retaining body dynamically rotates and the dispensing module remains in place.

Additionally, a rotary potentiometer 149 is mounted underneath the dispensing module 140, beneath motor 145, and provides axial position information to confirm that the correct additive vessel is being acted upon, while circuit board 150 provides the logic and control for both the indexing motor 146 and the dispensing motor 145, and also houses, in accordance with at least one embodiment, the RFID processing unit (read/write/broadcast.) Similarly, a linear graphite potentiometer 151 is mounted within the top portion of the dispensing module 140 to measure and monitor the linear motion of the pressure applicator/actuator 141. This positional information is used to provide feedback to the container processor and/or an application on the user's mobile device, about the linear distance through which the pressure applicator 141 has moved in order to confirm that the correct amount of pressure has been applied and to further enhance the accuracy of additive dispensing.

In some cases the pressure applied by the pressure applicator 141 to the additive vessel, the time duration of the pressure application and the frequency of pressure application to dispense the additive, may be varied based on the data read and imported by the RFID antenna 143 from an RFID tag on the additive vessel (e.g., RFID tag 102 on additive vessel 101 as shown in FIG. 1) and communicated to the processor 156. For example, a fluid of higher viscosity might require a greater pressure to be applied and a powder additive might require pressure sufficient to agitate and level the powder contents but insufficient to initiate any actual dispensing of the powder. This may additionally be varied based on data associated with a user of the container. For example, user preference or previous usage data may indicate that an amount less than or greater than a standard volume be released and the pressure applied by the pressure applicator 141 and/or the duration of application of pressure, varied accordingly. Each component of the dispensing module 140, at least with respect to the embodiment described above, can modulate a dispensing event by adjusting or otherwise modifying stroke length, stroke frequency, stroke force, and stroke speed. In alternate configurations, the angle, position, and nature of the input force might be entirely or partially different, however one of ordinary skill in the art will understand that the resultant system would produce the same general results of fractional/partial non-zero dynamic dispensing of an additive vessel.

In accordance with at least one embodiment, the additive vessel (e.g., additive vessel 101 shown in FIG. 14) is manufactured from any number of suitably compliant, flexible materials and may have ridges, accordion-features, or a bellows form 130, 131 on one or more of the sides to facilitate compression by the pressure applicator 141 and the subsequent recovery of form when pressure is released from the vessel. The vessel also has a valve 142 through which the additive is released outwardly when pressure is applied and which permits air to pass inwardly to equalize the pressure when pressure is released. The additive vessel 101 may also have an RFID or similar type tag 102 affixed to an external surface of the vessel 101 to store and communicate data about the vessel contents to an onboard or separate processor or application (e.g., container processor 156).

Figure 27:
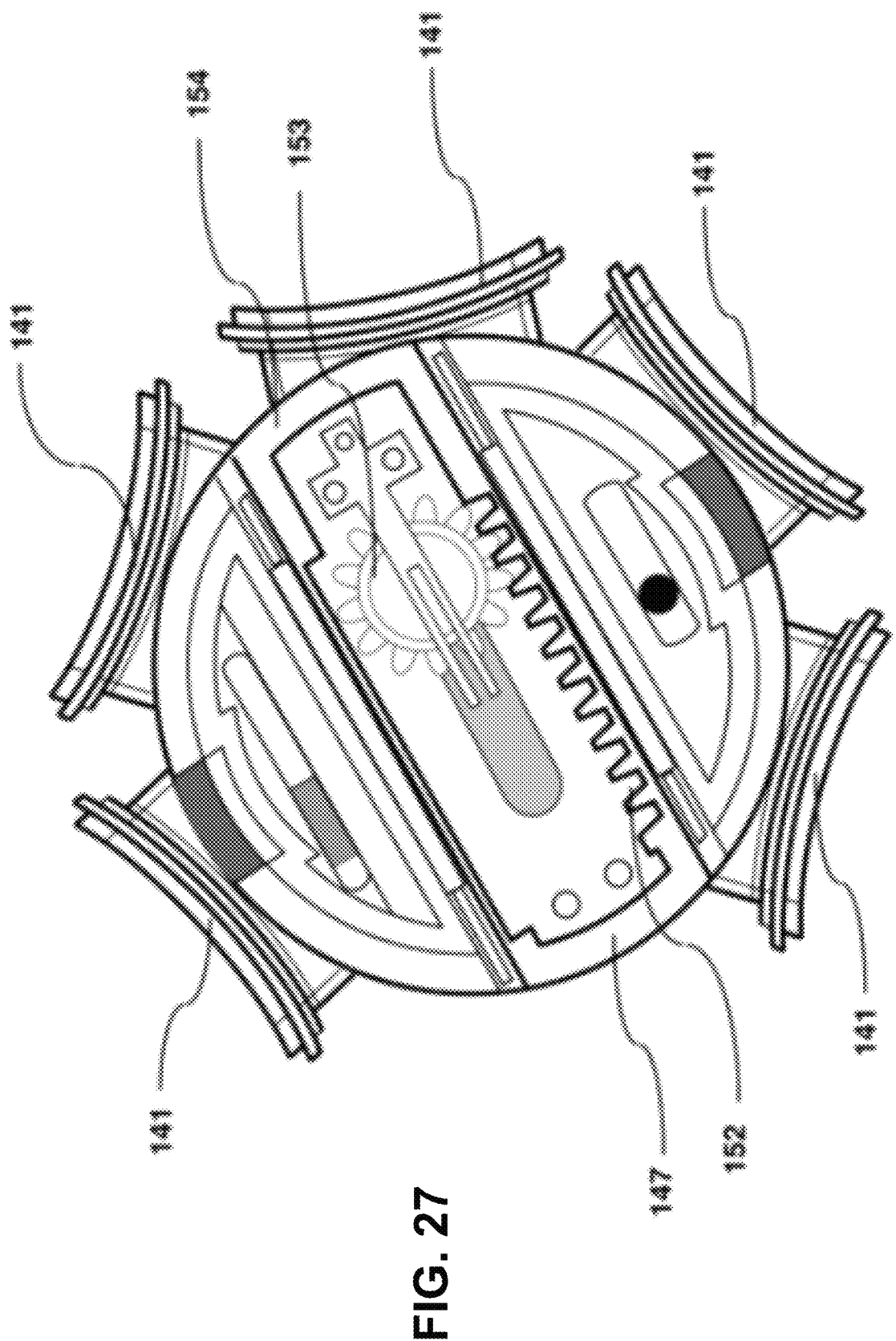
FIG. 27 is a top view of the dispensing module shown in FIG. 26, including a pressure applicator rack and pinion mechanism according to one or more embodiments described herein.

FIG. 27 shows a detailed plan view of a rack and pinion assembly 147 which, in accordance with at least some embodiments of the present disclosure, moves in a linear manner and applies force to a pressure applicator 141 that further applies pressure to the wall of an additive vessel (e.g., additive vessel 101). The rack-and-pinion assembly 147 comprises a rack 152 on an inner wall and a gear 153 engaged with the rack 152. When the gear 153 is rotated by the electric motor (e.g., dispensing motor 145) in a counterclockwise direction, it moves the rack 152 and the rack-assembly outward. The rack and pinion mechanism 147 is also rotated into position axially to align with a pressure applicator 141 and additive vessel. Movement of the rack and pinion assembly 147 applies force to the pressure applicators 141 via a surface 154. Five pressure applicators 141 are shown in FIG. 27, consistent with the number of additive vessels in at least one embodiment. However, it should be understood that a greater or lesser number of pressure applicators 141 is also possible. The pressure applicators 141 may be manufactured of a flexible material, enabling expansion when force is applied to the surface 154 and subsequent recovery to a first position when the gear 153 is rotated clockwise and the rack and pinion assembly 147 moves back to its original position.

Figure 28:
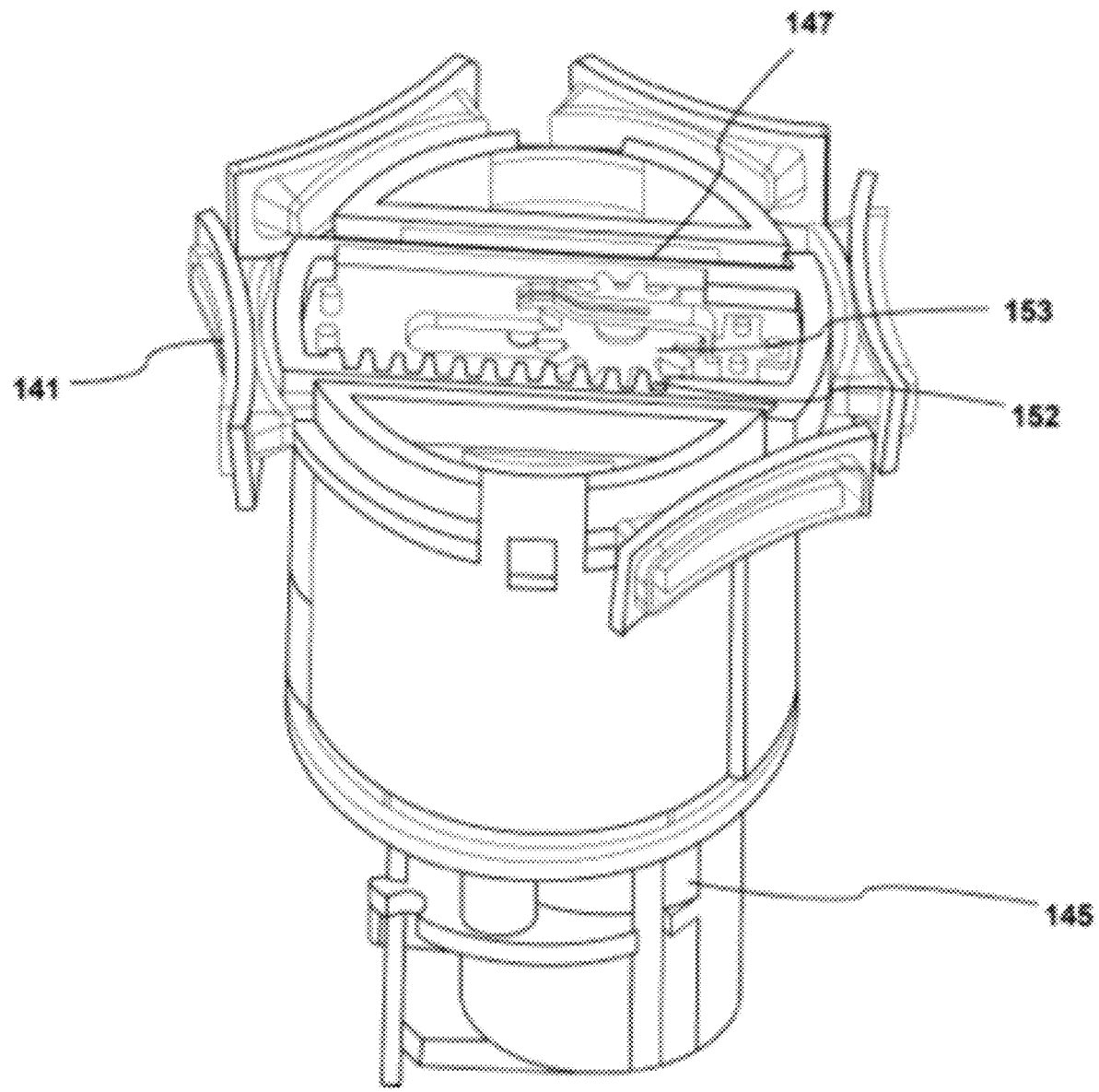
FIG. 28 is a perspective view of the dispensing module shown in FIG. 26 according to one or more embodiments described herein.

A more detailed view of the apparatus for pressure application, the measurement of that pressure application, and monitoring using a linear potentiometer, in accordance with one or more embodiments, is shown in FIG. 28. The motor 145 rotates a circular gear 153 which rotates and moves a linear rack 152 outward from the central axis of the dispensing module 140. The rack unit 152 further applies pressure to an additive vessel (e.g., additive vessel 101) via a pressure applicator 141. Thus, varying the degree of rotation of the circular gear 153 will vary the linear distance moved by the rack 152 and consequently the amount of pressure applied to the additive vessel 101 by the pressure applicator 141. An electrical signal is communicated from or through the linear potentiometer 151 to a processor to determine the distance through which the rack 152 has moved, and length of time that the rack 152 is in a position whereby it would cause the pressure applicator 141 to apply pressure to an additive vessel. This electrical signal is communicated to the container processor 156 and/or an application or processor in the user's mobile device.

Figure 29:
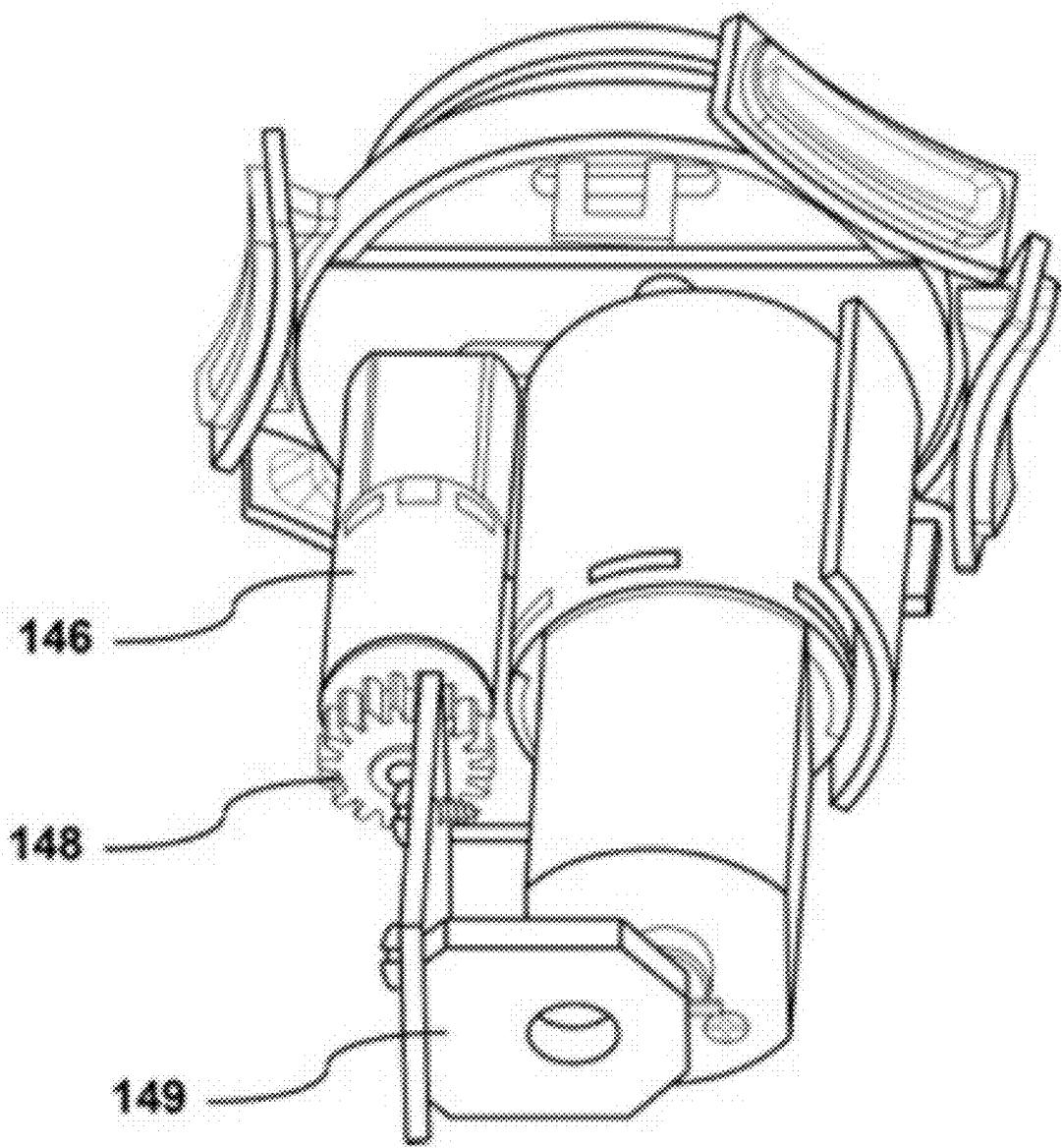
FIG. 29 is a bottom perspective view of the dispensing module shown in FIG. 26, including a dispensing motor and mechanism according to one or more embodiments described herein.

A more detailed view of the apparatus for measuring and controlling the rotational position of the pressure applicator (and RFID antenna), in accordance with one or more embodiments, is shown in FIG. 29, where the motor 146 rotates a spur-gear 148 rotating within the inner circumference of a ring-gear (not shown). A continuous rotary potentiometer 149 moves relative to the container and an electrical signal is communicated from or through the continuous rotary potentiometer 149 to indicate the rotational/axial position relative to the container or the rotational/axial displacement/difference from a previous position. This communicates a signal to the processor to indicate and/or confirm the exact rotational position of the dispensing module 140 and the length of time that the dispensing module 140 is aligned with an additive vessel (e.g., additive vessel 101). The processor furthermore combines the electrical signal data indicating position, from both the linear and rotary potentiometers (151, 149) to determine whether the dispensing module 140 is actively operating on an additive vessel or whether it is "parked" adjacent to it. In accordance with at least one embodiment, the indexing mechanism orients the dispensing mechanism to a "home-point" relative to the housing after each cycle or set of cycles, so as to reduce the significance of cumulative error on the indexing component/s (e.g., the rotary potentiometer mechanism 149), furthermore, in an alternate preferred embodiment, a redundant/supplementary/complementary mechanism might be employed to verify the successful alignment of the "home-point."

Figure 30:
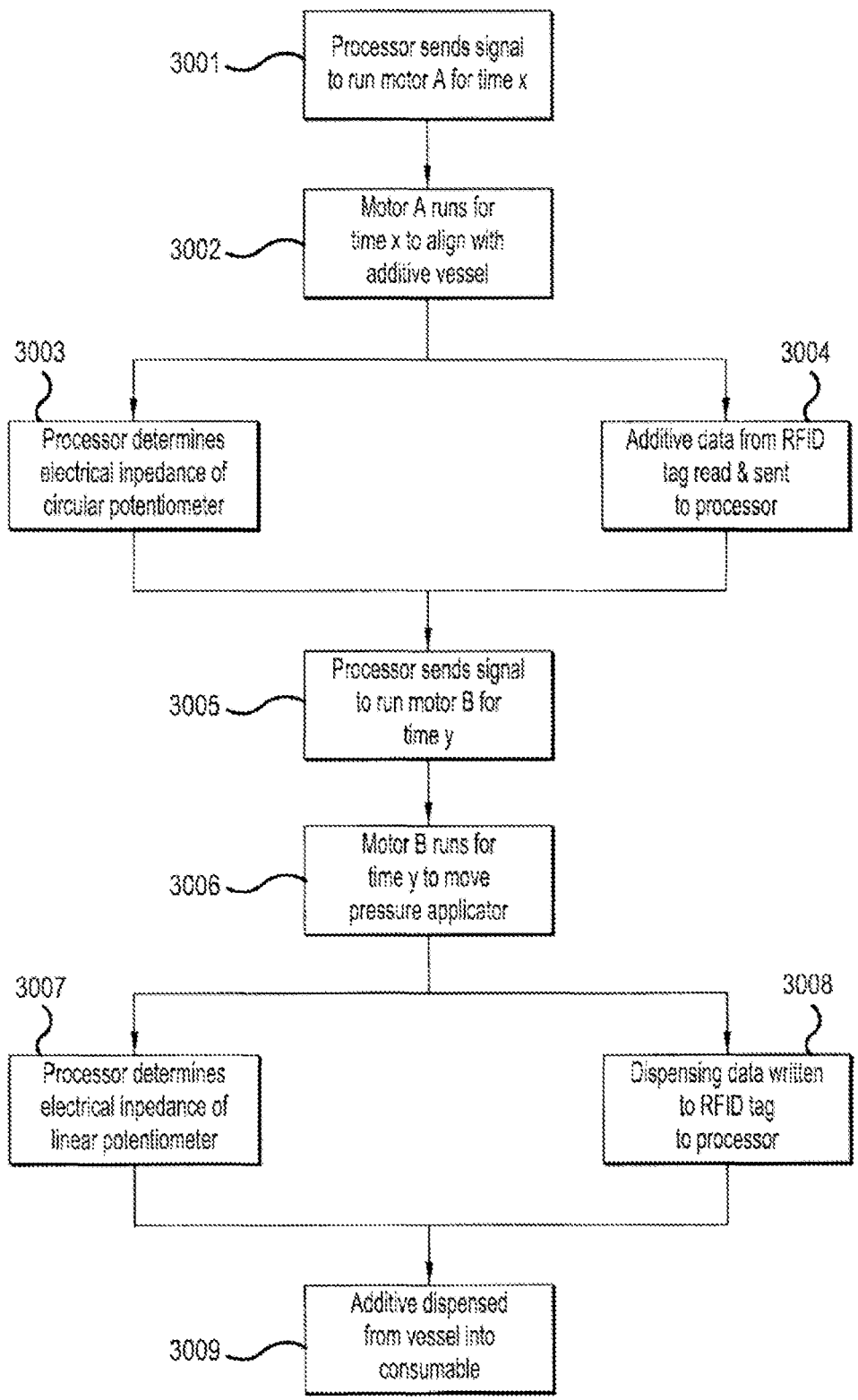
FIG. 30 is a flowchart illustrating an example process for controllably releasing a quantity of an additive according to one or more embodiments described herein.

An example method whereby the above described apparatus operates to achieve the controlled release of a substance is shown in FIG. 30. At block 3001, a processor sends a signal to a first motor (e.g., motor 145) to operate for the specific time period required (e.g., "x" seconds, where "x" is an arbitrary number) to rotate the dispensing module (e.g., dispensing module 140) from its current position to the new position needed to align with the appropriate additive vessel (e.g., additive vessel 101). At block 3002, the motor operates and rotates the dispensing module, and thus activates the active components of the rotary potentiometer that is a part of the module, and subsequently encodes axial position. At block 3003, the electrical impedance of the potentiometer is determined by the processor to confirm that the dispensing module is aligned with the correct additive vessel. If the actuator/pressure-applicator is aligned with the correct additive vessel, then the RFID antenna will also be aligned with the same correct vessel by default. Therefore, at block 3004, the system may additionally confirm that the correct additive vessel is aligned by reading the data from the RFID tag on the additive vessel and comparing this data with that previously stored in, or accessible by the processor. Having confirmed that the actuator/pressure-applicator is aligned with the correct additive vessel, at block 3005, the processor may then send a signal to a second motor to operate for the specific time required (e.g., "y" seconds, where "y" is an arbitrary number that may or may not be different from "x") to move the rack and, as a result, move the pressure applicator to a position whereby it is applying pressure to the wall of the additive vessel, at block 3006. It should be noted that the signal to a second motor may additionally include data on the length of time that the pressure applicator should remain in its pressure applying position before retracting back to a position of rest and/or the number of times that pressure may be applied and/or an oscillation frequency which may be used, for example to agitate a powder additive stored in the additive vessel prior to or subsequent to a dispensing event.

At block 3007, the electrical impedance of the linear potentiometer which is part of the dispensing module is determined by the processor in order to confirm that the actuator/pressure-applicator has moved the correct linear distance to apply sufficient pressure to the additive vessel and to dispense additive at block 3009. During or subsequent to a dispensing event, the system may additionally write data to the RFID tag on the additive vessel at block 3008, including but not limited to data about the dispensing event that has just taken place. Such data may include the date/time and quantity of additive dispensed, a container and/or user identifier and the like.

Figure 31:
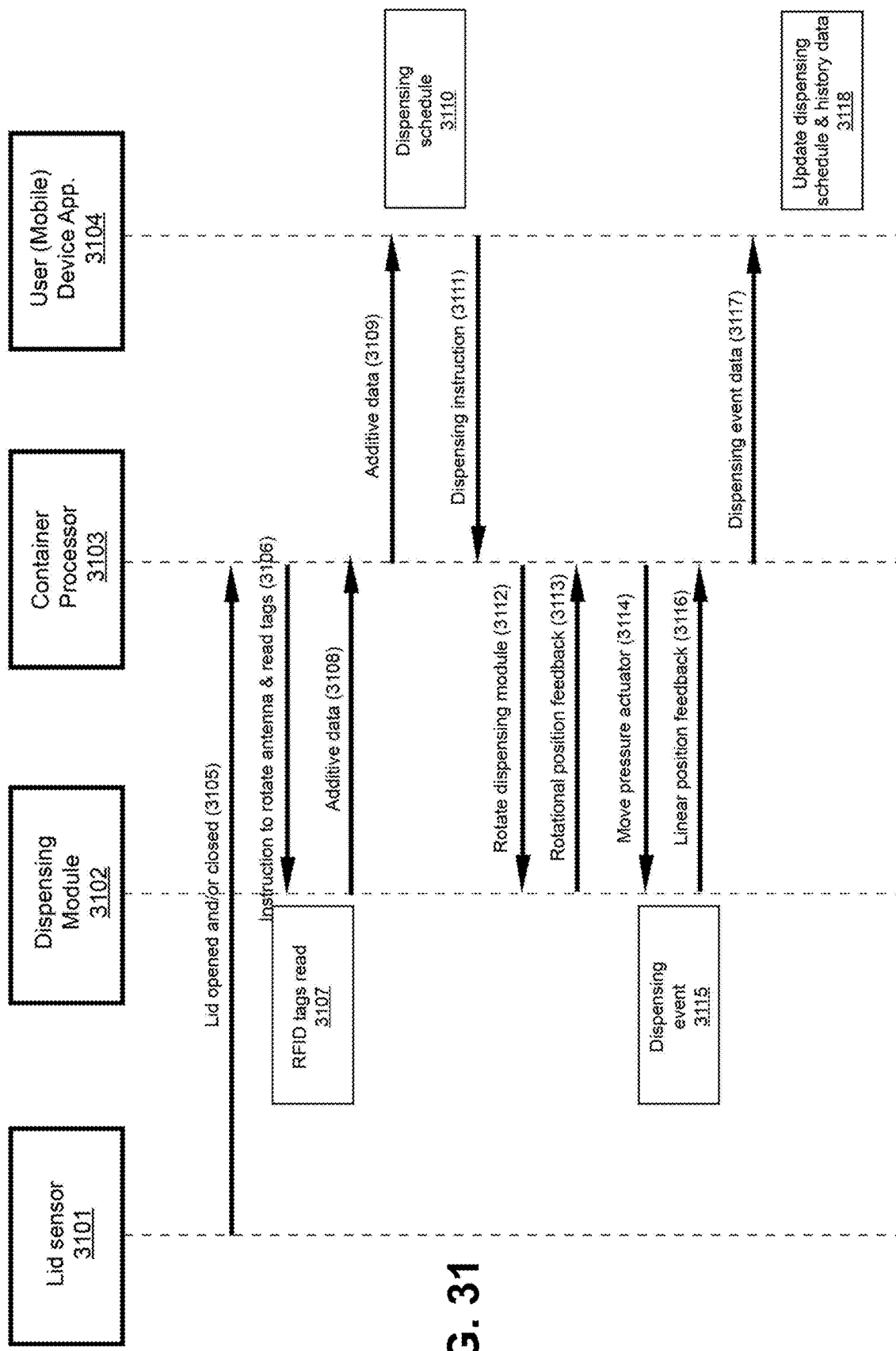
FIG. 31 is a data flow diagram illustrating example data flows between components of a hydration system according to one or more embodiments described herein.

FIG. 31 shows a data flow diagram illustrating example data flows between components of a dispensing module within a hydration system during a dispensing event in accordance with one or more embodiments described herein. Example data flows are shown between an application 3104 on the user's mobile device, a processor 3103 within the hydration container, the dispensing module 3102 and a lid open/close sensor 3101.

The lid or top of the hydration container may be fitted with a sensor to determine when the lid has been opened or closed. The lid sensor 3101, which may be, for example, a Hall-Effect switch, communicates to the container processor 3103 that the lid has been opened or closed (3105), the open and close event indicating a likelihood that the user has placed or replaced additive vessels in the container and/or emptied or refilled the hydration container with water or other consumable liquid. Irrespective of what change has occurred, the container processor 3103 instructs the dispensing module 3102 to rotate through 360 degrees (3106) enabling for an RFID antenna to pass, or pause, by each of the additive vessel apertures, and thus the RFID tags affixed to the additive vessels, and read the encoded data (3107) about the additives in the additive vessels, whereby any changes in contents and/or position would be saved and/or updated to local and/or peripheral memory systems to guide dispensing actions. This additive data is then communicated (3108) to the container processor 3103 and may be further communicated (3109) to an application on the user's mobile device 3104.

The application 3104 installed on the user's mobile device stores or creates a dispensing schedule (3110) for that user based on the additive vessels loaded into the container and, at the appropriate time, communicates a dispensing instruction (3111) to the container processor 3103. The dispensing schedule may be periodically updated or modified according to, for example, user preferences, contextual data, environmental information, previous dispensing data, and the like, which may be communicated from remote storage in the cloud to the user's mobile device application 3104 or from an API to third-party applications on the user's mobile device, or from the container to the user's mobile device.

In response to a dispensing instruction (3111) from the container processor (3103), a first motor (of the dispensing module 3102) rotates the dispensing module (3112) to align with the correct additive vessel, and positional information determined by a rotary potentiometer (of the dispensing module 3102) is communicated (3113) back to the container processor 3103 to confirm alignment with the correct additive vessel. Concurrently or subsequently, the container processor 3103 instructs a second motor (of the dispensing module 3102) to rotate and move the pressure actuator linearly (3114) via a rack and pinion mechanism (of the dispensing module 3102) to apply pressure to that additive vessel thereby dispensing the vessel contents (3115). The linear potentiometer (of the dispensing module 3102) confirms the position of the pressure actuator (3116) to the container processor 3103. The container processor 3103 is thereby enabled to determine whether the actuator has moved the correct distance and maintained that position for the correct length of time in order to dispense the correct amount of additive from the vessel. The aggregated dispensing event data may then be communicated (3117) to the application on the user's mobile device 3104 and the dispensing schedule and/or dispensing history updated accordingly (3118). The system is then ready for the next dispensing instruction and/or the next lid open/close event detection.

Figure 32:
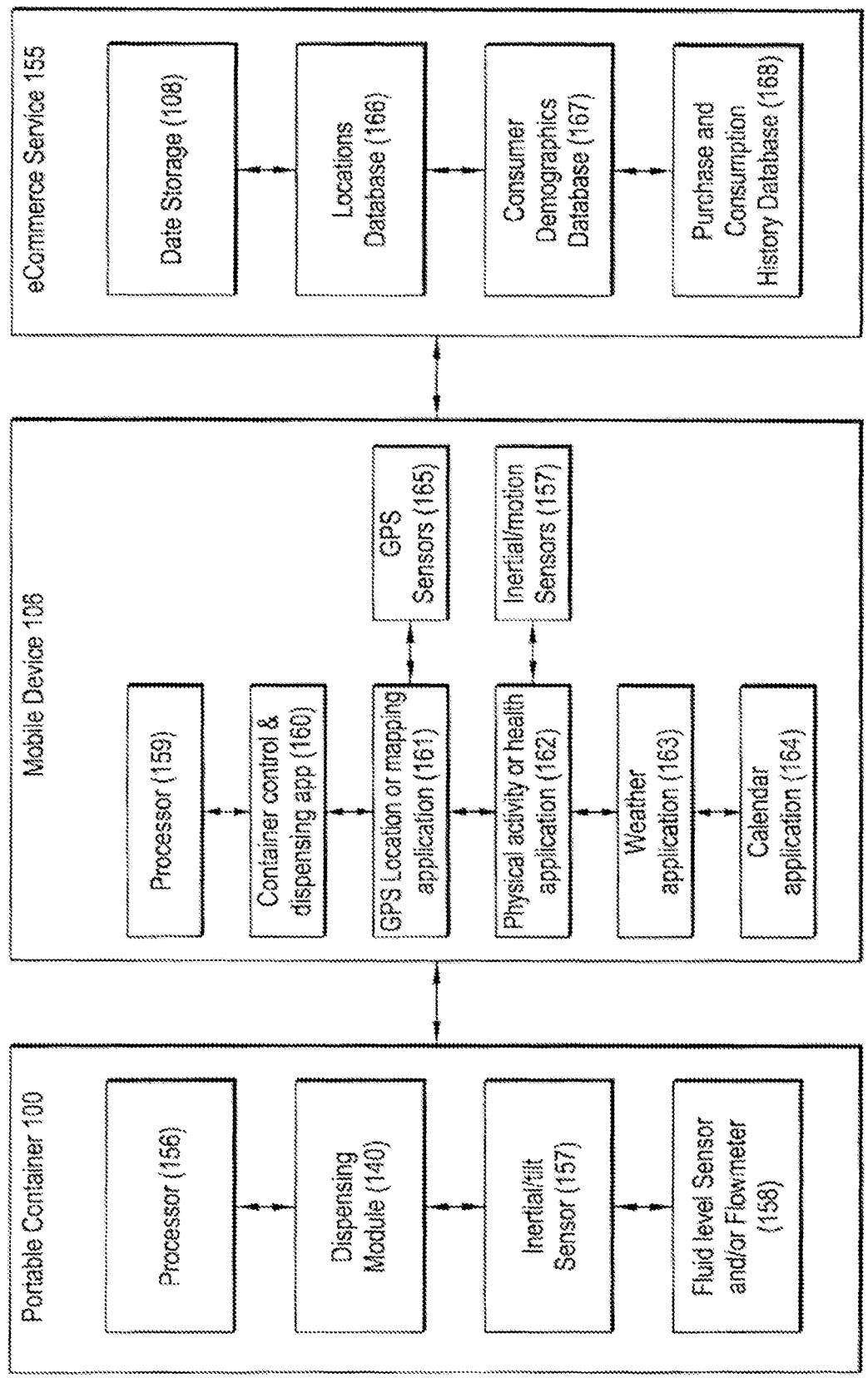
FIG. 32 is a block diagram illustrating an example system for obtaining and using contextual data according to one or more embodiments described herein.

FIG. 32 shows example apparatus, systems, and applications for leveraging context data in accordance with one or more embodiments described herein. A portable hydration container 100 includes a processor 156, a dispensing module 140, inertial and/or tilt sensors 157, and one or more fluid or liquid level sensor 158 and/or flowmeter. The inertial and/or tilt sensors 157 function to detect when the container 100 is tilted, and the level sensors 158 function to detect a change in fluid or beverage level in the container 100. The container 100 may also include a processor 156 and communications means to a user's mobile device 106. The user's mobile device 106 may be in two-way wireless communication with the portable hydration container 100 and may include a processor 159 and one or more of the following applications: a GPS location and/or mapping application 161 that uses GPS sensors 165 to determine a location of the user and/or speed of motion; a physical activity application 162 or the like to determine the user's current or previous levels of physical activity such as number of steps taken within a certain time period; a weather application 163 to determine the ambient environmental conditions at a location of the user; and a calendar application 164 to determine the past and future locations and/or activities of the user. The mobile device 106 may also be equipped with inertial/motion sensors 157 to provide the motion data required by a physical activity application 162 and may furnish this data directly to a processor 156 within the portable hydration container 100, or to another application on the mobile device 106 that controls or otherwise communicates with the hydration container 100. Similar data may also be obtained from websites or services using the cellular communications capabilities of the mobile device 106, or via Wi-Fi.

Figure 33:
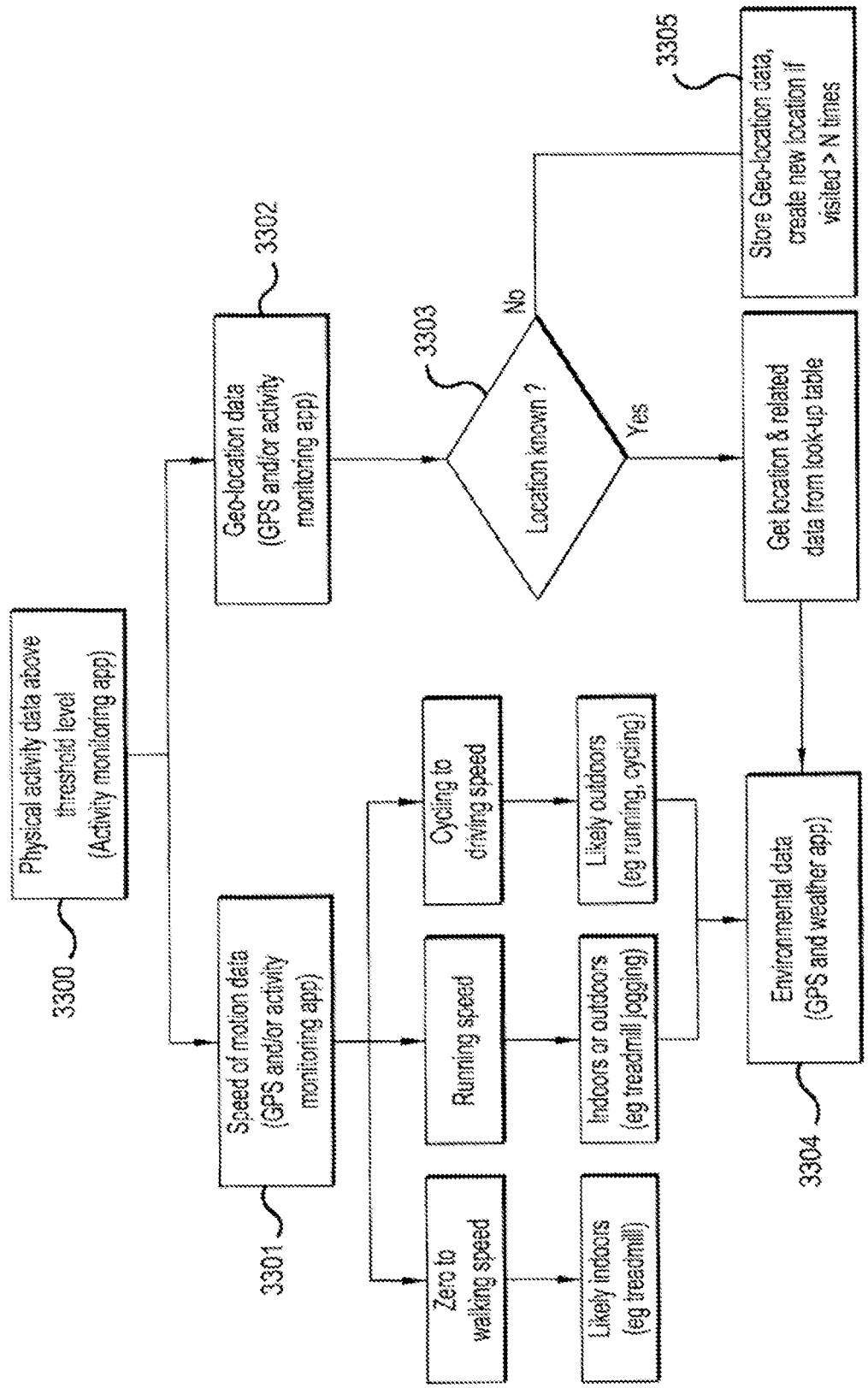
FIG. 33 is a flowchart illustrating an example process for obtaining environmental and contextual data about a user of a portable container according to one or more embodiments described herein.

Some example use cases for the leveraging of context data (as shown in FIG. 32 and described above) are described in the following with reference to FIG. 33. The number of steps taken in a day or week or other time period along with speed of motion data derived from an activity application such as, for example, "MapMyRun", may indicate that a user's level of physical activity has passed above a pre-defined threshold (at block 3300), which may suggest that the user is probably exercising. Data on the speed of linear motion of the user can be derived (at block 3301) from this and/or from GPS data (at block 3302) to provide an estimation of the user's activity and location. For example, if data indicates that the user is at approximately a typical human running speed, the user could be either indoors or outdoors. The GPS data from the user's mobile device 106 might indicate, for example, that the user is at a previously unknown location, at block 3303. If there is no mapping data to suggest that the user is at a specific address or building, then it might be inferred that the user is outdoors and environmental data relating to this specific location, such as weather data can be accessed at block 3304. Such data may indicate that it is currently 90 degrees Fahrenheit and 90% relative humidity at the location. Depending on how many times it has been determined that the user is at the specific location, location data may be stored at block 3305. Further, in at least one embodiment, such data may be processed and translated into dispensing modifications and/or consumption directives, such as increased electrolyte dispensing, combined with higher frequency drinking of the water/electrolyte post-mix beverage.

In the manner described above, it can be determined how far the user has run, at what speed and in what environmental (weather) conditions, therefore it is possible to infer the degree of dehydration of the user. When the activity application 162 determines that the user has paused or stopped running, then a recommendation may be presented to the user about the quantity of water the user should consume, and within what time-period, in order to appropriately re-hydrate. Appropriate additives may additionally be dispensed into the water after the exercise, and if those additives (stored in additive vessels) are not currently inserted in the container, then it might be recommended to the user that they consume them when they next get home. Since the GPS and/or mapping application can also determine when the user is next at home, then a further reminder can be displayed to the user at that time. Such a reminder may be presented via a visual and/or auditory display on the hydration container, and/or via a visual and/or auditory display on the user's mobile device. In accordance with at least one embodiment, since the eCommerce system of the present disclosure also stores data on what additive vessels a user has previously purchased, the process can avoid recommending additives that the user does not have, but may recommend instead that those additives be added to the shopping cart for later purchase from the eCommerce service.

In another example, steps and activity data from a mobile device activity application such as "MapMyRun" or a wearable fitness device such as "Fitbit" at block 3301 may suggest that a user is jogging. However, GPS data associated with the user's mobile device 106 may indicate that the user is stationary, which would suggest that the user is likely to be jogging on a treadmill, and therefore most likely to be indoors (and likely therefore to be at typical room temperature of about 70 degrees Fahrenheit).

If there is no known address associated with a GPS location, then the data may be further leveraged to derive an address and this address can then be further used to determine the type of location (e.g., home, gym, hotel fitness-room, yoga studio, etc.). The application (e.g., physical activity application 162) may enable a user to specify (e.g., in the settings part of the application) a preferred criterion whereby a frequently visited location may become defined as a "favorite place" and, if that address is visited more than that specified number of occasions within a certain time period then it may be automatically defined and stored as a "favorite place" at block 3305. When the activity application 162 determines that the user has stopped jogging, then a recommendation may be presented to the user about the quantity of water the user should drink, and within what time-period, in order to appropriately re-hydrate. Appropriate additives may additionally be dispensed into the water after the exercise.

In accordance with at least one embodiment, addresses and geo-codes may be stored as "frequently visited places," the user being able to type in descriptive names for these favorite places (e.g., home, gym, office, pub) or to approve/change suggested names that may be automatically generated from web-crawling using the geo-location data or from APIs to other applications. Once stored, the system can associate general activity levels with each location (which might be, for example mostly jogging and cycling when in "gym" location, little activity and some walking when in "office" location, almost no activity when in "pub" location, etc.). This data can be used to anticipate what additives a user might wish to insert in the container in the morning for consumption during the day. For example, a user's calendar application might say "gym" at 8 am, and previous activity data corresponding to that location indicates a generally high level of expected physical activity. Other data associated with that location may include the additives that the user tends to insert and consume before going to the gym. The system may determine that there may be a more appropriate mix of additives for the user, given the levels of activity that the user undertakes at the gym. Consequently, the personal recommendations may be on two levels—a recommendation for today only (based on the additives that the user currently has) and for the future (recommending what additives the user should purchase in the future).

In another example, text in the user's calendar application 164 may include the word "flight" or "travel" and/or a meeting notice in the calendar application may give an exact or approximate location of a meeting, for example. Furthermore, the GPS data may determine that he is presently 3000 miles away from the location he was at 12 hours previously, it is therefore likely that he has flown from city A to city B. It might further be determined from this location data that these locations are 6 time-zones apart. Given that approximate start/end times can be derived from the GPS data and the time zones are known, it will be possible for a specific combination of additives to be recommended and/or a specific dispensing schedule generated, in order to help address jet lag and/or general exhaustion in the days following the user's arrival at the second destination.

Additional dynamic user lifestyle context data may also be obtained from friends and connections such as might be determined from social networking sites such as Facebook, LinkedIn and the like, and also from semantic mining of email and text messages on the mobile device.

Figure 34:
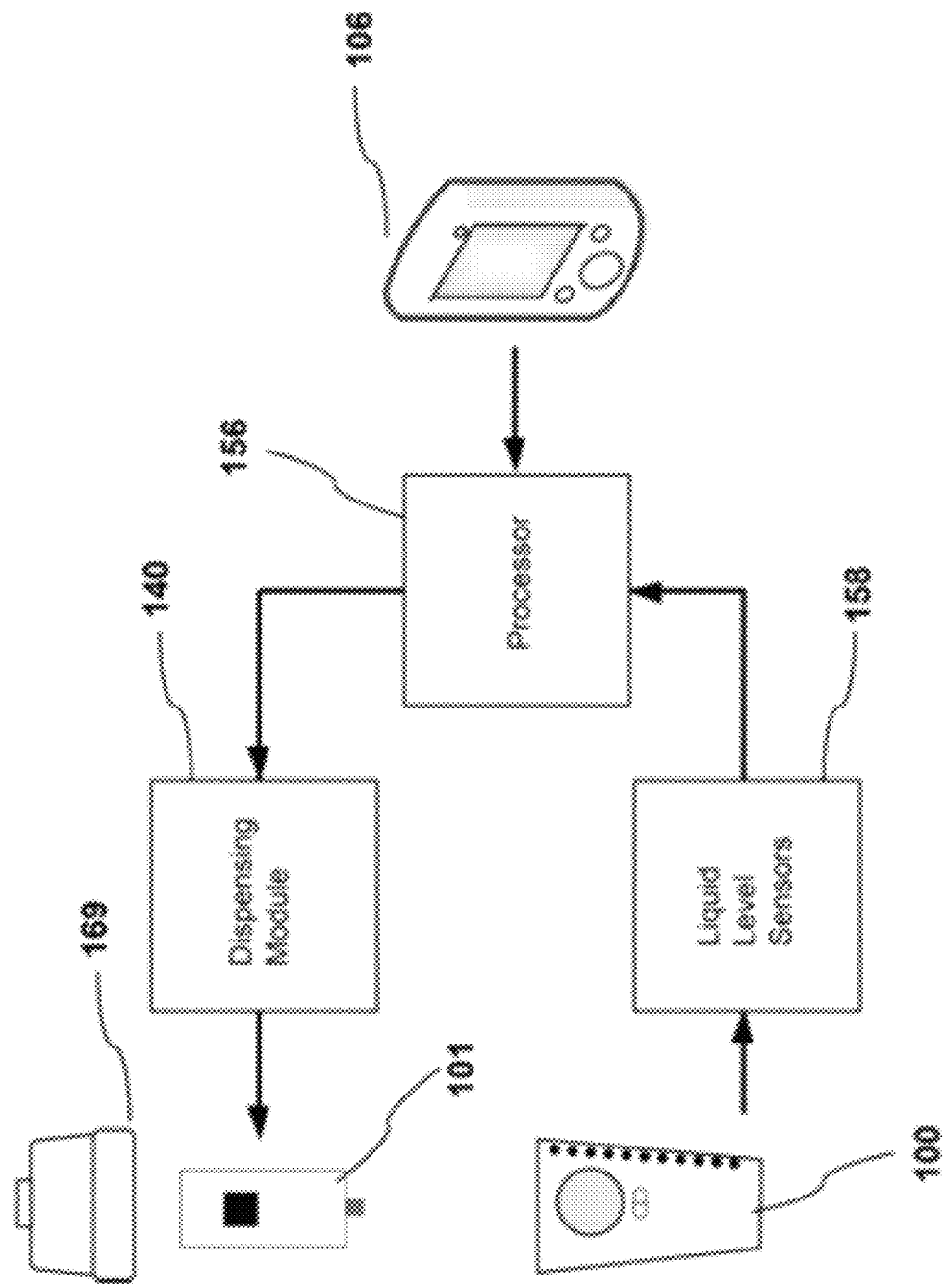
FIG. 34 is a block diagram illustrating example data communications between components of a hydration system according to one or more embodiments described herein.

FIG. 34 shows a summary block diagram of the system, in which a processor 156 (which may be disposed within the container assembly 100) receives a signal, either directly or from a user's mobile device 106, to dispense an additive from an additive vessel 101 into the container assembly 100. One or more liquid level sensors 158 in the container assembly 100 measure the liquid level and the level data is communicated to processor 156 which then determines the amount of additive to be dispensed to achieve a correct level of concentration. The processor 156 further determines the distance through which a pressure applicator needs to move in order to apply that pressure and the duration of pressure application required to dispense a correct amount of additive, and communicates this to the dispensing module 140, which rotates into position adjacent to the appropriate additive vessel 101 and applies pressure to the wall to dispense a correct amount of that additive. In accordance with at least one embodiment, the container assembly 100 is additionally equipped with a sensor 169 to detect when the top is removed for refilling or to replace or change additive vessels 101.

Figure 35:
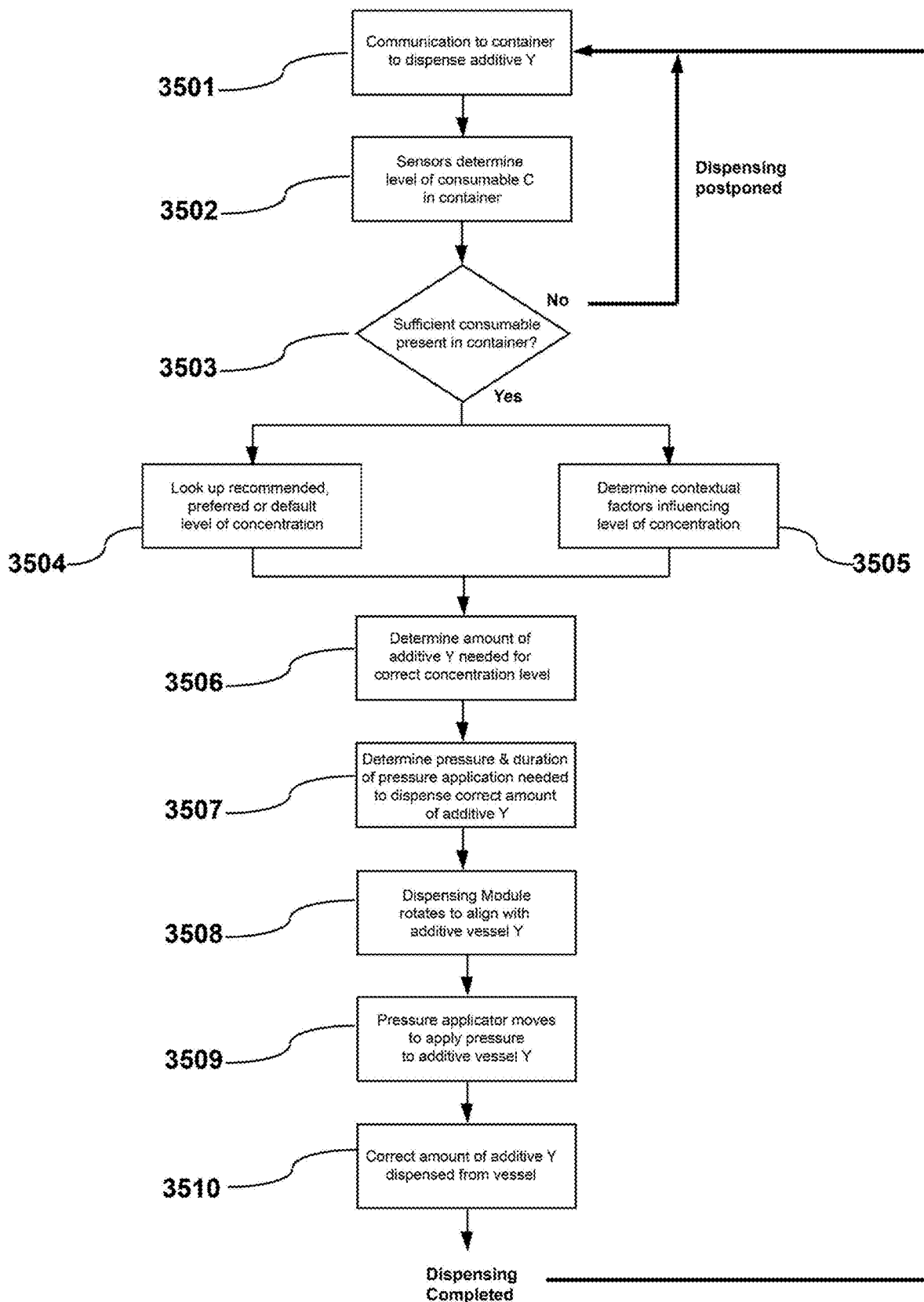
FIG. 35 is a flowchart illustrating an example process for determining a level of a consumable liquid and adjusting an amount of additive dispensed into the consumable liquid according to one or more embodiments described herein.

FIG. 35 shows an example process for controlling (e.g., adjusting, varying, etc.) an amount (e.g., quantity) of additive dispensed into a consumable liquid (e.g., stored in a container assembly) based on a consumable liquid level of the consumable liquid. In at least one embodiment, the consumable liquid level of the consumable liquid may be determined by a level sensor or level sensing device of the container assembly.

In at least one embodiment, the controlling of the dispensing of the additive may also be based on one or more contextual factors. At block 3501, a communication is received by the container (e.g., container processor 156) to dispense an additive Y into the consumable liquid (e.g., substrate) stored in the container assembly. For example, the additive may be a cherry flavoring which should ideally be at a concentration of 1 drop per 50 ml of water. At block 3502, a level sensor (e.g., an infrared, capacitive level sensing array) disposed in the container assembly may determine the level of consumable C stored in the container assembly, and communicate that level to the processor to determine (at block 3503) whether there is sufficient consumable liquid (water, alcohol, and the like) present for the dispensing event to take place. If it is determined that the level of the consumable liquid is zero, or below a predefined threshold level (at block 3503), then dispensing may be cancelled, postponed, or otherwise modified until such time as the container is fully or partially refilled, at which time the process may re-commence at block 3501. It should be noted that in at least one embodiment, the container assembly is equipped with a sensor to detect when the top of the container assembly is removed for refilling. When such a detection is made, the process may repeat at block 3501.

If sensors detect the presence of a consumable liquid, the level of liquid is measured and the volume of liquid can then be determined from the known and fixed dimensions of the container. If there is sufficient consumable present, then the amount of additive needed to achieve a targeted level of concentration is determined at step 3504. The processor may additionally access dynamic, historic, or profile-level data about the user of the container and their personal preferences in order to adjust a recommended concentration level upward or downward according to the user's taste or based on other contextual data, consequently the level of concentration may be further adjusted based on contextual factors such as time of day, user activity levels, user preferences, environmental conditions (temperature, humidity etc.), location, previously consumed food, previously consumed beverages, previously consumed supplements, and the like, at step 3505. For example it may be determined that there is 250 ml of liquid in the container therefore 5 drops of cherry flavor are needed. It may also determine that the user has a preference for a stronger flavor which may increase this to 6 drops. Contextual data (e.g. from a 3rd party application) may indicate that the temperature and humidity are very high and therefore a greater level of hydration and lower concentration may be appropriate at this time, which may adjust this downwards to 5.5 drops. In this way the processor determines at 3506, the appropriate amount of additive Y to be dispensed in order to achieve the targeted level of concentration. The method further determines the amount of pressure and the length of time that pressure needs to be applied to the additive vessel (e.g. in order to dispense exactly 5.5 drops of flavoring) at step 3507. This may, within the same step 3507, be defined or communicated to the dispensing module in the form of a linear distance through which a pressure applicator/actuator moves (which applies force to the wall of an additive vessel to trigger a controllably variable dispensing event), and the length of time that it remains in position before retracting, to dispense the additive Y. The dispensing module then rotates to align with the appropriate additive vessel at step 3508 and the pressure applicator moved into position at step 3509 to apply pressure and dispense 5.5 drops of additive Y. The process is completed when the correct amount of additive has been dispensed at a step 3510.

Furthermore it should be noted that the ideal level of concentration may not be a single ratio of additive to consumable but may be a range of ratios, depending on the type of additive. In a further embodiment, if additive Y has been added to a consumable in a container and a further dispensing event for additive Y is received before the container has been emptied and refilled, then the dispensing event may be blocked or the amount adjusted, in order to avoid the concentration level being excessively elevated.

Figure 36:
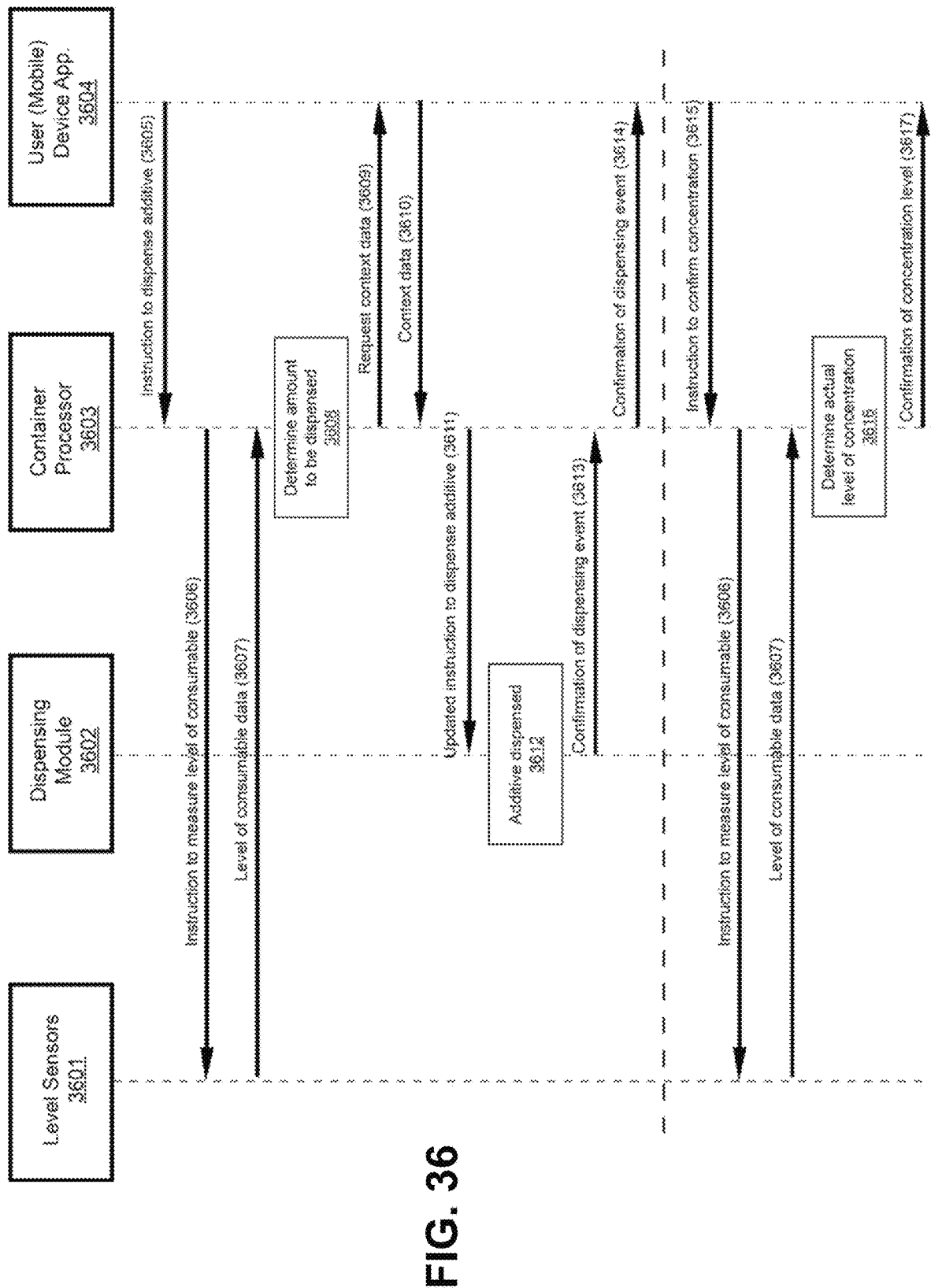
FIG. 36 is a data flow diagram illustrating example data flows between components of a hydration system according to one or more embodiments described herein.

FIG. 36 shows example data communications between components of a hydration system in accordance with one or more embodiments described herein. The data communications shown include those between one or more level sensors 3601, a dispensing module 3602, a container processor 3603, and an application running on a user device 3604.

A signal or instruction to dispense an additive may be communicated (3605) from the user's mobile device 3604 to the container processor 3603. The container processor 3603 may then send an instruction (e.g., query) (3606) to the level sensor 3601 to measure the level of consumable liquid presently stored in the container, and that level data may be communicated (3607) back to the container processor 3603, which may then determine the appropriate amount of additive to dispense (3608). The container processor 3603 may then request (3609) additional context data from APIs to applications running on the user's mobile device 3604, which is communicated (3610) back to the container processor 3603 and used to further adjust the amount of additive to be dispensed if appropriate. A signal or instruction to dispense a more precise amount of additive is then communicated (3611) to the dispensing module 3602 and the additive dispensed (3612). Confirmation of a successful dispensing event may then be communicated (3613) from the dispensing module 3602 to the container processor 3603, and may be further communicated (3614) from the container processor 3603 to the user's mobile device 3604. This may occur immediately after a dispensing event or data may be batched and communicated at some later time.

Optionally, in a further embodiment, an instruction may be sent from the user's mobile device 3604 to confirm the concentration (3615) by measuring the level of consumable immediately following the dispensing event, with an instruction to measure the level (3606) being sent from the container processor 3603 to the level sensors 3601 as before. The level data being communicated (3607) back to the container processor 3603, which may then determine the level of concentration of additive in the consumable (3616). As before, this may be further communicated (3617) from the container processor 3603 to the user's mobile device 3604.

Portable drinking bottles have previously not required a way of communicating with a user since the only relevant information has for the most part been to see how much water there is in the bottle, which is clearly determined by simple observation. More recently, portable water containers and those for other consumable liquids are becoming increasingly sophisticated and connected, some having wireless communications capability with a user's mobile device and/or with Wi-Fi and other methods. Others also have displays to present data or information to a user or viewer of the container and/or LEDs to illuminate the water, however a beneficial function of the current disclosure is that the method of communicating can enable more meaningful, useful and context-relevant information to be communicated to a user since it uses several LEDs whose spectral output and other parameters can be varied and controlled. Furthermore, the hydration container has multiple capabilities, including the ability to periodically dispense additives into the consumable liquid within the container and thereby changing it's composition, there is therefore considerably more relevant and useful information that can potentially be communicated to the user.

Figure 37:
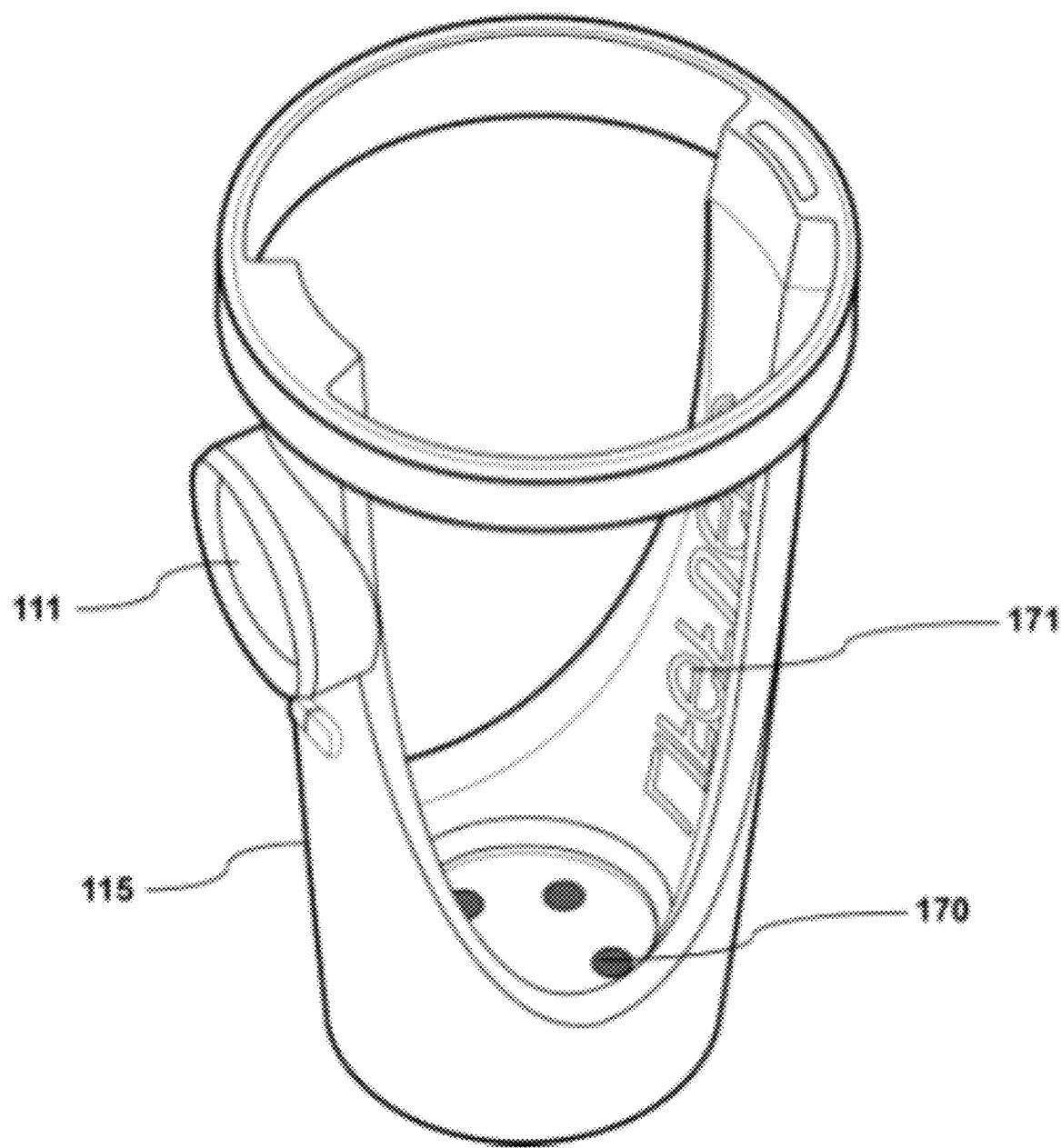
FIG. 37 is a perspective view of a container with multiple communication means for communicating information to a user according to one or more embodiments described herein.

One embodiment of a means of communicating with the user of a container (e.g., container assembly 101) is shown in FIG. 37, which shows the outer sleeve 115 for a portable liquid (e.g., water) container assembly 101 without the other components obscuring the illuminating LED's. The outer sleeve 115 comprises an integrated LCD or similar display 111, an array of illuminating LEDs 170 in the base of the container and a translucent lens 171 vertically oriented along the side of the sleeve 115. A transparent chamber for the consumable liquid fits within this outer sleeve 115. More complex information may be communicated to the user via the display 111. This may not be easily visible from a distance however, and is less attention-grabbing, while illuminating the liquid and the vertical lens 171 using the LEDs 170 in the base would be visible from a greater distance and also considerably more attention-grabbing. A user may not always have the container very close by, for example it may be nearby when running on a treadmill, in a holder on a cycle or to the side in a vehicle's drink holder and so on, so a more visible alert would be beneficial to a user. The liquid contents will scatter the illumination throughout such that it will not be perceived as a series of point source illuminants but as a gentle glow throughout the entire container contents, therefore the illuminated area that is visible to the user will be much larger than the surface area of the LEDs 170. Light from the LEDs 170 will also be internally reflected from the sides of the container assembly and scattered throughout the liquid contents.

Figure 38:
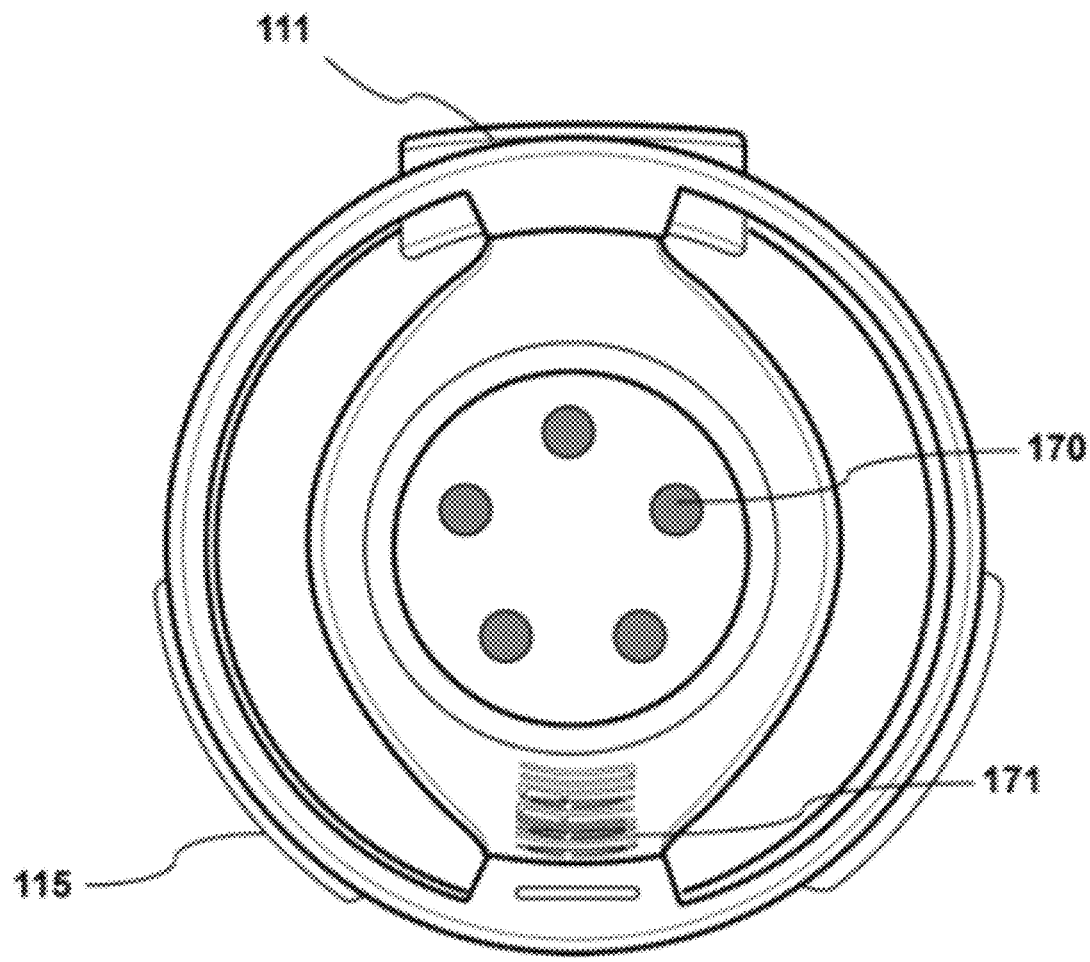
FIG. 38 is a top view of the container shown in FIG. 37 according to one or more embodiments described herein.

A more detailed view of an array of LEDs 170 is shown in FIG. 38, which is a view vertically downward into a container assembly 101 having an externally mounted display 111 and a circular array of LEDs 170 in the base.

Information which could be conveyed using illumination of the liquid in this way includes, but is not limited to, for example, alerting a user that their level of hydration is low and that they need to drink some water, where a container is used to dispense medications it could alert the user that it is time to consume some medication, if a user is drinking water to re-hydrate, the illumination might change color to indicate the point when sufficient quantity has been drunk.

In some implementations of the system, the container may be in communication with a user's mobile device (e.g., user device 106), and therefore the illumination of the liquid may be used to supplement information presented on the screen of the mobile device, such as, for example alerting the user to an incoming text message, email or iOS notification, or notifications from a fitness or activity tracking application, and the like.

Some non-limiting examples of ways in which the LEDs' 170 output may be encoded to communicate such useful information include the following:

All LEDs are the same color and there is no flashing;

All LEDs are the same color and are flashing slowly ("breathing" effect);

All LEDs are the same color and are flashing rapidly (attention getting);

LEDs emit a range of colors and there is no flashing (rainbow effect);

LEDs emit a range of colors and are flashing; and

LEDs emit a range of colors in a sequence (effect of rainbow rotating around the bottle).

There are a very wide range of encoding options and permutations and, though described in the context of a portable hydration container, the methods and apparatuses of the present disclosure may apply to any container containing a liquid or other light scattering substance.

Since data is available to a processor regarding the type, category and/or unique product code of an additive vessel, including the amount of additive originally stored in the vessel (typically, but not necessarily, 1 oz.), and data is also available regarding the amount, frequency and times when a portion of that additive was dispensed into a consumable liquid in the container, the system can determine the amount or level of additive remaining in the vessel at any time. Therefore the system can identify when a vessel is empty, and can also predict when it is likely to become empty given the rate of previous dispensing and the scheduled or predicted future rate of dispensing.

The eCommerce system from which the vessels were purchased may also store information about a user's purchase history, therefore data is available about when a user last purchased additive vessels, what they were and how many were purchased. When correlated to the additive dispensing data, the system can not only predict when a vessel inserted in the container will be depleted, but may also predict when a users' personal supply of that particular additive vessel will run out. The system can therefore additionally alert the user to this via the display on the container and/or via auditory means.

Furthermore, since the container is wirelessly connected to the eCommerce system, either directly or via a user's mobile device, pressing a button on, or otherwise interacting with the container can send a communication directly or indirectly to the eCommerce system to add some of these additive vessels to the user's shopping cart or to automatically order them and have them shipped, depending on the preferences or settings the user has on the eCommerce site. Therefore the user does not have to remember to re-order the additive vessels if they are needed, or check/keep track of stocks in reserve at home, and also has the option to not order them, or to cancel the order later if they change their mind.

Figure 39A:
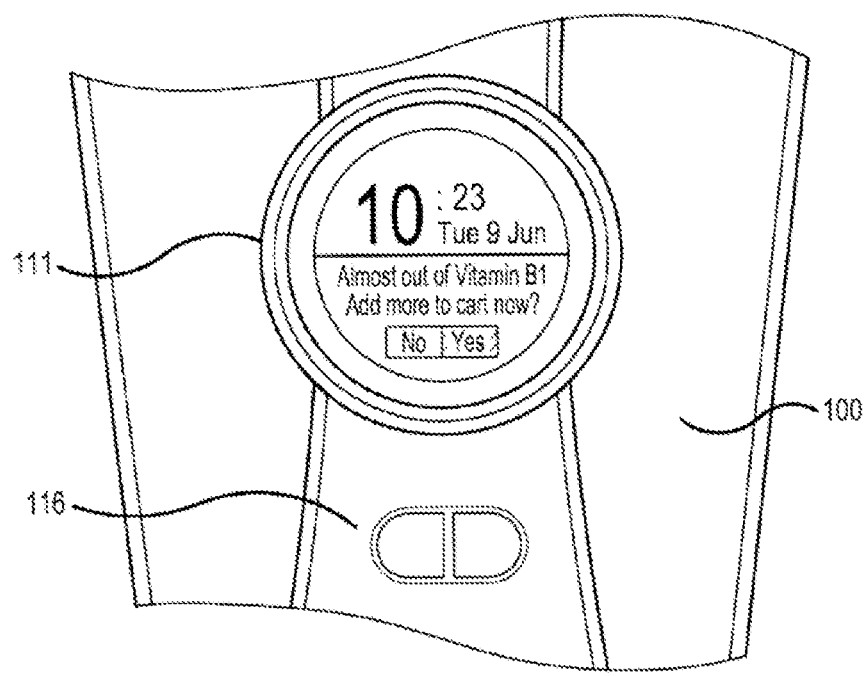
FIGS. 39A and 39B illustrate examples of a visual display and user interface controls for a portable container according to one or more embodiments described herein.
Figure 39B:
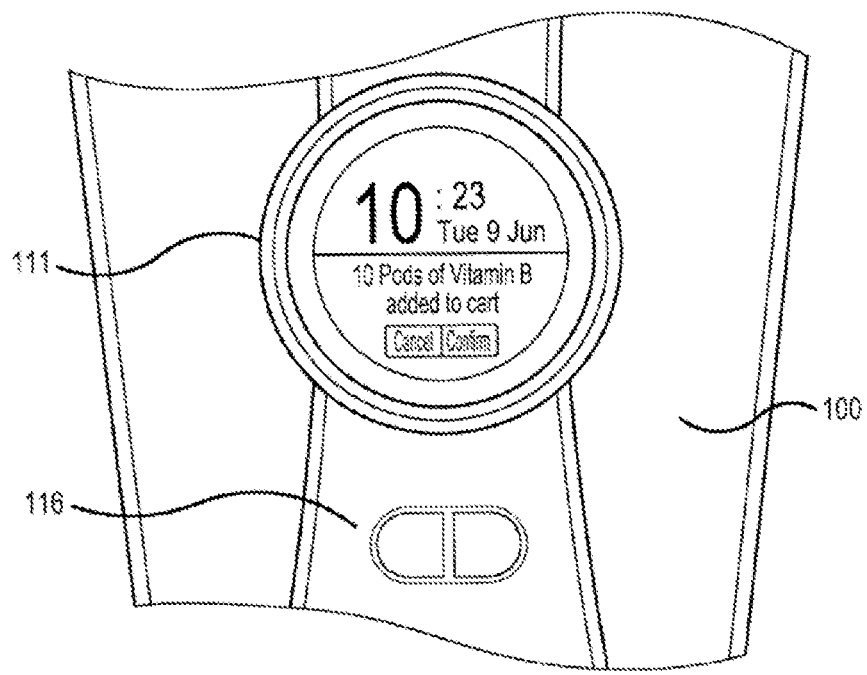

FIGS. 39A and 39B show illustrative example of a user interface through which a user may add products to their eCommerce shopping cart directly from a hydration container assembly. The container assembly 101 (a portion thereof is shown) may have a simple user interface comprising of a circular display 111 and two pushbuttons 116. The display 111 may, as shown in FIG. 40A for example, display to the user that "Supplies of Vitamin B are almost out", pressing the right hand button 116 causes a message to be sent to add Vitamin B vessels to the shopping cart. Though confirming this may not actually make a purchase, it may just add them to the shopping cart, it is generally good practice to ask the user to confirm the instruction in a two-step process. Therefore, a confirming display of "Vitamin B added to cart" may be accompanied by the button options to "Cancel" or "Confirm" the request as shown in the display 111 in FIG. 40B.

The purchase transaction may be completed when the user next goes to the eCommerce site. In an alternative embodiment, the user actions may cause the ordered product to be ordered and automatically shipped, or may add several orders to a shopping cart until such time as an order quantity threshold is reached, at which point the order batch may be shipped.

Furthermore, several soon to be depleted products may be added to the shopping cart (e.g., additives a, b, and c) and since the system is able to predict an earliest time when the user will run out of each of these additives, (e.g., the user will run out of additive b four days sooner than additives a and c), then the batch may be automatically shipped to the user at a time whereby the batch of several products arrives before additive b runs out, taking into account the shipping and delivery schedule. These alternatives may be under the control of and configurable by the user on the eCommerce site either directly, or via the application on the user's associated mobile device.

Furthermore, in accordance with at least one embodiment of the present disclosure, provided is a system capable of caching eCommerce selections and/or directives locally on a portable dispensing device that subsequently communicates the selections and/or directives to relevant databases and eCommerce mechanisms engaged with peripheral and/or connected user devices such as a mobile application. In the aforementioned embodiment, this data "push" from the portable dispensing device related to the repurchase of additive vessels may occur in real-time, or at a later time when a sufficient connection is established between devices, furthermore, the data "push" associated with the on-device purchase instruction might not initiate and/or fulfill immediately, and might be scheduled or postponed in accordance with the user's profile, preferences, consumption history, and other data or factors relevant to the user's consumption of the additive/s.

Figure 40:
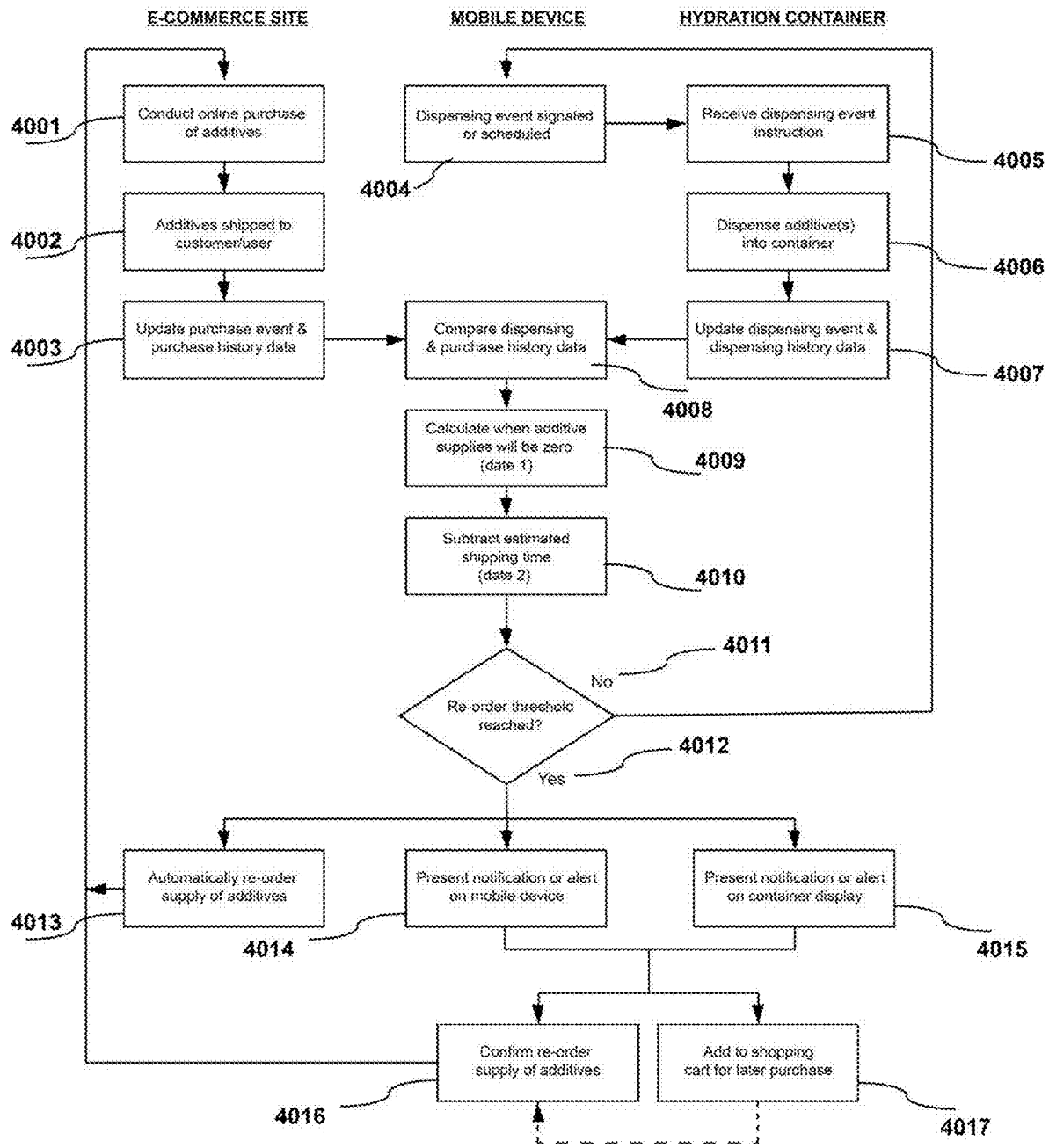
FIG. 40 is a flowchart illustrating an example process for a product ordering transaction according to one or more embodiments described herein.

FIG. 40 shows an illustrative example of some methods and processes for an eCommerce transaction directly from a product, in this case, a hydration container assembly. It is assumed that one or more purchases of additives have been made (at block 4001), shipped to the customer/user (at block 4002) and that some additive vessels are inserted in the container and are in use, while others are stored at home awaiting use. As a consequence of these previous purchases from the eCommerce site, purchase-history data may be stored at a location accessible to the eCommerce system (at block 4003). This includes but is not limited to, the amount of each different types of additive purchased over time and the date, time and quantity purchased, shipped and received by the customer/user and the like.

Periodically, an instruction to dispense an additive into the container is sent from an application on the user's mobile device (at block 4004) and received by a processor in the container (at block 4005), and the additive is dispensed (at block 4006). Data about that dispensing event is subsequently sent back to the application on the user's mobile device and the dispensing/consumption history updated accordingly (at block 4007). This includes but is not limited to, the amount of each different types of additive dispensed over time and the date, time and quantity dispensed and the like. The additive purchase history data and the additive dispensing history data is then correlated and compared (at block 4008) and an estimate derived regarding a date/time when supplies of that additive will be depleted (at block 4009). For example, a user may have purchased 10 vessels of Vitamin B, each containing 1 oz. of additive, on 1 March. With standard shipping, the user would have received them on 3 March. The dispensing history on 13 March indicates that a total of 7 oz. of Vitamin B have been dispensed to date and the rate of dispensing averages 0.7 oz. per day. Thus the system would predict that supplies will be depleted on the 17 March (date 1) (at block 4009). Given that it takes 2 days to ship the order, then it would be predicted that the re-order threshold would be reached on the morning of 15 March (date 2) (at block 4010), when approximately 8.6 oz. of additive have been dispensed. Since additive dispensing and consumption may not be consistent day to day, then this prediction process may be periodically repeated each time that a dispensing event occurs in order to adjust the re-order threshold accordingly (at block 4011).

If the dispensing of Vitamin B is fairly consistent then the re-order threshold would be reached on the 15 March (at block 4012), and the user duly informed in sufficient time that supplies may be re-ordered and shipped to arrive on or before the point when supplies are depleted. The margin, or amount of advance warning that the system provides may be configurable by the user in the eCommerce account. Similarly, the process preferred by the user in response to receiving an alert or notification, may also be configurable. In one alternative process the user may choose to automatically place a repeat purchase (at block 4013) when the threshold is reached in order to maintain uninterrupted continuity of supply. This may occur with or without any notification being presented to the user. In a second alternative process the user may wish to know that supplies are running low and choose if and when to re-order and/or to vary the quantity that is re-ordered. In this instance a notification or alert would be presented to the user on the user's mobile device (at block 4014) and/or using the display on the container itself (at block 4015). In response to this notification or alert, the user may choose to immediately confirm and place a purchase (at block 4016) by selecting the appropriate menu choice, or may choose to add the order to his shopping cart and confirm and place the purchase sometime later (at block 4017).

Furthermore, in accordance with the aforementioned, if a user is consuming the additive vessels at a slower-than-expected rate, or not at all, and/or they are consistently 'rating' the additives poorly on the portable container and/or on a peripheral system (e.g. mobile application) a system level prompt might incentivize or otherwise encourage them to give their additive vessels to a social connection (friend) or to exchange them in some other fashion, so as to preserve the value of their experience. In a similar regard, if the additive vessels in question are due to expire in a certain timeframe, the system might similarly prompt the user to more rapidly use/consume the additives, and/or share them so as to reduce the potential for wasted product. Thus prioritizing the dispensing system as such.

Figure 41:
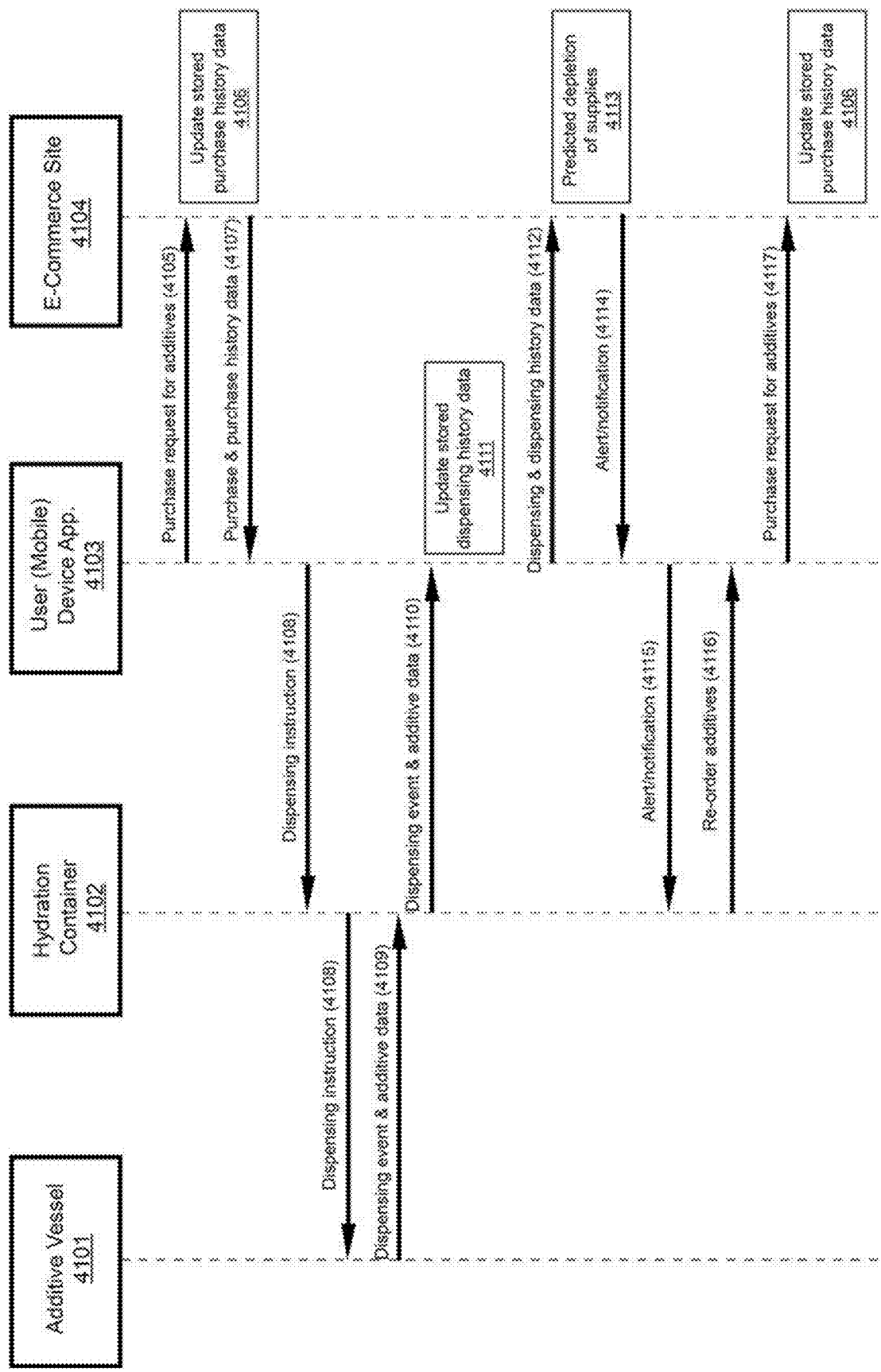
FIG. 41 is a data flow diagram illustrating example data flows between components of a hydration system and a user portal according to one or more embodiments described herein.

FIG. 41 shows an illustrative example of data communications between components of the eCommerce system in accordance with one or more embodiments described herein. An order (4105) for the purchase of additives may be placed via an eCommerce site 4104 from a user's mobile device 4103, from a computer, or from another user device. A history of the user's additive and other purchases on the eCommerce site 4104 is stored therein and is updated with the latest purchase (4106). This updated purchase history data is subsequently communicated (4107) from the eCommerce site 4104 to an application on the user's mobile device 4103 and may be stored on the mobile device. Periodically, an instruction to dispense an additive (4108) may be communicated from the user's mobile device 4103 to a processor within the hydration container 4102, which communicates (4108) with and/or acts upon the additive vessel 4101 to dispense the additive as instructed.

Following a dispensing event, additive data read from passive storage means on the additive vessel 4101, and other data about that event is communicated (4109) to a processor within the hydration container 4102 and may be further communicated (4110) to an application on the user's mobile device 4103. The consumption and dispensing history of that user is then updated (4111) locally on the user's mobile device 4103 and may, immediately, or at some later time, be further communicated (4112) to update the dispensing history data stored at the eCommerce site 4104.

This updated dispensing information may then be used as an input to predict (4113) the date/time when the user's supplies of the additive will be depleted. When a date/time threshold is reached when re-ordering needs to take place in order for the products to be received before existing supplies run out, then a notification or alert may be sent (4114) to the mobile application running on the user's device 4103 for presenting to the user. This may be received by, and presented visually and/or audibly on the user's mobile device and/or further communicated (4115) to the hydration container 4102 and presented to the user visually and/or audibly on the container assembly 4102 itself. In response to the notification or alert, the user may interact with an interface on the hydration container 4102 to re-order supplies of additives (4116), or may interact with an interface on the mobile device 4103 to re-order additives (4417), and the stored purchase history data updated (4106) with this most recent purchase. The process described above may then be repeated periodically as dispensing events and/or purchase events occur.

A hydration container system may be configured to enable a defined and limited group of containers to be securely controlled and monitored by a single, central mobile or fixed device or application with which all containers in the group are in direct or indirect communication, for example, several different containers may be allocated to and used by members of a sports team. An application on the coach's computer, tablet or mobile device may provide a dashboard whereby the consumption patterns and behaviors of each member of the team can be monitored and future instructions or recommendations may be assigned by the coach, or recommended by an application, and communicated back to each individual container and/or individual. It may be, for example that to achieve optimum performance in the days prior to a sports game, players require a strict schedule of ingesting vitamins, nutritional supplements and the like. In addition, the ideal schedule may not be the same for each individual sports player and such a system allows for each individual schedule to be different and to be optimized for that individual. Furthermore, a consumption schedule may also be dynamically adjusted, either automatically by the application or system, or manually by the monitoring person (e.g. team coach) according to the consumption times and patterns communicated to the central application from the containers.

In a further, non-limiting, example, several different containers may be assigned to and used by inpatients in a medical or behavioral facility, or by outpatients. An application on the nurse or doctor's computer, tablet or mobile device may provide a dashboard enabling the medical practitioner to schedule, monitor, control and adjust a medication or pharmaceutical schedule independently for each patient. One example use case is that of gastric surgery for weight loss which requires that the post-operative patent maintain a very strict and tightly controlled regime of intake of nutrients, vitamins and supplements in order to ensure full and timely recovery over a period of several weeks. This is typically difficult for an individual to easily maintain with the required degree of accuracy. Furthermore, the reaction and/or efficacy of the dispensed additives in the aforementioned use-case scenarios might be correlated or otherwise monitored through the combination of supporting data from other devices, such as wearable activity trackers, heart-rate monitors, and the like.

In a further embodiment, where the users of the multiple containers are within a Wi-Fi environment, a system may receive periodic dispensing status updates initiated by and communicated from each one of multiple containers within wireless range including an ID-specific to each container and/or user. Additional data about the time that a medication was dispensed into the container and the time that the container was tilted and/or the level of consumable liquid in the container decreased, enables a medical practitioner to determine whether the patient has consumed some of the liquid after dispensing and how much has been consumed.

Figure 42:
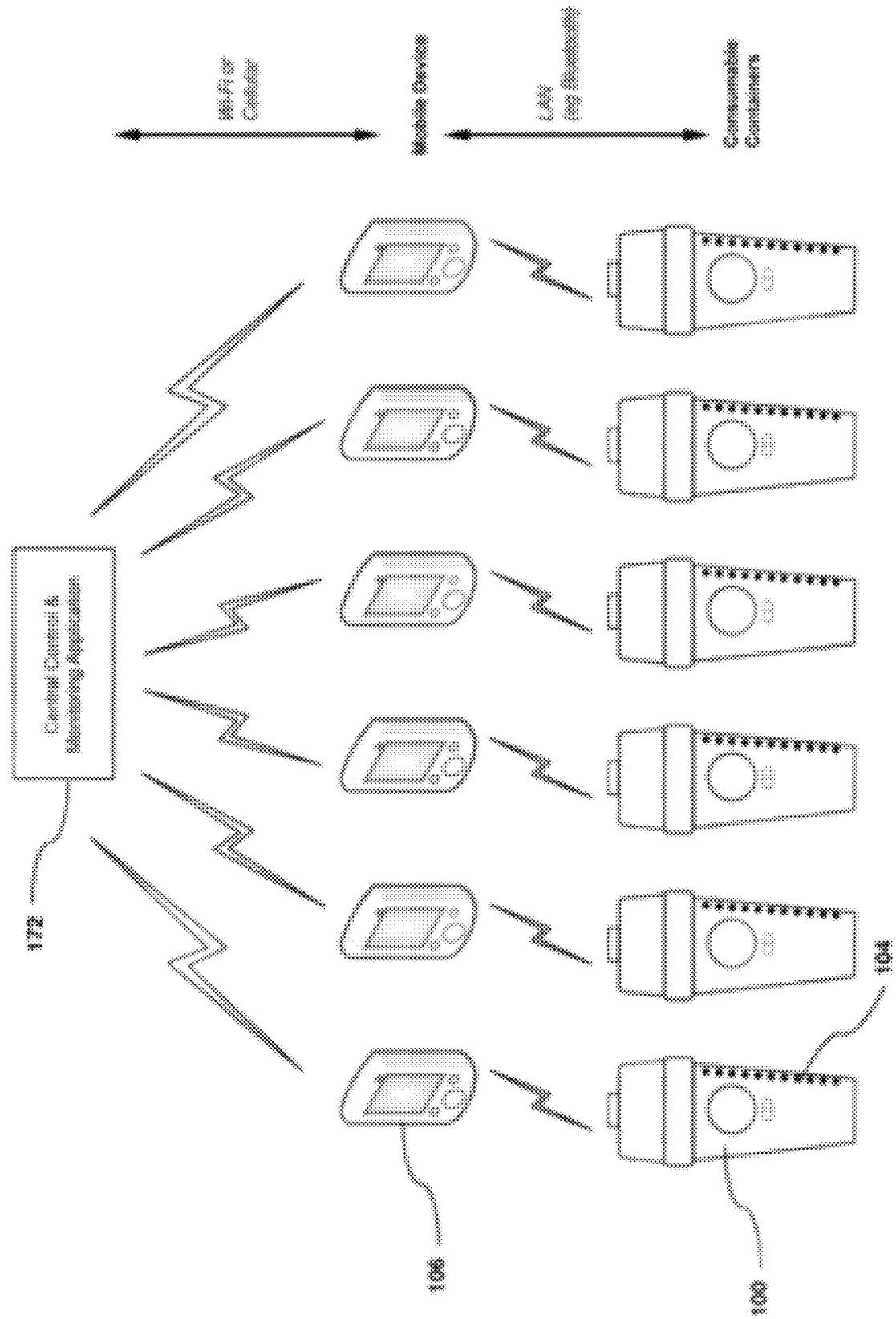
FIG. 42 is a block diagram illustrating an example of a closed group system according to one or more embodiments described herein.

FIG. 42 is an illustrative diagram of a system for controlling and monitoring additive consumption within a closed group of consumers.

In a further example, clinical trials of a new drug or pharmaceutical require a very strict and well controlled schedule of ingestion in order to ensure the scientific accuracy and validity of the results of the trial. In conducting such trials, a system for remotely controlling and monitoring additive dispensing and consumption would be very beneficial. Furthermore, the reaction and/or efficacy of the dispensed additives in the aforementioned use-case scenarios might be correlated or otherwise monitored through the combination of supporting data from other devices, such as wearable activity trackers, heart-rate monitors, and the like.

FIG. 42 shows a number of portable container assemblies 100 having level sensors 104 (e.g., infrared or other level sensing means) to determine the level of liquid consumable stored within them. Examples of such level sensors 104 include non-contact capacitive level sensing arrays, ultrasonic range-finder implementations, and/or load-cell implementations. The level sensors 104 are in short range (e.g., Bluetooth Low Energy or similar) wireless communication with the users' mobile devices 106. Each mobile device 106 may be in further wireless communication (e.g., via Cellular or other Wide Area Networks) with a receiving device (e.g., laptop, PC, tablet etc.) having a control and monitoring application 172. The control and monitoring application 172 may transmit dispensing instructions to each of the container assemblies 100 and may also receive data from the level sensors 104, as well as processors within the container assemblies 100.

In accordance with at least one embodiment, a user's mobile device 106 may not be needed, and the container assemblies 100 may be in direct wired or wireless communication with the control and monitoring application 172. In at least one other embodiment, communication may take place via a charging coaster or other charging module, with the data being stored in memory within the container assemblies 100 and uploaded when in contact with or connected to the charging device.

Figure 43:
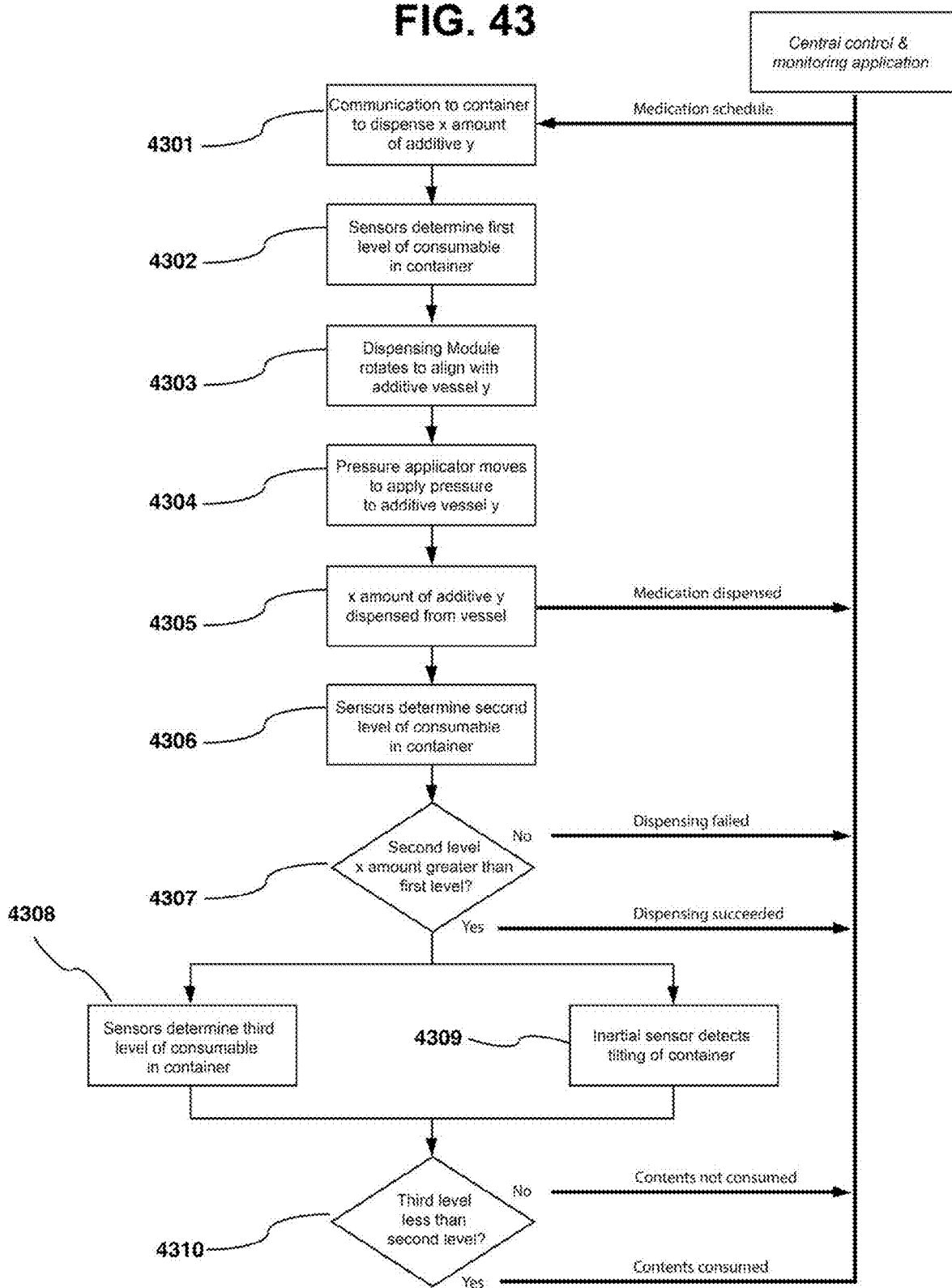
FIG. 43 is a flowchart illustrating an example process for monitoring additive consumption within a closed group of containers according to one or more embodiments described herein.

The example system and method presented above with respect to FIG. 42 are further illustrated in FIG. 43 in the exemplary context of medication dispensing, described in greater detail below.

At block 4301, an application on a central monitoring device communicates wirelessly to a user's mobile device, or directly to the container, an instruction to dispense X-amount of additive-Y into the consumable within the container. Prior to, or subsequent to this communication IR, capacitive level sensing strip, or other sensors in the container determine a first level of consumable within the container at block 4302. If the IR, or capacitive level sensing strip, or other sensors in the container determine that the level of consumable in the container is greater than a specific threshold then a dispensing module within the container rotates to align with the additive vessel-Y at block 4303 and a pressure applicator moves to apply pressure to additive vessel-Y, at block 4304 to force X-amount of additive-Y out of the additive vessel and into the consumable liquid at block 4305. Carrying out a first determination of the level of consumable in the container prior to the dispensing event may avoid additive being dispensed into an empty or near empty container, which could result in too high, or too low a level of concentration of the additive in the consumable. At this time a communication may be sent from the container to a central monitoring device or application to confirm that the additive has been dispensed from the additive vessel, that a dispensing failure has occurred or that the dispensing event was not carried out due to an absence of, or insufficient quantity of consumable in the container.

It should be noted that although in the present example, the level sensing technique focuses on infrared absorption/interference, that the relationship with a dispensing module, and/or additive vessel/s is achievable in different configurations with different technologies. With regard to the aforementioned, such technologies might include ultrasonic range finders, contact-based capacitive level sensing (for example, a probe), non-contact capacitive level sensing (for example, a shrouded printed circuit board assembly with active shielding elements to measure dielectric variation of a container), load-cell or other mass-measuring apparatus (whereby the system would extrapolate volume changes by changes in mass/weight), a float mechanism might also be employed, whereby the level is measured directly by the relative height of a constrained but movable float. The changes in substrate/solute/target-fluid level/quantity ultimately inform trackable hydration targets, dispensing protocol, and/or other user and/or system prompts. The implementation enables dynamic maintenance of the characteristics of the post-mix beverage in cases where the concentration is modified and/or in cases where the post-mix concentration requires adjustment. Furthermore, the approach enables for the dynamic creation of beverages in response to the level of target fluid/solute/substrate, whereby the measured level of the target fluid/solute/substrate informs the dispensing module to modify, postpone, cancel, or otherwise adjust a dispensing protocol, and/or whereby the measured level of the target fluid/solute/substrate informs a peripheral user interface (mobile application etc.) and subsequently prompts a data exchange, user-prompt, and the like.

At block 4306, the IR (or other) sensors determine a second level of consumable in the container and, at block 4307, the first level is compared with the second level to determine whether the level has changed in accordance with what would be expected due to the introduction of X-amount of an additive-Y, and that the additive has been successfully introduced into the consumable. This confirmation is then sent from the container directly or indirectly to the central monitoring device or application. Since the level of consumable in the container is known to the system, the level of concentration of the additive in the consumable can therefore be determined and may also be communicated to the central monitoring device or application. If the level of consumable has not changed then it may be concluded that a dispensing failure has occurred. If the level changes from zero to an amount consistent with X-amount of additive-Y, then it may be concluded that the additive vessel was empty before the additive was dispensed.

The container has an integrated display and methods of illumination which can be used to communicate to a user, including a message that dispensing has taken place or in about to take place and/or that the contents (additive and consumable) should be consumed. As described below, the next steps in this process are to determine if, when and how much of the consumable contents a user has consumed in response to this communication.

Subsequently, at block 4308, the IR (or other) sensors determine a third level of consumable in the container. This may be scheduled to occur after each dispensing event and/or may be initiated by the detection by inertial sensors at block 4309, that the container has been tilted. This third level of consumable is compared with the second previous level at block 4310 to determine whether the level of consumable has decreased.

If the inertial sensor at block 4309 indicates tilting and the level at block 4308 is unchanged from the second level, it may be concluded that none of the contents have been consumed. If the inertial sensor at block 4309 indicates tilting and the third level of consumable at block 4308 has decreased, it may be concluded that the container was tilted for the purpose of drinking and the user has consumed some of the contents and ingested the medication. This determination may be supplemented with the duration of tilting, since mean rates of drinking can be estimated, then the length of time that a container was tilted may be a proxy for the amount of content consumed. In a further embodiment, each individual container may monitor the rates at which the individual user drinks the contents by means of a flowmeter, flowmeter-valve, or similar, and determine a mean or range for that particular user. In this way, estimates of the amount consumed as determined from the time and duration of tilting could be considerably more accurate.

At this time a communication may be sent from the container to a central monitoring device or application to confirm that the user has consumed the medication. Since the amount of consumable and the amount of additive are known, the concentration can be determined and since the amount that has been consumed is also known, then the amount of medication ingested by the user/patient can be determined.

In accordance with at least one embodiment, the control and monitoring system may be in communication with a container and the dispensing module modified in order to dispense solid substances such as tablets, into a container which may be empty and does not contain a liquid or any consumable. Such a system may, for example control the timing with which tablet or gel-form drugs are administered, preventing a user from taking the drugs at incorrect intervals. Such a system could be particularly beneficial in the case of patients suffering from Alzheimer's Syndrome or other conditions where cognitive capacity or judgment is impaired or for the clinical trials of drugs.

In cases where it may not be possible for a central control device (e.g., computer, tablet, mobile device, and the like) to simultaneously communicate with multiple containers, the method may require the application to sequentially communicate with each container in turn via Bluetooth or similar wireless technology, then disconnecting and pairing with the next one. In this way a full cycle of connect/disconnect can be carried out in a timely manner. The aforementioned embodiment and use-case would be ideal in group settings such as physician monitoring of patients/clients, or in a trainer or coach interfacing with a team of players.

Data exchanges between the container, the users mobile device and the central device or application may also be implemented using cellular communications and/or internet protocol if the client containers are not within the range of a direct peer to peer wireless or Wi-Fi system.

Figure 44:
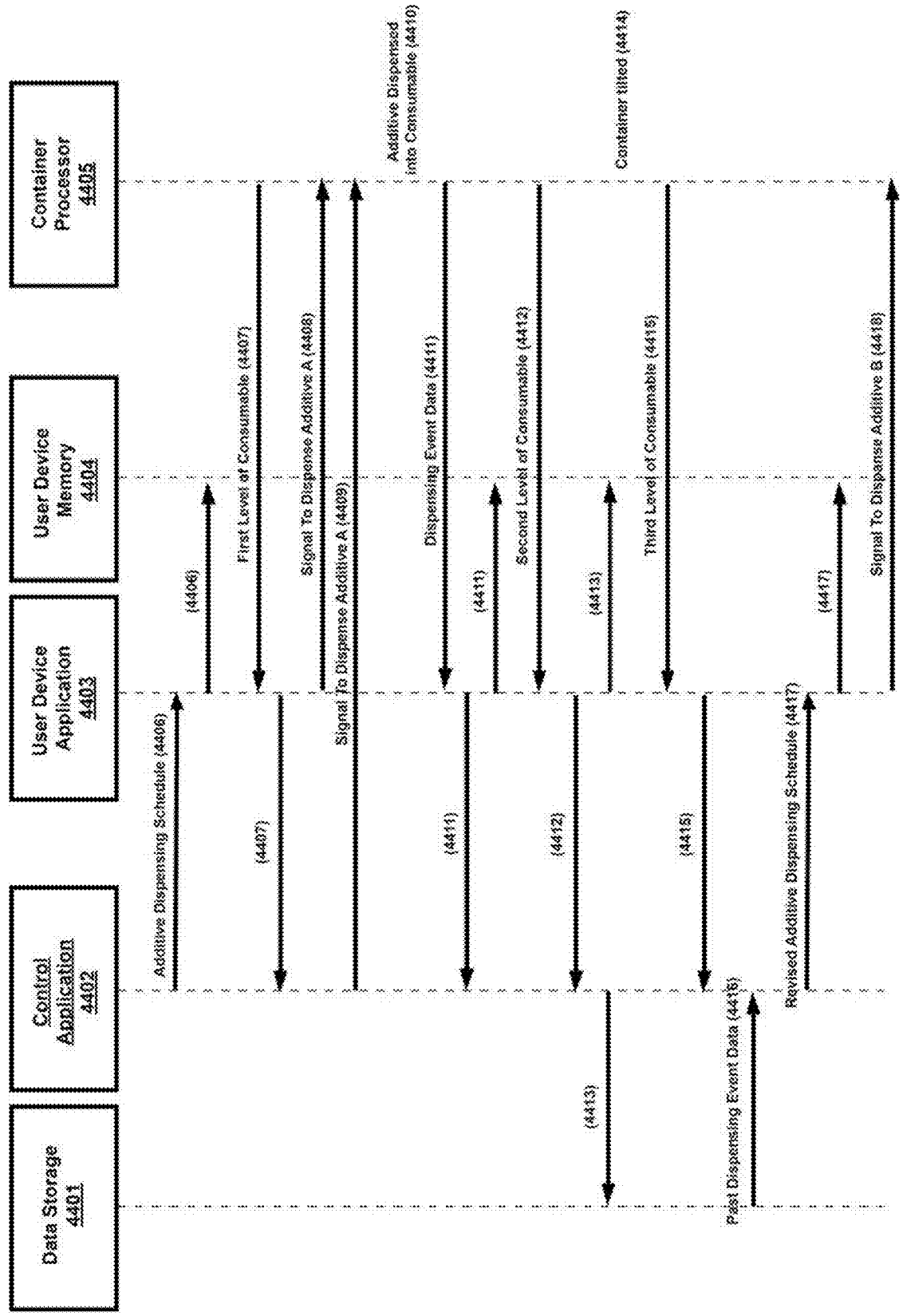
FIG. 44 is a data flow diagram illustrating example data communications between a central controller, a monitoring application, and a portable container according to one or more embodiments described herein.

FIG. 44 shows example data communications between a central control and monitoring application 4402, data storage 4401 (e.g., local, network or cloud based memory), an application installed on a user device 4403, memory of the user device 4404, and a processor 4405 in one of a plurality of remote container assemblies. The central control and monitoring application 4402 may communicate an additive dispensing schedule (4406) or dispensing event to the application on a user device 4403 which is associated with the user's container. This dispensing schedule may then be further communicated to (4406) and stored in memory 4404 associated with the application and may comprise a single dispensing event or multiple dispensing events over a period of minutes, hours, days or longer. Immediately prior to a scheduled dispensing event, sensors determine a first level of consumable within the container and communicate that first level 4407 to the application on the user's mobile device, this may be further communicated (4407) to the control application 4402. Periodically, according to the schedule, a signal (4408) may be communicated from the user device application 4403 to the container processor 4405 to dispense an additive from one of the additive vessels.

In an alternative embodiment, the signal to dispense additive (4409) may be communicated directly from the control application 4402 to the container processor 4405. The dispensing event (4410) then takes place and feedback data about that event communicated (4411) from the container processor 4405 to the user device application 4403, and further communicated (4411) from the user device application 4403 to the control application 4402. The dispensing event data may also be communicated (4411) to local memory storage 4404 in the user's device. In an alternative embodiment, feedback data about a dispensing event may be communicated directly from the container processor 4405 to the control application 4402 without requiring a user device as a wireless relay.

Following the dispensing event sensors determine a second level of consumable within the container and communicate that second level (4412) to the application on the user's mobile device 4403. Data about the dispensing event and the level of consumable prior to and following the dispensing event may be further communicated (4412) to the control application 4402 and may be yet further communicated (4413) to local, network or cloud based memory 4401 associated with the control application. This may also be communicated to (4413) and stored in memory 4404 on the user's mobile device. The dispensing event data may include, but is not limited to, the quantity of additive dispensed, the change in level of consumable within the container immediately afterwards, date, time, and the like.

Consequently, historical data about dispensing events may be duplicated and stored both in the user device 4404 and in memory 4401 associated with the control application. Thereby enabling the historical (past dispensing and consumption) data to still be accessible to, and usable by the container processor 4405 to adjust future dispensing if communications between the container 4405 and the control application 4402 are not available. Subsequently, inertial sensors may detect a movement or tilting (4414) of the container assembly, which may prompt the sensors to determine a third level of consumable within the container assembly and communicate that third level (4415) to the application on the user's mobile device 4403. The third level may be further communicated (4415) to the control application 4402.

Past dispensing event data may be accessed (4416) from data storage 4401 by the control application 4402 and used to revise a dispensing schedule which is then communicated (4417) to the user device application 4403 and memory 4404. In this example the revised dispensing schedule includes the dispensing of additive B (4418).

Figure 45:
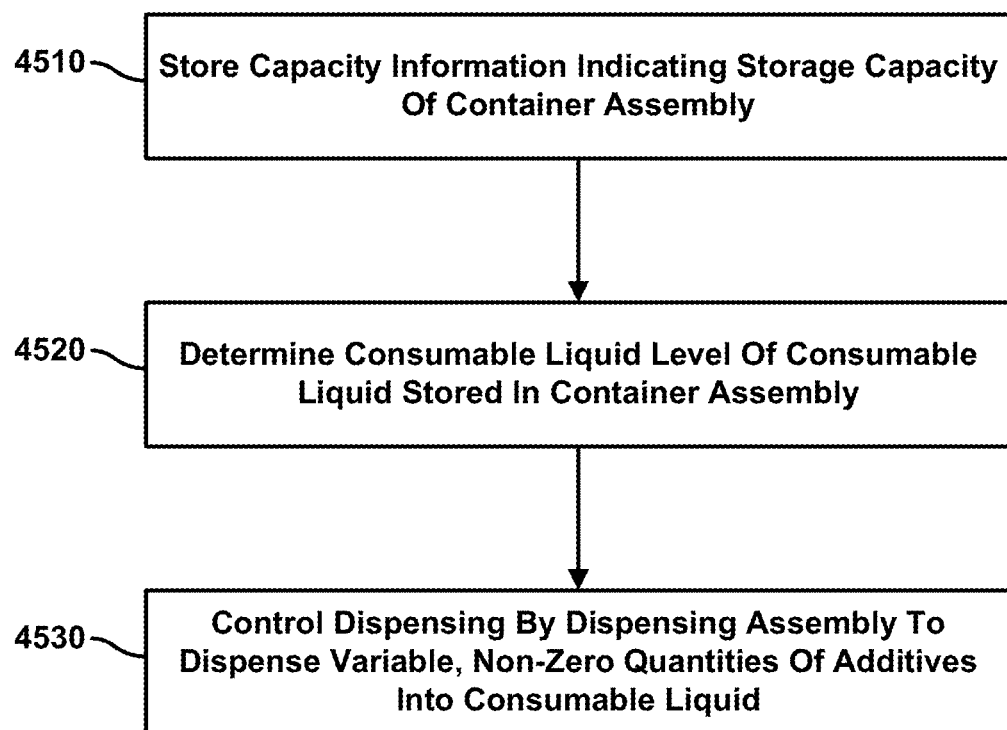
FIG. 45 is a flowchart illustrating an example process for controlling a portable, self-contained beverage apparatus according to one or more embodiments described herein.

FIG. 45 illustrates an example process for controlling a portable, self-contained beverage apparatus. In accordance with one or more embodiments described herein, the process may be performed by or implemented in a beverage apparatus that includes an internally disposed dispensing assembly having a plurality of apertures structured and arranged to receive and retain vessels containing additives to be dispensed into a consumable liquid stored in a container assembly of the apparatus. At block 4510, capacity information for the container assembly may be stored, where the capacity information indicates a storage capacity of the container assembly for storing a consumable liquid. At block 4520, a consumable liquid level of a consumable liquid stored in the container assembly may be determined. For example, the consumable liquid level may be determined using a sensor device disposed within the container assembly. At block 4530, the dispensing assembly may be controlled to dispense variable, non-zero quantities of additives from the vessels retained in the apertures into the consumable liquid based on the determined consumable liquid level of the consumable liquid and the storage capacity of the container.

One or more embodiments of the present disclosure relate to portable containers, specifically, to such containers focused on hydration tracking and the customized and variable dispensing of additives. In at least one preferred embodiment, the aforementioned additives are contained in discrete vessels designed to allow precise, repeatable dispense volumes based upon variable and modifiable compression. The methods, systems, and apparatuses described herein should not be understood as limiting, and one skilled in the art will understand that components of the system and apparatuses described may be omitted or expressed more broadly so as to focus on the unique aspects of the disclosure.

The system and method in accordance with at least one embodiment involves a user configurable dispensing arm, adjustable to orient specifically upon the desired additive vessel. The dispensing arm then may be further adjusted to modify the stroke length of the arm, thereby determining the amount of vessel compression, and thus the quantity of additive dispensed. Such a system could be guided by an interface either directly on the device or peripheral to the device, such as on a user's mobile phone. In the aforementioned use cases, the interface may prompt the user to orient the dispensing arm on a particular additive vessel, and then to adjust the stroke length of the dispensing arm in accordance with achieving a desired concentration. The final element of this mechanical process then involves the user depressing a mechanical switch that drives the dispensing arm into the additive vessel.

In one embodiment, a successful dispense may be ascertained with a mobile application engaging an optical reader to appraise the saturation and/or color of the combined fluid. If the combined fluid is too light and/or under-saturated, a further dispense command may be prompted, in accordance with the existing parameters, to achieve the desired concentration. If, conversely, the fluid is too dark and/or saturated, then a prompt might guide the user to dilute the combined fluid so as to achieve a desired concentration.

In accordance with at least one other embodiment, the system or apparatus may include a lid or other housing oriented upon threads that correspond to a specific, pre-calibrated, compression range. In such an embodiment, a rotary potentiometer or other rotary position sensor or counter may collect data throughout a dispensing event to monitor the quantity or rate of compression (for instance, a quarter twist might correspond to a vertical compression of ⅛th of an inch, and subsequently correspond to 3.5 mL of dispensed volume for a given additive vessel, and/or additive with known characteristics). Such a mechanism allows for an additive vessel with a variable, bursting valve to open temporarily or permanently in a controlled and repeatable fashion. More ideally, the system, apparatus, and method allows for a valve to open and then close, dispensing an additive, while maintaining a pressure equilibrium, thereby preventing water ingress, while maintaining the reliability of the dispensing characteristics of the vessel.

In accordance with at least one other embodiment, a ratcheted caliper mechanism is oriented upon an active face and/or active faces on a dispensing vessel and allows for reliable, repeatable, dispense of the additive whereby one increment of the ratchet might correspond to a pre-calibrated and reliable compression of the additive vessel that subsequently corresponds to a known dispense volume. In this embodiment, a linear potentiometer or other position sensor or counter may collect data throughout a dispensing event to monitor the quantity or rate of compression (for instance, a single ratchet increment might correspond to a lateral compression of 1/12th of an inch, and subsequently correspond to 2 mL of dispensed volume for a given additive vessel, and/or additive with known characteristics). Such a mechanism allows for an additive vessel with a variable, bursting valve to open temporarily or permanently in a controlled and repeatable fashion. More ideally, the system, apparatus, and method allows for a valve to open and then close, dispensing an additive, while maintaining a pressure equilibrium, thereby preventing water ingress, while maintaining the reliability of the dispensing characteristics of the vessel.

In yet another embodiment, a vessel might be compressed between two rollers that are themselves positioned on a rack with known, calibrated increments. In the aforementioned embodiment, the vessel might be received in the rollers in such a way as to neutralize any empty volume in the vessel, thereby priming the vessel for accurate and precise dispensing. Once primed, the vessel could then be incrementally flattened or otherwise compressed so that each increment initiates a repeatable and reliable dispense quantity. In such an embodiment, a linear potentiometer or other position sensor or counter might collect data throughout a dispensing event to monitor the quantity or rate of compression (for instance, a single ratchet increment might correspond to a lateral compression of 1/12th of an inch, and subsequently correspond to 2 mL of dispensed volume for a given additive vessel, and/or additive with known characteristics). Such a mechanism would allow for an additive vessel with a variable, bursting valve to open temporarily or permanently in a controlled and repeatable fashion. More ideally, the system, apparatus, and method allows for a valve to open and then close, dispensing an additive, while maintaining a pressure equilibrium, thereby preventing water ingress, while maintaining the reliability of the dispensing characteristics of the vessel.

Importantly, at least one embodiment of the present disclosure allows for real-time modification, creation, and/or maintenance of a functional beverage product based upon contextual data variables, such as weather, physical activity, eating behaviors, and the like. For instance, a recent 'logging' of a meal high in High Density Lipoproteins (HDL) might inform the system that it is now optimal for the user to consume a vitamin mix with a greater density of fat-soluble constituents. Furthermore, if there is a newly realized time-window for a specific additive to be dispensed, the system might dispense that additive into an existing post-mix beverage, thus modifying the beverage, in response to the additional additive, the system might also prompt a dispense event of a 'counter-balance' flavor additive, to retain the same taste and flavor characteristics, in place of or in supplement to the aforementioned step, the system might also prompt the user to fill the container with more fluid so as to sufficiently dilute and/or dissolve the new post-mix beverage to a target level.

Furthermore, one or more embodiments of the present disclosure also enables for a system capable of prompting a user to dispose of a beverage should the ingredients/contents/experience/flavor/taste/consistency fall outside of a target range, for instance if a degradable supplement is dispensed into a target fluid/solution, and is not consumed within a specific time frame, it may become unpalatable, ineffective, or even harmful to the user, in this case, the system would have information related to the initial dispensing event (the beverage 'creation' time) as well as ambient conditions (such as temperature and humidity) thus providing the system with the necessary insights to formulate a determination as to whether or not the beverage is acceptable, if the beverage is deemed unacceptable, the user could be prompted to dispose of the beverage and to create a new one, or to consume something else as an alternative. The myriad benefits of such a system include: consumer-experience-protection (in so far as the consumer will be less likely to consume a non-optimal beverage, and thus damage their sentiment and/or experience with regard to the beverage brand), improved reliability of nutrition-content tracking (in so far as the consumer will not be improperly tracking nutrients that are no longer viable), and in improved compliance for the beverage makers from a regulatory standpoint (in so far as the created, post-mix beverage is readily adjustable in concentration/strength to precisely and reliably account for ingredient degradation, and thus, create a beverage that reflects the nutrition-facts on the Primary Display Panel (PDP) of the additive vessel).

In alternate embodiments, and/or alternate use-cases, the system enables the guiding of a consumer experience with relation to a dispensing event and to the post-mix beverage that is created by the dispensing event; with prompts either on the portable container itself or on a peripheral device (such as a user's mobile device), the system can instruct the user to add an ice cube or to refrigerate the fluid/water to achieve a target temperature range. This process is accomplished through the placement and/or proximity of thermistors and/or equivalent temperature sensing modalities (such as an infrared system), such that the system is able to measure directly, or infer/extrapolate indirectly, the temperature of the target fluid/water, furthermore, the system is able to execute and present an accurate estimate to guide the user to sufficiently adjust the temperature of the fluid based upon the data it has insights into, the quantity of fluid, the type of fluid (if a dispensing event has occurred), and the Specific Heat Capacity of the fluid, based upon these factors, the system can make an accurate determination as to the exact energy requirements to alter the temperature of the fluid to a specific level. In the aforementioned embodiment, the system can make a determination that the post-mix beverage should be X-degrees cooler, the system also estimates that a standard size ice cube has a capacity to cool this fluid by Y-degrees, and furthermore that a standard size ice cube will dilute the beverage by Z-quantity once melted, the resultant calculation derives that three ice cubes should be added to the beverage to cool it sufficiently, furthermore, the same calculation also derives that the dilutive effect of the added ice cubes will require X-mL of additional additive to counteract the dilutive effect and retain the same flavor/taste profile of the post-mix beverage.

In an alternate scenario of the aforementioned, the user might prefer to cool their beverage by placing the post-mix beverage vessel into a refrigerator or freezer, in which case an assumed average cooling rate is applied against the known volume, Specific Heat Capacity of the target fluid, current temperature, and desired temperature, from the preceding variables, the system can derive an estimated length of time that the vessel should be placed in either the refrigerator or the freezer, thus providing the user with the necessary guidance to sufficiently cool their beverage to a targeted point without under- or over-cooling the beverage.

In accordance with aforementioned embodiments, it should be apparent to one of ordinary skill in the art that the methods, systems, and apparatuses of the present disclosure are designed to include a calibrated and repeatable compression of a variably compressible additive vessel, further connected to a direct or indirect measurement mechanism. In the more idealized embodiments, the compression is set in such a way so as to maintain the incrementally compressed state to prevent any water or air ingress, or any other conditional change that would impact the state of the additive and/or future dispensing events. The methods, systems, and apparatuses described herein offer improved performance and user experience over that of existing approaches by specifying user adjustable, and user orientable mechanisms that are guided in some direct or indirect fashion to.

In a more advanced embodiment building upon all the aforementioned embodiments, dispensing events might be recorded or otherwise monitored by a mobile application using acoustic methods. As a non-limiting example, a ratcheted caliper might produce a distinctive 'click' upon being engaged by the user, the click might change in tone, pitch, or volume based upon position and/or dispensing activity, a mobile application monitoring such a sound might be able to subsequently infer to what extent an additive vessel has been dispensed or otherwise acted upon.

In yet another embodiment, a mobile application might use a photographic or otherwise optical methodology to record the color, saturation, absorbance, reflection, or other visual property to make an inferential estimation of the target liquids concentration, in this case, as it pertains to taste, nutritional characteristics, and the like.

One or more of the aforementioned embodiments relate to a dispensing system, an adjustable or otherwise personalized dispensing protocol, tracking or otherwise metering of a dispensing event, and user replaceable containers, such that the critical components of the system are interchangeable with various drinking vessels or hydration systems, fitting a user's preferences or use cases.

The above description focuses on a particularly important aspect, which is a mechanical feature designed to standardize manual user-input so as to perform a precise, incrementally-defined dispensing event on at least one additive vessel designed for multiple dispensing events and interchangeable use within the same or multiple devices. The system also makes use of an embedded mechanism to track either directly or inferentially, the incremental dispensing, assigning data related and relevant to the dispensing event, such as quantity, rate, volume, place or time of consumption, post-dispense user-adjustments, and the like.

Furthermore, data about a user of the container 100 may be accessible to and/or obtainable by the container (e.g., by a processor or other component of the container 100). For example, the container 100 may receive (e.g., retrieve, access, request, or otherwise obtain) data about the user that is stored, for example, in one or more databases or storage devices 103 local to the user, within an application residing on a device of the user 106 (e.g., a portable user device, such as a cellular telephone, smartphone, personal data assistant, laptop or tablet computer, etc.), and/or in network/cloud data storage 108, 107. In accordance with at least one embodiment of the present disclosure, the data about the user may include, for example, user demographic information (e.g., age, gender, weight, body mass index, etc.), additive purchase history information, additive usage history information, charge/payment information for purchases, and various other data associated with the user or actions of the user. In this manner, such data about the user of the container 100 may be collected, analyzed, and/or communicated by the container 100 (e.g., by a processor and/or other components of the container 100), and made available to the device of the user 106, to one or more other devices of the user, to the one or more databases or storage devices local to the user, to the network/cloud data storage 108, 107, and the like.

Furthermore, one or more APIs (Application Programming Interfaces) from a mobile device application associated with the container 100 may interface with and access data from other applications running on a device of the user (e.g., user device 106), where such data may include, but is not limited to, geo-location, time, local weather conditions, temperature, personal schedule (e.g., from a calendar application), etc. APIs to third party applications may also be used by the container 100 to access user data about the recent physical activity of the user. For example, data may be obtained from a variety of existing or future personal physical activity tracking/monitoring devices (e.g., Fitbit, Apple HealthKit, etc.), any of which can furnish various data related to physical activity of the user. Some non-limiting examples of the type of data that may be obtained from such physical activity tracking/monitoring devices include data about the type of physical activity undertaken by the user, the number of steps taken by the user during a period of time, speed of motion, estimated energy expenditure (e.g., calories burned), etc. Accordingly, data about the user's physical activity levels and activity history may be collected, analyzed, and/or communicated by the container 100 (e.g., by a processor and/or other components of the container 100).

All or a portion of the data described above may be communicated to or otherwise retrieved by one or more processors which may be located within the consumable container 100 or external to the consumable container 100 (e.g., in the user's mobile device 106, in the cloud network 108, etc.), where the data may be used to derive more specific and focused patterns and trends about an individual's activity, purchase, and/or consumption behaviors.

Therefore, data about a user's consumable liquid consumption and/or a user's additive consumption may be communicated from the container (or from an associated mobile device) to an eCommerce system. In accordance with one or more embodiments of the present disclosure, such data communicated to the eCommerce system may include any of the following non-exhaustive and non-limiting examples:

Data about the additives including, but not limited to the types of additive, the amount initially in the vessel, the date/time that vessel was inserted in the container, the total amount dispensed, the date/time and frequency with which the additive was dispensed, the concentration levels and limits, the mix of additives typically combined and inserted in container together and the like.

Data about the consumable liquid including, but not limited to the level of consumable in the container at any time, the level prior to and after each dispensing event, the amount consumed on an hourly, daily or other time period, variation in consumption rate over a time period and the like.

Data about the user of the container including, but not limited to the user's age, gender, weight, the types and quantities of additives previously consumed, user preferences, etc.

Data about the context of use, for example, the number of steps the user has walked this day and previous days, geo-location, direction and/or speed of movement of the user (e.g., to identify when the user is walking, jogging, cycling, etc.), time of day, time zone, local weather conditions, etc.

In accordance with at least one embodiment, the eCommerce system may have access to stored data about the user's additive purchase history including, for example, what was purchased, when and in what combinations such purchases were made, the frequency of reordering additives, etc. Furthermore, inertial sensors in the container may additionally communicate data including when a container is tilted for the purposes of drinking and the duration that it was tilted, as an indicator of the volume of consumable consumed.

Data from these various sources can be processed and combined to track an individual's purchase and consumption patterns. The following presents some exemplary use cases to further illustrate such features of the present disclosure.

A user generally consumes 4 liters of consumable liquid per day but analysis of this data over a period a several days indicates that the consumption level is decreasing and will shortly pass below a recommended threshold level. As a result, an alert indicating that the user should increase consumption may be communicated to the user via, for example, a mobile device associated with the user, or via a display on the consumable container, or the like.

A user generally consumes 5 ounces (oz.) of flavoring A, 2 oz. of vitamin B, and 1 oz. of nutritional supplement C in a certain time period. This relative consumption data may be used to recommend bundled packages of additive purchases which are closely aligned with that user's predicted consumption patterns. As the relative consumption quantities of the user change over time, the bundled packages recommended by the system change accordingly.

A user purchased N additive vessels (where "N" is an arbitrary number) of a certain type on a certain date, and the rate of dispensing of that additive indicates a likelihood that the user will run out of supplies on some date subsequent to the purchase. An alert or message advising the user to order new supplies and providing an immediate means of doing so may be communicated to the user via, for example, a mobile device associated with the user, or via a display on the consumable container, or the like.

A user consumes different additives when in different locations. For example, the user consumes more energy boosting additives when at location A, which is visited on a regular weekly schedule or basis. This might suggest that location A corresponds to a gym or fitness facility. Consequently, tracking location and movements enables more accurate prediction of likely future additive purchase needs. The processor of the container assembly also has access to data about the user such as settings, preferences and personal/demographic data, which may be locally stored in onboard memory within the container and/or in the mobile device memory. The processor may additionally have access to data about other consumables such as snack bars, which the user may eat and this data may be imported into the system independently of the measurement and identification of consumable liquid by means of an RFID antenna or similar method, by manual input by the user, or by other means.

All of the above listed data may be communicated to a processor associated with an eCommerce site from where the additives were obtained, the processor additionally having access to the user's purchase history stored within. Various combinations of these rich data sources can then be made accessible to a data analytics and recommendation engine to generate recommendations to the user about short term actions for example, drinking more consumable liquid and/or long term actions for example purchase recommendations, which may be communicated to the user via the mobile device, via a display on the portable container or by other means. Individual purchase and consumption data may be aggregated across a population of users and used to determine broader patterns, some exemplary use cases are as follows:

The types of additives generally purchased and consumed are different in different areas of the country (which might be expected due to various factors including variations in climate for example). This data may be used to influence the advertising and marketing of additives in different regions.

Sales of an additive show a short term spike following an advertising campaign in a specific region of the country. This data can be used to quantify the impact of advertising and marketing campaigns.

A high proportion of the population set the concentration level of a flavoring additive higher than that which is recommended, this data suggests that the recommendation should be changed.

There is a significant increase in the purchase and consumption of certain health supplements at the beginning of winter, this data suggests that the cold & flu season may be starting.

Users who bought additives a, b and c, also tend to buy additives c and d, therefore this correlation is factored into the additive recommendation engine.

In accordance with one or more embodiments, population trends may be determined according to, for example, one or more of the following: (1) location, such as regional preferences for additives (e.g., at country, state, town, and/or zip code levels), location hotspots for additive consumption (e.g., health club geolocation); (2) time, such as additive consumption trends by time of day, by day of week, seasonal trends by month and long term consumption trends over years, indicating long lifecycle trends and changes in population taste and preference; and (3) time and associated event, such as advertising campaigns, transient health alerts (e.g., pandemics, outbreaks, etc.), flu outbreaks, city marathons and other public sporting events. It should be understood that there are many ways in which the additive, consumable, consumption and user data may be combined with location, activity and other context data and further combined with purchase history data in order to generate purchase recommendations of vale and benefit to the user of a portable container.

Functional beverages increasingly account for a larger portion of revenue share in the global beverage industry. These beverages are characterized broadly in their attributes focused on cause-and-effect nutritional goals, such as energy drinks for example which might exploit B-Vitamins and Caffeine, or relaxation beverages for example, which might exploit Valerian Root and Melatonin, and the like. These beverages exploit ingredients that are in some cases water-soluble, however it is not a limiting factor, as complete or partial emulsions are readily sold, and accepted. In the prior art, systems that segregate the solute from the solution (in this case, active ingredients or degradable vitamins) account for the degradation concerns of the constituent ingredients, which in most cases relates to the biological efficacy and availability of a soluble vitamin complex, whereby the solubilized vitamin components lose their efficacy as a result of being mixed.

What is lacking in the prior art however is a system that allows for multiple functional additives to be stored carried, or otherwise made available for a target solute, and for such functional additives to be variable in a non-zero sense in their dispensing behaviors, specific to the customized creation and/or maintenance of a functional beverage. Whereby functional beverage products are dynamically "created" from non-functional beverage products, in constantly variable ways, without necessitating compromise on product integrity and/or experience. Furthermore, a functional beverage containing degradable products can be dynamically maintained such that the functional contents of a solute maintain their functional characteristics independently of degrading external conditions. The embodiment of the present disclosure relates specifically to such a system, designed to accomplish the aforementioned, as well as to specifically address the dynamic needs of functional products and the like. It should be obvious to one learned in the art, that such a system should not be limited to functional beverage products, and that an identical embodiment would have applicability across a wide range of consumable-oriented scenarios, including but not limited to medicines, supplements, beverages, and the like.

In the aforementioned case, and in the preferred embodiment, the system comprises of a portable device with multiple apertures to contain and orient additive vessels containing functional ingredients/additives, and a context-driven mechanical or electromechanical dispensing module that dispenses variable non-zero quantities of said additive into the target solute, and in doing so vary not only the type of functional additive, but the combination of multiple additives, and/or the concentration or overall quantity of the additive. Such a mechanism allows not only for the functional ingredients to remain segregated (and thus more effective), but also for their concentration to be modified dynamically in response to numerous relevant or related factors either directly or automatically. Such a mechanism allows for the dynamic transformation of non-functional beverages into functional beverages, without necessitating reformulation at the bottling site, and without necessitating a change in the user experience of the beverage as it relates to taste, consistency, density. The system thus permits for dynamic creation of functional beverages in customized, personalized fashion, without requiring homogenous system-level reformulation, and without compromising on product integrity.

Importantly, at least one embodiment of the present disclosure allows for real-time modification, creation, and/or maintenance of a functional beverage product based upon contextual data variables, such as weather, physical activity, eating behaviors, and the like. For example, a recent 'logging' of a meal high in High Density Lipoproteins (HDL) might inform the system that it is now optimal for the user to consume a vitamin mix with a greater density of fat-soluble constituents, thereby prompting the dispensing mechanism in the present disclosure to orient upon the target additive vessel (or vessels) and to further drive the electromechanical elements responsible for delivering a dispense-triggering force in a manner that corresponds, according to the known variables, to a particular dispense volume and corresponding concentration that accounts for the new user conditions.

Furthermore, if there is a newly realized time-window for a specific additive to be dispensed, the system might dispense that additive into an existing post-mix beverage, thus modifying the beverage, in response to the additional additive, the system might also prompt a dispense event of a 'counter-balance' flavor additive, to retain the same taste and flavor characteristics, in place of or in supplement to the aforementioned step, the system might also prompt the user to fill the container with more fluid so as to sufficiently dilute and/or dissolve the new post-mix beverage to a target level.

Furthermore, at least one embodiment of the present disclosure also enables for a system capable of prompting a user to dispose of a beverage should the ingredients/contents/experience/flavor/taste/consistency fall outside of a target range, for instance if a degradable supplement is dispensed into a target fluid/solution, and is not consumed within a specific time frame, it may become unpalatable, ineffective, or even harmful to the user, in this case, the system would have information related to the initial dispensing event (the beverage 'creation' time) as well as ambient conditions (such as temperature and humidity) thus providing the system with the necessary insights to formulate a determination as to whether or not the beverage is acceptable, if the beverage is deemed unacceptable, the user could be prompted to dispose of the beverage and to create a new one, or to consume something else as an alternative. The myriad benefits of such a system include: consumer-experience-protection (in so far as the consumer will be less likely to consume a non-optimal beverage, and thus damage their sentiment and/or experience with regard to the beverage brand), improved reliability of nutrition-content tracking (in so far as the consumer will not be improperly tracking nutrients that are no longer viable), and in improved compliance for the beverage makers from a regulatory standpoint (in so far as the created, post-mix beverage is readily adjustable in concentration/strength to precisely and reliably account for ingredient degradation, and thus, create a beverage that reflects the nutrition-facts on the Primary Display Panel (PDP) of the additive vessel).

In alternate embodiments, and/or alternate use-cases, the system enables the guiding of a consumer experience with relation to a dispensing event and to the post-mix beverage that is created by the dispensing event; with prompts either on the portable container itself or on a peripheral device (such as a user's mobile device), the system can instruct the user to add an ice cube or to refrigerate the fluid/water to achieve a target temperature range. This process is accomplished through the placement and/or proximity of thermistors and/or equivalent temperature sensing modalities (such as an infrared system), such that the system is able to measure directly, or infer/extrapolate indirectly, the temperature of the target fluid/water, furthermore, the system is able to execute and present an accurate estimate to guide the user to sufficiently adjust the temperature of the fluid based upon the data it has insights into, the quantity of fluid, the type of fluid (if a dispensing event has occurred), and the Specific Heat Capacity of the fluid, based upon these factors, the system can make an accurate determination as to the exact energy requirements to alter the temperature of the fluid to a specific level. In the aforementioned embodiment, the system can make a determination that the post-mix beverage should be X-degrees cooler, the system also estimates that a standard size ice cube has a capacity to cool this fluid by Y-degrees, and furthermore that a standard size ice cube will dilute the beverage by Z-quantity once melted, the resultant calculation derives that three ice cubes should be added to the beverage to cool it sufficiently, furthermore, the same calculation also derives that the dilutive effect of the added ice cubes will require X-mL of additional additive to counteract the dilutive effect and retain the same flavor/taste profile of the post-mix beverage.

Furthermore, in an alternate embodiment of the scenario in the aforementioned, the user might prefer to cool their beverage by placing the post-mix beverage vessel into a refrigerator or freezer, in which case an assumed average cooling rate is applied against the known volume, Specific Heat Capacity of the target fluid, current temperature, and desired temperature, from the preceding variables, the system can derive an estimated length of time that the vessel should be placed in either the refrigerator or the freezer, thus providing the user with the necessary guidance to sufficiently cool their beverage to a targeted point without under- or over-cooling the beverage.

The portable beverage creation system described in at least one embodiment of the present disclosure can also account precisely, and adjust or otherwise maintain, with an environmental and time dynamic, the functional characteristics of a beverage that might degrade over time, or upon exposure to particular conditions, lose their efficacy. The system thus dispenses additives and/or functional ingredients in response to the user requirements and/or preferences, but also in response to the chemical sensitivities of the ingredients themselves. In yet another embodiment of the aforementioned, the dispensing modality can take into account and adjust for the time degradation of the functional ingredients within readable additive vessels such that a consistent functional concentration can be dispensed reliably whether that requires the dispensing system to dispense a larger or smaller net quantity by volume of the additive, the mechanism would be capable of maintaining the functional characteristics of the ingredient in question. Furthermore, as an additional step of the aforementioned, the system would be capable of addressing flavor aspects of the aforementioned action, for example, if the additive requires an extra 5 mL to maintain its functional properties, said additive might alter the flavor and/or user experience of the composite beverage, in response, the dispensing mechanism would dispense an appropriate and corresponding quantity of the flavor additive.

In accordance with at least one embodiment, the system leverages a read/write capability and interface between the additive vessel and the dispensing system or dispensing module, encoded within the communicable data element of the additive vessel is information relevant to the dynamic qualities of the contents of the additive vessel, such information might include: the bottling date, temperature of storage facilities, time of opening, transit time, local storage conditions, etc. All the aforementioned data points can be reliably encoded in simple, purely numeric form on an RFID tag or equivalent data structure. The RFID tag in the preferred embodiment has information unique and specific to the bottling location, time, date, and the contents of the additive vessel.

Leveraging this data, and reconciling it against known content dynamics, the dispensing system can infer the state of degradation of a particular ingredient or a plurality thereof, and subsequently adjust for said degradation by adjusting dispense-rate and/or dispense-volume. The mechanism adjusts for the degradation two-fold; first by adjusting for gross degradation of the vessel contents itself, thereby adjusting the entire dispensing protocol (in a simple example, an assumed degradation rate of 10% might result in an increase of dispense volume by 10%, thereby neutralizing the impact of the degradation from a potency/effectiveness/functional standpoint.) Building upon the aforementioned, and leveraging a similar protocol, the rate of consumption combined with local conditions might result in a calculation that infers that at least one ingredient in a functional solute has degraded in potency/effectiveness/functionality and subsequently needs adjusting as a result, thus impacting the dynamics of the mixed beverage itself, as opposed to making a gross adjustment accounting for the vessel. It is reasonable that in most cases, both approaches would be deployed to complement one another. Thus, the system would make a general adjustment for an initial dispensing event, and then upon the creation of the mixed beverage, the dispensing system would adjust the beverage to maintain key functional aspects of a degradable ingredient or ingredients.

A valuable element of this embodiment is found in the impact it would have on the supply-chain and storage of functional ingredients. The present approach necessitates the destruction of products that no longer contain the stated daily-values (DV) of a key ingredient or ingredients. This is especially pronounced in FDA regulated vitamins and supplements, whereby a product with 80% DV of Vitamin-E (as an example) would be out of compliance, should the actual DV in a serving fall outside of an acceptable range. In the case where the embodiment of the present disclosure is implemented effectively, the data underlying the system would inform the dispensing mechanism of this degradation, and thus, seamlessly adjust for it. The result being a post-mix beverage of identical functional characteristics, independent of component-level degradation in the additive vessel/s. The embodiment of the present disclosure subsequently enables for significantly decreased waste of products subject to degradation that might render them unsellable despite their ultimate consumable, sanitary state.

In another embodiment, the portable container might leverage onboard sensors such as Near Infrared Spectroscopy (NIRS) within the electromagnetic spectrum (generally considered between 700 nm and 2500 nm) In the preferred embodiment, Emitters and Receivers leveraging this technique directly extrapolate hydration, blood oxygenation levels, pulse/heart-rate levels, and blood sugar/glucose levels from a user's hand or lips, providing the device with highly accurate real-time data relevant not only to hydration guidance but also to the recommendation and/or deployment of the additives themselves. The monitoring of the biological markers via NIRS (blood oxygenation, pulse/heart-rate, heart rate variability, and hydration level (absolute tissue saturation, or $StO_2$)) serves a two-fold purpose for providing insight towards dispensing recommendations based upon existing biological state, as well as to track the users' reactions (or lack thereof) to specific ingredients. In the preferred embodiment, NIRS techniques are leveraged as they require little to zero preparation of any sample, and also do not require direct measurement of a mass or liquid. The NIRS spectra in the preferred, and more efficient embodiment does not require a direct process and extrapolation of the spectra, instead, it requires that the spectra be processed and compared against a library of known spectra accounting for distinctive features of targeted variables. Preferred techniques include Partial Least Squares (PLS), PLS Regression, and Principal Components Analysis. NIRS technique emitters and/or receivers are mounted in such a way as to monitor the hand of the user, on the portable beverage container, and/or for the lips of the user by placing the emitters and/or receivers on the drinking spout, oriented in a way to obtain data from the capillary bed on the inside wall of the lower lip, in the ideal embodiment. One learned in the art will understand that identical or equally insightful results could be produced with differing placement of such a system.

Furthermore, this aforementioned real-time data would be associated with activities, locations, and/or environmental conditions, identifying validity/invalidity in associated data sets with wearable technology devices and or other activity and/or physiological data trackers or monitoring devices. For instance, the sensors might detect a higher than normal dehydration rate and/or electrolyte loss-rate associated with a specific activity, thus developing the relevant feedback loop to recommend a more precise hydration protocol and/or additive recommendation/purchase/dispense cycle.

In yet another embodiment, the portable container might leverage onboard sensors to monitor the inflammatory response of the user to correlate metabolic reaction/response to various ingredients. One with an ordinary understanding of the art will understand that other bio-markers and/or physiological data points could be measured or otherwise monitored, and that such bio-markers and/or data points could be measured or otherwise monitored through a variety of sensor and/or data collection techniques or implementations. Such approaches might include galvanic skin response, heart-rate, temperature, absolute tissue saturation, oxygen saturation, blood-pressure, and the like, depending on what health aspects are being evaluated, and which additives and/or substances are being evaluated, different approaches, techniques, sensors, and/or data sets might be considered. Such a system might then operate to identify nascent, or previously unidentified allergies and/or sensitivities.

Furthermore, in a similar fashion, monitoring the feedback loop between additives consumed and/or logged food, and/or the aforementioned in isolation or combination, against physical activity in a fitness sense, in aggregate, would allow for the system to identify or otherwise make recommendations as to what additives, foods, and the like contribute most effectively to an individual's performance and health, whether correlated and/or extrapolated by fitness data, by sleep data, by self-reporting via the portable container, and/or by a peripheral device (e.g. a user application on a mobile device, etc.) In accordance with the aforementioned, the data loop associated with the device is itself a refinement engine for a recommendations platform for the discovery, recommendation, purchase, dispensing, and/or consumption of additives and/or substances dispensed, tracked, or otherwise utilized by the overall system described herein, these recommendations might be further compared or otherwise evaluated against subsequent use-cases, further refined by user characteristics in the aforementioned, thereby identifying false-positives, false-negatives, true-positives, and true-negatives with regard to recommendations and/or predictions against known data.

In another embodiment, the portable container might leverage the capabilities of both the device itself, and the supporting data and network mechanisms to adjust the functional elements of additives and/or beverage products, within contexts of user characteristics, user preferences, user use-cases, environmental conditions, and prior data associated with any of the aforementioned, oriented around predictive recommendations.

Figure 46A:
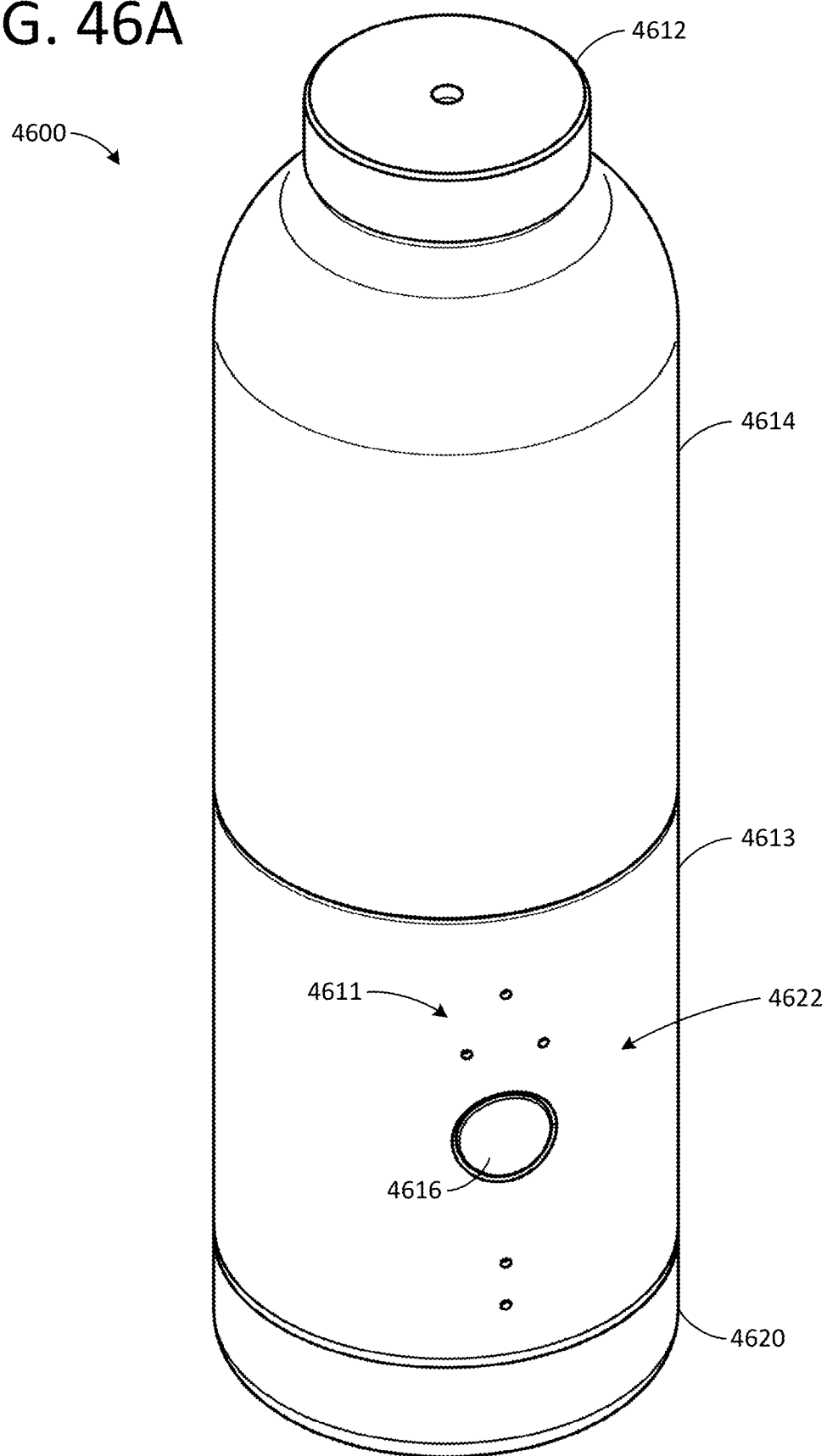
FIGS. 46A and 46B illustrate a beverage container assembly in accordance with one or more additional embodiments.
Figure 46B:
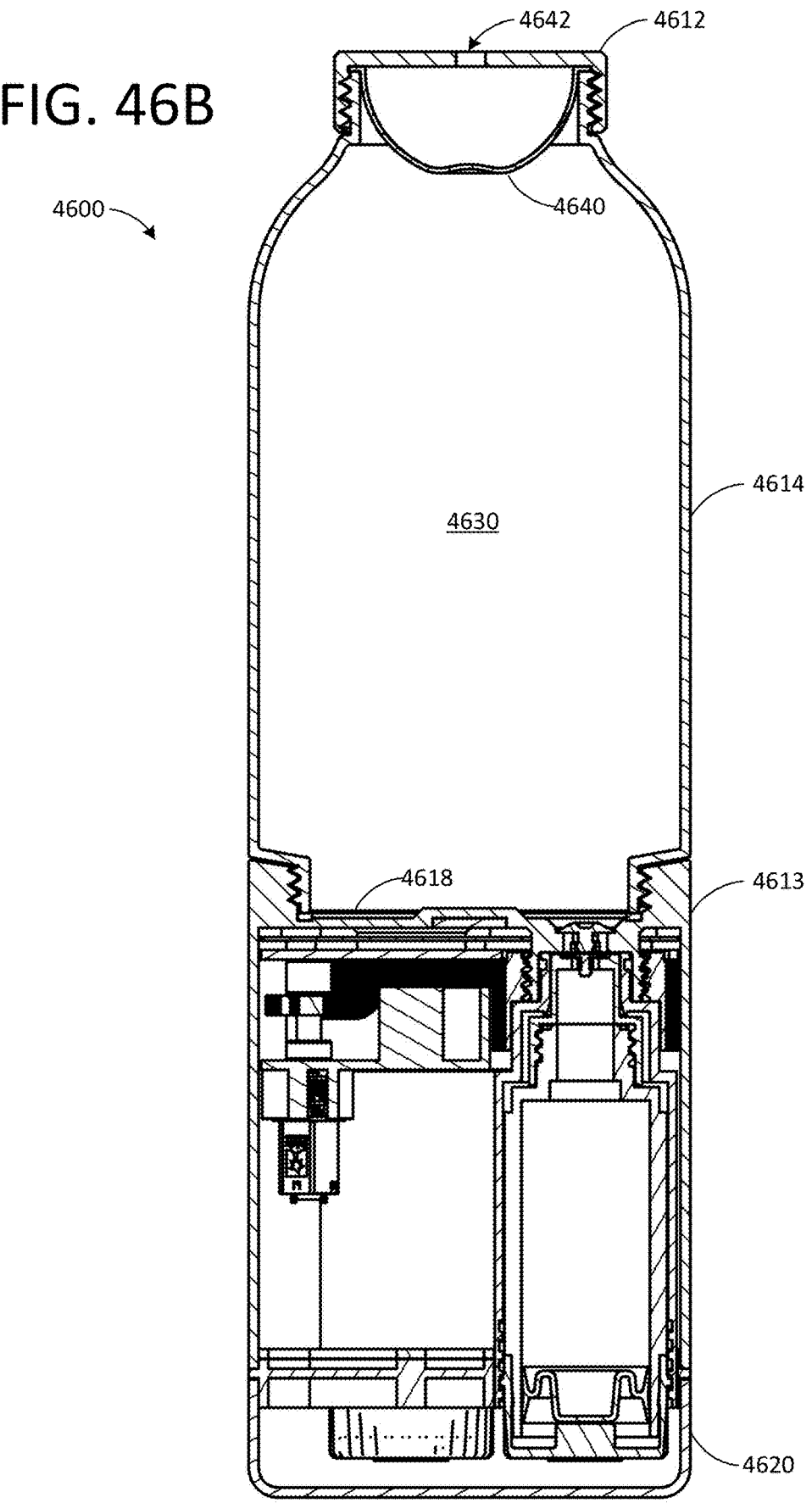

FIGS. 46A and 46B illustrate a beverage container assembly 4600 in accordance with various embodiments that will be shown in further detail in subsequent FIGS. 47-55 and the corresponding further description that follows. As will be understood by one skilled in the art, the various features and functionality described above and elsewhere in this disclosure can be applied, combined and used in conjunction with the container assembly 4600 in accordance with the various embodiments described below.

FIG. 46A illustrates an isometric view while FIG. 46B illustrates a cross section cutaway view of the beverage container assembly 4600. The beverage container assembly 4600 includes a beverage chamber housing 4614, which forms a portion of a chamber 4630 to contain a beverage. The beverage chamber housing 4614 can be configured with an open threaded base that threads on to a top end of a dispensing assembly 4613. A top portion of the dispensing assembly 4613 can include a platform 4618, which can form a bottom half of the chamber 4630 to contain the beverage. The dispensing assembly 4613 can house containers of additives to be dispensed into the chamber 4630, a dispensing mechanism configured control the addition of the additives, and electronics configured to control the dispensing mechanism. A removable base cover 4620 can be configured to thread on to and off of a bottom end of the dispensing assembly 4613 in order to provide access to insert and remove containers of additives. Consistent with the description above, each of these containers of additives will be referred to below as an additive vessel 4802 (see FIGS. 48A, 49A and 49B).

The container assembly 4600 can include a removable cap 4612, which, in the illustrated embodiment, seals a top opening of a beverage chamber housing 4614 to complete the chamber 4630. The cap 4612 can be configured to thread or snap on to a top end of the beverage chamber housing 4614. Referring to FIG. 46B, in one embodiment, the cap 4612 includes a compressible bladder 4640 formed of silicone or other suitable rubber, that allows for deformation of the bladder so as to accommodate the addition of liquid additives into the chamber 4630 by the dispensing assembly 4613. The cap 4612 also includes an air passageway 4642 to allow air to escape from behind the bladder 4640 so that the bladder can compress to accommodate the addition of the liquid additives.

Referring to FIG. 46A, the dispensing assembly 4613 can be further configured with a user interface 4622, which can include a display 4611 and one or more user input buttons 4616. In the illustrated embodiment of FIG. 46, the display 4611 includes five LEDs, with three LEDs in a triangle that can be configured to indicate selection of one of three additive vessels. Another LED can be configured to indicate a power on or wake up condition of the dispensing assembly, and yet another LED that can be configured to indicate that a dispensing of an additive to the beverage chamber housing 4614 has been selected. The LEDs may use specific lensing or may be embedded behind a micro-perforated material to abstract the user from the physical components of the LEDs. In one embodiment, a single user input button can be configured as a multi-function button to perform different actions depending on the amount of pressure applied to it by the user, by duration of presses and/or by quantity of presses. The button can also be configured to accommodate partial or complete depression of the differentiated by a perceptible detent or click in order further provide varied functionality. The user interface can provide a means for the user to, for example, dispense an additive from an additive vessel or display the current battery level of the system and apparatus.

Figure 47:
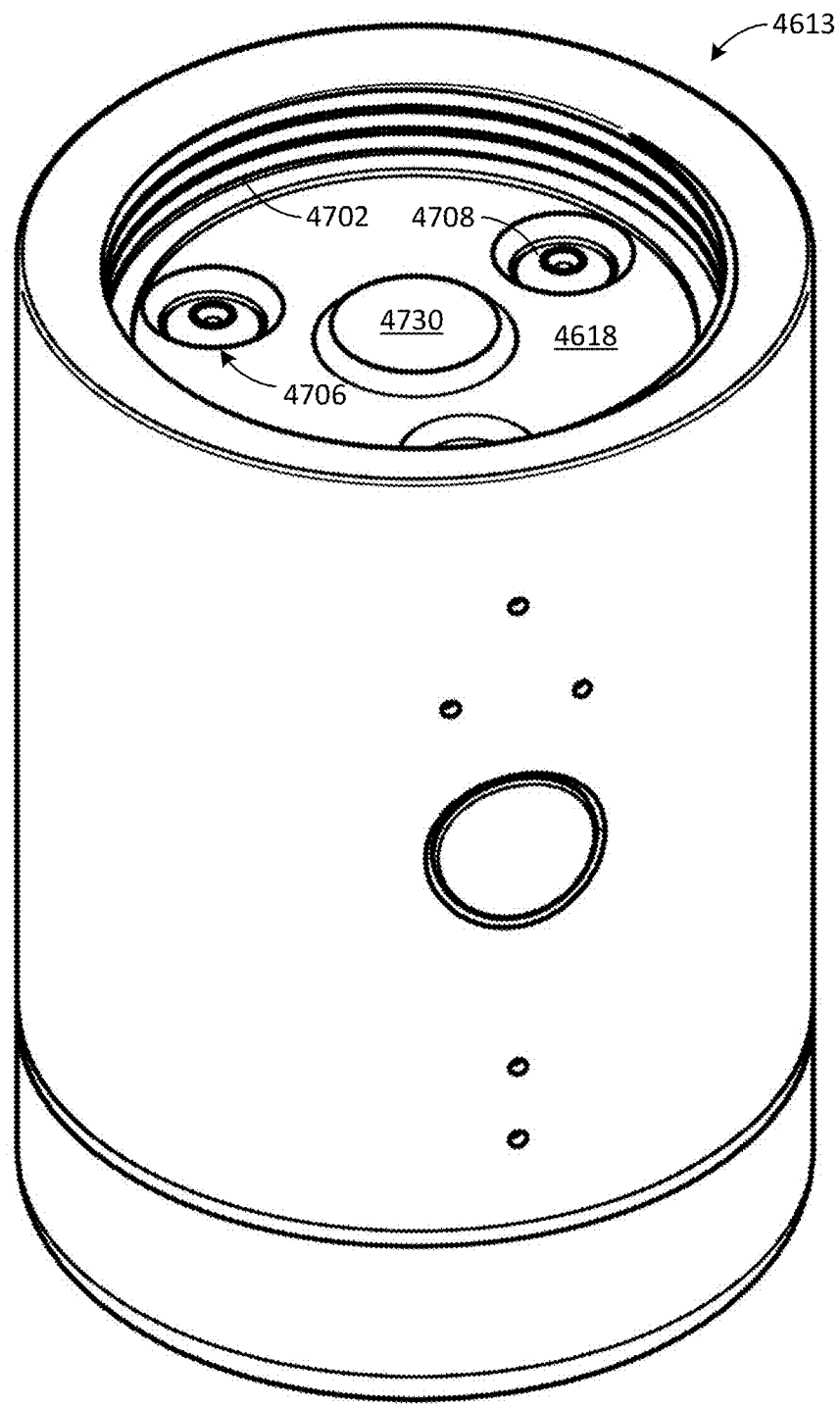
FIG. 47 illustrates a view of a dispensing assembly with a beverage chamber housing removed.

FIG. 47 illustrates a view of the dispensing assembly 4613 with the beverage chamber housing 4614 removed. A top portion of the dispensing assembly 4613 includes an annular wall with threads 4702 that engage with matching threads on the beverage chamber housing 4614. The top portion of the dispensing assembly 4613 can also include the platform 4618 to form a base for the beverage chamber housing 4614 in order to contain the beverage within the chamber 4630. The platform 4618 can include one or more outlet ports 4706 through which additives are added to the beverage in the chamber, and in the illustrated embodiment, three such ports are shown. In one embodiment, each port 4706 can be sealed by a one-way valve 4708 (e.g. an umbrella valve of rubber or silicone) that permits one way passage of a liquid additive into the chamber. As will be discussed below, each one-way valve 4708 can form part of a pumping mechanism 5002 (FIG. 50) that injects liquid additives into the chamber. In one embodiment, the pumping mechanism 5002 is a reciprocating positive displacement pump.

FIG. 47 also illustrates an ultrasonic fluid level sensor 4730 disposed on or within the platform 4618. In accordance with one embodiment, the fluid level sensor 4730 uses round trip time for a reflected sound wave to measure the height of a fluid or water column within the chamber 4630 and thereby infer fill volume.

Figure 48A:
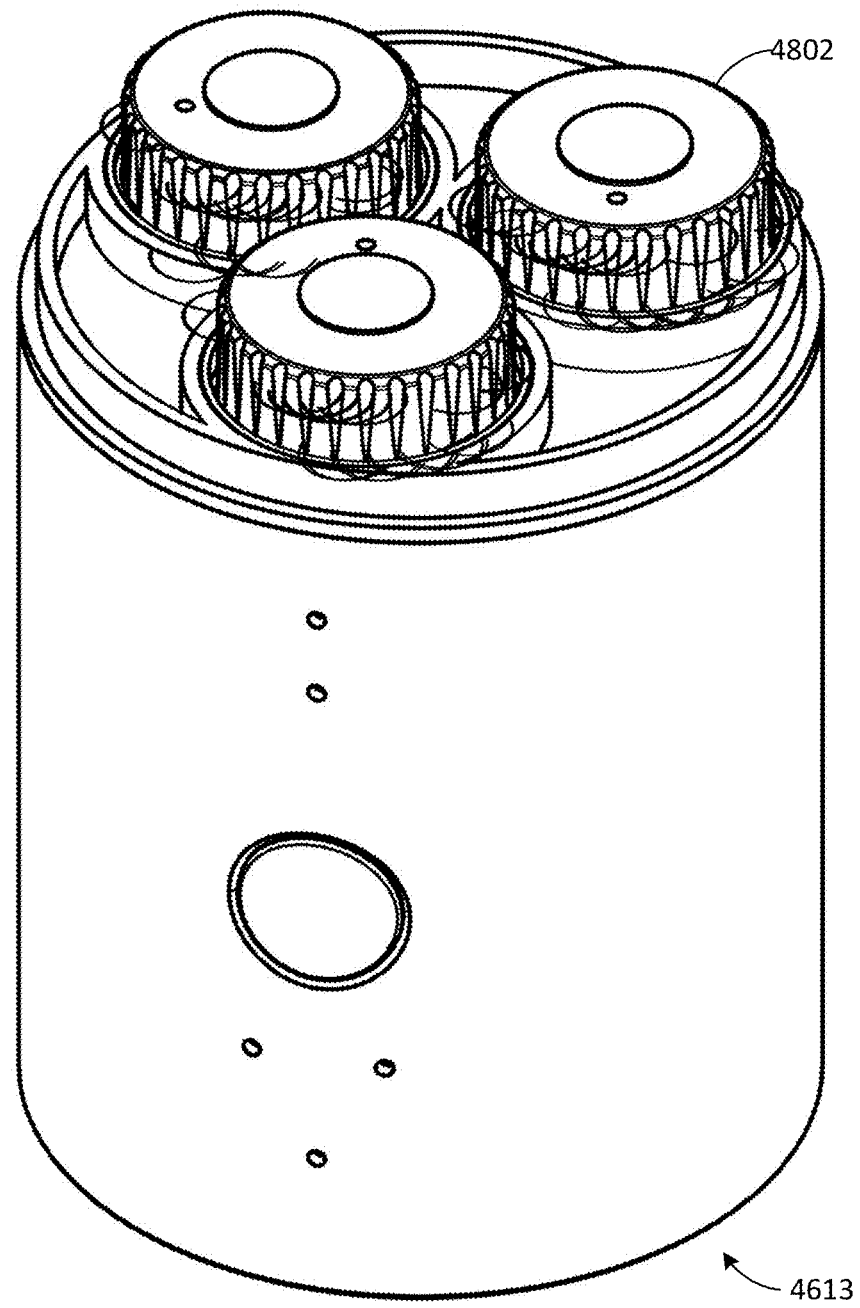
FIGS. 48A and 48B illustrate a bottom view of the dispensing assembly with a base cover removed.
Figure 48B:
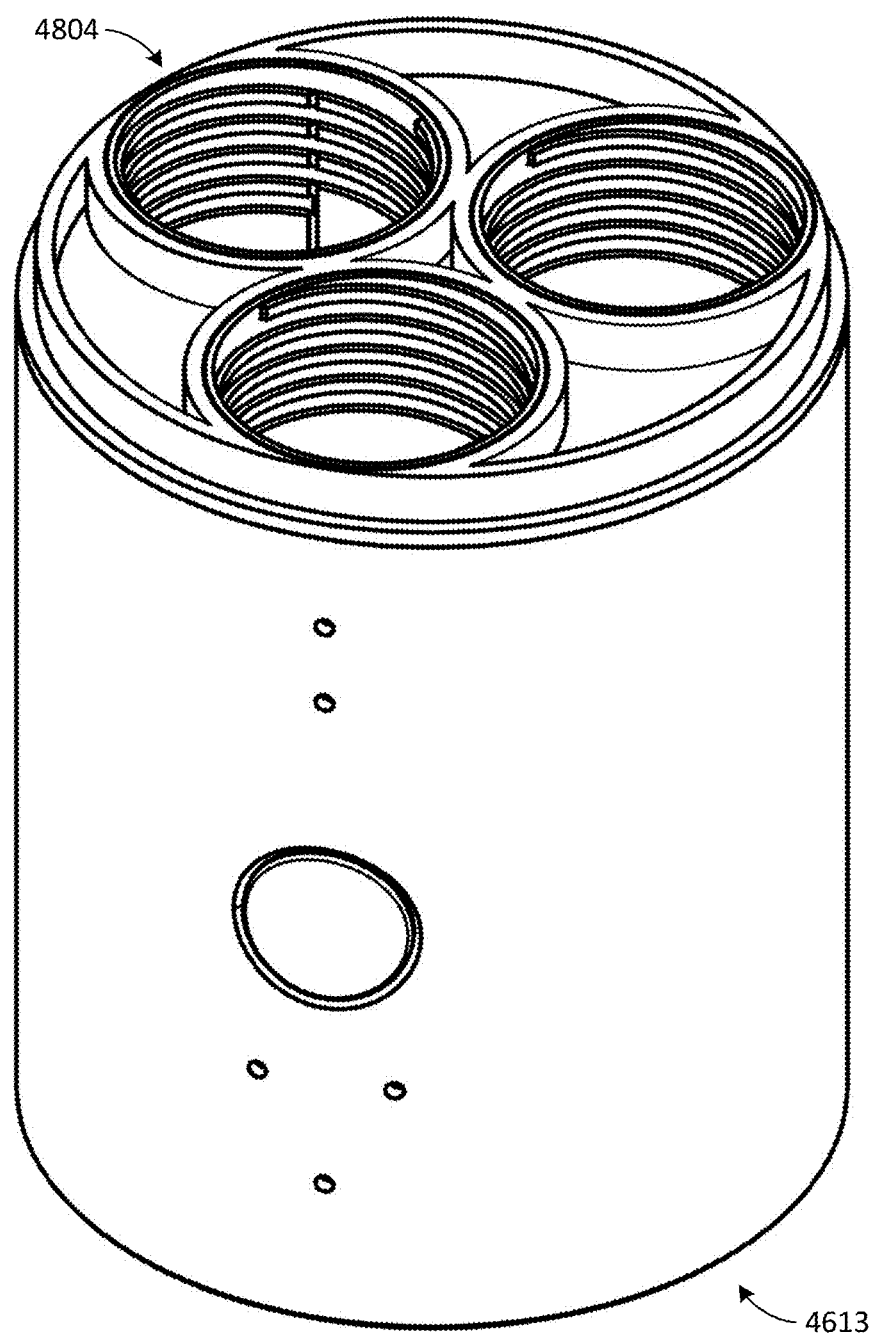

FIGS. 48A and 48B illustrate a bottom view of the dispensing assembly 4613 with the base cover 4620 removed. FIG. 48A shows the ends of each of three additive vessels 4802 that are threaded into three corresponding receptacles or apertures 4804 shown in FIG. 48B. While the term "receptacle" is used in the description that follows, for the purpose of consistency with various embodiments described above, the receptacles 4804 can also be referred to as "apertures".

It should be noted that FIG. 48A shows, near the vessels 4802, a number of semicircular artifacts that could not be easily removed from an available CAD rendering. These artifacts do not form any part of the illustrated embodiment and should be ignored by the reader.

Figure 49A:
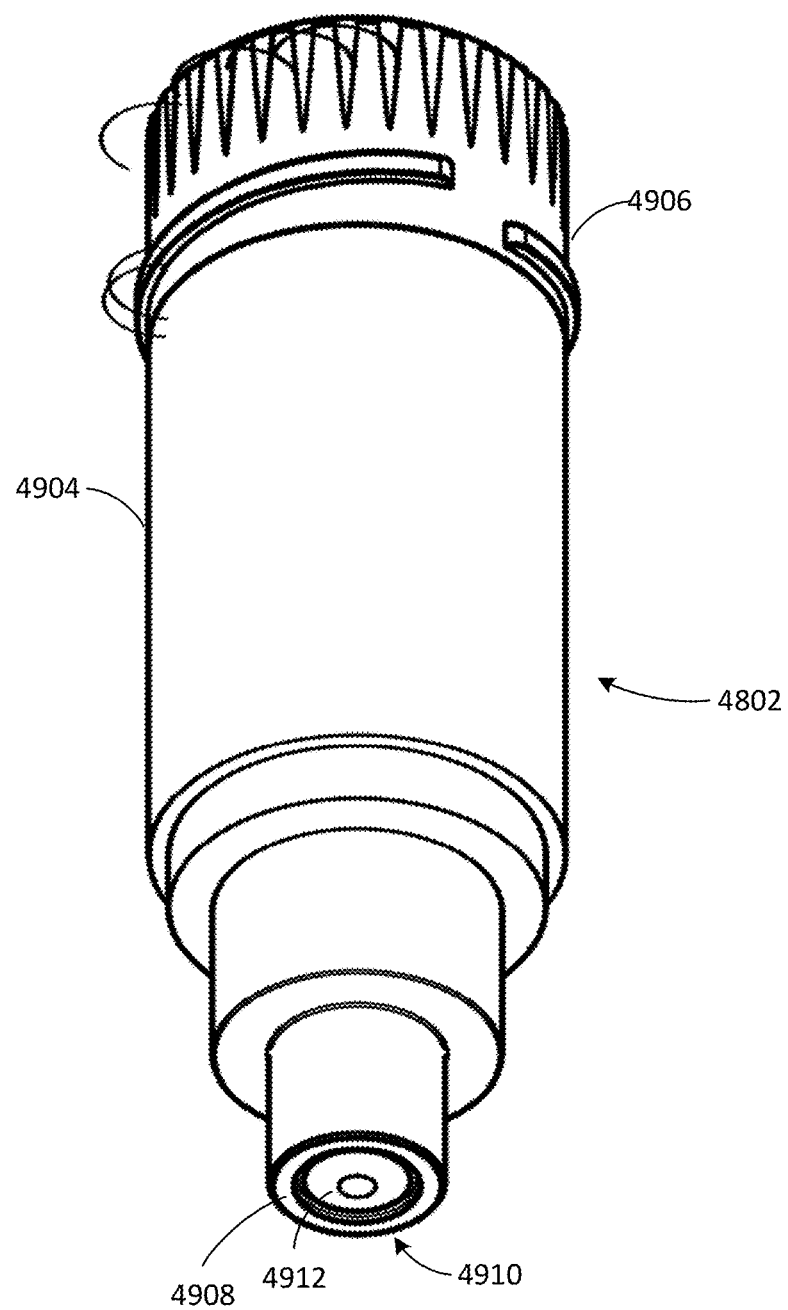
FIGS. 49A and 49B illustrate an isometric perspective view and a cross section cutaway view of an additive container in accordance with one embodiment.
Figure 49B:
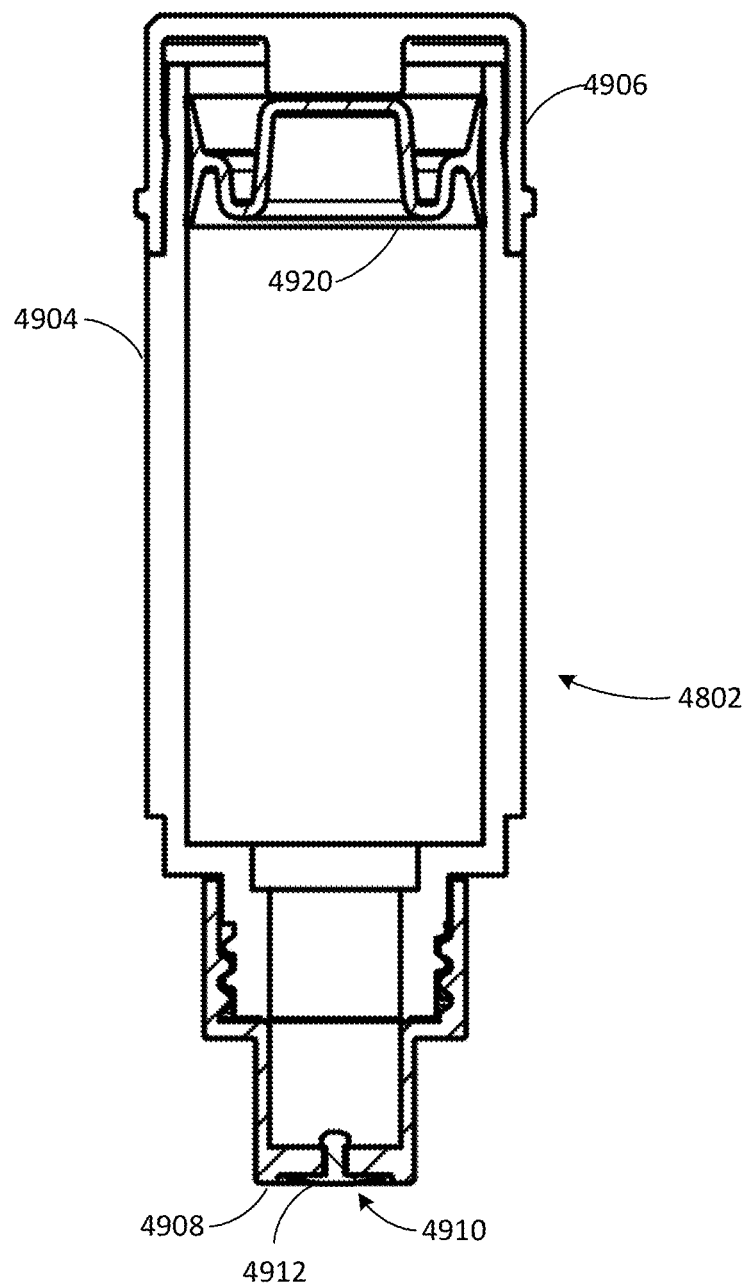

FIGS. 49A and 49B illustrate an isometric perspective view and a cross section cutaway view of an additive vessel 4802 in accordance with one embodiment. The vessel 4802 can include a housing 4904, which can be cylindrical in shape to fit into a corresponding cylindrically shaped receptacle 4804. At a proximal end, the housing 4904 can be covered with a threaded cap 4906, which snaps onto the housing 4904 and the threads of which also engage with receiving threads in a receptacle 4804 to lock the additive vessel 4802 in place within the dispensing assembly 4613. At a distal end, the vessel 4802 includes a piston head 4908 that includes a port 4910 that is capped by another one-way valve 4912 (e.g. an umbrella valve of rubber or silicone). The port 4910 and one-way valve 4912 function to permit additive to flow in only one direction from the vessel 4802 and into a pumping chamber 5011 of the pumping mechanism 5002 (FIG. 50).

Referring to FIG. 49B, a slideable plunger 4920 is disposed within an interior portion of the housing 4904. The interior of the housing and the exterior of the plunger can be a matching cylindrical shape such that the plunger can slide along the length of the housing, from the proximal to the distal end of the housing as additive contained within the housing is dispensed from the vessel. The plunger is preferably formed of soft plastic such as LDPE that seals against the interior of the housing and moves so that no air is allowed into the vessel 4802 during dispensing of the additive.

Figure 50:
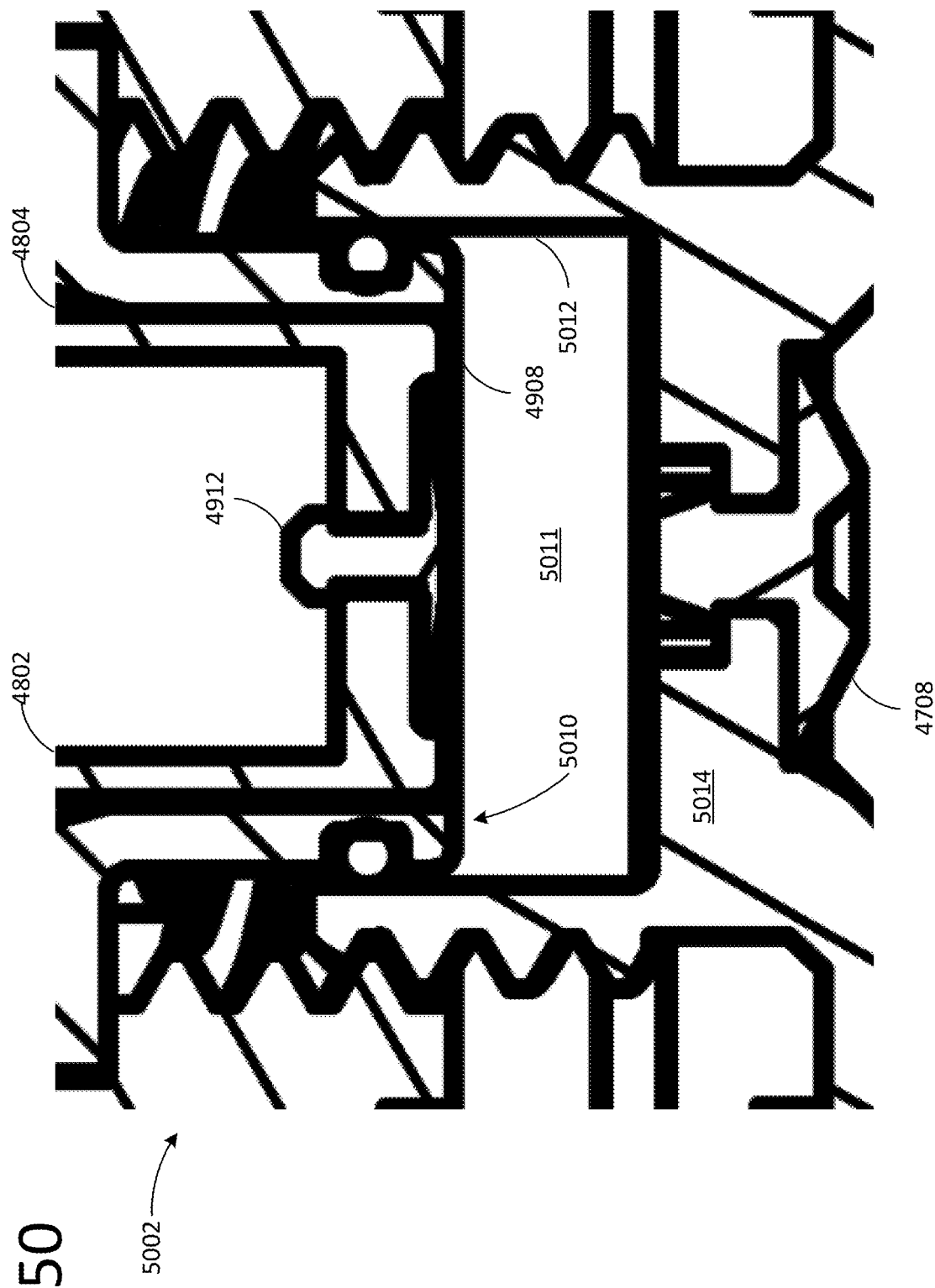
FIGS. 50 and 50A-C illustrate a cutaway cross section of the dispensing assembly showing the operation of a pumping mechanism for an additive container.
Figure 50A:
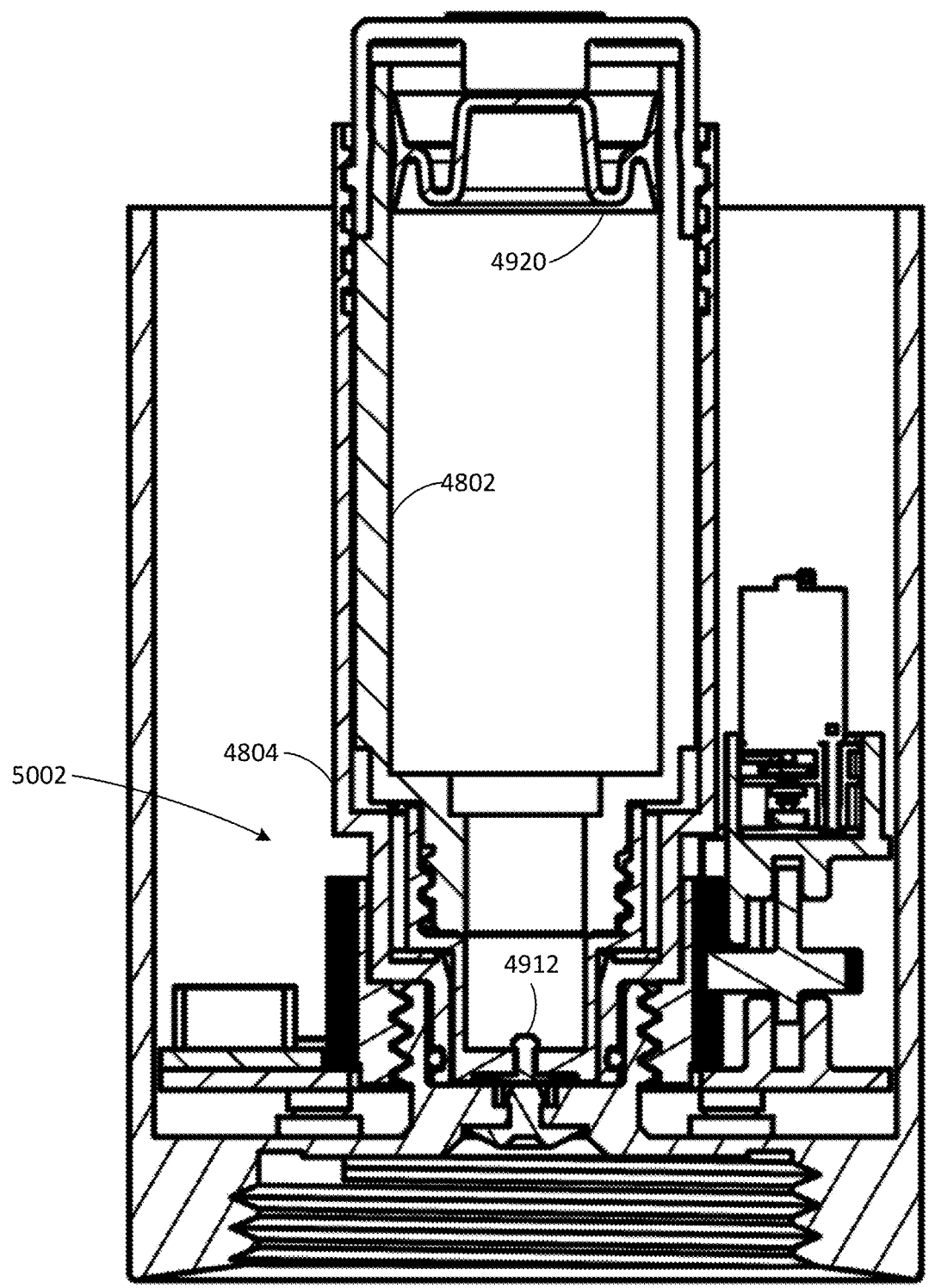
Figure 50B:
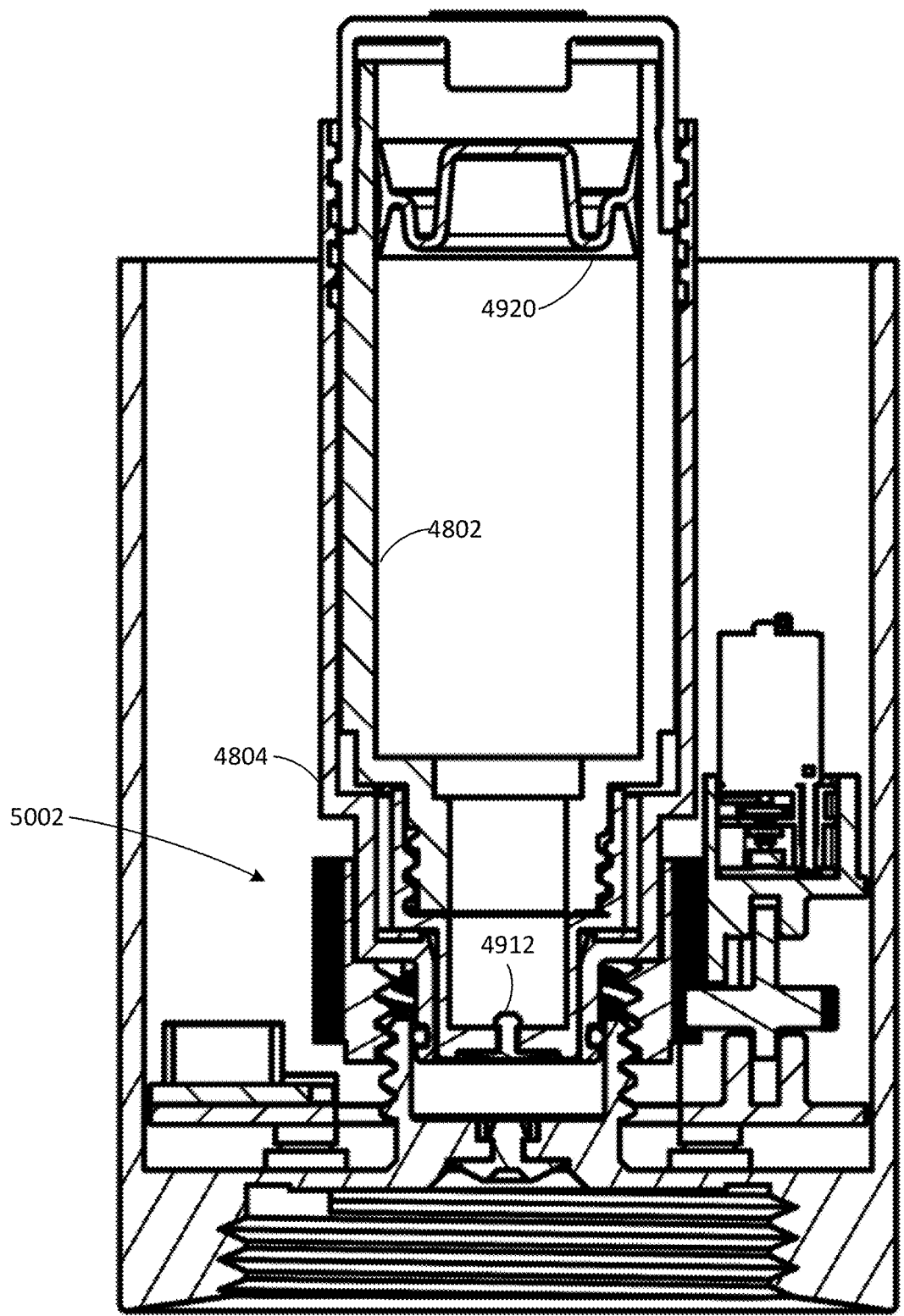

FIGS. 50 and 50A-C illustrate a cutaway cross section of the dispensing assembly showing the operation of the pumping mechanism 5002 for an additive vessel 4802. FIG. 50 shows an enlarged view of a portion of FIG. 50B showing the pumping mechanism 5002 in a partially actuated state. As illustrated, the vessel 4802 is threaded into the receptacle 4804 such that the piston head 4908 of the vessel 4802 engages with a housing of the receptacle to form a piston 5010. The piston 5010 can slide back and forth within a pumping chamber 5011 formed by a cylinder 5012 of a pump housing 5014. As noted above, the piston head 4908 includes a one-way valve 4912 that permits flow from the vessel 4802 into the pumping chamber 5011. At an opposite end of the chamber 5011 from the piston head 4908, the second one-way valve 4708 permits liquid additive to flow from the pumping chamber 5011 into the beverage chamber as the piston 5010 moves forward in the cylinder 5012.

Figure 50C:
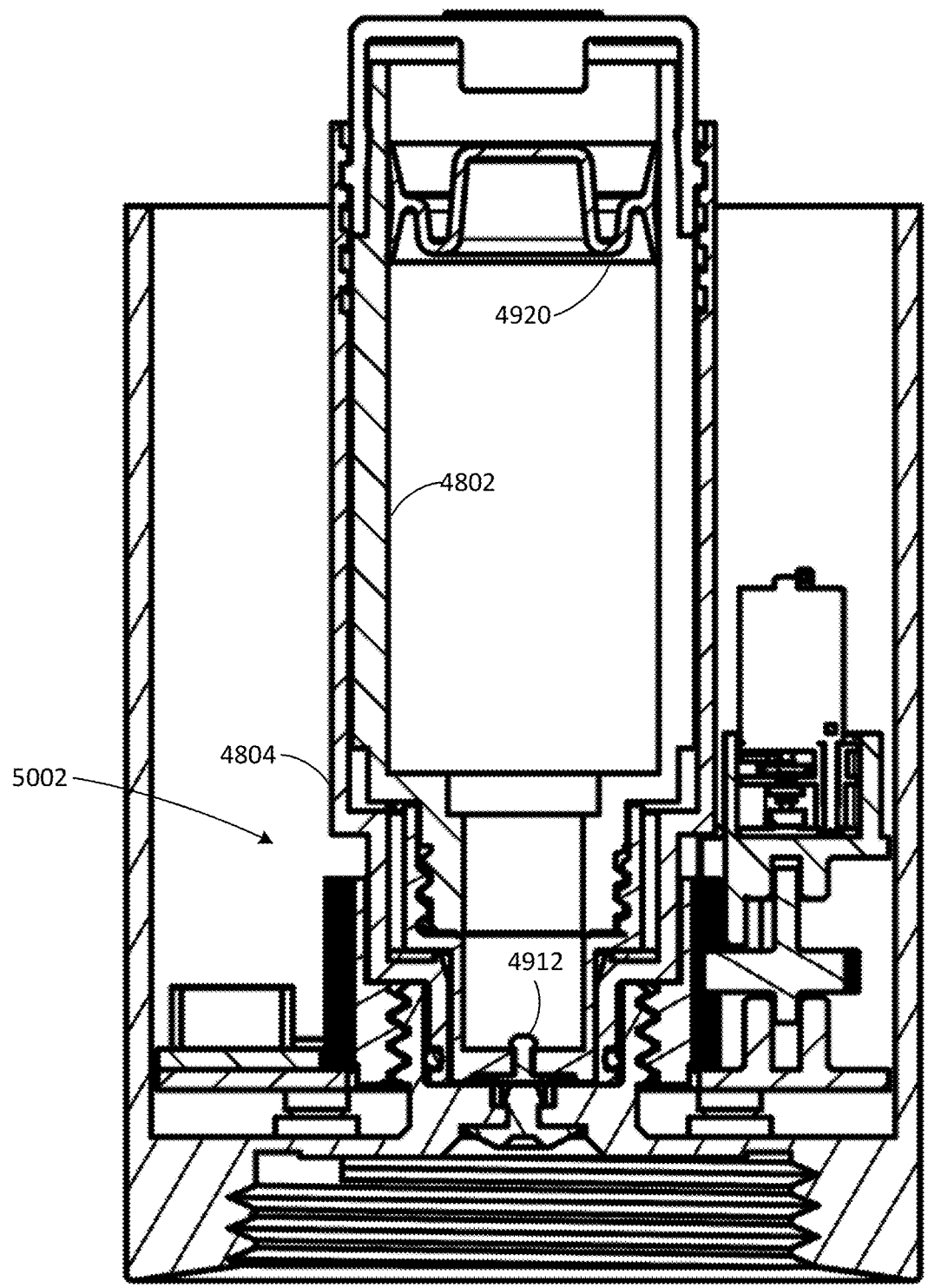

FIG. 50A shows the receptacle 4804 and piston 5010 in a starting position and the plunger 4920 of the additive vessel 4802 in an initial position prior to any additive being dispensed from a full vessel. As shown in in FIG. 50B, the piston 5010 is withdrawn, and the one-way valve 4708 at the outlet port 4706 blocks fluid flow in the reverse direction, creating the vacuum which draws fluid from the additive vessel 4802 through the one-way valve 4912 into the pumping chamber 5011. It should be noted that in FIG. 50B, the plunger 4920 has moved from its staring position illustrated in FIG. 50A to accommodate fluid flow from the vessel 4802 into the pumping chamber 5011. As shown in FIG. 50C, the piston 5010 is driven to back to its starting position, compressing the fluid within the chamber 5011 and forcing it through the one-way valve 4708 at the outlet port 4706 and into the beverage chamber 4630. The one-way valve 4912 blocks the flow of fluid from returning into the vessel 4802. Positive pressure, accordingly, is produced in this compression stoke, dispensing the contents of the pump chamber through the outlet port 4706 into the beverage chamber 4630.

The volume dispensed during a single piston stroke can be modulated linearly by modifying the piston stroke length. Multiple piston strokes can be used to dispense larger quantities. By design, the volume of the pumping chamber can be configured to be as small as practically possible when the piston 5010 is in the starting position to avoid wasting additive liquid when a depleted additive vessel is withdrawn from the receptacle.

Figure 51A:
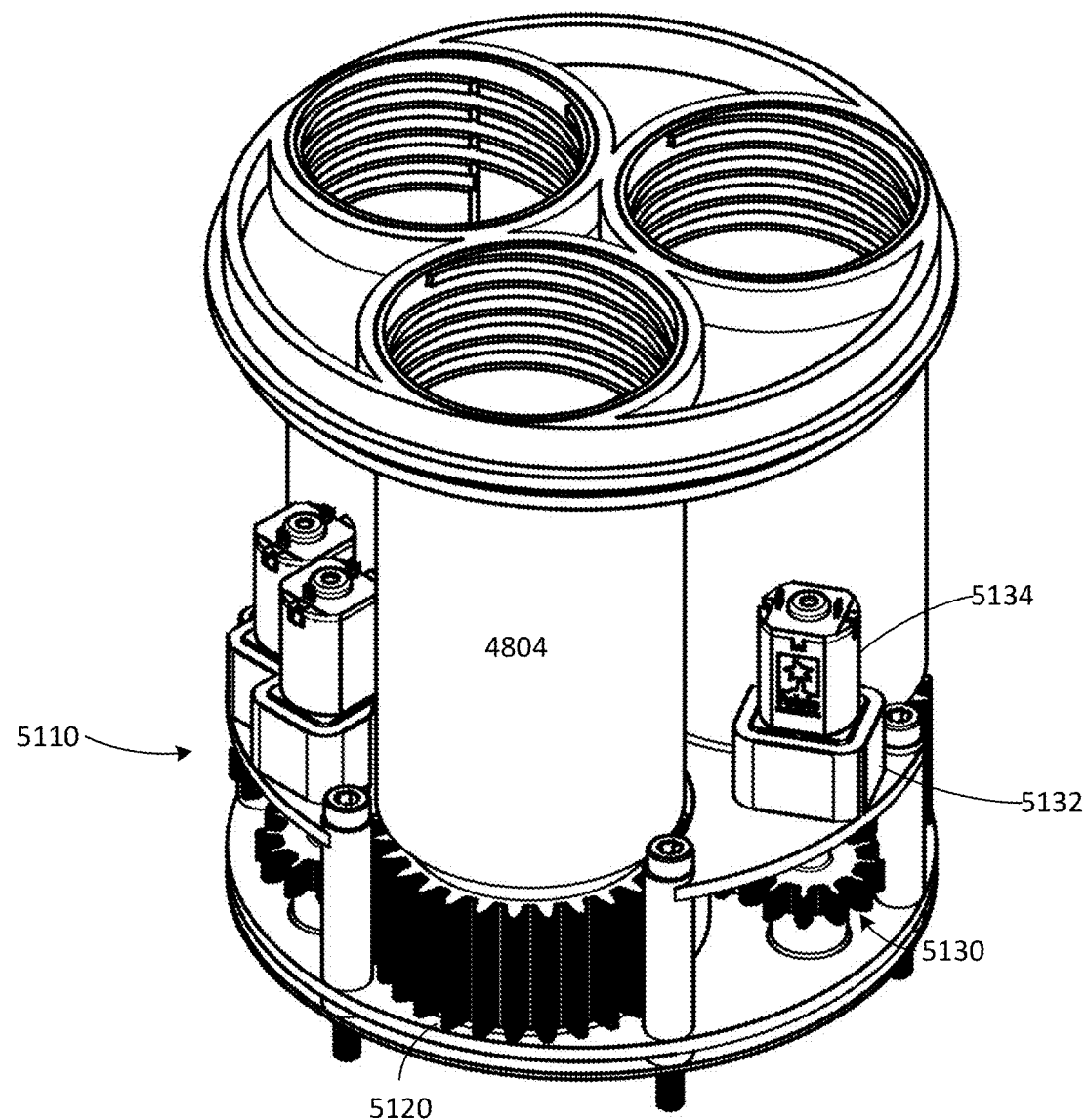
FIGS. 51A and 51B illustrate views a drive mechanism for actuating a receptacle and associated piston of a pumping mechanism.
Figure 51B:
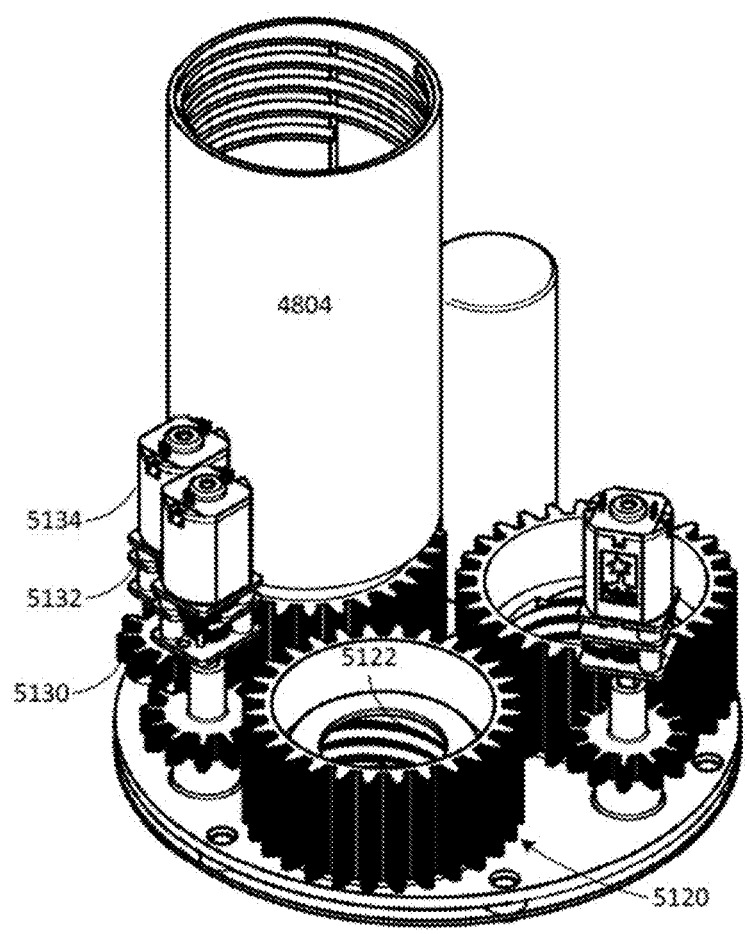

FIGS. 51A and 51B illustrate views a drive mechanism 5110 for actuating the receptacle 4804 and associated piston 5010 of the pumping mechanism 5002. FIG. 51A illustrates an internal perspective view of the dispensing assembly 4613 without an outer cover. FIG. 51B illustrates an additional internal perspective view of the dispensing assembly 4613 without further structure removed to better illustrate certain aspects of the drive mechanism 5110. As illustrated, each receptacle 4804 and its associated piston 5010 (not visible in FIGS. 51A-B) is moved down and up by an internally threaded toothed ring 5120. A set of internal threads 5122 on each internally threaded toothed ring 5120 engage with a threaded extension 5210 (FIG. 52B) of the pump housing 5014. Each internally threaded toothed ring 5120, can be driven by a gear 5130, which in turn can be driven by an optional gearbox 5132, which in turn is driven by an electric motor 5134.

FIGS. 52A and 52B illustrate an elevation view of the drive mechanism with the receptacle in a starting position (52A) and in a withdrawn position (52B). As the toothed ring 5120 rotates, the internal threads 5122 cause the toothed ring to rise and fall on the threaded extension 5210 of the pump housing 5014. The receptacle, which can be snapped into or adhered to the toothed ring 5120, also therefore rises and falls with the toothed ring, causing the piston 5010 to move within the cylinder 5012. In accordance with one embodiment, the threads on the toothed ring 5120 and the threaded extension 5210 are a "fast" 4-start thread that cause the toothed ring 5120 to travel to full linear extension with 180 degrees of rotation. The threads can be configured to have an ACME profile or similar.

FIG. 53 illustrates a cross section of an internally threaded toothed ring 5120 engaged with a threaded extension 5210 (FIG. 52B) of the pump housing 5014.

Figure 54A:
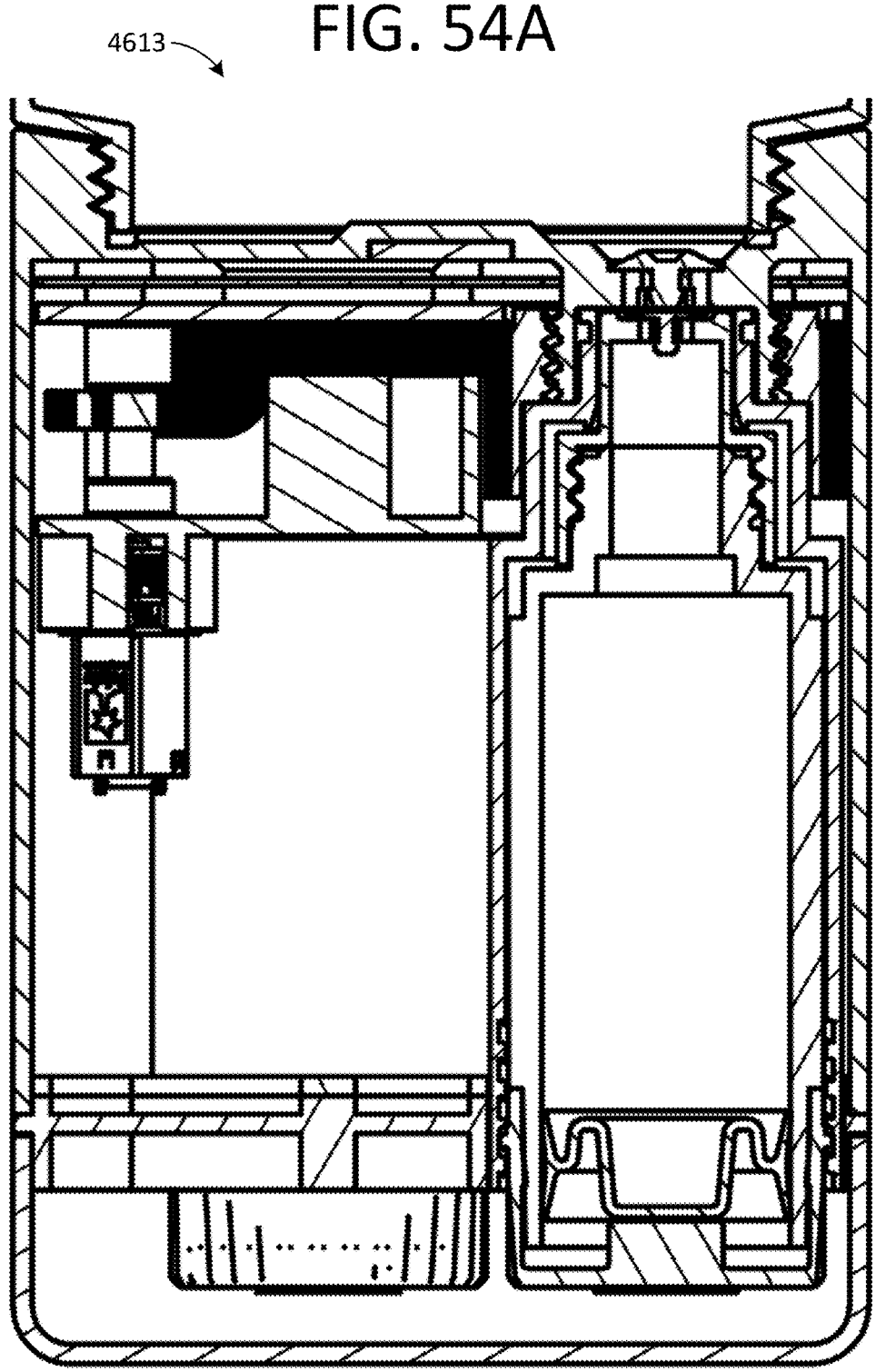
FIGS. 54A, 54B and 54C illustrate three cross sectional cutaway views of a dispensing assembly.
Figure 54B:
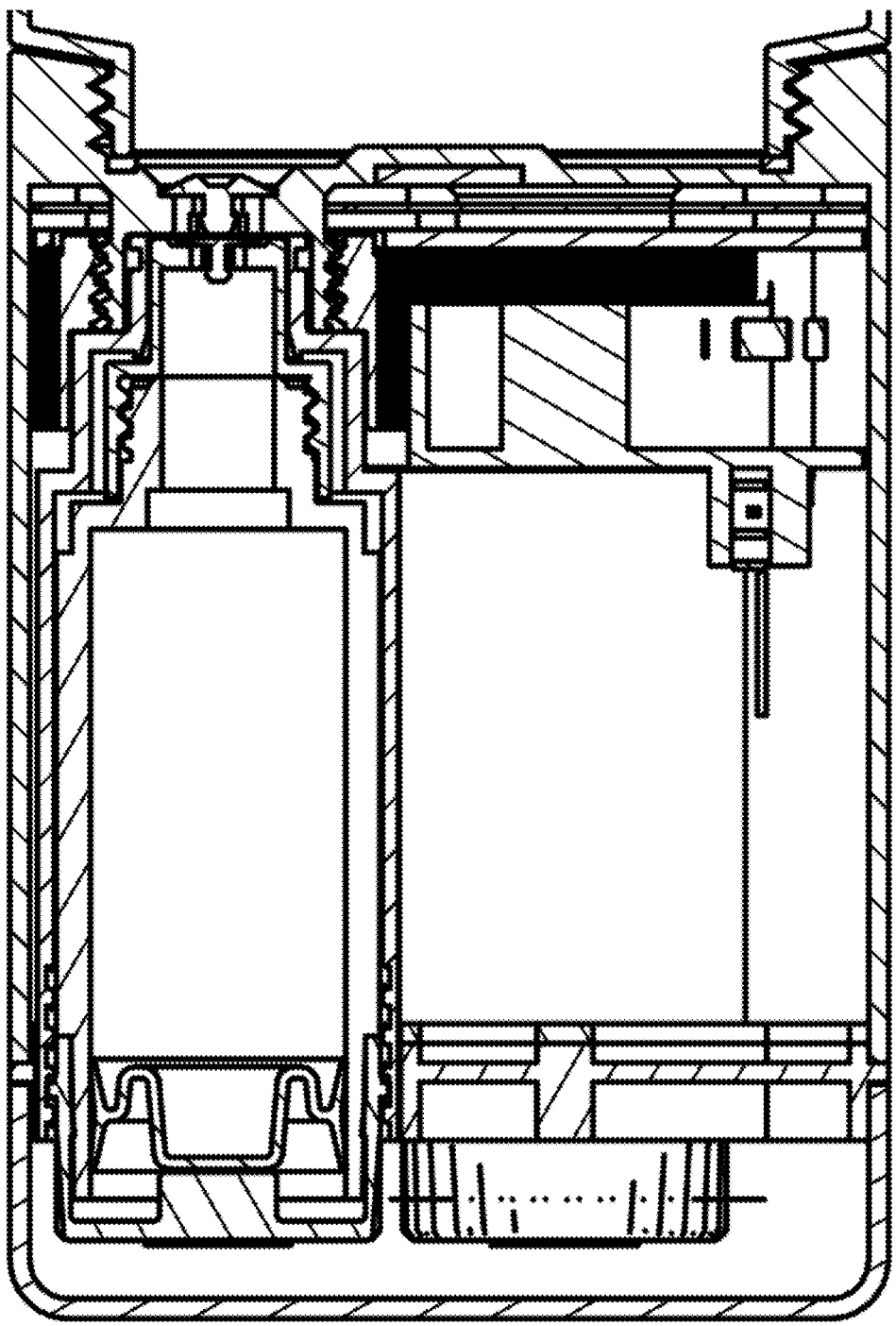
Figure 54C:
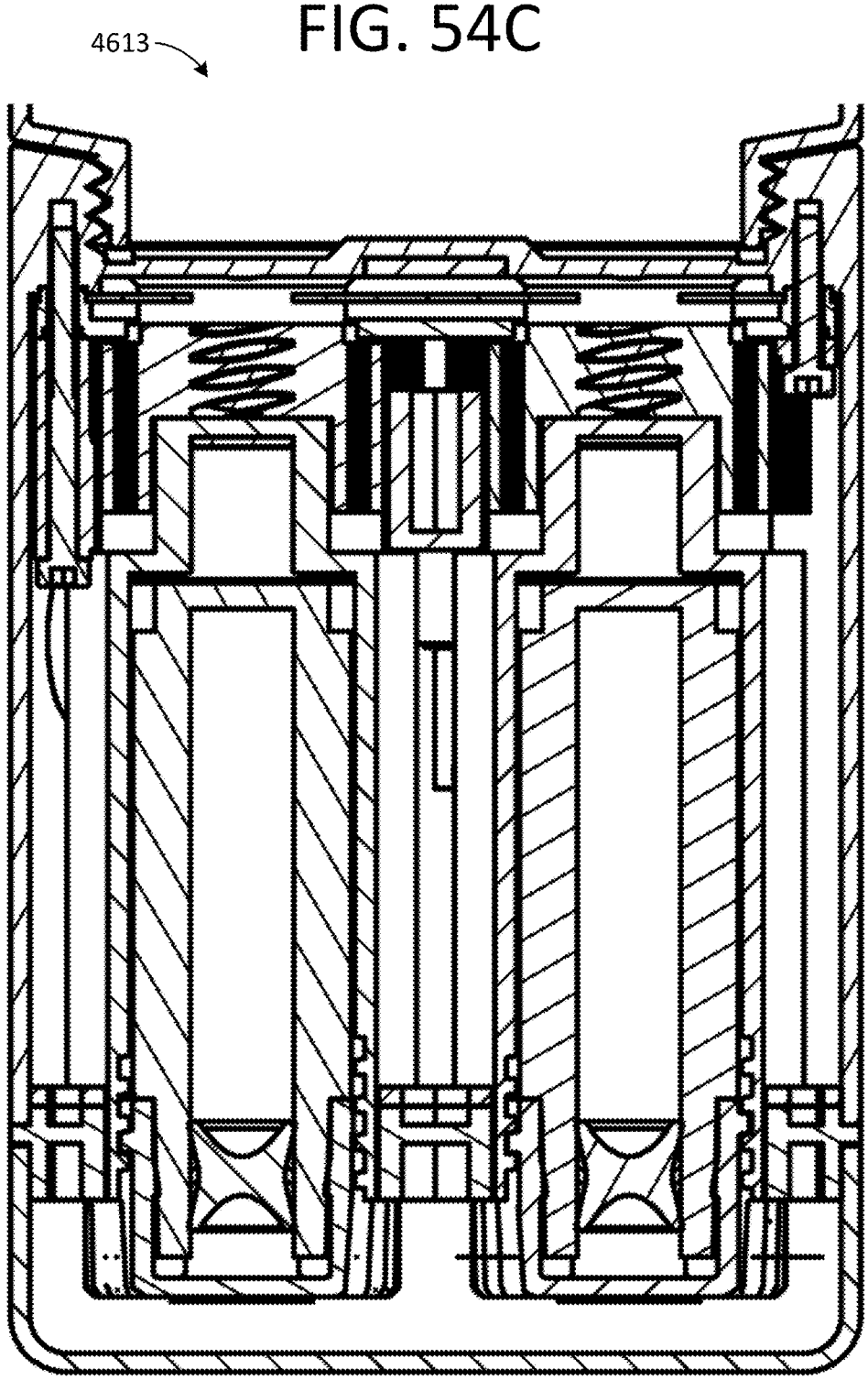

FIGS. 54A-C illustrate three difference cross sectional cutaway views of the dispensing assembly 4613.

Figure 55B:
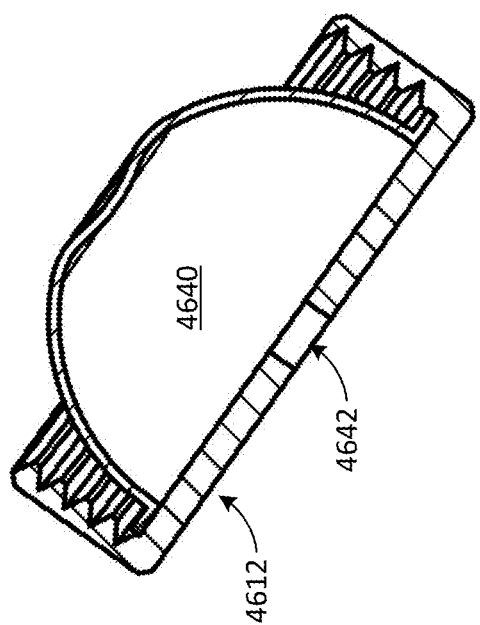
FIGS. 55A-B illustrate isometric and cutaway views of a removable cap.
Figure 55A:
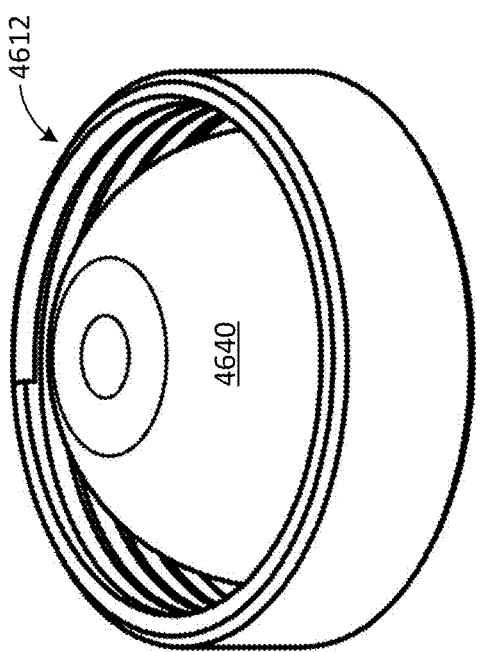

FIGS. 55A-B illustrate isometric and cutaway views of the removable cap 4612. As discussed above with reference to FIG. 46, in the illustrated embodiment, the cap 4612 seals a top opening of the beverage chamber housing 4614 to complete the chamber 4630. The cap 4612 can be configured to thread or snap on to a top end of the beverage chamber housing 4614. The cap 4612 includes a compressible bladder 4640 formed of silicone or other suitable rubber, that allows for deformation of the bladder so as to accommodate the addition of liquid additives into the chamber 4630 by the dispensing assembly 4613. The cap 4612 also includes an air passageway 4642 to allow air to escape from behind the bladder 4640 so that the bladder can compress to accommodate the addition of the liquid additives. As shown in FIGS. 55A-B, the bladder 4640 can be configured with a dimpled dome shape that yields an approximately linear resistance to deformation.

Figure 56:
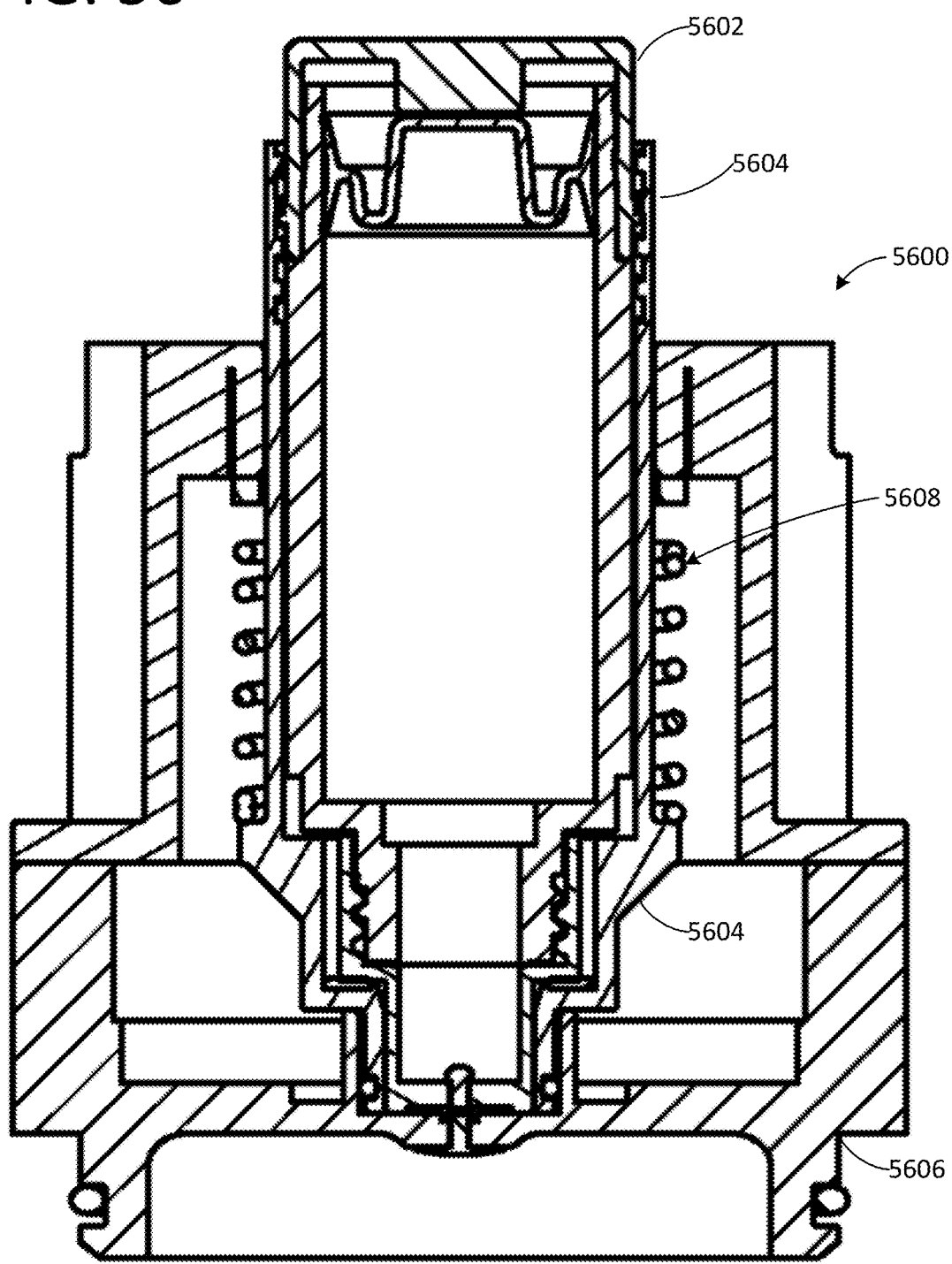
FIG. 56 illustrates a cutaway view of a pumping mechanism in accordance with one embodiment.

FIG. 56 illustrates a cutaway view of a pumping mechanism 5600 in accordance with one embodiment. Similar to the embodiments discussed above with reference to FIGS. 46-55, an additive vessel 5602 is received in a receptacle 5604, which engages within a pump housing 5606. Two one-way valves similarly work together with a sliding piston and cylinder to pump additive liquid through a pumping chamber. In the embodiment illustrated in FIG. 56, however, the receptacle 5604 can be actuated manually, by a user grasping and withdrawing the receptacle from the pump housing 5606, or by another mechanical means. The receptacle 5604 is withdrawn against pressure of a spring 5608, which is biased to press the receptacle back to its start position, such that when the receptacle is released, any additive fluid drawn into the pumping chamber is then automatically ejected into the beverage chamber.

Figure 57A:
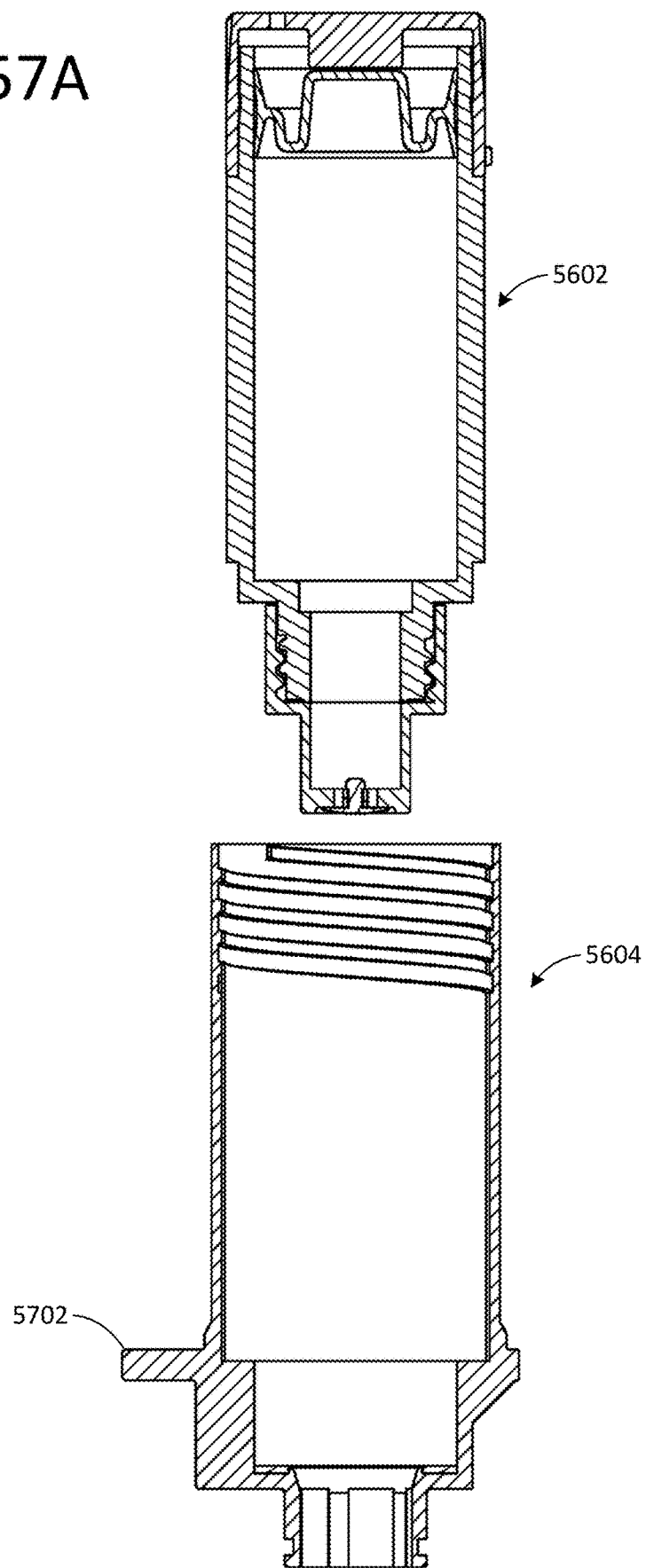
FIG. 57A illustrates a cutaway view of a receptacle of the embodiment of FIG. 56, but shown from a different perspective rotated 90 degrees around a vertical axis.

FIG. 57A illustrates a cutaway view of the receptacle 5604 of the embodiment of FIG. 56, but shown from a different perspective rotated 90 degrees around a vertical axis. The receptacle 5604 includes a tab 5702 that can be used either manually or actuated by a mechanism in order to withdraw the receptacle against the tension of the spring 5608 from the pump housing 5606. FIG. 57A also shows the additive vessel 5602 removed from the receptacle 5604.

Figure 57C:
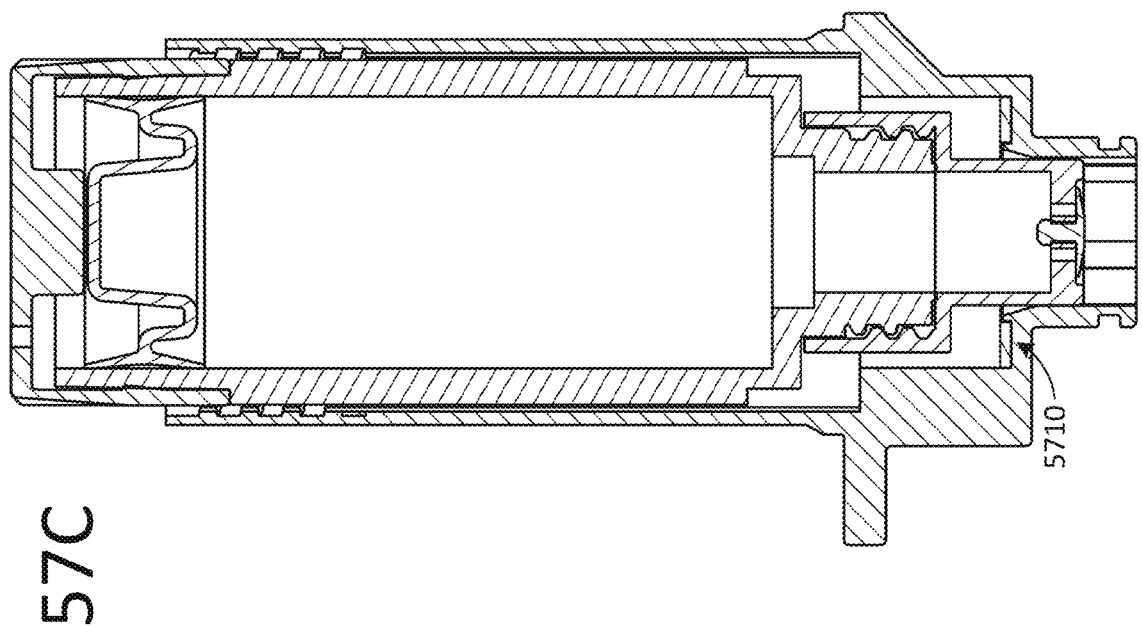
FIGS. 57B and 57C illustrate a seal placed in a shoulder portion of the receptacle that serves a vacuum breaker function as an additive container is withdrawn from the receptacle.
Figure 57B:
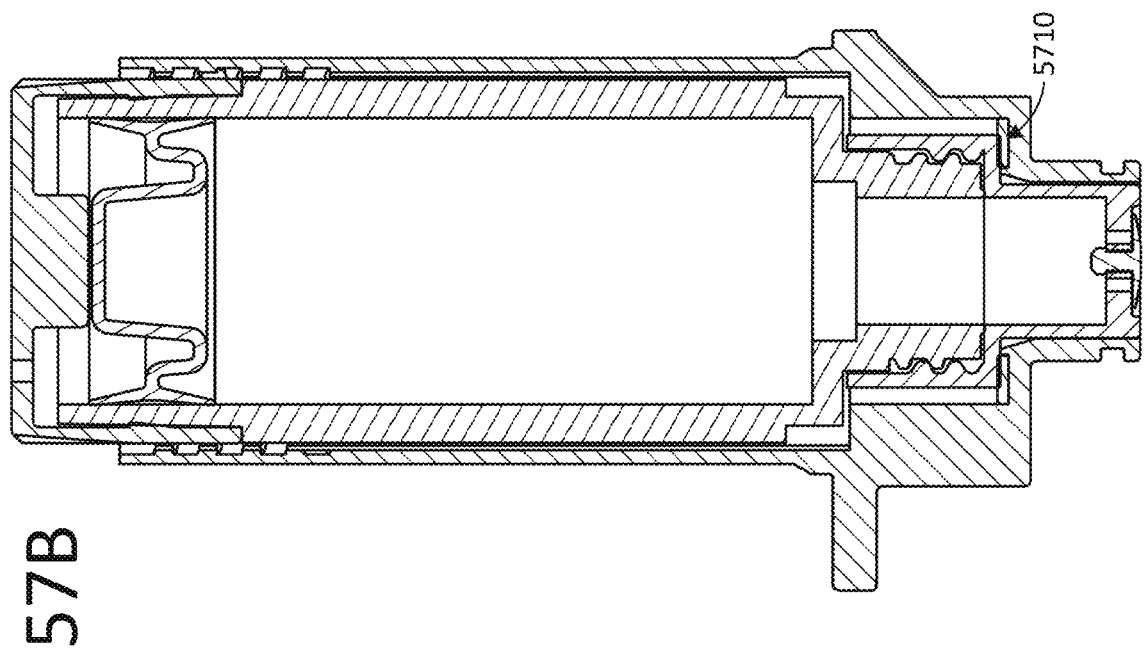

FIGS. 57B and 57C illustrate a seal 5710 placed in a shoulder portion of the receptacle 5604 that serves a vacuum breaker function as the additive vessel 5602 is withdrawn from the receptacle. Once the additive vessel 5602 is withdrawn even a slightest amount, the vessel no longer contacts the seal 5710 and therefore air is allowed to pass into the pumping chamber area as the vessel is withdrawn. If no air were allowed to pass into the pumping chamber, the action of withdrawing the vessel would create a vacuum that would suck additive fluid out of the vessel and into the now open pumping chamber.

Figure 58A:
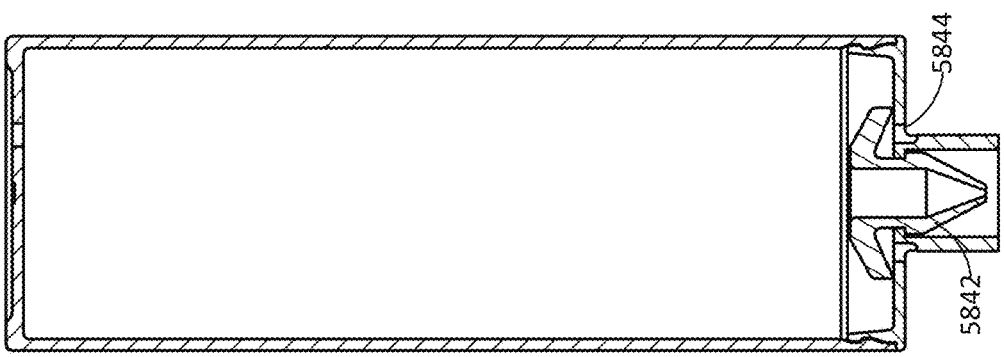
FIGS. 58A-D illustrate different configurations of containers, vessels or pods for liquid additives that can be used in accordance with various embodiments.
Figure 58B:
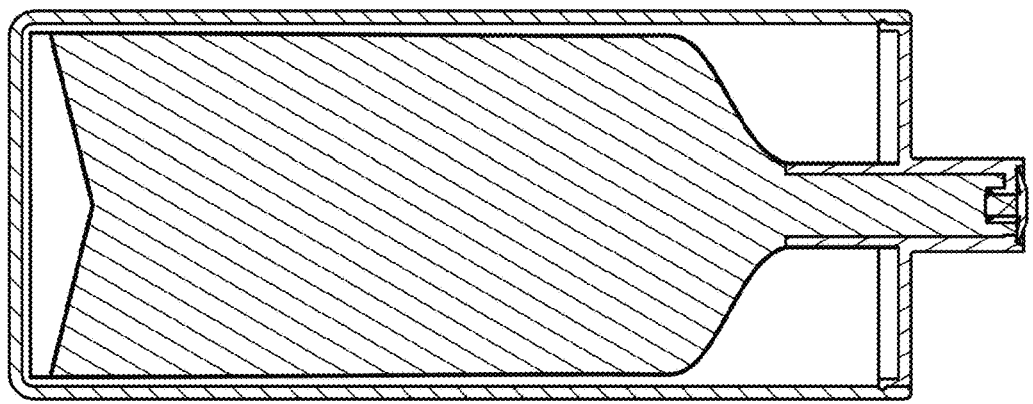
Figure 58C:
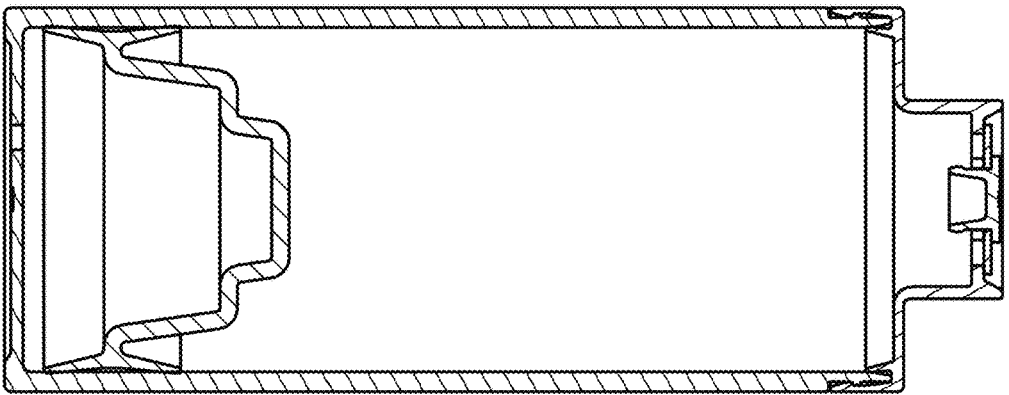
Figure 58D:
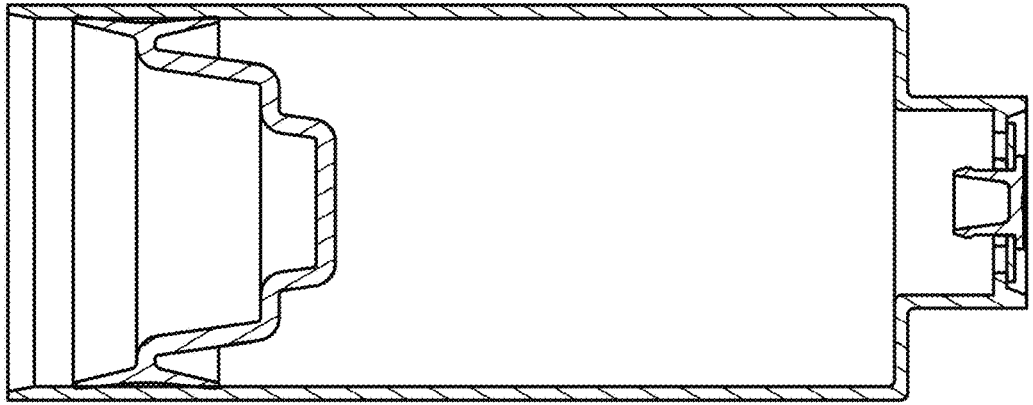

FIGS. 58A-D illustrate different configurations of additive vessels, containers or pods for liquid additives that can be used in accordance with various embodiments. FIG. 58A illustrates an airless or non-vented rear load vessel with a rigid tubular side wall. The additive vessel of FIG. 58A is similar in function to the vessel 4802 illustrated in FIGS. 49A-B, with a plunger 4920 that moves to prevent air from entering the vessel. FIG. 58B illustrates an airless front load vessel with a rigid tubular side wall. FIG. 58C illustrates a collapsible bag or sachet enclosed within an outer container. The collapsible bag makes the plunger unnecessary. FIG. 58D illustrates a vented additive vessel, which allows air to pass back into the vessel to take the place of pumped additive fluid. A two-way valve 5842 allows additive fluid to pass out of the vessel through a center portion of the valve, while air is allowed to enter the vessel through ports 5844 around the periphery of the valve and under an umbrella portion of the valve.

Figure 59:
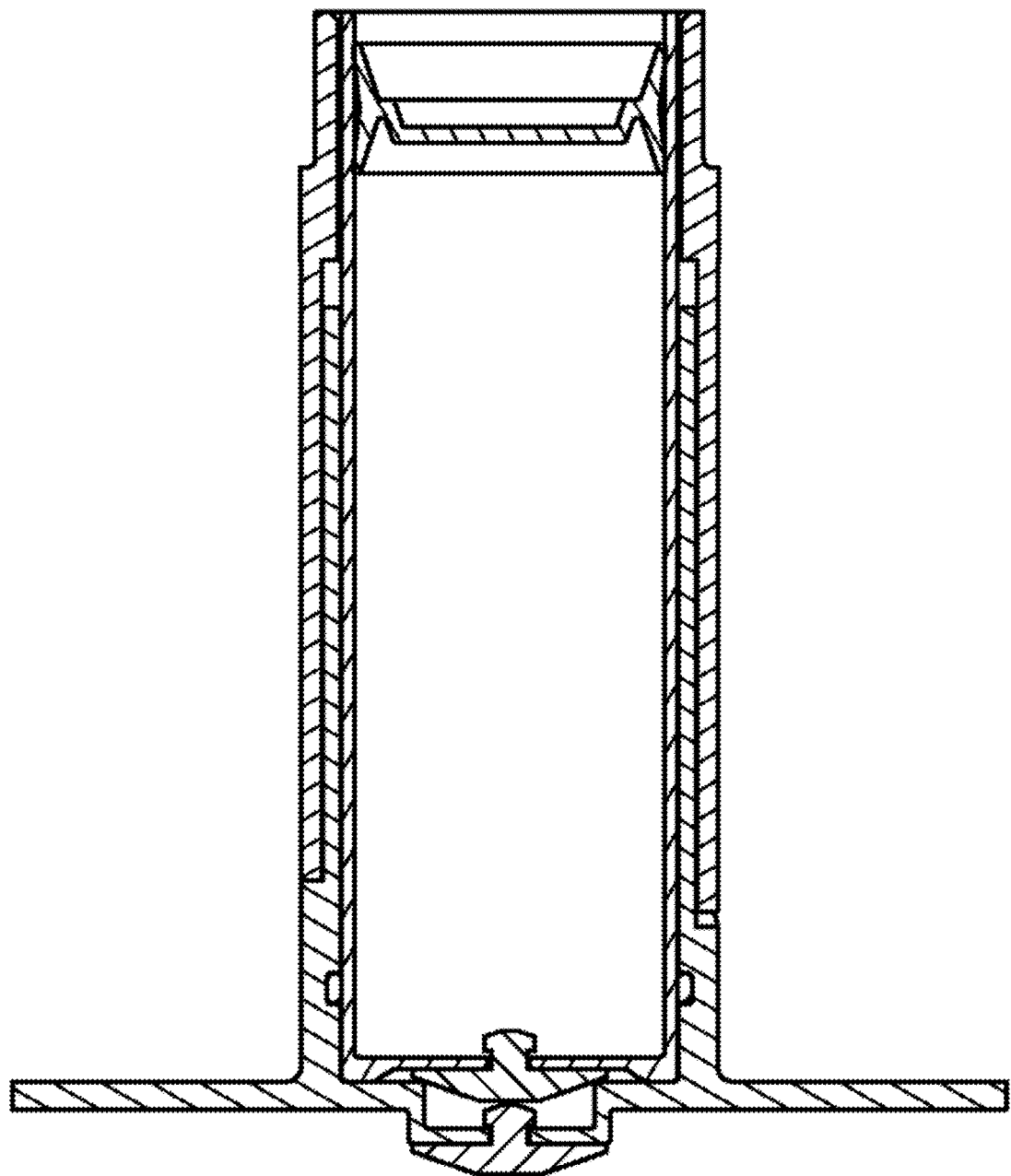
FIG. 59 illustrates a simplified positive displacement pumping mechanism that can be used with various actuation mechanisms in accordance with various embodiments.

FIG. 59 illustrates a simplified positive displacement pumping mechanism that can be used with various actuation mechanisms in accordance with various embodiments.

One benefit of the foregoing described positive displacement pump configurations is that when the additive vessel is withdrawn and when the beverage chamber housing is removed from the dispensing assembly all parts of the pumping mechanism become visible and accessible for cleaning. The pumping chamber is accessible through the receptacle and only a one-way umbrella valve sits in the port between the pumping chamber and the platform which is otherwise also accessible for cleaning. A one-way umbrella valve can be easily removed and cleaned or replaced.

As noted above, the various features and functionality of the embodiments described above with reference to FIGS. 46-55, and further with respect to FIGS. 56-59, can be combined and used in conjunction various features and functionality described earlier with respect to FIGS. 1-45. While such combinations will be apparent to one skilled in the art, certain variations on the embodiments described earlier with respect to FIGS. 1-45 to accommodate the various embodiments of FIGS. 46-59 will nevertheless be described in additional detail below.

Referring again to FIG. 24, the illustrated flowchart can be modified to accommodate the various embodiments of FIGS. 46-59. For example, the dispensing assembly 4613 illustrated in FIG. 47 can be further configured with an attachment sensor (not illustrated) that monitors whether the beverage chamber housing 4614 is threaded onto the dispensing assembly 4613 before a dispensing event occurs. In the illustration of FIG. 24, the attachment sensor can replace or supplement the lid sensor 2401 and one or both checks can be performed before initiating a dispensing event. Each additive vessel 4802 can be configured with an RFID tag as described above with reference to FIG. 24. In the various embodiments of FIGS. 46-59, each vessel can be configured with its own separate pumping mechanism 5002, in which case the steps 2412 and 2413 can omitted. The step 2414, to move a pressure actuator, can be modified to instead drive a motor or other actuation mechanism to move the piston. At step 2416 a linear potentiometer (not illustrated) can be used to determine the position of the pump piston. As noted above, the volume dispensed during a single piston stroke can be modulated linearly by modifying the piston stroke length. Multiple piston strokes can be used to dispense larger quantities.

Referring again to FIG. 30, the illustrated flowchart can be modified to accommodate the various embodiments of FIGS. 46-59. For example, the step 3006, to move a pressure actuator, can be modified to instead drive a motor or other actuation mechanism to move the piston. At step 3007 a linear potentiometer (not illustrated) can be used to determine the position of the pump piston. As noted above, the volume dispensed during a single piston stroke can be modulated linearly by modifying the piston stroke length. Multiple piston strokes can be used to dispense larger quantities.

Referring again to FIG. 35, the illustrated flowchart can be modified to accommodate the various embodiments of FIGS. 46-59. For example, the step 3501 can be triggered by a user's actuation of a user input button 4616 on the container in order to initiate a dispensing event. The step 3501 can also or alternatively be triggered by a Bluetooth or other communication from a user's mobile device. The step 3507 to determine pressure and duration, can be modified to determine piston stroke length and/or number of strokes needed to dispense the correct amount of additive.

In various embodiments, portions of the pumping mechanism need not be replicated and can be configured to be shared between different additive vessels, such as by using a single motor that is actuated or rotated to engage with different pumping mechanisms for different additive vessels. In this case, the steps 2412 and 2413 referred to with respect to FIG. 24 can be configured to rotate or move the shared motor or actuation mechanism to an appropriate position to act on a corresponding pumping mechanism or additive vessel. Similar modifications can be made to steps 3001, 3002 and 3003 of FIG. 30, as well as to step 3508 of FIG. 35.

The foregoing detailed description has set forth various embodiments of the systems, devices, and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. In some cases, the actions described in accordance with one or more of the embodiments may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention. Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A portable, self-contained beverage apparatus, comprising:
    a container assembly having a known storage capacity for storing a consumable liquid;
    a dispensing assembly disposed within the container assembly that dispenses variable, non-zero quantities of additives into the consumable liquid stored in the container assembly;
    said dispensing assembly including a plurality of apertures structured and arranged to retain additive vessels containing the additives to be dispensed into the consumable liquid; and
    the dispensing assembly including a pumping mechanism for dispensing contents of an additive vessel of the additive vessels;
        the pumping mechanism including a reciprocating piston assembly;
        the pumping mechanism including at least one component contained within the additive vessel that can be removed from the dispensing assembly; and
    the portable, self-contained beverage apparatus including a controller that controls the dispensing by the dispensing assembly of the variable, non-zero quantities of the additives into the consumable liquid stored in the container assembly; and
    wherein the controller controls the dispensing by the dispensing assembly of the variable, non-zero quantities of the additives based on a consumable liquid level of the consumable liquid determined by a level sensor and the known storage capacity of the container assembly.

2. The portable, self-contained beverage apparatus of claim 1,
    said controller controlling the dispensing by the dispensing assembly to achieve a targeted concentration of at least one of the additives in the consumable liquid stored in the container assembly, wherein said controlling is based on the consumable liquid level of the consumable liquid determined by the level sensor and the known storage capacity of the container assembly.

3. The portable, self-contained beverage apparatus of claim 1, wherein the plurality of apertures are positioned radially about the dispensing assembly.

4. The portable, self-contained beverage apparatus according to claim 3, said dispensing assembly including:

a nest having a plurality of nest apertures structured and arranged to receive and support the additive vessels retained in the nest apertures, a pressure applicator provided proximate to at least one of the nest apertures, said pressure applicator applying pressure to the additive vessel when the additive vessel is retained in one of the nest apertures to create a dispensing event from the additive vessel.

5. The portable, self-contained beverage apparatus of claim 1, said container assembly including:
an outer sleeve; and
an inner chamber slidably and removably fitted into said outer sleeve, said inner chamber being structured and arranged to receive the dispensing assembly at a top end thereof, said inner chamber storing the consumable liquid.

6. The portable, self-contained beverage apparatus of claim 1, the level sensor disposed within the container assembly, and the level sensor determines the consumable liquid level of the consumable liquid stored in the container assembly.

7. The portable, self-contained beverage apparatus of claim 1, further including an air-tight radial face seal between the additive vessel and a pump body facilitating neutral pressure additive vessel removal.

8. The portable, self-contained beverage apparatus of claim 1, further including an attachment mechanism for coupling the additive vessel to the dispensing assembly.

9. The portable, self-contained beverage apparatus of claim 1, wherein the plurality of apertures each have a modular dispensing assembly.

10. The portable, self-contained beverage apparatus of claim 1, the dispensing assembly coupled to a bottom end of the container assembly.

11. A portable, self-contained beverage apparatus, comprising:
a container assembly having a known storage capacity for storing a consumable liquid;
a dispensing assembly disposed within the container assembly that dispenses variable, non-zero quantities of additives into the consumable liquid stored in the container assembly;
said dispensing assembly including a plurality of apertures structured and arranged to retain additive vessels containing the additives to be dispensed into the consumable liquid; and
the dispensing assembly including a pumping mechanism for dispensing contents of an additive vessel of the additive vessels;
the pumping mechanism including a reciprocating piston assembly;
the pumping mechanism including at least one component contained within the additive vessel that can be removed from the dispensing assembly; and
the portable, self-contained beverage apparatus further including:
a controller that controls the dispensing by the dispensing assembly of the variable, non-zero quantities of the additives into the consumable liquid stored in the container assembly; and
reading means for reading identification information on the additive vessels retained in the apertures, said controller controlling the dispensing by the dispensing assembly based on the identification information.

12. The portable, self-contained beverage apparatus of claim 11, further including:

a memory device storing tracked consumable liquid level in the container assembly and quantity of the additives,
a level sensor sensing the consumable liquid level at different times,
said controller tracking the consumable liquid level in the container assembly and the quantity of the additives dispensed into the consumable liquid,
said memory device storing the identification information of each of the additive vessels in data association with the tracked consumable liquid level and the quantity of the additives.

13. A portable, self-contained beverage apparatus, comprising:
a container assembly having a known storage capacity for storing a consumable liquid;
a dispensing assembly disposed within the container assembly that dispenses variable, non-zero quantities of additives into the consumable liquid stored in the container assembly;
said dispensing assembly including a plurality of apertures structured and arranged to retain additive vessels containing the additives to be dispensed into the consumable liquid; and
the dispensing assembly including a pumping mechanism for dispensing contents of an additive vessel of the additive vessels;
the pumping mechanism including a reciprocating piston assembly;
the pumping mechanism including at least one component contained within the additive vessel that can be removed from the dispensing assembly; and
the portable, self-contained beverage apparatus further including:
a controller that controls the dispensing by the dispensing assembly of the variable, non-zero quantities of the additives into the consumable liquid stored in the container assembly; and
a level sensor disposed within the container assembly that determines a consumable liquid level of the consumable liquid stored in the container assembly;
the level sensor sensing the consumable liquid level at different times;
the controller tracking the consumable liquid level in the container assembly and the quantity of at least one additive dispensed into the consumable liquid, and
a memory device storing the tracked consumable liquid level in the container assembly and the quantity of the at least one additive.

14. A portable, self-contained beverage apparatus, comprising:
a container assembly having a known storage capacity for storing a consumable liquid;
a dispensing assembly disposed within the container assembly that dispenses variable, non-zero quantities of additives into the consumable liquid stored in the container assembly;
said dispensing assembly including a plurality of apertures structured and arranged to retain additive vessels containing the additives to be dispensed into the consumable liquid; and
the dispensing assembly including a pumping mechanism for dispensing contents of an additive vessel of the additive vessels;
the pumping mechanism including a reciprocating piston assembly;

the pumping mechanism including at least one component contained within the additive vessel that can be removed from the dispensing assembly; and the portable, self-contained beverage apparatus further including:

a controller that controls the dispensing by the dispensing assembly of the variable, non-zero quantities of the additives into the consumable liquid stored in the container assembly; and the controller controlling the dispensing by the dispensing assembly to maintain a targeted concentration of at least one of the additives in the consumable liquid stored in the container assembly, wherein said controlling is based on tracked consumable liquid level and the quantity of the at least one of the additives.

15. A portable, self-contained beverage apparatus, comprising:

a container assembly having a known storage capacity for storing a consumable liquid;

a dispensing assembly disposed within the container assembly that dispenses variable, non-zero quantities of additives into the consumable liquid stored in the container assembly;

said dispensing assembly including a plurality of apertures structured and arranged to retain additive vessels containing the additives to be dispensed into the consumable liquid; and the dispensing assembly including a pumping mechanism for dispensing contents of an additive vessel of the additive vessels;

the pumping mechanism including a reciprocating piston assembly;

the pumping mechanism including at least one component contained within the additive vessel that can be removed from the dispensing assembly; and the portable, self-contained beverage apparatus including three additive vessels, of the additive vessels, retained in the plurality of apertures that contain the additives to be dispensed into the consumable liquid stored in the container assembly;

wherein each of the additive vessels includes a one-way valve through which additive contained in the respective additive vessel is dispensed into the consumable liquid stored in the container assembly; and wherein each of the additive vessels has a plurality of bellows formed in at least one side wall of the additive vessel.

* * * * *